(12) United States Patent
Sasai et al.

(10) Patent No.: US 8,805,099 B2
(45) Date of Patent: Aug. 12, 2014

(54) IMAGE DECODING METHOD AND IMAGE CODING METHOD

(75) Inventors: Hisao Sasai, Osaka (JP); Takahiro Nishi, Nara (JP); Youji Shibahara, Osaka (JP); Toshiyasu Sugio, Osaka (JP); Kyoko Tanikawa, Osaka (JP); Toru Matsunobu, Osaka (JP); Kengo Terada, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 186 days.

(21) Appl. No.: 13/529,246

(22) Filed: Jun. 21, 2012

(65) Prior Publication Data

US 2012/0328207 A1 Dec. 27, 2012

Related U.S. Application Data

(60) Provisional application No. 61/499,787, filed on Jun. 22, 2011, provisional application No. 61/499,795, filed on Jun. 22, 2011, provisional application No. 61/499,885, filed on Jun. 22, 2011, provisional application No. 61/500,225, filed on Jun. 23, 2011, provisional application No. 61/544,364, filed on Oct. 7, 2011, provisional application No. 61/545,665, filed on Oct. 11, 2011.

(51) Int. Cl.
*G06K 9/36* (2006.01)
*H04N 7/26* (2006.01)
*H04N 7/50* (2006.01)

(52) U.S. Cl.
CPC .... *H04N 19/00121* (2013.01); *H04N 19/00781* (2013.01)
USPC ...... 382/233; 382/236; 382/248; 358/426.04; 708/203

(58) Field of Classification Search
USPC ............. 382/233, 236, 239, 248; 358/426.03, 358/426.04; 708/203
See application file for complete search history.

(56) References Cited

U.S. PATENT DOCUMENTS 6,631,214 B1 * 10/2003 Nakaya ......................... 382/238
6,643,409 B1 * 11/2003 Nakaya ......................... 382/251
(Continued)

FOREIGN PATENT DOCUMENTS

WO 2008/118145 10/2008
WO 2009/029797 3/2009

OTHER PUBLICATIONS

ISO/IEC 14496-10, "MPEG-4 Part 10: Advanced Video Coding", Oct. 1, 2004, pp. 1-267.

(Continued)

*Primary Examiner* — Yosef Kassa
(74) *Attorney, Agent, or Firm* — Wenderoth, Lind & Ponack, L.L.P.

(57) ABSTRACT

An image decoding method is an image decoding method of decoding coded image data, including selecting, based on a type of a decoding target signal, an arithmetic decoding method that is used to decode the decoding target signal, from among a plurality of arithmetic decoding methods that include: a first arithmetic decoding method which is performed based on a symbol occurrence probability obtained according to a context, and which involves update of the symbol occurrence probability according to a decoding symbol; and a second arithmetic decoding method which is performed based on a symbol occurrence probability obtained according to a context, and which maintains the symbol occurrence probability that is other than 50%.

4 Claims, 106 Drawing Sheets

(56) References Cited

U.S. PATENT DOCUMENTS

| | | | |
|---|---|---|---|
| 6,650,781 B2 * | 11/2003 | Nakaya | 382/236 |
| 7,634,145 B2 * | 12/2009 | Keith et al. | 382/233 |
| 7,839,311 B2 | 11/2010 | Bao et al. | |
| 8,204,321 B2 * | 6/2012 | Rossato et al. | 382/238 |
| 2009/0058695 A1 | 3/2009 | Bao et al. | |
| 2010/0027684 A1 | 2/2010 | Zou et al. | |
| 2010/0150394 A1 | 6/2010 | Bloom et al. | |
| 2010/0169349 A1 | 7/2010 | Zou et al. | |

OTHER PUBLICATIONS

Thomas Wiegand et al., "WD3: Working Draft 3 of High-Efficiency Video Coding ver. 5", Joint Collaborative Team on Video Coding (JCT-VC) of ITU-T SG16 WP3 and ISO/IEC JTC1/SC29/WG11, JCTVC-E603, $5^{th}$ Meeting: Geneva, CH, Mar. 16-23, 2011, http://phenix.int-evry.fr/jct/doc_end_user/documents/5_Geneva/wg11/JCTVC-E603-v5.zip.

* cited by examiner

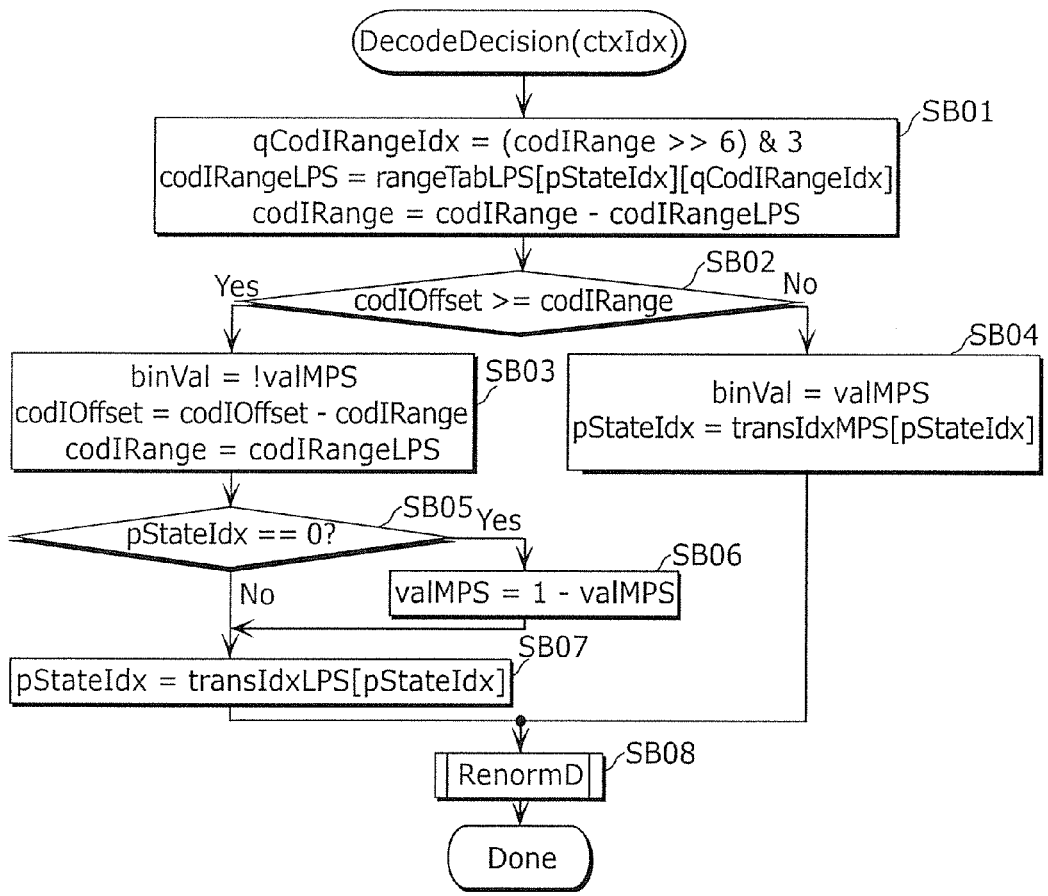
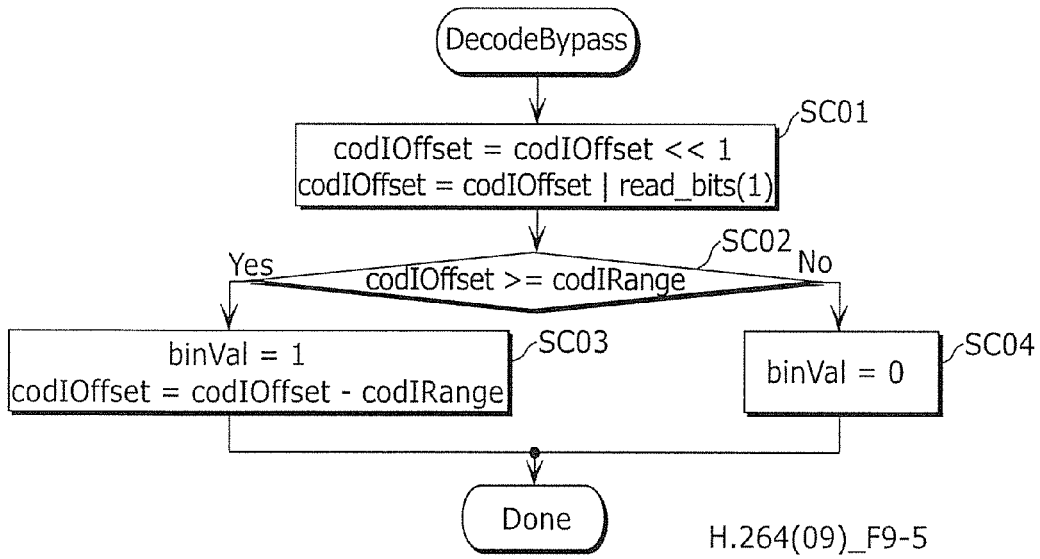

FIG. 4

| pStateIdx | qCodIRangeIdx D01 | | | | pStateIdx | qCodIRangeIdx | | | |
|---|---|---|---|---|---|---|---|---|---|
| | 0 | 1 | 2 | 3 | | 0 | 1 | 2 | 3 |
| 0 | 128 | 176 | 208 | 240 | 32 | 27 | 33 | 39 | 45 |
| 1 | 128 | 167 | 197 | 227 | 33 | 26 | 31 | 37 | 43 |
| 2 | 128 | 158 | 187 | 216 | 34 | 24 | 30 | 35 | 41 |
| 3 | 123 | 150 | 178 | 205 | 35 | 23 | 28 | 33 | 39 |
| 4 | 116 | 142 | 169 | 195 | 36 | 22 | 27 | 32 | 37 |
| 5 | 111 | 135 | 160 | 185 | 37 | 21 | 26 | 30 | 35 |
| 6 | 105 | 128 | 152 | 175 | 38 | 20 | 24 | 29 | 33 |
| 7 | 100 | 122 | 144 | 166 | 39 | 19 | 23 | 27 | 31 |
| 8 | 95 | 116 | 137 | 158 | 40 | 18 | 22 | 26 | 30 |
| 9 | 90 | 110 | 130 | 150 | 41 | 17 | 21 | 25 | 28 |
| 10 | 85 | 104 | 123 | 142 | 42 | 16 | 20 | 23 | 27 |
| 11 | 81 | 99 | 117 | 135 | 43 | 15 | 19 | 22 | 25 |
| 12 | 77 | 94 | 111 | 128 | 44 | 14 | 18 | 21 | 24 |
| 13 | 73 | 89 | 105 | 122 | 45 | 14 | 17 | 20 | 23 |
| 14 | 69 | 85 | 100 | 116 | 46 | 13 | 16 | 19 | 22 |
| 15 | 66 | 80 | 95 | 110 | 47 | 12 | 15 | 18 | 21 |
| 16 | 62 | 76 | 90 | 104 | 48 | 12 | 14 | 17 | 20 |
| 17 | 59 | 72 | 86 | 99 | 49 | 11 | 14 | 16 | 19 |
| 18 | 56 | 69 | 81 | 94 | 50 | 11 | 13 | 15 | 18 |
| 19 | 53 | 65 | 77 | 89 | 51 | 10 | 12 | 15 | 17 |
| 20 | 51 | 62 | 73 | 85 | 52 | 10 | 12 | 14 | 16 |
| 21 | 48 | 59 | 69 | 80 | 53 | 9 | 11 | 13 | 15 |
| 22 | 46 | 56 | 66 | 76 | 54 | 9 | 11 | 12 | 14 |
| 23 | 43 | 53 | 63 | 72 | 55 | 8 | 10 | 12 | 14 |
| 24 | 41 | 50 | 59 | 69 | 56 | 8 | 9 | 11 | 13 |
| 25 | 39 | 48 | 56 | 65 | 57 | 7 | 9 | 11 | 12 |
| 26 | 37 | 45 | 54 | 62 | 58 | 7 | 9 | 10 | 12 |
| 27 | 35 | 43 | 51 | 59 | 59 | 7 | 8 | 10 | 11 |
| 28 | 33 | 41 | 48 | 56 | 60 | 6 | 8 | 9 | 11 |
| 29 | 32 | 39 | 46 | 53 | 61 | 6 | 7 | 9 | 10 |
| 30 | 30 | 37 | 43 | 50 | 62 | 6 | 7 | 8 | 9 |
| 31 | 29 | 35 | 41 | 48 | 63 | 2 | 2 | 2 | 2 |

Extracted from Non-Patent Literature 1

Extracted from Non-Patent Literature 1

| pStateIdx2 | leftShiftTabLPS |
|---|---|
| 0 | 0 |
| 1 | 1 |
| 2 | 2 |
| 3 | 3 |
| 4 | 4 |
| 5 | 5 |
| 6 | 6 |

(b)

| pStateIdx2 | leftShiftTabLPS |
|---|---|
| 0 | 0 |
| 1 | 1 |
| 2 | 2 |
| 3 – 4 | 3 |
| 5 – 11 | 4 |
| 12 – | 5 |

(c)

| pStateIdx2 | leftShiftTabLPS |
|---|---|
| 0 | 0 |
| 1 | 1 |
| 2 | 2 |
| 3 | 3 |
| 4 – 11 | 4 |
| 12 – 61 | 5 |
| 62 – 63 | 6 |

Extracted from Non-Patent Literature 1

Extracted from Non-Patent Literature 1

Extracted from Non-Patent Literature 1

FIG. 19

| pStateIdx | qCodIRangeIdx D01 | | | | pStateIdx | qCodIRangeIdx | | | |
|---|---|---|---|---|---|---|---|---|---|
| | 0 | 1 | 2 | 3 | | 0 | 1 | 2 | 3 |
| 0 | 128 | 176 | 208 | 240 | 32 | 27 | 33 | 39 | 45 |
| 1 | 128 | 167 | 197 | 227 | 33 | 26 | 31 | 37 | 43 |
| 2 | 128 | 158 | 187 | 216 | 34 | 24 | 30 | 35 | 41 |
| 3 | 123 | 150 | 178 | 205 | 35 | 23 | 28 | 33 | 39 |
| 4 | 116 | 142 | 169 | 195 | 36 | 22 | 27 | 32 | 37 |
| 5 | 111 | 135 | 160 | 185 | 37 | 21 | 26 | 30 | 35 |
| 6 | 105 | 128 | 152 | 175 | 38 | 20 | 24 | 29 | 33 |
| 7 | 100 | 122 | 144 | 166 | 39 | 19 | 23 | 27 | 31 |
| 8 | 95 | 116 | 137 | 158 | 40 | 18 | 22 | 26 | 30 |
| 9 | 90 | 110 | 130 | 150 | 41 | 17 | 21 | 25 | 28 |
| 10 | 85 | 104 | 123 | 142 | 42 | 16 | 20 | 23 | 27 |
| 11 | 81 | 99 | 117 | 135 | 43 | 15 | 19 | 22 | 25 |
| 12 | 77 | 94 | 111 | 128 | 44 | 14 | 18 | 21 | 24 |
| 13 | 73 | 89 | 105 | 122 | 45 | 14 | 17 | 20 | 23 |
| 14 | 69 | 85 | 100 | 116 | 46 | 13 | 16 | 19 | 22 |
| 15 | 66 | 80 | 95 | 110 | 47 | 12 | 15 | 18 | 21 |
| 16 | 62 | 76 | 90 | 104 | 48 | 12 | 14 | 17 | 20 |
| 17 | 59 | 72 | 86 | 99 | 49 | 11 | 14 | 16 | 19 |
| 18 | 56 | 69 | 81 | 94 | 50 | 11 | 13 | 15 | 18 |
| 19 | 53 | 65 | 77 | 89 | 51 | 10 | 12 | 15 | 17 |
| 20 | 51 | 62 | 73 | 85 | 52 | 10 | 12 | 14 | 16 |
| 21 | 48 | 59 | 69 | 80 | 53 | 9 | 11 | 13 | 15 |
| 22 | 46 | 56 | 66 | 76 | 54 | 9 | 11 | 12 | 14 |
| 23 | 43 | 53 | 63 | 72 | 55 | 8 | 10 | 12 | 14 |
| 24 | 41 | 50 | 59 | 69 | 56 | 8 | 9 | 11 | 13 |
| 25 | 39 | 48 | 56 | 65 | 57 | 7 | 9 | 11 | 12 |
| 26 | 37 | 45 | 54 | 62 | 58 | 7 | 9 | 10 | 12 |
| 27 | 35 | 43 | 51 | 59 | 59 | 7 | 8 | 10 | 11 |
| 28 | 33 | 41 | 48 | 56 | 60 | 6 | 8 | 9 | 11 |
| 29 | 32 | 39 | 46 | 53 | 61 | 6 | 7 | 9 | 10 |
| 30 | 30 | 37 | 43 | 50 | 62 | 6 | 7 | 8 | 9 |
| 31 | 29 | 35 | 41 | 48 | 63 | 2 | 2 | 2 | 2 |

D02 points to row 1 (128 167 197 227); D03 points to row 43 (15 19 22 25)

Extracted from Non-Patent Literature 1

Extracted from Non-Patent Literature 1

Extracted from Non-Patent Literature 1

H.264(09)_F9-5
Extracted from Non-Patent Literature 1

FIG. 35

| pStateIdx | qCodIRangeIdx | | | | pStateIdx | qCodIRangeIdx | | | |
| --- | --- | --- | --- | --- | --- | --- | --- | --- | --- |
| | 0 | 1 | 2 | 3 | | 0 | 1 | 2 | 3 |
| 0 | 128 | 176 | 208 | 240 | 32 | 27 | 33 | 39 | 45 |
| 1 | 128 | 167 | 197 | 227 | 33 | 26 | 31 | 37 | 43 |
| 2 | 128 | 158 | 187 | 216 | 34 | 24 | 30 | 35 | 41 |
| 3 | 123 | 150 | 178 | 205 | 35 | 23 | 28 | 33 | 39 |
| 4 | 116 | 142 | 169 | 195 | 36 | 22 | 27 | 32 | 37 |
| 5 | 111 | 135 | 160 | 185 | 37 | 21 | 26 | 30 | 35 |
| 6 | 105 | 128 | 152 | 175 | 38 | 20 | 24 | 29 | 33 |
| 7 | 100 | 122 | 144 | 166 | 39 | 19 | 23 | 27 | 31 |
| 8 | 95 | 116 | 137 | 158 | 40 | 18 | 22 | 26 | 30 |
| 9 | 90 | 110 | 130 | 150 | 41 | 17 | 21 | 25 | 28 |
| 10 | 85 | 104 | 123 | 142 | 42 | 16 | 20 | 23 | 27 |
| 11 | 81 | 99 | 117 | 135 | 43 | 15 | 19 | 22 | 25 |
| 12 | 77 | 94 | 111 | 128 | 44 | 14 | 18 | 21 | 24 |
| 13 | 73 | 89 | 105 | 122 | 45 | 14 | 17 | 20 | 23 |
| 14 | 69 | 85 | 100 | 116 | 46 | 13 | 16 | 19 | 22 |
| 15 | 66 | 80 | 95 | 110 | 47 | 12 | 15 | 18 | 21 |
| 16 | 62 | 76 | 90 | 104 | 48 | 12 | 14 | 17 | 20 |
| 17 | 59 | 72 | 86 | 99 | 49 | 11 | 14 | 16 | 19 |
| 18 | 56 | 69 | 81 | 94 | 50 | 11 | 13 | 15 | 18 |
| 19 | 53 | 65 | 77 | 89 | 51 | 10 | 12 | 15 | 17 |
| 20 | 51 | 62 | 73 | 85 | 52 | 10 | 12 | 14 | 16 |
| 21 | 48 | 59 | 69 | 80 | 53 | 9 | 11 | 13 | 15 |
| 22 | 46 | 56 | 66 | 76 | 54 | 9 | 11 | 12 | 14 |
| 23 | 43 | 53 | 63 | 72 | 55 | 8 | 10 | 12 | 14 |
| 24 | 41 | 50 | 59 | 69 | 56 | 8 | 9 | 11 | 13 |
| 25 | 39 | 48 | 56 | 65 | 57 | 7 | 9 | 11 | 12 |
| 26 | 37 | 45 | 54 | 62 | 58 | 7 | 9 | 10 | 12 |
| 27 | 35 | 43 | 51 | 59 | 59 | 7 | 8 | 10 | 11 |
| 28 | 33 | 41 | 48 | 56 | 60 | 6 | 8 | 9 | 11 |
| 29 | 32 | 39 | 46 | 53 | 61 | 6 | 7 | 9 | 10 |
| 30 | 30 | 37 | 43 | 50 | 62 | 6 | 7 | 8 | 9 |
| 31 | 29 | 35 | 41 | 48 | 63 | 2 | 2 | 2 | 2 |

Extracted from Non-Patent Literature 1

Extracted from Non-Patent Literature 1

FIG. 39
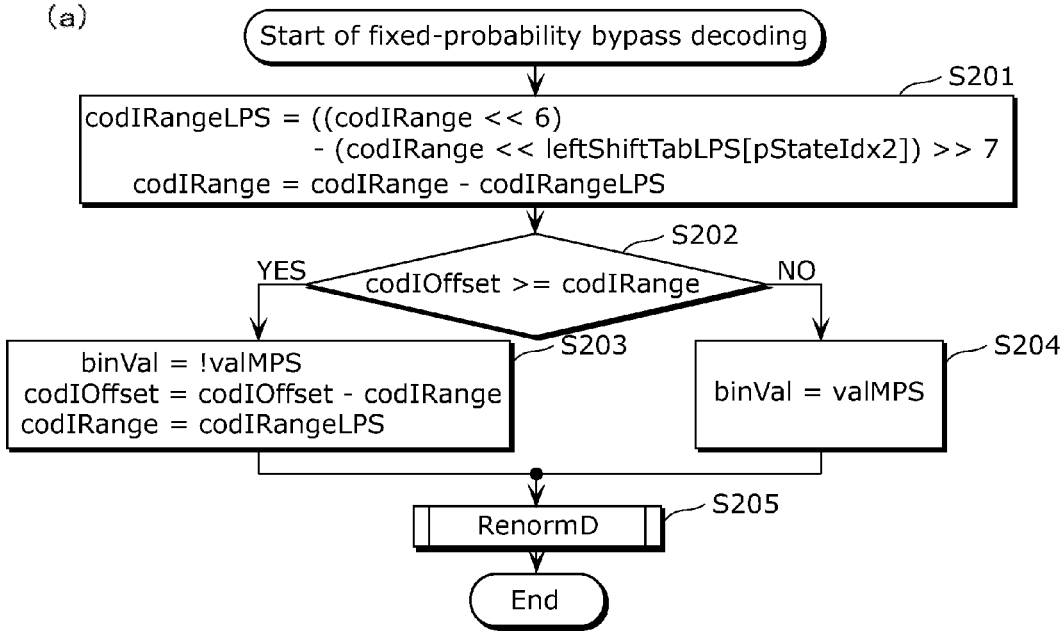
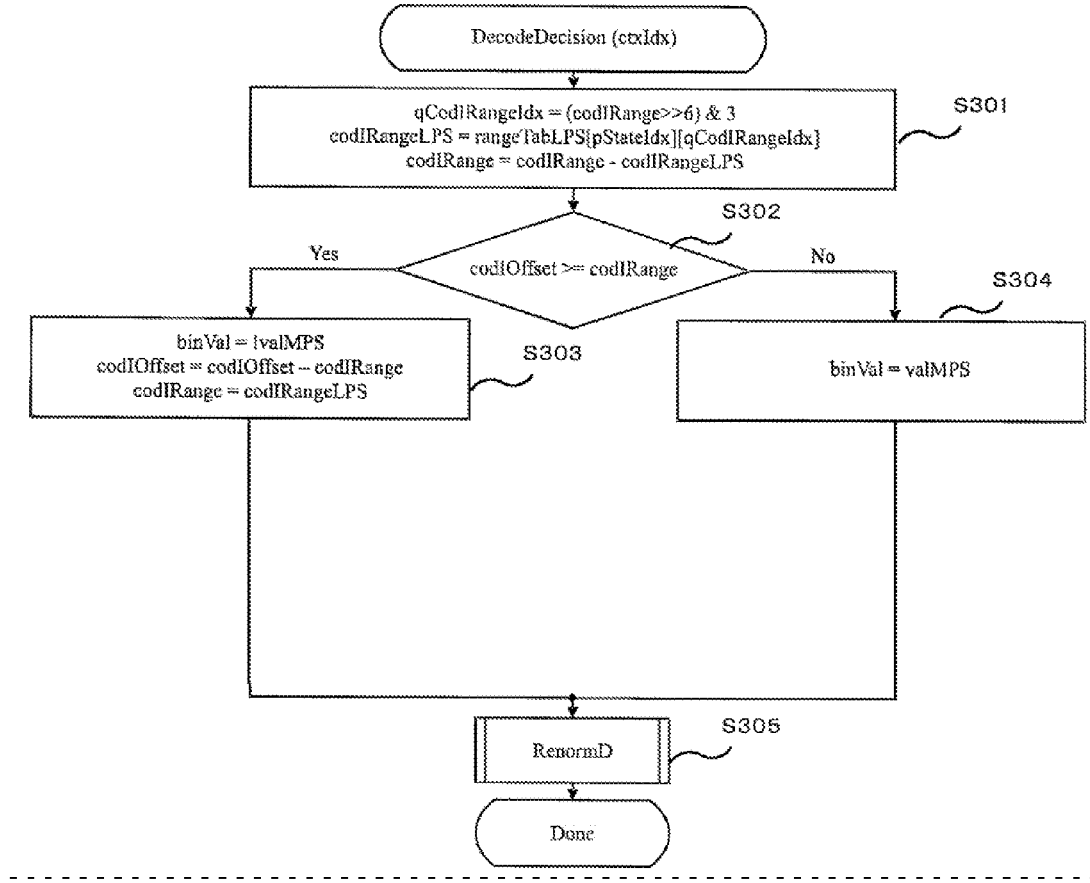

Figure 8-1 — Intra prediction mode directions (informative)
Diagram extracted from Non-patent Literature 1

| idx | bins |
|-----|------|
| 0 | 0000 |
| 1 | 1000 |
| 2 | 0100 |
| 3 | 1100 |
| 4 | 0010 |
| 5 | 1010 |
| 6 | 0110 |
| 7 | 1110 |
| 8 | 0001 |
| 9 | 1001 |
| 10 | 0101 |
| 11 | 1101 |
| 12 | 0011 |
| 13 | 1011 |
| 14 | 0111 |
| 15 | 1111 |

(b)

| idx | bins |
|-----|------|
| 0 | 00000 |
| 1 | 10000 |
| 2 | 01000 |
| 3 | 11000 |
| 4 | 00100 |
| 5 | 10100 |
| 6 | 01100 |
| 7 | 11100 |
| 8 | 00010 |
| 9 | 10010 |
| 10 | 01010 |
| 11 | 11010 |
| 12 | 00110 |
| 13 | 10110 |
| 14 | 01110 |
| 15 | 11110 |
| 16 | 00001 |
| 17 | 10001 |
| 18 | 01001 |
| 19 | 11001 |
| 20 | 00101 |
| 21 | 10101 |
| 22 | 01101 |
| 23 | 11101 |
| 24 | 00011 |
| 25 | 10011 |
| 26 | 01011 |
| 27 | 11011 |
| 28 | 00111 |
| 29 | 10111 |
| 30 | 01111 |
| 31 | 111110 |
| 32 | 111111 |

FIG. 65
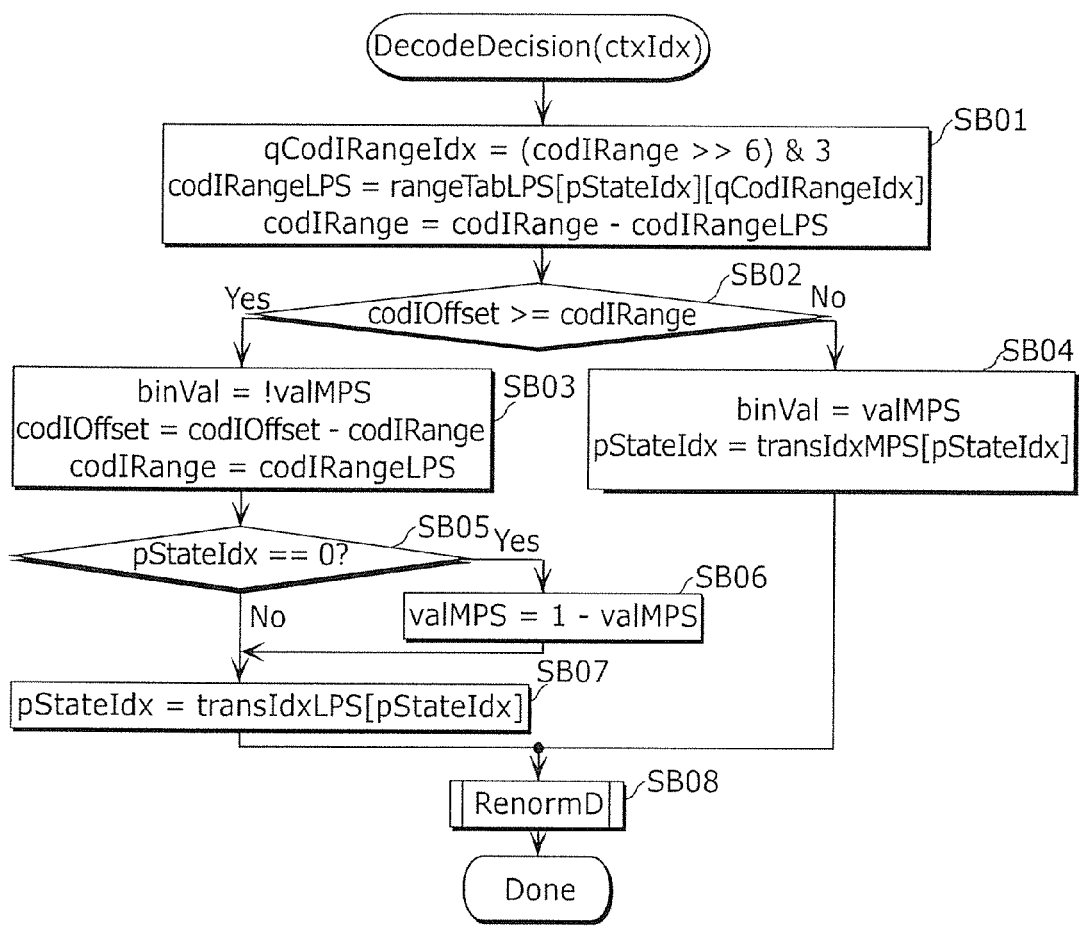
Extracted from Non-Patent Literature 2
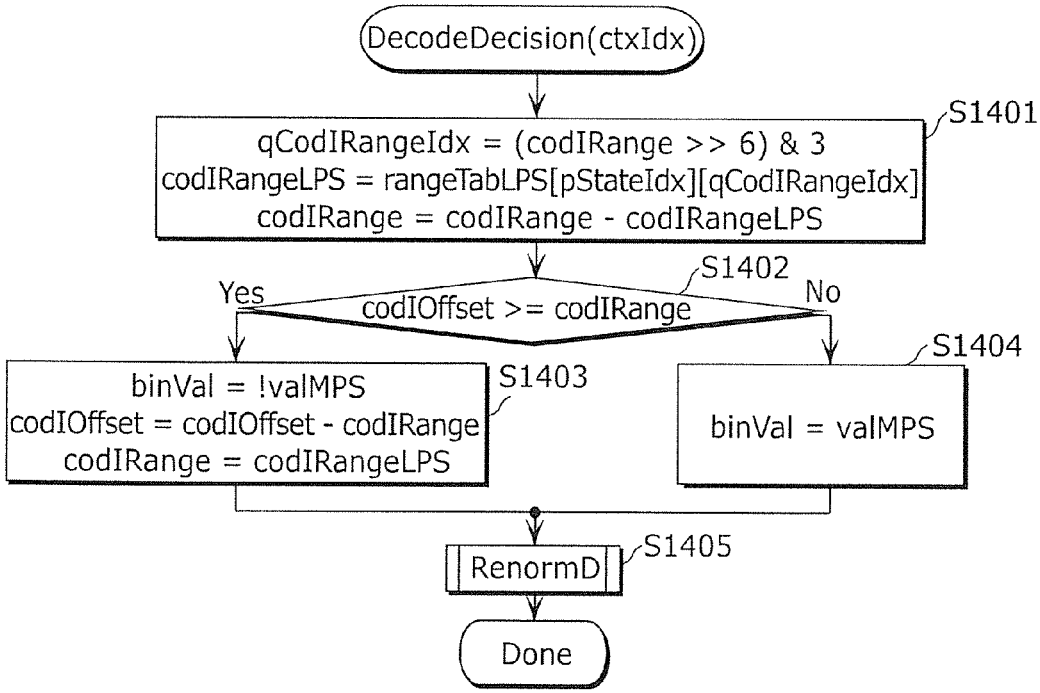

Extracted from
Non-patent Literature 2

| ctxIdx | 0 | 1 | 2 | 3 | ... |
|---|---|---|---|---|---|
| pStateIdx | 12 | 7 | 41 | 22 | ... |
| valMPS | 1 | 0 | 0 | 1 | ... |

FIG. 80

| ctxIdx | 0 | 1 | 2 | 3 | ... |
|---|---|---|---|---|---|
| m | -7 | -10 | -10 | -14 | ... |
| n | 68 | 87 | 105 | 71 | ... |

FIG. 81

```
preCtxState = Clip3( 1, 126, ( ( ( m * Clip3( 0, 51, SliceQP_Y ) ) >> 4 ) + n )
if( preCtxState <= 63 ){
    pStateIdx = 63 - preCtxState
    valMPS = 0
} else {
    pStateIdx = preCtxState - 64
    valMPS = 1
}
```

| ctxIdx | 0 | 1 | 2 | 3 | ... |
|---|---|---|---|---|---|
| pStateIdx | 12 | 7 | 41 | 22 | ... |
| valMPS | 1 | 0 | 0 | 1 | ... |

FIG. 98

| ctxIdx | 0 | 1 | 2 | 3 | ... |
|---|---|---|---|---|---|
| m | -7 | -10 | -10 | -14 | ... |
| n | 68 | 87 | 105 | 71 | ... |

FIG. 99

```
preCtxState = Clip3( 1, 126, ( ( ( m * Clip3(0, 51, SliceQP_Y ) ) >> 4 ) + n )
if( preCtxState <= 63 ){
    pStateIdx = 63 - preCtxState
    valMPS = 0
} else {
    pStateIdx = preCtxState - 64
    valMPS = 1
}
```

Coded stream
(including numerical value indicating initial value)

Coded stream
(including initial value)

Coded stream
(including difference)

Coded stream
(including m and n)

FIG. 113

| |
|---|
| Video stream (PID=0x1011, Primary video) |
| Audio stream (PID=0x1100) |
| Audio stream (PID=0x1101) |
| Presentation graphics stream (PID=0x1200) |
| Presentation graphics stream (PID=0x1201) |
| Interactive graphics stream (PID=0x1400) |
| Video stream (PID=0x1B00, Secondary video) |
| Video stream (PID=0x1B01, Secondary video) |

FIG. 116
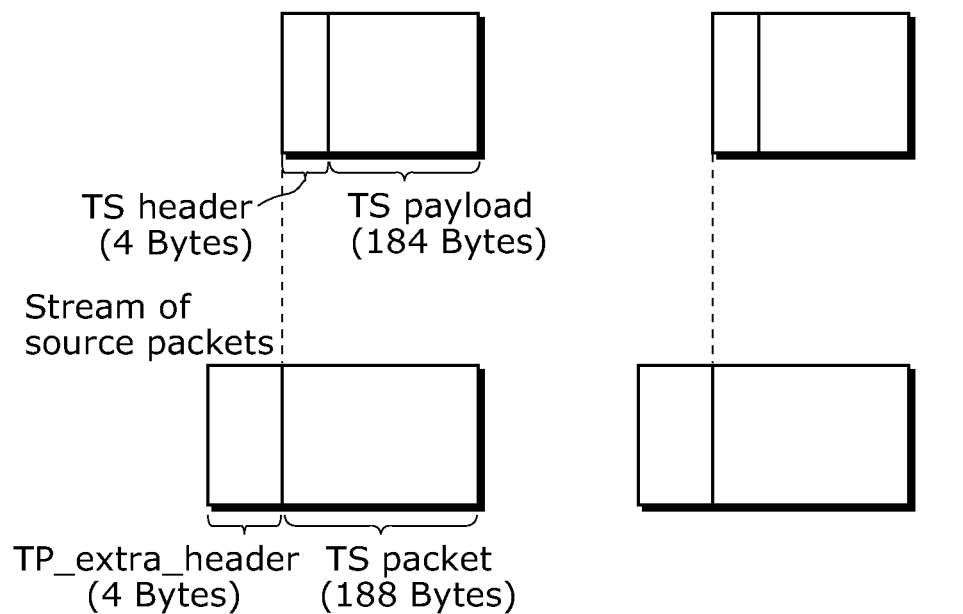
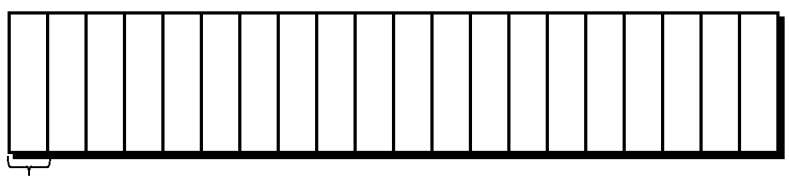

Data structure of PMT

FIG. 124

| Corresponding standard | Driving frequency |
|---|---|
| MPEG-4. AVC | 500 MHz |
| MPEG-2 | 350 MHz |
| ⋮ | ⋮ |

IMAGE DECODING METHOD AND IMAGE CODING METHOD

CROSS REFERENCE TO RELATED APPLICATIONS

The present application claims the benefit of the following U.S. Provisional Patent Applications: No. 61/499,787 filed Jun. 22, 2011; No. 61/499,795 filed Jun. 22, 2011; No. 61/499,885 filed Jun. 22, 2011; No. 61/500,225 filed Jun. 23, 2011; No. 61/544,364 filed Oct. 7, 2011; and No. 61/545,665 filed Oct. 11, 2011. The entire disclosures of the above-identified applications, including the specifications, drawings and claims are incorporated herein by reference in their entirety.

TECHNICAL FIELD

The present invention relates to image decoding methods of decoding images using arithmetic decoding, and image coding methods of coding images using arithmetic coding.

BACKGROUND ART

Examples of techniques related to image coding methods of coding images using arithmetic coding and image decoding methods of decoding images using arithmetic decoding include Patent Literature 1, Patent Literature 2, Non-patent Literature 1, Non-patent Literature 2, and so on indicated below.

CITATION LIST

Patent Literature

[PTL 1]
International Publication No. 2009/029797
[PTL 2]
International Publication No. 2008/118145

Non Patent Literature

[NPL 1]
ISO/IEC 14496-10 "MPEG-4 Part 10 Advanced Video Coding"
[NPL 2]
Joint Collaborative Team on Video Coding (JCT-VC) of ITU-T SG16 WP3 and ISO/IEC JTC1/SC29/WG11 5th Meeting: Geneva, CH, -6-23 Mar. 2011, JCTVC-E603 Title:WD3: Working Draft 3 of High-Efficiency Video Coding ver.5, http://phenix.int-evry.fr/jct/doc_end_user/documents/5_Geneva/wg 11/JCTVC-E603-v5.zip

SUMMARY OF INVENTION

Technical Problem

Further increase in coding efficiency is desired in image coding methods and image decoding methods.

The present invention aims to provide a new image decoding method which allows decoding of images coded with a high coding efficiency.

Solution to Problem

In order to achieve the aforementioned aim, an image decoding method according to an aspect of the present invention is an image decoding method of decoding coded image data, including: selecting, based on a type of a decoding target signal, an arithmetic decoding method that is used to decode the decoding target signal, from among a plurality of arithmetic decoding methods that include: a first arithmetic decoding method which is performed based on a symbol occurrence probability obtained according to a context, and which involves update of the symbol occurrence probability according to a decoding symbol; and a second arithmetic decoding method which is performed based on a symbol occurrence probability obtained according to a context, and which maintains the symbol occurrence probability that is other than 50%.

Any one of these general and specific embodiments may be implemented or realized as a system, a method, an integrated circuit, a computer program, a computer-readable recording medium such as a CD-ROM, or any combination of the system, method, integrated circuit, computer program, or recording medium.

Advantageous Effects of Invention

The image decoding method according to an aspect of the present invention allows decoding of images coded with a high coding efficiency.

BRIEF DESCRIPTION OF DRAWINGS

These and other objects, advantages and features of the invention will become apparent from the following description thereof taken in conjunction with the accompanying drawings that illustrate a specific embodiment of the present invention. In the Drawings:

FIG. 2 is a flowchart of context-adaptive arithmetic decoding in the conventional arithmetic decoding method;

FIG. 3 is a flowchart of bypass arithmetic decoding in the conventional arithmetic decoding method;

FIG. 4 is a schematic diagram for illustrating a probability reference method in the conventional arithmetic decoding method;

FIG. 8 is composed of examples of calculation tables for use in the fixed-probability arithmetic decoding according to Embodiment A1 of the present invention;

FIG. 19 is a schematic diagram for illustrating a probability reference method in the conventional arithmetic decoding method;

In FIG. 31: (a) is an illustration of an exemplary structure of a code string of a coded image corresponding to a video sequence; (b) is an illustration of an exemplary structure of sequence data; (c) is an illustration of an exemplary structure of a picture signal; (d) is an illustration of an exemplary structure of picture data; (e) is an illustration of an exemplary structure of a slice signal; and (f) is an exemplary syntax of data structure including header parameters;

FIG. 35 is a schematic diagram for illustrating a probability reference method in the conventional arithmetic decoding method;

In FIG. 39: (a) is a flowchart of processes of a fixed-probability arithmetic decoding in the arithmetic decoding method according to Embodiment C1 of the present invention; and (b) is a flowchart of exemplary processes of a fixed-probability arithmetic decoding in the arithmetic decoding method according to Embodiment C1 of the present invention;

In FIG. 48: (a) is an illustration of an exemplary structure of a code string of a coded image corresponding to a video sequence; (b) is an illustration of an exemplary structure of sequence data; (c) is an illustration of an exemplary structure of a picture signal; (d) is an illustration of an exemplary structure of picture data; (e) is an illustration of an exemplary structure of a slice signal; and (f) is an exemplary syntax of data structure including header parameters;

In FIG. 50, (a) is a table of conventional association examples of coding mode numbers and binary strings, and (b) is a table of conventional association examples of coding mode numbers and binary strings;

In FIG. 65 according to Embodiment D2: (a) is a flowchart of context-adaptive arithmetic decoding processes in an arithmetic decoding method; and (b) is a flowchart of fixed-probability arithmetic decoding processes;

FIG. 80 is a table of examples of numerical values for initializing probability information according to Embodiment E1;

FIG. 81 is a diagram showing how to calculate an initial value according to Embodiment E1;

FIG. 98 is a table of exemplary numerical values for initializing probability information according to Embodiment F1;

FIG. 99 is a diagram showing how to calculate an initial value according to Embodiment F1;

FIG. 113 illustrates a structure of multiplexed data;

FIG. 116 shows a structure of TS packets and source packets in the multiplexed data;

FIG. 118 shows an internal structure of multiplexed data information;

FIG. 119 shows an internal structure of stream attribute information;

FIG. 120 shows steps for identifying video data;

FIG. 121 shows an example of a configuration of an integrated circuit for implementing the moving picture coding method and the moving picture decoding method according to each of embodiments;

FIG. 122 shows a configuration for switching between driving frequencies;

FIG. 123 shows steps for identifying video data and switching between driving frequencies;

FIG. 124 shows an example of a look-up table in which video data standards are associated with driving frequencies;

FIG. 125A is a diagram showing an example of a configuration for sharing a module of a signal processing unit; and FIG. 125B is a diagram showing another example of a configuration for sharing a module of the signal processing unit.

DESCRIPTION OF EMBODIMENTS

Underlying Knowledge a Forming Basis of the Present Invention

Recent years have seen an increase in the number of applications for services of video on demand types etc. Examples of such services include video-conferencing through the Internet, digital video broadcasting, and streaming of video contents. These applications depend on transmission of video information. When the video data is transmitted or recorded, a considerable amount of data is transmitted through a conventional transmission path having a limited bandwidth, or is recorded onto a conventional recording medium having a limited data capacity. Accordingly, in order to transmit the video information using such a conventional transmission channel or to record the video information onto a conventional recording medium, it is inevitable to compress or reduce the amount of digital data.

For the purpose of compressing such video data, a plurality of video coding standards has been developed. Such video coding standards are, for instance, International Telecommunication Union Telecommunication Standardization Sector (ITU-T) standards denoted with H.26x and ISO/IEC standards denoted with MPEG-x. The most advanced video coding standard is currently the standard denoted as H.264/AVC or MPEG-4/AVC (see Non-patent Literature 1).

The data compression processes in the H.264/AVC standard is roughly divided into prediction, transform, quantization, and entropy coding. The entropy coding is intended to reduce redundant information in information that is used for the prediction and quantized information. Representatives of entropy coding include variable-length coding, adaptive coding, and fixed-length coding. Representatives of variable-length coding include Huffman coding, run-length coding, and arithmetic coding. Among these, the arithmetic coding is known as a method which is intended to determine output codes while calculating symbol occurrence probabilities and which provides a high coding efficiency by determining contexts according to the features of image data, compared to Huffman coding which uses a fixed coding table.

A conventional arithmetic decoding method is described with reference to FIG. 1 to FIG. 5.

First, a flow of the arithmetic decoding method is described below with reference to FIG. 1 to FIG. 5.

Figure 1:
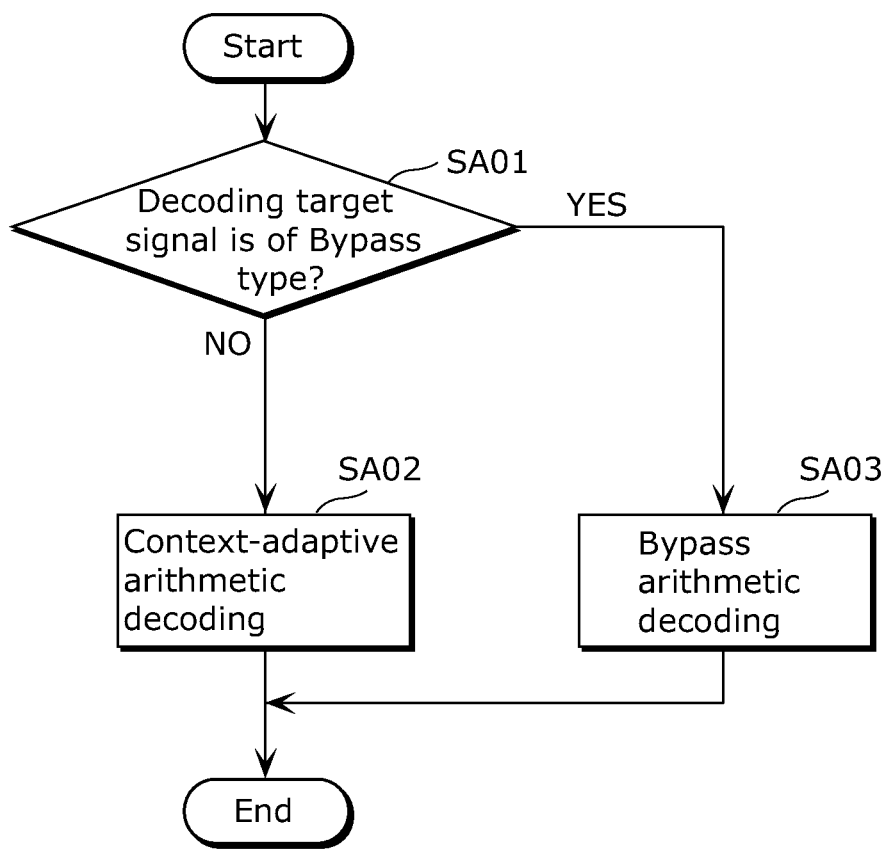
FIG. 1 is a flowchart of a conventional arithmetic decoding method.

FIG. 1 is a flowchart of arithmetic decoding processes performed by an arithmetic decoding unit according to the conventional H.264/AVC standard. As shown in FIG. 1, the arithmetic decoding unit determines whether or not the type of a decoding target signal is of a Bypass type (SA01). When the decoding target signal is of the Bypass type (YES in SA01), bypass arithmetic decoding is performed (SA03). On the other hand, when the decoding target signal is not of the Bypass type (NO in SA01), context adaptive arithmetic decoding is performed based on the type of the decoding target signal (SA02).

FIG. 2 is a flowchart of the aforementioned conventional context adaptive arithmetic decoding. This flowchart is extracted from Non-patent Literature 1, and is the same as in Non-patent Literature 1 unless otherwise explained.

In the arithmetic decoding, a context (ctxIdx) determined based on the signal type is input first.

This is followed by: the calculation of a value qCodIRangeIdx derived from a parameter codIRange showing a current internal state of the arithmetic decoding apparatus; the obtainment of a pStateIdx value that is a state value corresponding to ctxIdx; and the obtainment of codIRangeLPS with reference to a table (rangeTableLPS) based on these two values of qCodIRangeIdx and pStateIdx. Here, this codIRangeLPS denotes a value that is a parameter showing the internal state of the arithmetic decoding apparatus at the time of the occurrence of an LPS (this LPS specifies one of the symbols 0 and 1 that has the lower occurrence probability) with respect to a first parameter codIRange showing the internal state of the arithmetic decoding apparatus.

In addition, a value obtained by subtracting the aforementioned codIRangeLPS from the current codIRange is included in codIRange (Step SB01). Next, the calculated codIRange is compared with a second parameter codIOffset showing the internal state of the arithmetic decoding apparatus (Step SB02). When the codIOffset is greater than or equal to codIRange (YES in Step SB02), it is determined that the symbol of the LPS has occurred, and a value different from a value of valMPS is set to binVal that is a decoding output value. This valMPS value is an MPS value (0 or 1) specifying the one of the symbols 0 and 1 which has the higher occurrence probability, and the different value is 0 when valMPM=1 is satisfied or 1 when valMPM=0 is satisfied. In addition, a value obtained through the subtraction of codIRange is set to the second parameter codIOffset showing the internal state of the arithmetic decoding apparatus, and, since the LPS has occurred, the value of codIRangeLPS calculated in Step SB01 is set to the first parameter codIRange showing the internal state of the arithmetic decoding apparatus (Step SB03). Here, when the pStateIdx value that is a state value corresponding to the aforementioned ctxIdx is 0 (YES in Step SB05), it is shown that the probability of the LPS exceeds the probability of the MPS, and thus valMPS is changed to the opposite value (changed to 0 when valMPM=1, and to 1 when valMPM=0) (Step SB06). On the other hand, when the pStateIdx value is 0 (NO in Step SB05), the pStateIdx value is updated based on a transform table transIDxLPS that is used at the time of the occurrence of the LPS (Step SB07).

In addition, when codIOffset is smaller (NO in SB02), it is determined that the symbol of the MPS has occurred, valMPS is set to binVal that is the decoding output value, and the pStateIdx value is updated based on a transform table transIdxMPS that is used at the time of the occurrence of the MPS (Step SB04).

Lastly, the normalization (RenormD) is performed (Step SB08) to end the arithmetic decoding.

FIG. 3 is a flowchart of the aforementioned conventional bypass arithmetic decoding. This flowchart is extracted from Non-patent Literature 1, and is the same as in Non-patent Literature 1 unless otherwise explained.

First, the second parameter codIOffset showing a current internal state of the arithmetic decoding apparatus is shifted to the left (doubled), and 1 bit is read out from a bit stream. Here, this (doubled) value is set when the read-out bit is 0, whereas a value obtained by adding 1 thereto is set when the read-out bit is 1 (SC01).

Next, when codIOffset is greater than or equal to the first parameter codIRange showing the internal state of the arithmetic decoding apparatus (YES in SC02), "1" is set to binVal that is a decoding output value, and a value obtained through the subtraction of codIRange is set to codIOffset (Step SC03). On the other hand, when codIOffset is smaller than the first parameter codIRange showing the internal state of the arithmetic decoding apparatus (NO in SC02), "0" is set to binVal that is a decoding output value (Step SC04).

FIG. 4 is a table of codIRangeLPS used in Step SB01 in FIG. 2, for illustrating in detail a method of deriving the LPS. This table is extracted from Non-patent Literature 1, and is the same as in Non-patent Literature 1 unless otherwise explained.

FIG. 4 is a table for deriving codIRangeLPS from pStateIdx and qCodIRangeIdx. As described above, pStateIdx shows the state determined for each of contexts, and shows that the occurrence probability of the LPS is smaller (the occurrence probability of the MPS is greater) as the occurrence probability of the LPS is on the increase and approaches closer to 50%. Here, qCodIRangeIdx is a value obtained by extracting a second bit and a third bit (the value obtained by performing a bitwise AND on 3 and codIRange shifted to the right by 6) among the most significant 3 bits in the parameter codIRange showing the internal state of the arithmetic coding apparatus, and codIRange is a value within a range from 256 to 511. Thus, qCodIRangeIdx is one of four ranges from 0 to 3 divided according to the codIRange value. More specifically, these divided four ranges of 0, 1, 2, and 3 are determined to be 256-319, 320-383, 384-447, and 448-511, respectively (D01). More specifically, when pStateIdx is 1, a value of 128, 167, 197, or 227 is output according to the codIRange value (D02). For example, 128 is output both when codIRange is 256 assuming that the occurrence probability of the LPS is exactly 50% and when codIRange is 300 assuming that the occurrence probability of the LPS is 42.7%. In addition, as another example, 197 is output when codIRange is 400 assuming that the occurrence probability of the LPS is exactly 49.25%.

Likewise, when pStateIdx is 43: 15 is output both when codIRange is 256 and when codIRange is 300 assuming that the occurrence probability of the LPS is 5.9% and 5%, respectively; and 22 is output when codIRange is 400 assuming that the occurrence probability of the LPS is 5.5%.

This eliminates the necessity of multiplications in the decoding. However, there remains a problem that it is impossible to increase the coding efficiency by reflecting the probability value estimated for each context in the coding because the probability value shown as pStateIdx varies depending on codIRange as described above.

Figure 5:
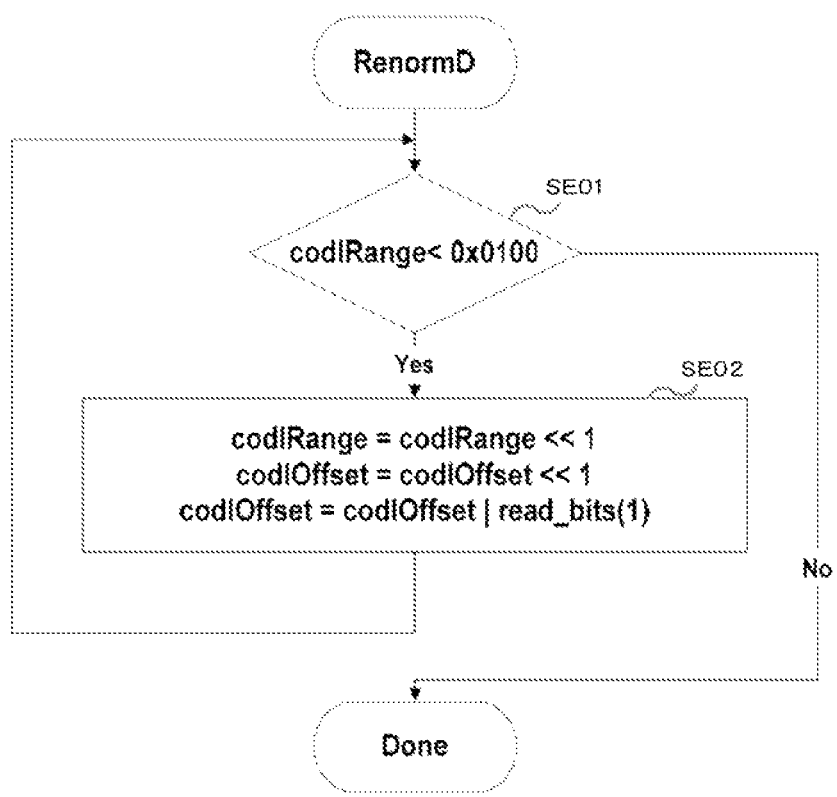
FIG. 5 is a flowchart of normalization in the conventional arithmetic decoding method.

FIG. 5 is a flowchart for illustrating in detail normalization (RenormD) shown in Step SB08 in FIG. 2. This table is extracted from Non-patent Literature 1, and is the same as in Non-patent Literature 1 unless otherwise explained.

When the first parameter codIRange showing the internal state of the arithmetic decoding apparatus in arithmetic decoding is smaller than 0x100 (in the hexadecimal notation that is 256 in the decimal system) (YES in Step SE01), codIRange is shifted to the left (doubled), the second parameter codIffset showing the internal state of the arithmetic decoding apparatus is shifted to the left (doubled), and 1 bit is read out from the bit stream. This (doubled) value is set when the read-out bit is 0, whereas a value obtained by adding 1 thereto is set when the read-out bit is 1 (SE02).

This processing is completed when codIRange reaches or exceeds 256 at last (NO in Step SE01).

Arithmetic decoding is performed by performing the above processes.

However, although the aforementioned conventional technique makes it possible to perform bypass processing on a signal having a probability of 50%, it makes it possible to perform only normal context adaptive arithmetic decoding on a signal having a probability other than 50%. For this reason, bypass processing that requires less update processing can be performed on signals of the limited signal type, and thus the decoding amount is large. The conventional technique has another problem that the coding efficiency decreases. This problem is caused because probability calculations are performed by classifying the internal states into four states for the reference of the tables in the context adaptive arithmetic decoding as described earlier, and thus the probability estimated for each context cannot be utilized properly.

The present invention has been conceived to solve the aforementioned conventional problems, and aims to provide an image coding method and an image decoding method which make it possible to reduce the coding amounts and increase the coding efficiency.

In order to solve the aforementioned conventional problems, an image decoding method according to an aspect of the present invention is an image decoding method for compression decoding image data. This method is intended to (i) perform arithmetic decoding based on a probability specified based on (a) a context determined according to the type of a decoding target signal and (b) a symbol occurrence probability determined corresponding to the context but without being based on a first parameter showing the internal state of the arithmetic decoding apparatus, and (ii) not to update the symbol occurrence probability.

In this way, it is possible to increase the number of types of signals that require such update processing, and reduce the required processing amount, and to thereby perform arithmetic decoding using the symbol occurrence probability independent of the internal state and to increase the coding efficiency.

In addition, for example, an image decoding method according to an aspect of the present invention may be an image decoding method of decoding coded image data, including: selecting, based on a type of a decoding target signal, an arithmetic decoding method that is used to decode the decoding target signal, from among a plurality of arithmetic decoding methods that include: a first arithmetic decoding method which is performed based on a symbol occurrence probability obtained according to a context, and which involves update of the symbol occurrence probability according to a decoding symbol; and a second arithmetic decoding method which is performed based on a symbol occurrence probability obtained according to a context, and which maintains the symbol occurrence probability that is other than 50%.

In addition, for example, the symbol occurrence probability in the second arithmetic decoding method may be defined by performing a shift operation based on a parameter showing an internal state of arithmetic decoding.

In addition, for example, the second arithmetic decoding method may include normalizing an arithmetic decoding process.

In addition, for example, the normalizing may be performed using a table that defines the number of processing loops In addition, for example, in the second arithmetic decoding method, a fixed probability value may be determined for each of parameters.

In addition, for example, an image coding method according to an aspect of the present invention may be an image coding method of coding image data to be coded, including: selecting, based on a type of a coding target signal, an arithmetic coding method that is used to code the coding target signal, from among a plurality of arithmetic coding methods that include: a first arithmetic coding method which is performed based on a symbol occurrence probability obtained according to a context, and involves update of the symbol occurrence probability according to a coding symbol; and a second arithmetic coding method which is performed based on a symbol occurrence probability obtained according to a context, and which maintains the symbol occurrence probability that is other than 50%.

In addition, for example, the symbol occurrence probability in the second arithmetic coding method may be defined by performing a shift operation based on a parameter showing an internal state of arithmetic coding.

In addition, for example, the second arithmetic coding method may include normalizing an arithmetic coding process, and the normalizing may be performed using a table that defines the number of processing loops.

In addition, for example, in the second arithmetic coding method, a fixed probability values may be determined for each of parameters.

It is to be noted that the present invention can be realized or implemented not only as image coding methods and image decoding methods, but also apparatuses which include processing units for performing the processing steps included in the image coding methods and image decoding methods. In addition, the present invention may be realized as programs for causing computers to execute these steps. Furthermore, the present invention may be implemented as recording media such as computer-readable Compact Disc-Read Only Memories (CD-ROMs) including the programs recorded thereon, and information, data, and/or signals representing the programs. Naturally, the program, information, data, and signals may be distributed through communication networks such as the Internet.

Some or all of the structural elements which make up any one of the image coding apparatuses and the image decoding apparatuses may be configured in the form of a single system Large Scale Integration (LSI). Such a system LSI is a super multifunctional LSI manufactured by integrating plural structural element units on a single chip. For example, the system LSI is a computer system configured to include a macro processor, a ROM, a Random Access Memory (RAM), and the like.

The present invention makes it possible to increase the coding efficiency and reduce the processing amount.

Hereinafter, embodiments of the present invention are described with reference to the drawings.

Embodiment A1

A description is given of the outline of an arithmetic decoding method according to this embodiment. The arithmetic decoding method according to this embodiment is for selectively performing, according to a decoding target signal, context-adaptive arithmetic decoding and a fixed-probability arithmetic decoding using a fixed probability without updating the probability for each context. In this way, this embodiment makes it possible to reduce the processing amount and decode a bit stream having a high coding efficiency.

The outline of the arithmetic decoding method according to this embodiment has been described above. The same method as in the conventional arithmetic decoding method can be performed unless otherwise explained.

Figure 6:
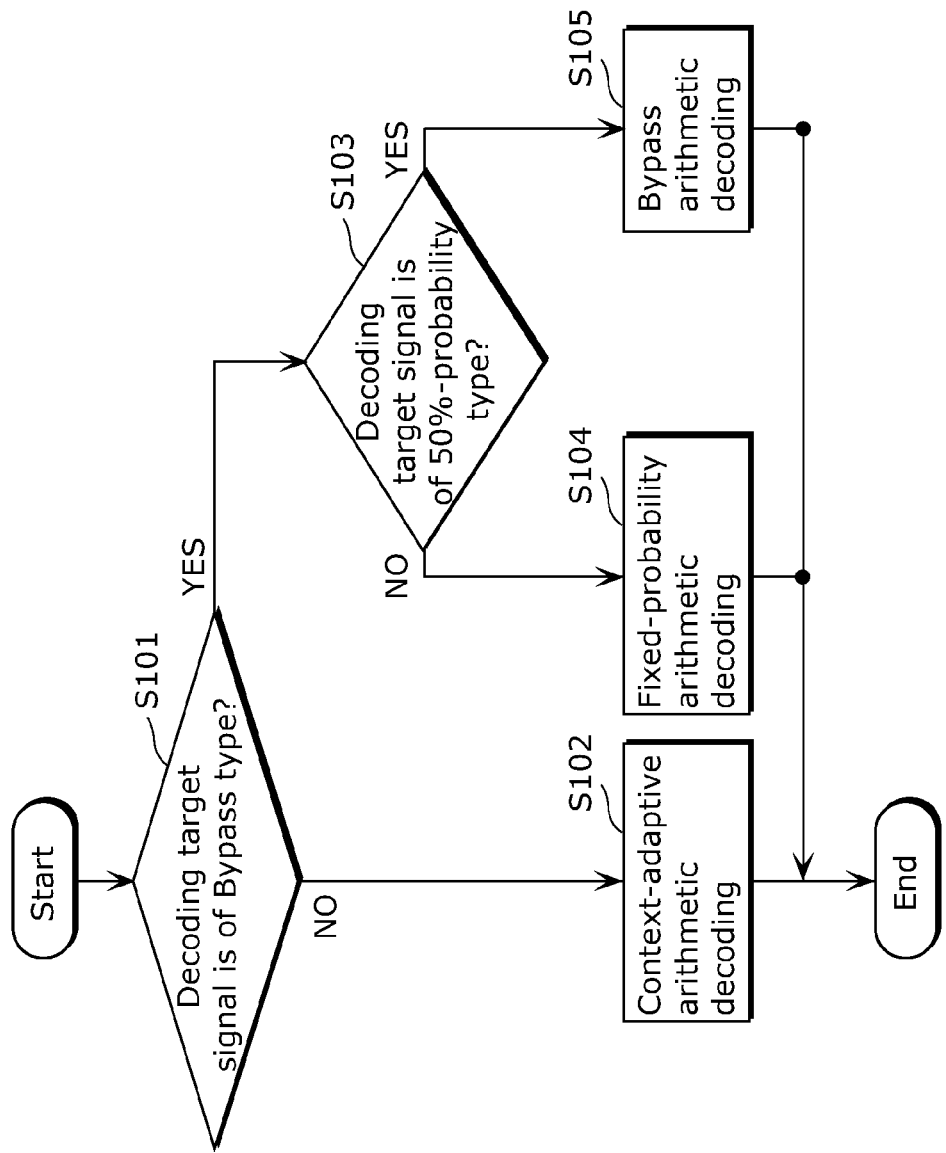
FIG. 6 is a flowchart of an example of an arithmetic decoding method according to Embodiment A1 of the present invention.

Next, a description is given of a flow of processes of the arithmetic decoding method performed by an arithmetic decoding unit according to this embodiment. FIG. 6 is a flowchart of processes performed by the arithmetic decoding unit according to Embodiment A1 of the present invention. The arithmetic decoding unit according to the present invention firstly obtains a bit stream to be a decoding target, and determines whether or not the decoding target signal is of a bypass type (Step S101). This determination may be made in advance with reference to a rule predetermined for each type of a target signal. For example, a sign (+ or −) showing whether or not the value of a coded difference transform image signal is positive or negative is used for bypass processing, and a signal (for example, 0 or 1) showing whether or not the value of a coded difference transform image signal is 0 or non-0 is used for a context-adaptive type.

Here, when the type is not the bypass type (NO in Step S101), the context-adaptive arithmetic decoding is performed (S102). This processing may be the same as the conventional arithmetic decoding method. On the other hand, when it is determined that the type is the bypass type (YES in Step S101), a determination is made as to whether or not the target signal is of 50%-probability type (S103). Here, for the signal of 50%-probability type, a predetermined one may be referred to as in Step S101. For example, a sign (+ or −) showing whether or not the value of a coded difference transform image signal is positive or negative is used for 50%-bypass processing, and a sign (+ or −) showing whether or not a motion vector difference value is positive or negative is used as a fixed probability.

When the target signal is of 50%-bypass type (YES in Step S103), bypass arithmetic decoding is performed (Step S105). This processing may be the same as the conventional arithmetic decoding method. Alternatively, the probability may be fixed at 50% in a fixed-probability decoding described later. In the former case, it is possible to use a circuit according to a conventional technique. In the latter case, it is possible to share circuits and thereby produce an advantage of being able to reduce the circuit scale.

When the decoding target signal is not of the 50%-bypass type, fixed-probability arithmetic decoding is performed (Step S104). In this case, arithmetic decoding is performed using a fixed probability instead of the 50% probability. This processing is further described with reference to FIG. 7.

Figure 7:
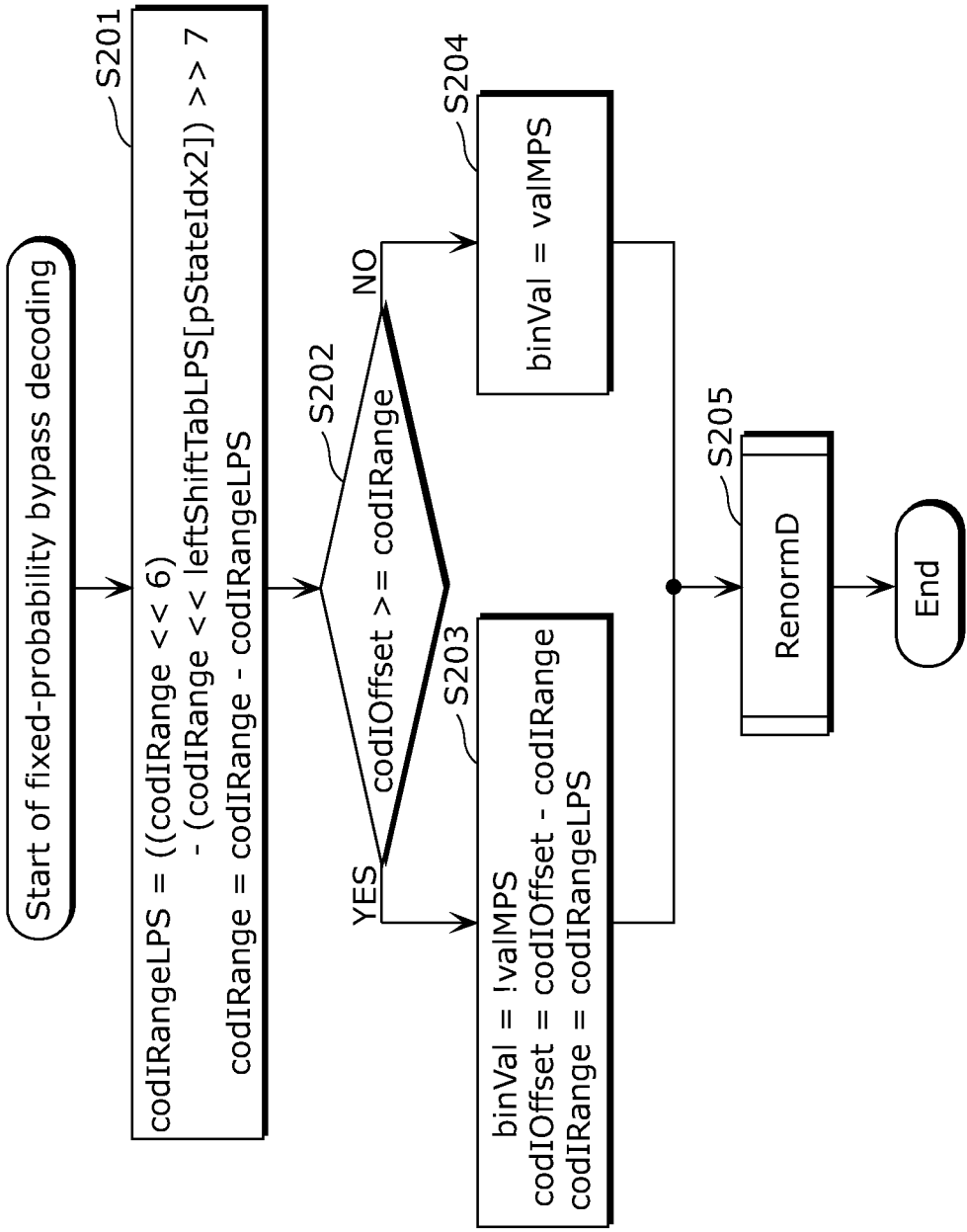
FIG. 7 is a flowchart of a fixed-probability arithmetic decoding in an arithmetic decoding method according to Embodiment A1 of the present invention.

FIG. 7 is a flowchart of fixed-probability arithmetic decoding in the arithmetic decoding unit according to the present invention.

In the arithmetic decoding, a context (ctxIdx) determined based on the signal type is input first.

The value pStateIdx2 obtained here is the value showing the fixed probability for each ctxIdx determined according to the type of a signal.

Next, codIRangeLPS showing the first parameter value at the time of the occurrence of the LPS is calculated based on the first parameter codIRang showing the current internal state of the arithmetic decoding apparatus and the aforementioned fixed probability pStateIdx2. More specifically, this value is calculated according to Expression 1.

$$\text{codIRangeLPS}=((\text{codIRange}<<6)-(\text{codIRange}<<\text{leftShiftTabLPS}[\text{pStateIdx2}]))>>7 \quad \text{(Expression 1)}$$

Where leftShiftTabLPS[ ] is a value in a range from 0 to 5. When the value is 0, 0 shows the probability of $63/128$, whereas when the value is n, n shows the probability of $(64-2*n)/128$. It is to be noted that Expression 1 may be transformed into the expression shown below.

$$\text{codIRangeLPS}=((\text{codIRange}<<6)-(\text{codIRange}<<\text{leftShiftTabLPS}[\text{pStateIdx2}])+1)>>7 \quad \text{(Expression 2)}$$

Where leftShiftTabLPS[ ] is a value in a range from 0 to 6. When the value is 0, 0 shows the probability of 64/128 (50%), when the value is n, n shows the probability of $(64-2*n+1)/128$, and when the value is 6, 6 shows the probability of $1/128$.

In other words, pStateIdx2 is an index showing any one of the plurality of fixed probability values, and the values shown by pStateIdx2 are determined for the respective types of signals.

Here, these values can be calculated by performing a right shift by 7 as an example. In the case of presenting finer probabilities, it is possible to perform a right shift by 10 or the like. The right shift by 10 or the like makes it possible to present finer probabilities, but requires a high internal bit accuracy.

In addition, a value obtained by subtracting the aforementioned codIRangeLPS from the current codIRange is included in codIRange (Step S201). Next, the calculated codIRange is compared with a second parameter codIOffset showing the internal state of the arithmetic decoding apparatus (Step SB02). When the codIOffset is greater than or equal to codIRange (YES in Step S202), it is determined that the symbol of the LPS has occurred, and a value different from a value of valMPS is set to binVal that is a decoding output value. This valMPS value is an MPS value (0 or 1) specifying the one of the symbols 0 and 1 which has the highest occurrence probability, and the different value is 0 when valMPM=1 is satisfied or 1 when valMPM=0 is satisfied. In addition, a value obtained through the subtraction of codIRange is set to the second parameter codIOffset showing the internal state of the arithmetic decoding apparatus, and, since the LPS has occurred, the value of codIRangeLPS calculated in Step S201 is set to the first parameter codIRange showing the internal state of the arithmetic decoding apparatus (Step S203).

In addition, when codIOffset is small (NO in S202), it is determined that the symbol of the MPS has occurred, valMPS is set to binVal that is the decoding output value, and the pStateIdx value is updated based on the transform table transIdxMPS at the time of the occurrence of the MPS (Step S204).

Lastly, the normalization (RenormD) is performed (Step S205) to end the arithmetic decoding. This normalization may be performed similarly to the conventional one. Alternatively, a later-described method for further reducing the processing amount may be used.

FIG. 8 is composed of schematic diagrams for illustrating the index pStateIdx2 for deriving fixed probabilities. In FIG. 8, (a) shows an example where pStateIdx2 has the same value as the value of leftShiftTabLPS (6 shows a case according to Expression 2). In this case, it is only necessary to store in advance, as values of 0 to 6, pStanteIdx2 for use in coding/decoding using fixed probabilities, and read out the value for use in the decoding of a current signal. This pStateIdx2 is a fixed value that is not updated in coding and decoding, and thus is simply read out from a memory (does not need to be written into the memory). In FIG. 8, each of (b) and (c) shows an association table between pStateIdx2 and leftShiftTableLPS in the case where pStateIdx2 has a value within a range from 0 to 63 as in the case of pStateIdx. In FIG. 8, (b) corresponds to Expression 1, and (c) corresponds to Expression 2. This is a table of mapping for approximating the probabilities derived from the values of leftShiftTabLPS and the values of pStateIdx (the probability values referred to in normal context adaptive arithmetic decoding). With the use of this association table, it is possible to internally process pStateIdx and pStateIdx2 in the same manner. In this way, it is possible to expect a reduction in the circuit scale.

Figure 9:
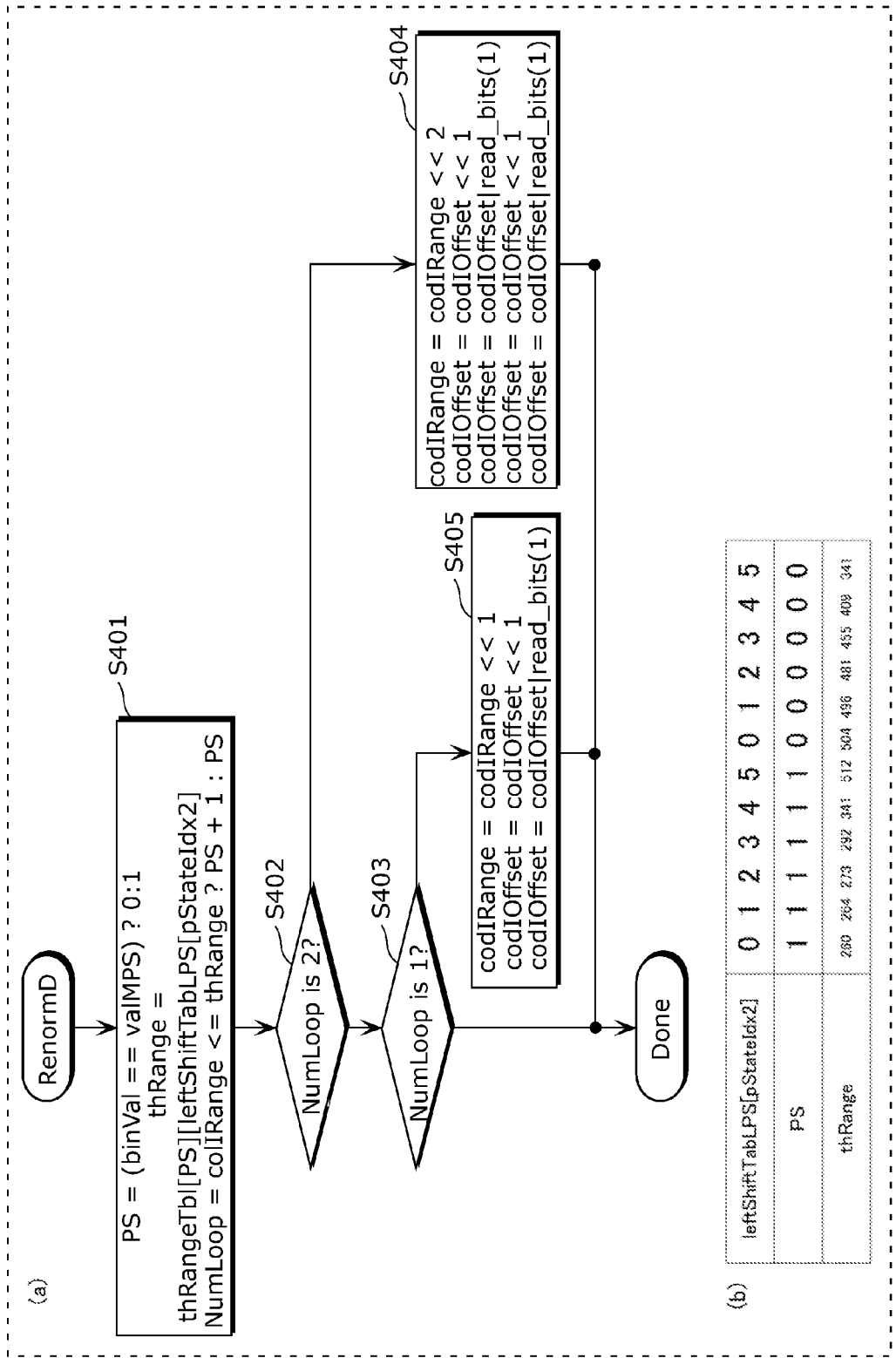
In FIG. 9, (a) is a flowchart of operations in normalization according to Embodiment A1 of the present invention; and (b) is an example of a calculation table for use in the normalization according to Embodiment A1 of the present invention.

In FIG. 9, (a) is a flowchart showing an example of a normalization method performed in the fixed-probability arithmetic decoding according to the present invention, and (b) is an example of a table for use in the normalization method performed in the fixed-probability arithmetic decoding.

In the normalization process (Step S205) in the fixed-probability arithmetic decoding, a flag PS is firstly derived which indicates whether a current decoded signal shows an LPS or an MPS. More specifically, 0 (in the case of the MPS) is set to the parameter PS when the decoded signal value binVal is the same value as that of valMPS, and 1 (in the case of the LPS) is set to the parameter PS when the decoded signal value binVal is a value different from that of valMPS. Next, a threshold value thRange is obtained with reference to the table based on a PS value and a left-shift value that is the value of leftShiftTabLPS [pStateIdx2] (a value within a range from 0 to 5 obtained according to Expression 1) derived from pStateIdx2 showing the aforementioned probability. This exemplary table is shown in (b) of FIG. 9. It is possible to check and calculate in advance which collRange requires what number of loops, and determine the number of loops. The use of this table eliminates the necessity of calculating the number of loops, and thereby reduces the processing amount. A value NumLoop showing what number of loops is required is calculated by comparing the derived threshold value and collRange. Here, a value obtained by adding 1 to the PS value is set to NumLoop when collRange is smaller than or equal to the derived threshold value thRange, and the number indicated by the PS value is set to NumLoop when collRange is greater than the threshold value thRange (Step S401).

When NumLoop is 0 next (NO in Step S402, and No in Step S401), it is only necessary to terminate the normalization process. When NumLoop is 1 (NO in Step S402, and YES in Step S401), coodIRange is shifted to the left (doubled), codIOffset is shifted to the left (doubled), and 1 bit is read out from a bit stream. Here, this (doubled) value is set when the read-out bit is 0, whereas a value obtained by adding 1 thereto is set when the read-out bit is 1 (Step S405).

On the other hand, when NumLoop is 2, the following processes are performed twice: coodIRange is shifted to the left by 2 twice (quadrupled); codIOffset is shifted to the left (doubled); 1 bit is read out from a bit stream; and this (doubled) value is set when the read-out bit is 0, whereas a value obtained by adding 1 thereto is set when the read-out bit is 1 (Step S404).

The table specifying the number of loops shows that the maximum number of loops in decoding according to Expression 1 is 2. This makes it possible to easily estimate the slowest case (called as the worst case) at the time of designing the circuit, and to thereby reduce the circuit scale. In addition, since it is possible to estimate in advance the number of loops based on a threshold value, it is possible to easily perform processing prediction, and to thereby further reduce the circuit scale.

Figure 10:
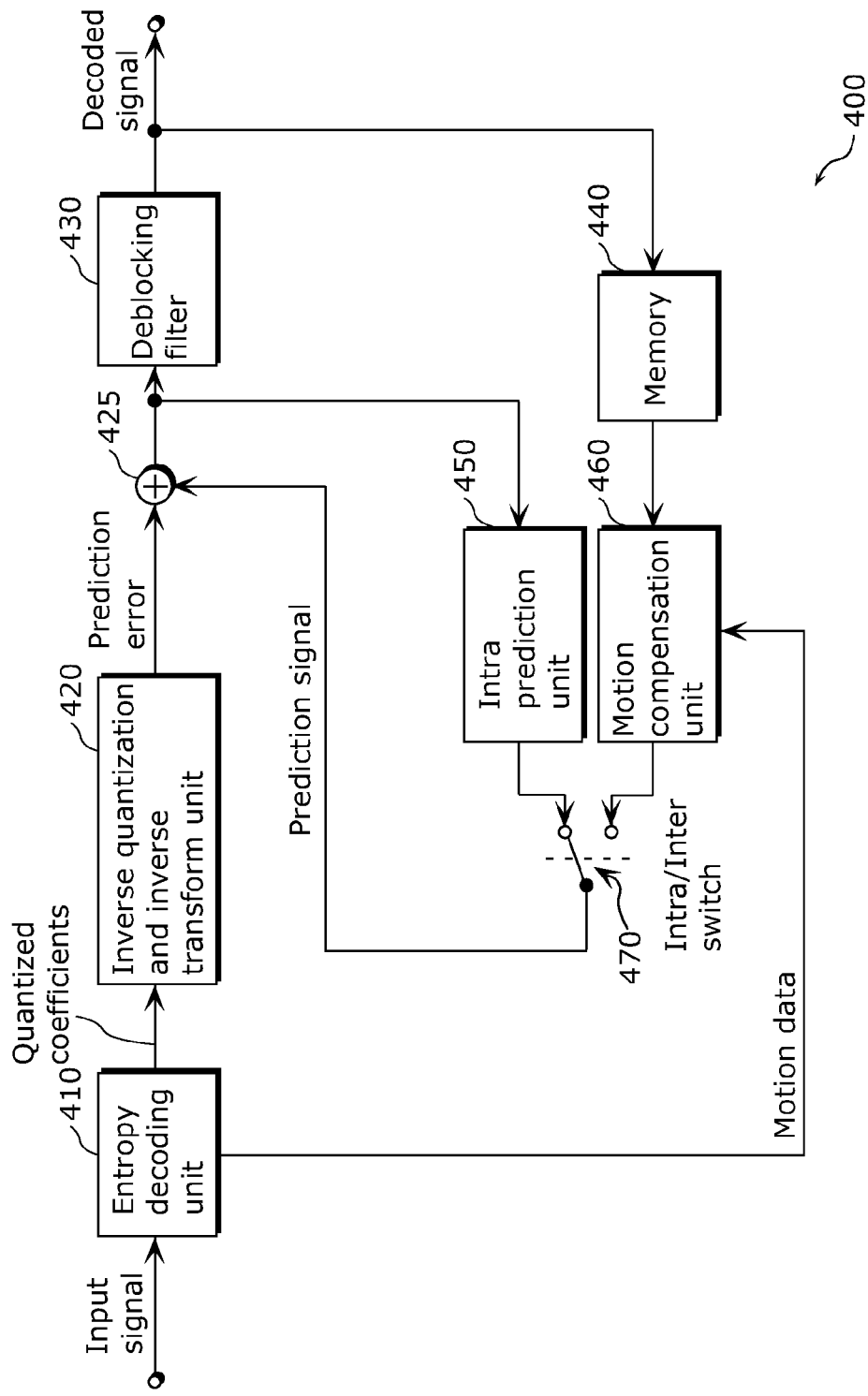
FIG. 10 is a block diagram of an example of the structure of an image decoding apparatus according to Embodiment A1 of the present invention.

It is to be noted that the arithmetic decoding unit according to Embodiment A1 of the present invention is included in the image decoding apparatus which decodes coded image data resulting from compression coding. FIG. 10 is a block diagram of an example of the structure of an image decoding apparatus 400 according to Embodiment A1 of the present invention.

The image decoding apparatus 400 decodes the compression-coded image data. For example, the image decoding apparatus 400 receives, for each of blocks of an image, an input of coded image data as a decoding target signal. The image decoding apparatus 400 reconstructs the image data by performing variable length decoding, and inverse quantization and inverse transform on the input decoding target signal.

As shown in FIG. 10, the image decoding apparatus 400 includes: an entropy decoding unit 410, an inverse quantization and inverse transform unit 420, an adder 425, a deblocking filter 430, a memory 440, an intra prediction unit 450, a motion compensation unit 460, and an intra/inter switch 470.

The entropy decoding unit 410 reconstructs quantized coefficients by performing variable length decoding on the input signal (input stream). Here, the input signal (input stream) is the decoding target signal, and corresponds to block data included in the coded image data. In addition, the entropy decoding unit 410 obtains motion data from the input signal, and outputs the obtained motion data to the motion compensation unit 460.

The inverse quantization and inverse transform unit 420 reconstructs the transform coefficients by performing inverse quantization on the quantized coefficients reconstructed by the entropy decoding unit 410. Then, the inverse quantization and inverse transform unit 420 reconstructs a prediction error by performing inverse transform on the reconstructed transform coefficients.

The adder 425 adds the reconstructed prediction error and a prediction signal to generate a decoded image.

The deblocking filter 430 performs deblocking filtering on the generated decoded image. The decoded image processed by the deblocking filter is output as a decoded signal.

The memory 440 is a memory for storing reference images for use in motion compensation. More specifically, the memory 440 stores decoded images processed by the deblocking filter.

The intra prediction unit 450 performs intra prediction to generate a prediction signal (an intra prediction signal). More specifically, the intra prediction unit 450 performs intra prediction with reference to images surrounding the decoding target block (input signal) in the decoded image generated by the adder 425 to generate an intra prediction signal.

The motion compensation unit 460 performs motion compensation based on motion data output from the entropy decoding unit 410 to generate a prediction signal (an inter prediction signal).

The intra/inter switch 470 selects any one of an intra prediction signal and an inter prediction signal, and outputs the selected signal as the prediction signal to the adder 425.

With the above structure, the image decoding apparatus 400 according to Embodiment A2 of the present invention decodes the compression-coded image data.

In the image decoding apparatus 400, the arithmetic decoding unit according to Embodiment A1 of the present invention is included by the entropy decoding unit 410. In other words, the arithmetic decoding unit performs arithmetic decoding and a multi-value conversion on the coded image data resulting from predictive coding as the input decoding target signal. In addition, signal type information indicates information such as the positions of the quantized coefficients, the motion data, or an intra prediction direction for use by the intra prediction unit 450.

As described above, the image decoding apparatus and the image decoding method according to Embodiment A1 of the present invention make it possible to appropriately reconstruct a signal coded using a fixed probability.

In this way, it is possible to accurately decode the signal having an increased coding efficiency. More specifically, as shown in Embodiment A1, it is possible to use the fixed probability information as coded probability information without depending on any parameter stored inside the decoding apparatus, and thus it is possible to increase the coding efficiency.

In short, it is possible to reduce the processing amount and to increase the coding efficiency.

Although the case of performing a shift operation using the fixed probability is described above, other cases are also possible. For example, it is also good to eliminate the probability update means (the parts for deriving pStateIdx that are Steps SB05, SB06, SB07, and SB04) from a probability derivation method according to a conventional approach as shown in FIG. 2, and performs the probability derivation method without the probability update means. By bypassing the parts (the update means) in the conventional circuit in this way, it is possible to achieve fixed-probability decoding, and to share circuits.

The image decoding apparatus and the image decoding method according to Embodiment A1 of the present invention make it possible to accurately decode the signal having the coding efficiency increased in this way.

In addition, the prepared table facilitates the estimation of required processing time. Thus, it is possible to achieve a high-speed operation circuit that is required, for example, in the real-time reproduction of a high-resolution video.

Embodiment A2

A description is given of the outline of an arithmetic coding method according to this embodiment. The arithmetic coding method according to this embodiment selectively performs, according to a coding target signal, context-adaptive arithmetic coding and a fixed-probability arithmetic coding using a fixed probability without updating the probability for each context. In this way, this embodiment makes it possible to reduce the processing amount and generate a bit stream having a high coding efficiency.

The outline of the arithmetic coding method according to this embodiment has been described above. The same method as in the conventional arithmetic coding method can be performed unless otherwise explained.

Next, a description is given of a flow of processes of the arithmetic coding method performed by an arithmetic coding unit according to this embodiment.

Figure 11:
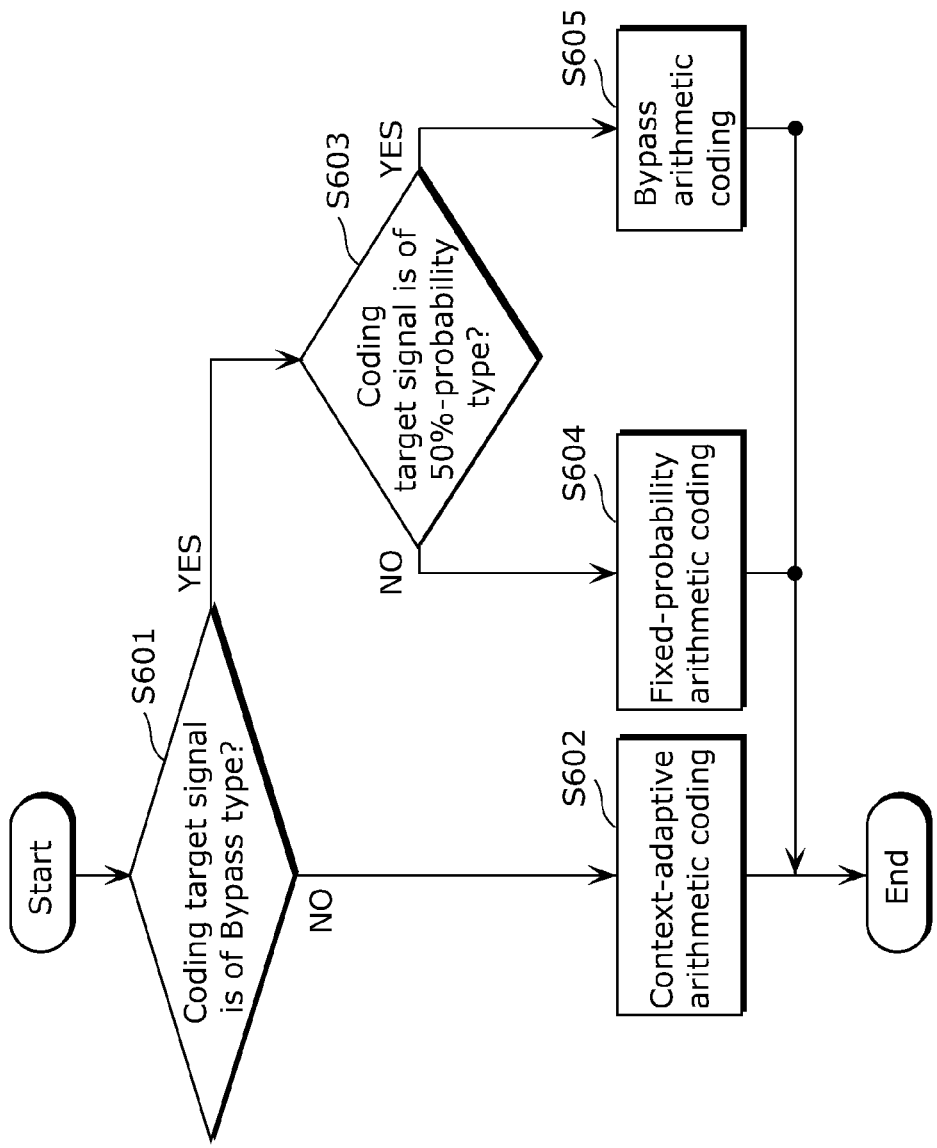
FIG. 11 is a flowchart of an example of the structure of an arithmetic coding unit according to Embodiment A2 of the present invention.

FIG. 11 is a flowchart of processes performed by the arithmetic coding unit according to Embodiment A2 of the present invention. The arithmetic coding unit according to the present invention obtains a coding target signal first, and determines whether or not the coding target signal is of a bypass type (Step S601). This determination may be made with reference to a rule predetermined for each type of a target signal. For example, a sign (+ or −) showing whether or not the value of a difference transform image signal is positive or negative is used for bypass processing, and a signal (for example, 0 or 1) showing whether or not the value of a difference transform image signal is 0 or non-0 is used for a context-adaptive type.

Here, when the type is not the bypass type (NO in Step S601), the context-adaptive arithmetic coding is performed (S602). This processing may be the same as the conventional arithmetic coding method (see (a) of FIG. 12). On the other hand, when it is determined that the type is the bypass type (YES in Step S601), a determination is made as to whether the target signal is of 50%-probability type (S603). Here, for the signal of 50%-probability type, a predetermined one may be referred to as in Step S601. For example, a sign (+ or −) showing whether or not the value of a difference transform image signal is positive or negative is used for 50%-bypass processing, and a sign (+ or −) showing whether or not a motion vector difference value is positive or negative is used as a fixed probability.

When the target signal is of 50%-bypass type (YES in Step S603), bypass arithmetic decoding is performed (Step S605). This processing may be the same as the conventional arithmetic decoding method. Alternatively, the probability may be fixed at 50% in fixed-probability coding described later. In the former case, it is possible to use a circuit according to a conventional technique. In the latter case, it is possible to share circuits and thereby produce an advantage of being able to reduce the circuit scale.

When the coding target signal is not of 50%-bypass type, fixed-probability arithmetic decoding is performed (Step S604). In this case, arithmetic coding is performed using a fixed probability instead of a 50% probability. This processing is further described with reference to FIG. 12.

Figure 12:
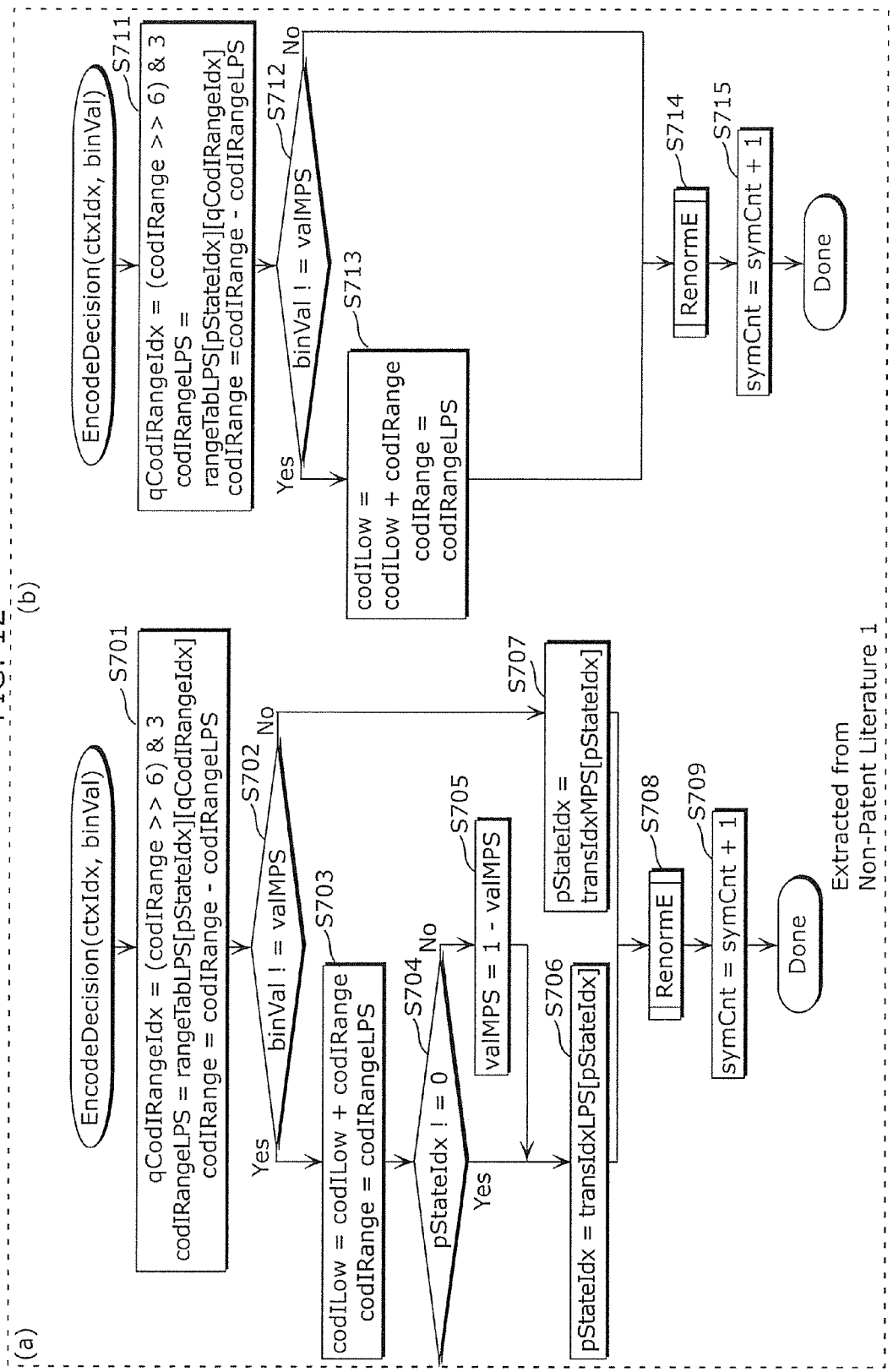
In FIG. 12, (a) is a flowchart of context-adaptive arithmetic decoding in an arithmetic coding method according to Embodiment A2 of the present invention; and (b) is a flowchart of fixed-probability arithmetic decoding in the arithmetic coding method according to Embodiment A2 of the present invention.

In FIG. 12, (a) is a flowchart (extracted from Non-patent Literature 1) of processes of context-adaptive arithmetic coding (S602). These processes are performed in manners similar to those shown in Non-patent Literature 1 unless otherwise explained.

First, for the first parameter codIRange showing the internal state of the arithmetic coding unit, a codIRange value and a codIRangeLPS that is a value in the case where an LPS signal has occurred as in the conventional decoding are calculated (corresponding to Steps S701 and SB01). Next, a determination is made as to whether a current coding target signal binVal is a symbol valMPS having a high symbol occurrence probability (S702). When the current target signal is an LPS (YES in Step 702), the codIRange value calculated in Step S701 is added to the second parameter codILow showing the internal state of the arithmetic coding unit, and the codIRange LPS value is set to codIRange (Step S703). Next, an update of pStateIdx is performed based on the fact that the LPS has occurred in Steps S704 to S706, as in Steps SB04 to SB06. The detailed description is the same as in the description in FIG. 2.

On the other hand, when the coding target signal is an MPS (NO in Step S702), an update of pStateIdx is performed (corresponding to Steps S707 and SB07). Next, a later-described normalization RenormE (S708) is performed, and the counter is incremented (S709) to terminate the processing.

In FIG. 12, (b) is a flowchart of processes of fixed-probability arithmetic coding according to the present invention. First, pStateIdx showing the corresponding probability is obtained, and a calculation is performed as in Step S701 (as in Step SB01) (Step S711). Next, a determination is made as to whether a current coding target signal binVal is a symbol valMPS having a high symbol occurrence probability (S712). When the current target signal is an LPS (YES in S712), the codIRange value calculated in Step S701 is added to the second parameter codILow showing the internal state of the arithmetic coding unit, and the codIRange LPS value is set to codIRange (Step S713). On the other hand, when the coding target signal is an MPS (NO in Step S712), normalization (RenormE, S714) is performed without performing any other processing. Lastly, the counter is incremented (S715) to terminate the processing. In other words, this shows that fixed-probability arithmetic coding is always performed without updating pStateIdx.

Figure 13:
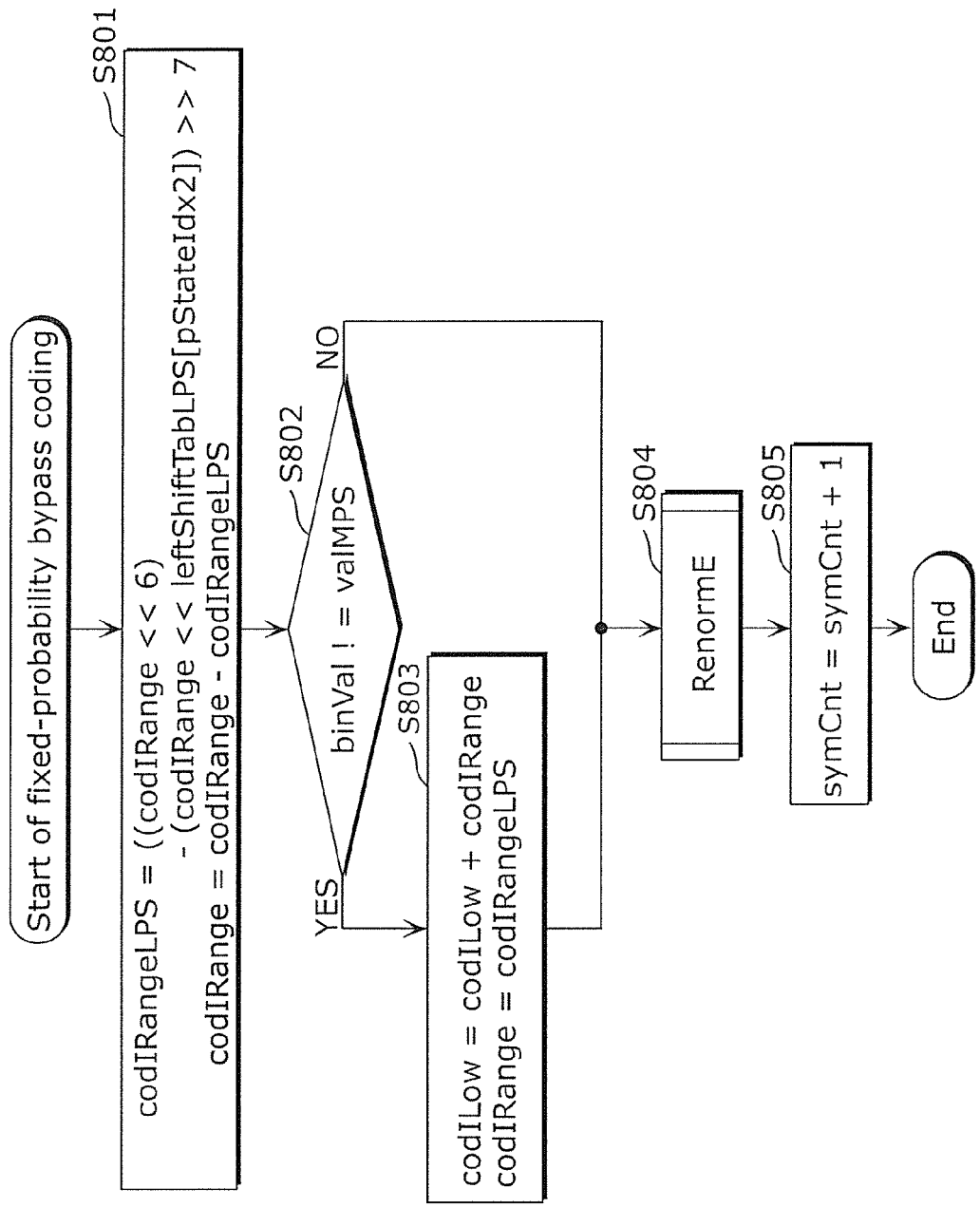
FIG. 13 is a flowchart of another example (different from the example in (b) of FIG. 12) of the fixed-probability arithmetic decoding in the arithmetic coding method according to Embodiment A2 of the present invention.

FIG. 13 shows an operation flow of an arithmetic coding method using a shift operation for reducing the processing amount corresponding to the arithmetic decoding in FIG. 7.

First, codIRangeLPS in the case where an LPS has occurred is calculated using the shift operation (the detailed operation is the same as that in S201 of FIG. 7), and codIRange is also calculated as in S7101 and S711. Next, a determination is made as to whether a current coding target signal binVal is a symbol valMPS having a high symbol occurrence probability (S802). When the current target signal is an LPS (YES in S802), the codIRange value calculated in Step S801 is added to the second parameter codILow showing the internal state of the arithmetic coding unit, and the codIRange LPS value is set to codIRange (Step S803). On the other hand, when the coding target signal is an MPS (NO in Step S802), normalization (RenormE, S804) is performed without performing any other processing. Lastly, the counter is incremented (S805) to terminate the processing. This method uses a number of kinds of fixed probabilities fewer than the number of kinds of fixed probabilities used in the method shown in (b) of FIG. 12, but makes it possible to use the fixed probabilities in the entire processing, and to thereby increase the coding efficiency. The details are the same as the details described in Embodiment A1.

Figure 14:
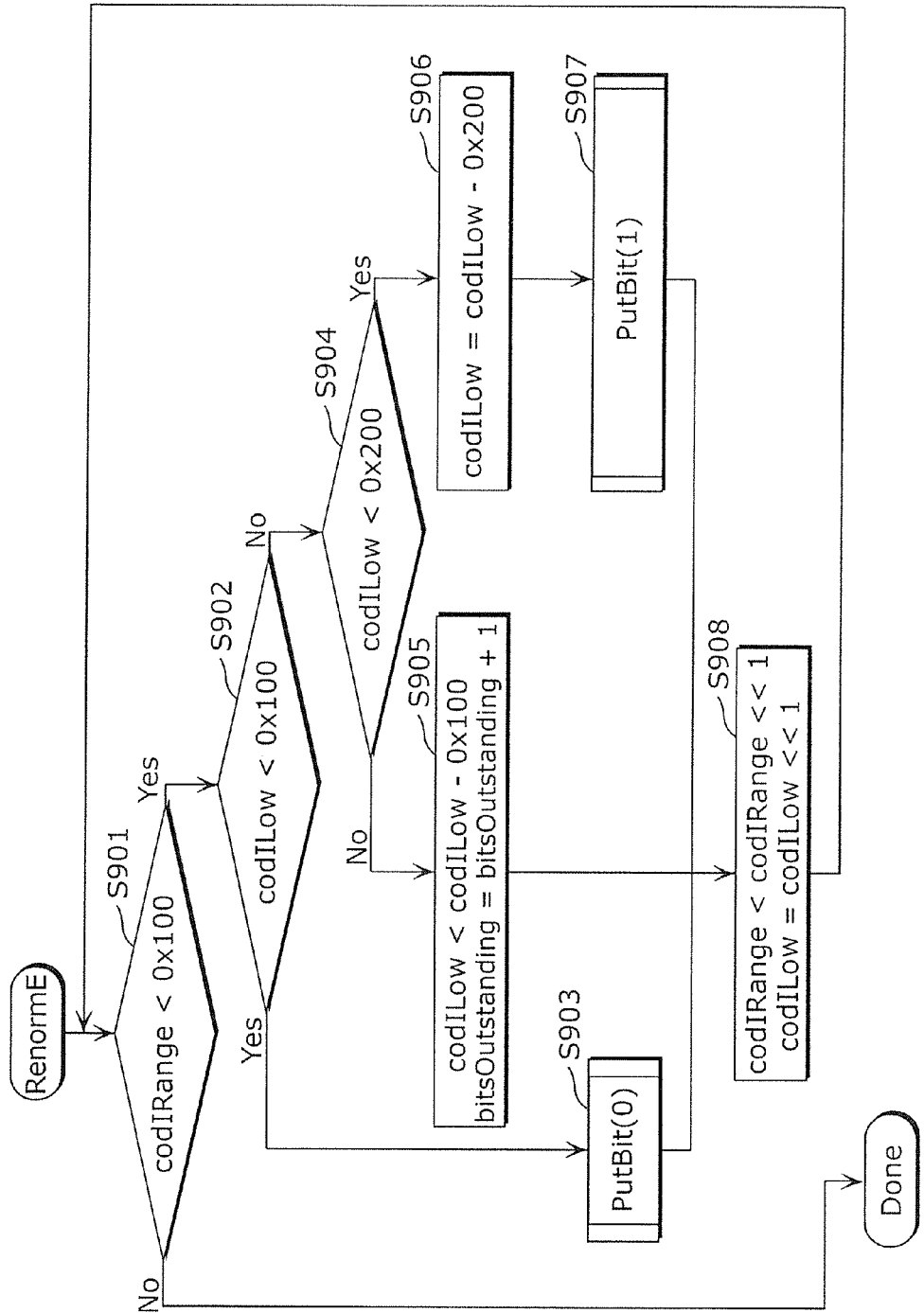
FIG. 14 is a flowchart of normalization in an arithmetic coding method according to Embodiment A2 of the present invention.

FIG. 14 is a flowchart (extracted from Non-patent Literature 1) showing operations in the processes corresponding to the aforementioned normalization processes (Steps S709, S715, and S805). These operations are performed in manners similar to those shown in Non-patent Literature 1 unless otherwise explained.

When codIRange is greater than or equal to 0x100 in the hexadecimal notation (256 in the decimal system) (NO in S901), the normalization process is terminated. On the other hand, a numerical code 0 is written (Step S903) when codIRange (the first parameter showing the internal state of the arithmetic coding apparatus) is smaller than 0x100 in the hexadecimal notation (256 in the decimal system) (YES in S901), and when codILow (the second parameter showing the internal state of the arithmetic coding apparatus) is smaller than 0x100 in the hexadecimal notation (256 in the decimal system) (YES in S902). On the other hand, when codILow is greater than or equal to 0x100 in the hexadecimal notation (256 in the decimal system) and smaller than 0x200 in the hexadecimal notation (512 in the decimal system) (NO in S902, and NO in S904), 0x100 in the hexadecimal notation (256 in the decimal system) is subtracted from codILow, and the counter showing bitsOutstanding that indicates an amount of bits to be written in sequence at the time of bit output is incremented by 1 (Step S905). On the other hand, when codILow is a value greater than or equal to 0x200 in the hexadecimal notation (512 in the decimal system) (NO in S902, and YES in S904), 0x200 in the hexadecimal notation (512 in the decimal system) is subtracted from codILow (S906), and a numerical code 1 is written (Step S907). When the value of bitsOutstanding is non-0 at the time of code writing (S903 or S907), the codes inverse to the codes specified as being written in the respective steps are written by the amount shown as bitOutstanding, and the value of bitOutstanding is reset to 0. Then, codIRange is shifted to the left by 1 (doubled), codILow is shifted to the left by 1 (doubled) (S908), and a return is made to Step S901. With these processes, arithmetic coding is realized.

Here, when performing a probability shift operation as in FIG. 13, it is also good to prepare and use a table that specifies the numbers of loops for update in encoding previously calculated, in the same manner as in the table shown in FIG. 9. In this way, it is possible to reduce the processing amount.

It is to be noted that the arithmetic coding unit according to Embodiment A2 of the present invention is included in the image coding apparatus which compression codes the image data.

Figure 15:
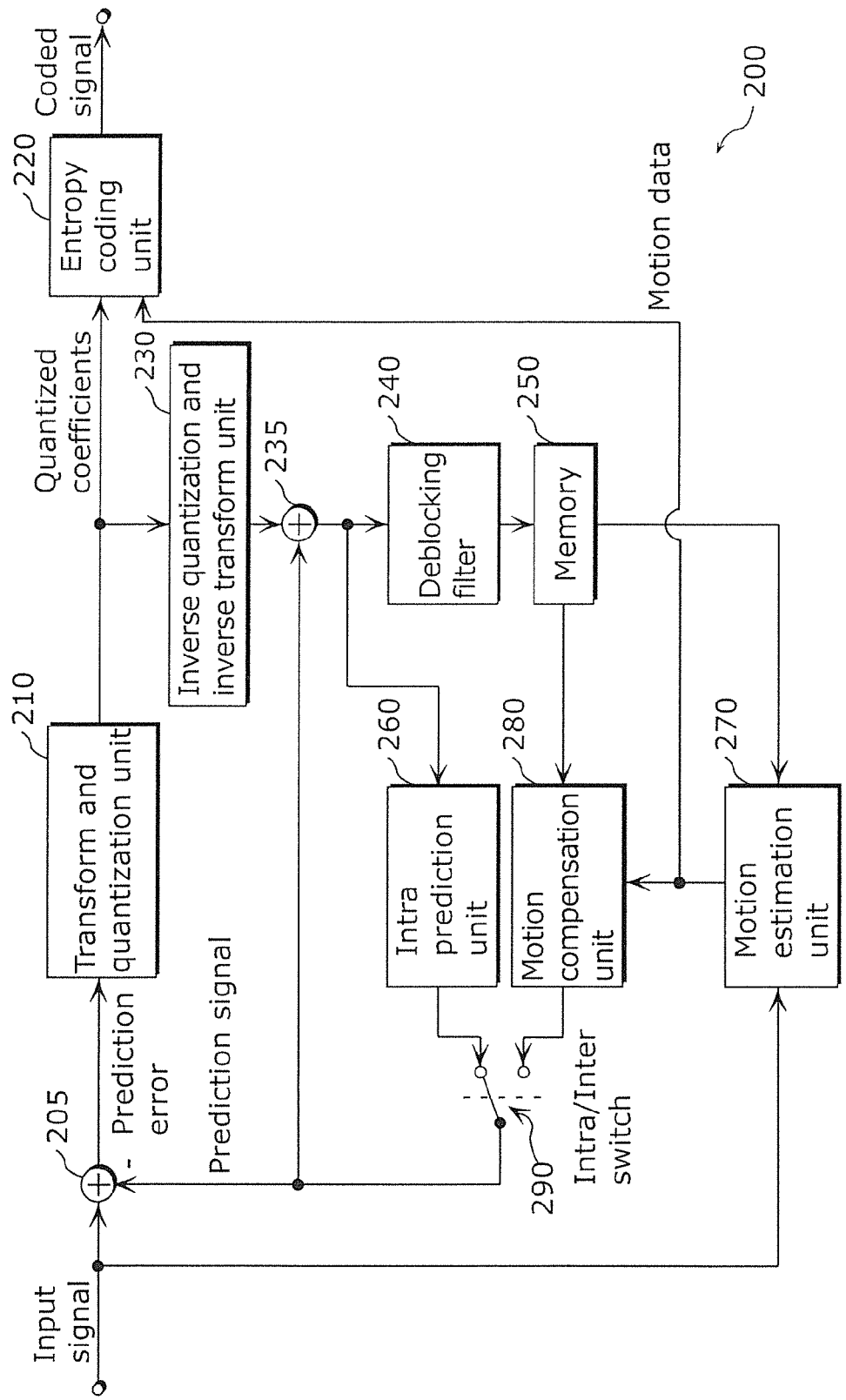
FIG. 15 is a block diagram of an example of the structure of an image coding apparatus according to Embodiment A2 of the present invention.

FIG. 15 is a block diagram of an example of the structure of an image coding apparatus 200 according to Embodiment A2 of the present invention. The image coding apparatus 200 codes the compression-coded image data. For example, the image coding apparatus 200 receives, for each of blocks of an image, an input of image data as an input signal. The image coding apparatus 200 generates a coded signal by performing transform, quantization, and variable length coding on the input signal.

As shown in FIG. 15, the image coding apparatus 200 includes: a subtractor 205, a transform and quantization unit 210, an entropy coding unit 220, an inverse quantization and inverse transform unit 230, an adder 235, a deblocking filter 240, a memory 250, an intra prediction unit 260, a motion estimation unit 270, a motion compensation unit 280, and an intra/inter switch 290.

The subtractor 205 calculates a prediction error that is the difference between the input signal and the prediction signal.

The transform and quantization unit 210 transforms the prediction error in the spatial domain into transform coefficients in the frequency domain. For example, the transform and quantization unit 210 performs Discrete Cosine Transform (DCT) on the prediction error to generate transform coefficients. Furthermore, the transform and quantization unit 210 quantizes the transform coefficients to generate quantized coefficients.

The entropy coding unit 220 performs variable length coding of the quantized coefficients to generate a coded signal. In addition, the entropy coding unit 220 codes motion data (such as a motion vector) estimated by the motion estimation unit 270, adds the motion data to the coded signal, and outputs the coded signal.

The inverse quantization and inverse transform unit 230 reconstructs the transform coefficients by performing inverse quantization on the quantized coefficients. Furthermore, the inverse quantization and inverse transform unit 230 reconstructs a prediction error by performing inverse transform on the reconstructed transform coefficients. Here, the reconstructed prediction error has lost a part of its information through the quantization, and thus does not match the prediction error that is generated by the subtractor 205. In other words, the reconstructed prediction error includes a quantization error.

The adder 235 adds the reconstructed prediction error and the prediction signal to generate a local decoded image.

The deblocking filter 240 performs deblocking filtering on the generated local decoded image.

The memory 250 is a memory for storing reference images for use in motion compensation. More specifically, the memory 250 stores the local decoded images processed by the deblocking filter.

The intra prediction unit 260 performs intra prediction to generate a prediction signal (an intra prediction signal). More specifically, the intra prediction unit 260 performs intra prediction with reference to images surrounding the coding target block (input signal) in the local decoded image generated by the adder 235 to generate an intra prediction signal.

The motion estimation unit 270 estimates motion data (such as a motion vector) between the input signal and a reference image stored in the memory 250.

The motion compensation unit 280 performs motion compensation based on the estimated motion data to generate a prediction signal (an inter prediction signal).

The intra/inter switch 290 selects any one of an intra prediction signal and an inter prediction signal, and outputs the selected signal as the prediction signal to the subtractor 205 and the adder 235.

With this structure, the image coding apparatus 200 according to Embodiment A1 of the present invention compression codes the image data.

In FIG. 15, the arithmetic coding unit according to Embodiment A2 of the present invention is included by the entropy coding unit 220. In other words, the arithmetic coding unit obtains, as an input signal, values obtained by binarizing quantized coefficients, and performs arithmetic coding. In addition, signal type information indicates information such as the positions of the quantized coefficients, the motion data shown in FIG. 15, or an intra prediction direction for use by the intra prediction unit 260.

As described above, the image coding apparatus and the image coding method according to the present invention make it possible to perform a fixed-probability arithmetic coding even in the case of a probability other than 50%, and to thereby perform high-speed processing.

More specifically, by skipping an update of the probability for each bit coding (decoding) according to a context, it is possible to maintain a coding efficiency, and, for example, to achieve a high-speed operation circuit required in the real-time code transmission of a high-resolution video.

As described above, an image decoding method according to an aspect of the present invention is an image decoding method of decoding coded image data, including selectively performing arithmetic decoding methods according to the type of a decoding target signal. The arithmetic decoding methods include: a first arithmetic decoding method which is performed based on a symbol occurrence probability obtained according to a context, and involves update of the occurrence probability according to a decoding symbol; and a second arithmetic decoding method which is performed based on a symbol occurrence probability obtained according to a context, and which does not involve update of the occurrence probability according to a decoding symbol. This makes it possible to increase the coding efficiency.

In addition, for example, in the second arithmetic decoding method, the symbol occurrence probability is defined by performing a shift operation based on a parameter showing the internal state of arithmetic decoding. This makes it possible to reduce the processing amount.

In addition, for example, the second arithmetic decoding method includes a normalization step of normalizing an arithmetic decoding process, and the normalization step is performed using a table that defines the number of processing loops. This makes it possible to further reduce the processing amount.

In addition, for example, in the second arithmetic decoding method, fixed probability values can be determined differently for parameters. This makes it possible to increase the coding efficiency.

In addition, an image coding method according to an aspect of the present invention is an image coding method of coding image data to be coded, including selectively performing arithmetic coding methods according to the type of a coding target signal. The arithmetic coding methods include: a first arithmetic coding method which is performed based on a symbol occurrence probability obtained according to a context, and involves update of the occurrence probability according to a coding symbol; and a second arithmetic coding method which is performed based on a symbol occurrence probability obtained according to a context, and which does not involve update of the occurrence probability according to a coding symbol. Symbol occurrence probabilities for use in coding according to the second arithmetic coding method include a probability that is other than 50%. This makes it possible to increase the coding efficiency.

In addition, for example, in the second arithmetic coding method, the symbol occurrence probability is defined by performing a shift operation based on a parameter showing the internal state of arithmetic coding. This makes it possible to reduce the processing amount.

In addition, for example, the second arithmetic coding method includes a normalization step for normalizing an arithmetic coding process, and the normalization step is performed by using a table that defines the number of processing loops. This makes it possible to further reduce the processing amount.

In addition, for example, in the second arithmetic coding method, fixed probability values can be determined differently for parameters. This makes it possible to increase the coding efficiency.

(Underlying Knowledge B Forming Basis of the Present Invention)

Recent years have seen an increase in the number of applications for services of video on demand types etc. Examples of such services include video-conferencing through the Internet, digital video broadcasting, and streaming of video contents. These applications depend on transmission of video information. When the video data is transmitted or recorded, a considerable amount of data is transmitted through a conventional transmission path having a limited bandwidth, or is recorded onto a conventional recording medium having a limited data capacity. Accordingly, in order to transmit the video information using such a conventional transmission channel or to record the video information onto a conventional recording medium, it is inevitable to compress or reduce the amount of digital data.

For the purpose of compressing such video data, a plurality of video coding standards has been developed. Such video coding standards are, for instance, International Telecommunication Union Telecommunication Standardization Sector (ITU-T) standards denoted with H.26× and ISO/IEC standards denoted with MPEG-x. The most advanced video coding standard is currently the standard denoted as H.264/AVC or MPEG-4/AVC (see Non-patent Literature 1).

The data compression processes in the H.264/AVC standard is roughly divided into prediction, transform, quantization, and entropy coding. The entropy coding is intended to reduce redundant information in information that is used for the prediction and quantized information. Representatives of entropy coding include variable-length coding, adaptive coding, and fixed-length coding. Representatives of variable-length coding include Huffman coding, run-length coding, and arithmetic coding. Among these, the arithmetic coding is known as a method which is intended to determine output codes while calculating symbol occurrence probabilities and which provides a high coding efficiency by determining contexts according to the features of image data, compared to Huffman coding which uses a fixed coding table.

A conventional arithmetic decoding method is described with reference to FIG. 16 to FIG. 20.

First, a flow of the arithmetic decoding method is described below with reference to FIG. 16 to FIG. 20.

Figure 16:
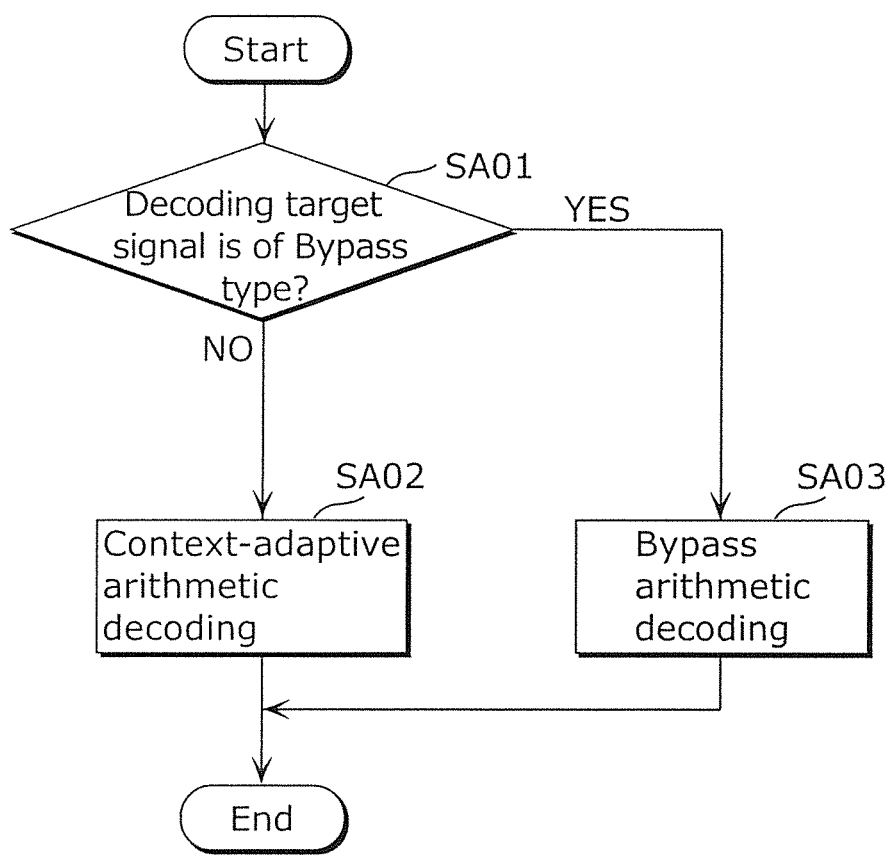
FIG. 16 is a flowchart of a conventional arithmetic decoding method.

FIG. 16 is a flowchart of arithmetic decoding processes performed by an arithmetic decoding unit according to the conventional H.264/AVC standard. As shown in FIG. 16, the arithmetic decoding unit determines whether or not the type of a decoding target signal is of a Bypass type (SA01). When the decoding target signal is of the Bypass type (YES in SA01), bypass arithmetic decoding is performed (SA03). On the other hand, when the decoding target signal is not of the Bypass type (NO in SA01), context adaptive arithmetic decoding is performed based on the type of the decoding target signal (SA02).

Figure 17:
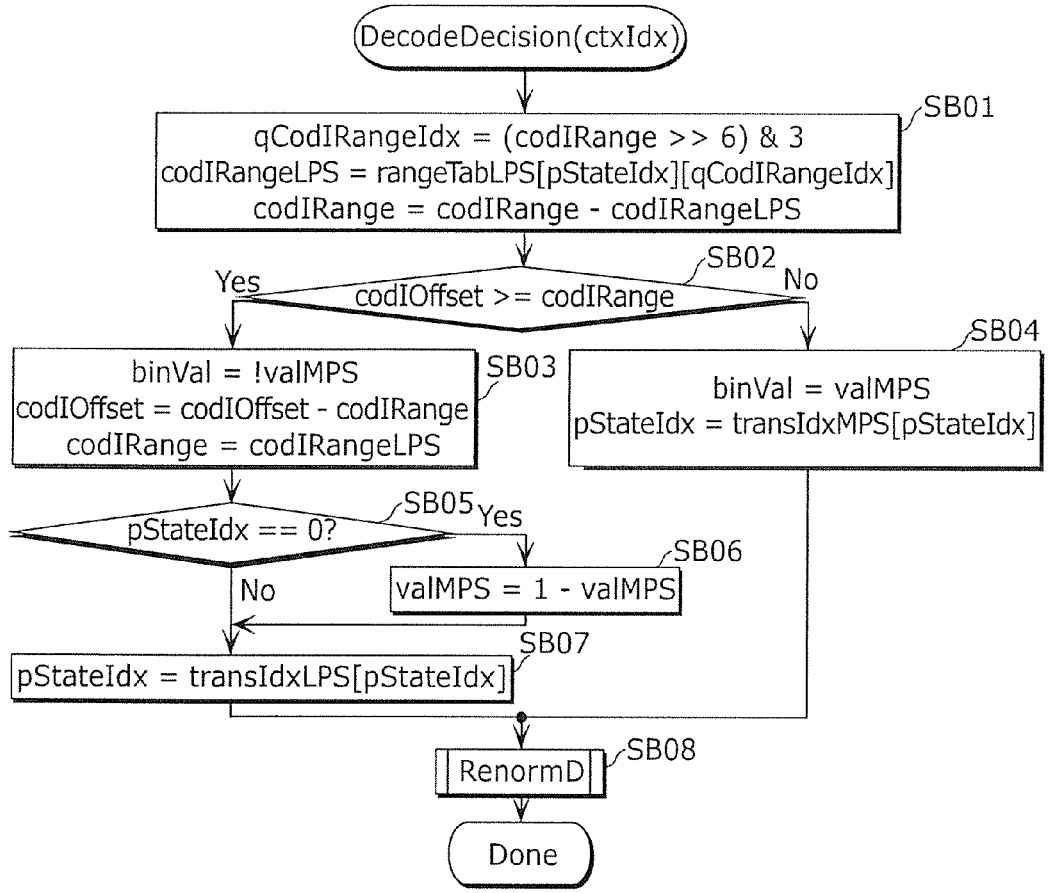
FIG. 17 is a flowchart of context-adaptive arithmetic decoding in the conventional arithmetic decoding method.

FIG. 17 is a flowchart of the aforementioned conventional context adaptive arithmetic decoding. This flowchart is extracted from Non-patent Literature 1, and is the same as in Non-patent Literature 1 unless otherwise explained.

In the arithmetic decoding, a context (ctxIdx) determined based on the signal type is input first.

This is followed by: the calculation of a value qCodIRangeIdx derived from a parameter codIRange showing a current internal state of the arithmetic decoding apparatus; the obtainment of a pStateIdx value that is a state value corresponding to ctxIdx; and the obtainment of codIRangeLPS with reference to a table (rangeTableLPS) based on these two values of qCodIRangeIdx and pStateIdx. Here, this codIRangeLPS denotes a value that is a parameter showing the internal state of the arithmetic decoding apparatus at the time of the occurrence of an LPS (this LPS specifies one of the symbols 0 and 1 that has the lower occurrence probability) with respect to a first parameter codIRange showing the internal state of the arithmetic decoding apparatus.

In addition, a value obtained by subtracting the aforementioned codIRangeLPS from the current codIRange is included in codIRange (Step SB01). Next, the calculated codIRange is compared with a second parameter codIOffset showing the internal state of the arithmetic decoding apparatus (Step SB02). When the codIOffset is greater than or equal to codIRange (YES in Step SB02), it is determined that the symbol of the LPS has occurred, and a value different from a value of valMPS is set to binVal that is a decoding output value. This valMPS value is an MPS value (0 or 1) specifying the one of the symbols 0 and 1 which has the higher occurrence probability, and the different value is 0 when valMPM=1 is satisfied or 1 when valMPM=0 is satisfied. In addition, a value obtained through the subtraction of codIRange is set to the second parameter codIOffset showing the internal state of the arithmetic decoding apparatus, and, since the LPS has occurred, the value of codIRangeLPS calculated in Step SB01 is set to the first parameter codIRange showing the internal state of the arithmetic decoding apparatus (Step SB03). Here, when the pStateIdx value that is a state value corresponding to the aforementioned ctxIdx is 0 (YES in Step SB05), it is shown that the probability of the LPS exceeds the probability of the MPS, and thus valMPS is changed to the opposite value (changed to 0 when valMPM=1, and to 1 when valMPM=0) (Step SB06). On the other hand, when the pStateIdx value is 0 (NO in Step SB05), the pStateIdx value is updated based on a transform table transIDxLPS that is used at the time of the occurrence of the LPS (Step SB07).

In addition, when codIOffset is smaller (NO in SB02), it is determined that the symbol of the MPS has occurred, valMPS is set to binVal that is the decoding output value, and the pStateIdx value is updated based on a transform table transIdxMPS that is used at the time of the occurrence of the MPS (Step SB04).

Lastly, the normalization (RenormD) is performed (Step SB08) to end the arithmetic decoding.

Figure 18:
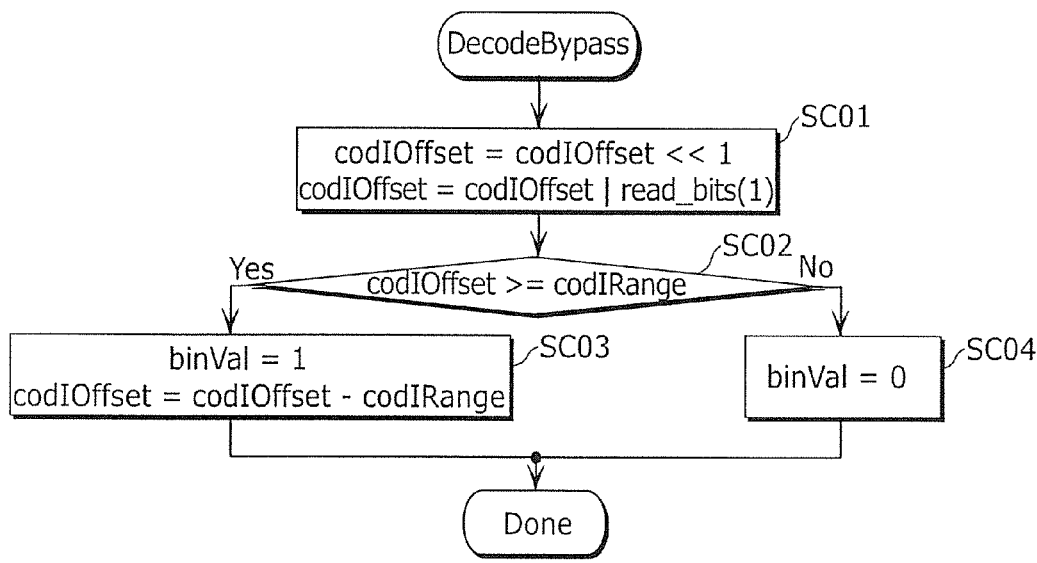
FIG. 18 is a flowchart of bypass arithmetic decoding in the conventional arithmetic decoding method.

FIG. 18 is a flowchart of the aforementioned conventional bybass arithmetic decoding. This flowchart is extracted from Non-patent Literature 1, and is the same as in Non-patent Literature 1 unless otherwise explained.

First, the second parameter codIOffset showing a current internal state of the arithmetic decoding apparatus is shifted to the left (doubled), and 1 bit is read out from a bit stream. Here, this (doubled) value is set when the read-out bit is 0, whereas a value obtained by adding 1 thereto is set when the read-out bit is 1 (SC01).

Next, when codIOffset is greater than or equal to the first parameter codIRange showing the internal state of the arithmetic decoding apparatus (YES in SC02), "1" is set to binVal that is a decoding output value, and a value obtained through the subtraction of codIRange is set to codIOffset (Step SC03). On the other hand, when codIOffset is smaller than the first parameter codIRange showing the internal state of the arithmetic decoding apparatus (NO in SC02), "0" is set to binVal that is a decoding output value (Step SC04).

FIG. 19 is a table of codIRangeLPS used in Step SB01 in FIG. 17, for illustrating in detail a method of deriving the LPS. This table is extracted from Non-patent Literature 1, and is the same as in Non-patent Literature 1 unless otherwise explained.

FIG. 19 is a table for deriving codIRangeLPS from pStateIdx and qCodIRangeIdx. As described above, pStateIdx shows the state determined for each of contexts, and shows that the occurrence probability of the LPS is smaller (the occurrence probability of the MPS is greater) as the occurrence probability of the LPS is on the increase and approaches closer to 50%. Here, qCodIRangeIdx is a value obtained by extracting a second bit and a third bit (the value obtained by performing a bitwise AND on 3 and codIRange shifted to the right by 6) among the most significant 3 bits in the parameter codIRange showing the internal state of the arithmetic coding apparatus, and codIRange is a value within a range from 256 to 511. Thus, qCodIRangeIdx is one of four ranges from 0 to 3 divided according to the codIRange value. More specifically, these divided four ranges of 0, 1, 2, and 3 are determined to be 256-319, 320-383, 384-447, and 448-511, respectively (D01). More specifically, when pStateIdx is 1, a value of 128, 167, 197, or 227 is output according to the codIRange value (D02). For example, 128 is output both when codIRange is 256 assuming that the occurrence probability of the LPS is exactly 50% and when codIRange is 300 assuming that the occurrence probability of the LPS is 42.7%. In addition, as another example, 197 is output when codIRange is 400 assuming that the occurrence probability of the LPS is exactly 49.25%.

Likewise, when pStateIdx is 43: 15 is output both when codIRange is 256 and when codIRange is 300 assuming that the occurrence probability of the LPS is 5.9% and 5%, respectively; and 22 is output when codIRange is 400 assuming that the occurrence probability of the LPS is 5.5%.

This eliminates the necessity of multiplications in the decoding. However, there remains a problem that it is impossible to increase the coding efficiency by reflecting the probability value estimated for each context in the coding because the probability value shown as pStateIdx varies depending on codIRange as described above.

Figure 20:
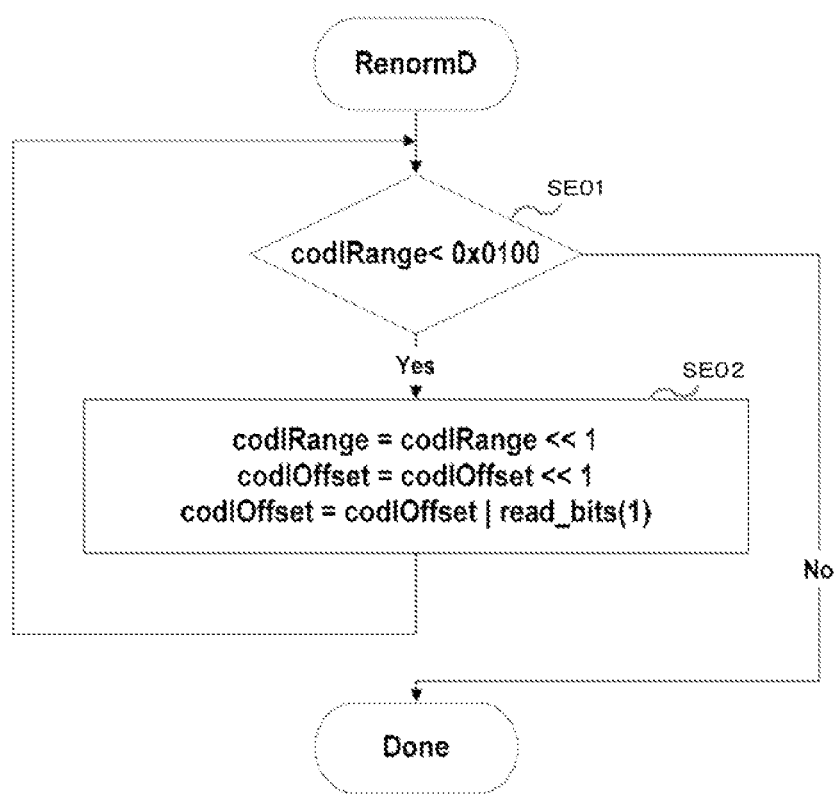
FIG. 20 is a flowchart of normalization in the conventional arithmetic decoding method.

FIG. 20 is a flowchart for illustrating in detail normalization (RenormD) shown in Step SB08 in FIG. 17. This table is extracted from Non-patent Literature 1, and is the same as in Non-patent Literature 1 unless otherwise explained.

When the first parameter codIRange showing the internal state of the arithmetic decoding apparatus in arithmetic decoding is smaller than 0x100 (in the hexadecimal notation that is 256 in the decimal system) (YES in Step SE01), codIRange is shifted to the left (doubled), the second parameter codIffset showing the internal state of the arithmetic decoding apparatus is shifted to the left (doubled), and 1 bit is read out from the bit stream. This (doubled) value is set when the read-out bit is 0, whereas a value obtained by adding 1 thereto is set when the read-out bit is 1 (SE02).

This processing is completed when codIRange reaches or exceeds 256 at last (NO in Step SE01).

Arithmetic decoding is performed by performing the above processes.

However, although the aforementioned conventional technique makes it possible to perform bypass processing on a signal having a probability of 50%, it makes it possible to perform only normal context adaptive arithmetic decoding on a signal having a probability other than 50%. For this reason, bypass processing that requires less update processing can be performed on signals of the limited signal type, and thus the decoding amount is large.

In the bypass processing, it is impossible to perform probability control based on quantization parameters. Thus, for example, when a quantization parameter (QP) is large, the coding efficiency is decreased by performing bypass processing on parameters of signals having an occurrence probability value other than 50% probability.

The present invention has been conceived to solve the aforementioned conventional problems, and aims to provide an image coding method and an image decoding method which make it possible to reduce the coding amounts and increase the coding efficiency.

In order to solve the above problems, an image decoding method according to an aspect of the present invention is an image decoding method for compression coding image data.

This method is intended to (i) perform arithmetic decoding based on a probability specified based on (a) a context determined according to the type of a decoding target signal and (b) a symbol occurrence probability determined corresponding to the context but without being based on a first parameter showing the internal state of the arithmetic decoding apparatus, and (ii) not to update the symbol occurrence probability.

In addition, this method is further intended to modify the specified probability based on a quantization parameter, an interval between motion predictions, an image resolution, or the like.

In this way, it is possible to increase the number of types of signals that require such update processing, and reduce the required processing amount, and to thereby perform arithmetic decoding using the symbol occurrence probability independent of the internal state and to increase the coding efficiency.

It is to be noted that the present invention can be realized or implemented not only as image coding methods and image decoding methods, but also apparatuses which include processing units for performing the processing steps included in the image coding methods and image decoding methods. In addition, the present invention may be realized as programs for causing computers to execute these steps. Furthermore, the present invention may be implemented as recording media such as computer-readable Compact Disc-Read Only Memories (CD-ROMs) including the programs recorded thereon, and information, data, and/or signals representing the programs.

Some or all of the structural elements which make up any one of the image coding apparatuses and the image decoding apparatuses may be configured in the form of a single system Large Scale Integration (LSI). Such a system LSI is a super multifunctional LSI manufactured by integrating plural structural element units on a single chip. For example, the system LSI is a computer system configured to include a macro processor, a ROM, a Random Access Memory (RAM), and the like.

The present invention makes it possible to increase the coding efficiency and reduce the processing amount.

Hereinafter, embodiments of the present invention are described with reference to the drawings.

Embodiment B1

A description is given of the outline of an arithmetic decoding method according to this embodiment. The arithmetic decoding method according to this embodiment is for selectively performing, according to a decoding target signal, context-adaptive arithmetic decoding and a fixed-probability arithmetic decoding using a fixed probability without updating the probability for each context. In addition, the values of fixed probabilities are determined based on: information such as a quantization parameter QP obtainable at the time of decoding; and the distance from the closest reference frame or the image resolution at the time of motion prediction coding. In this way, this embodiment makes it possible to reduce the processing amount and decode a bit stream having a high coding efficiency.

The outline of the arithmetic decoding method according to this embodiment has been described above. The same method as in the conventional arithmetic decoding method can be performed unless otherwise explained.

Figure 21:
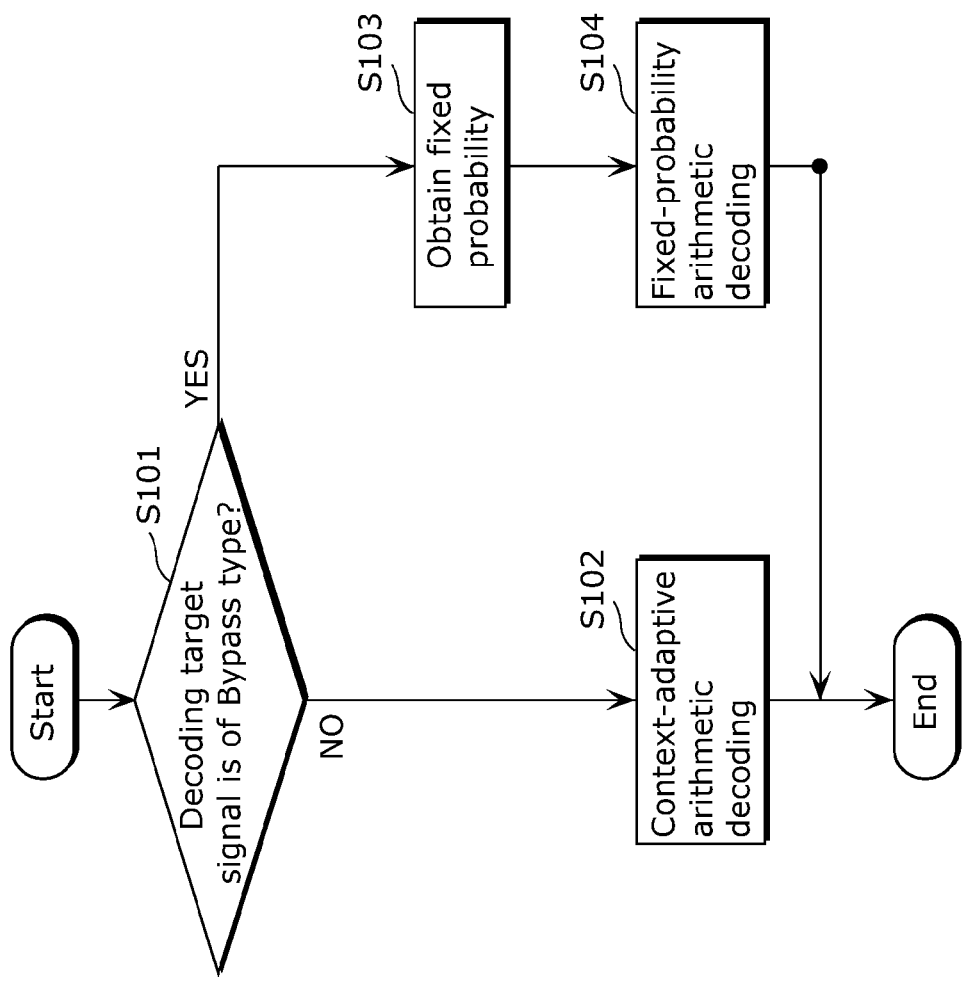
FIG. 21 is a flowchart of an example of an arithmetic decoding method according to Embodiment B1 of the present invention.
Figure 22:
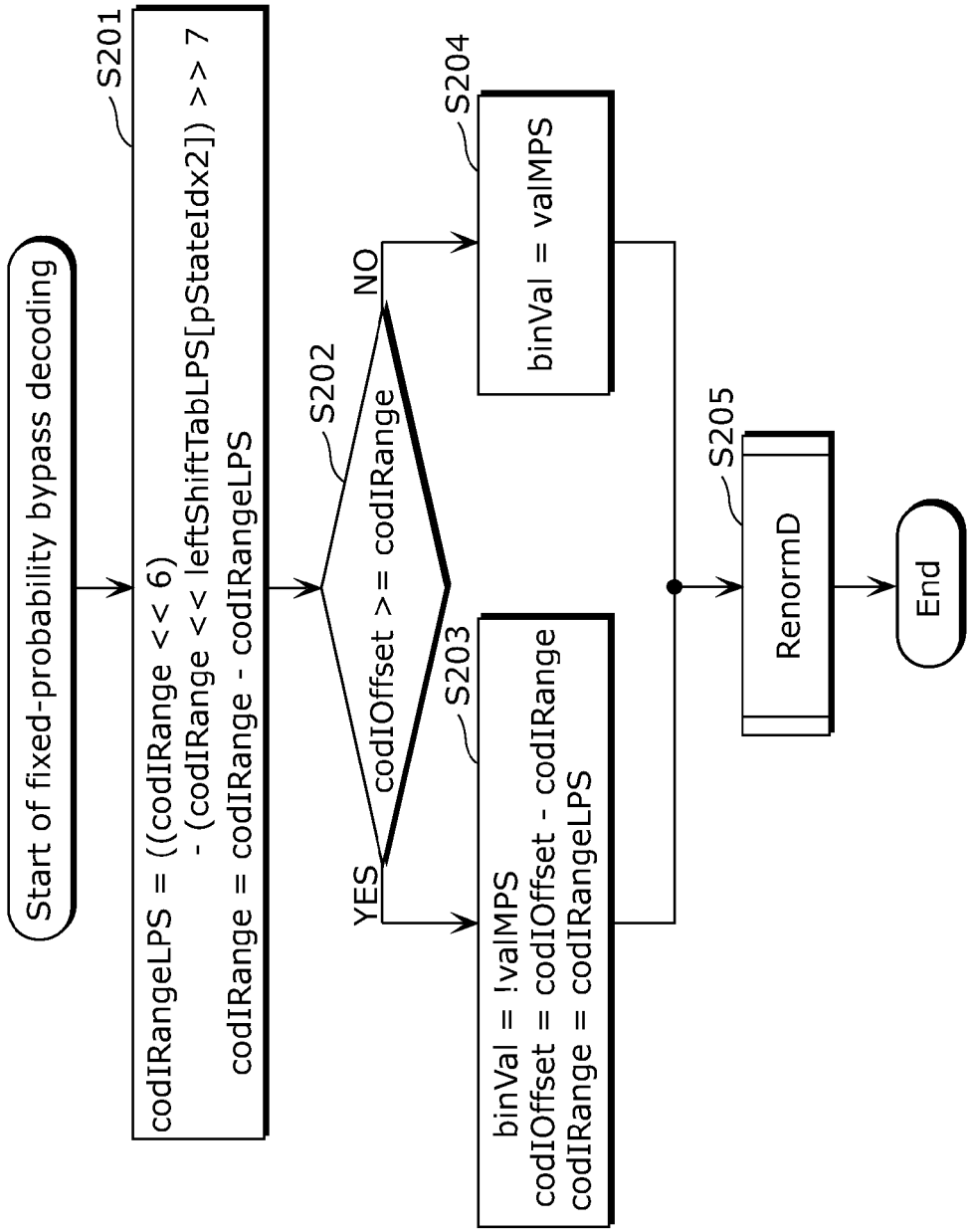
FIG. 22 is a flowchart of a fixed-probability arithmetic decoding in an arithmetic decoding method according to Embodiment B1 of the present invention.
Figure 23:
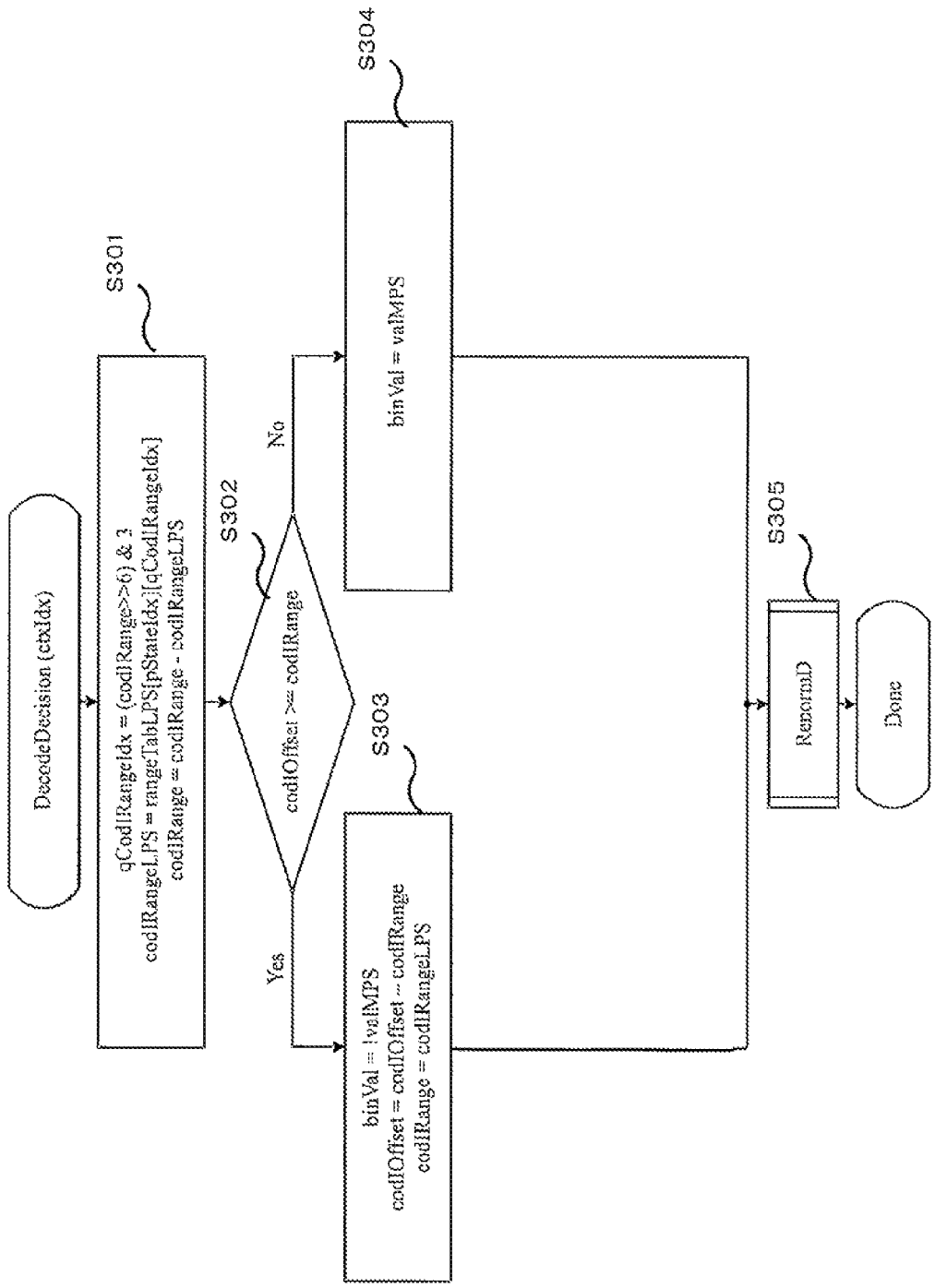
FIG. 23 is a flowchart of a fixed-probability arithmetic decoding in an arithmetic decoding method according to Embodiment B1 of the present invention.
Figure 24:
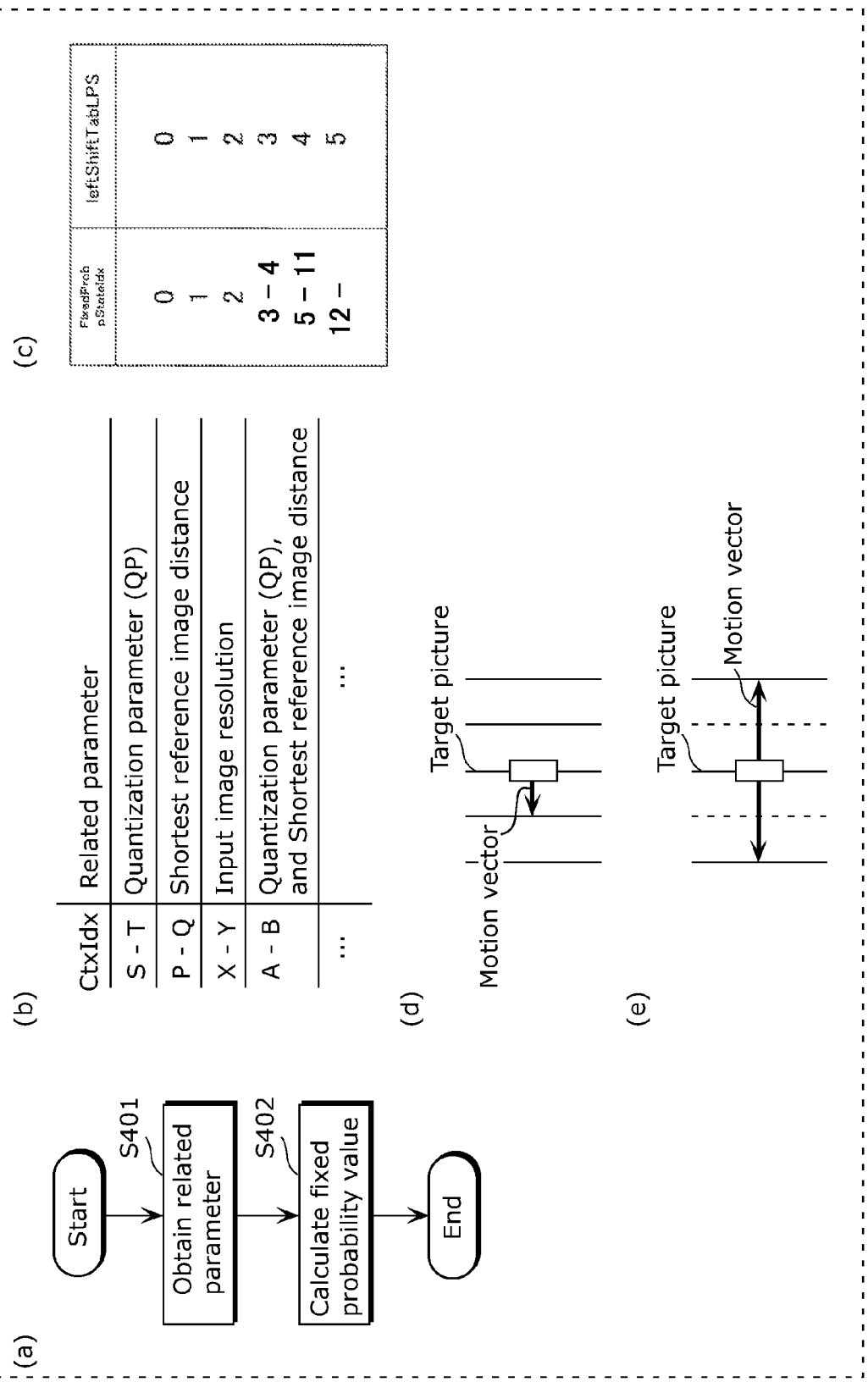
In FIG. 24: (a) is a flowchart of an example of processes of a fixed-probability determining method in the arithmetic decoding method according to Embodiment B1 of the present invention; (b) is a table of the associations between CtxIdx of signals and the parameters related thereto; (c) is an example of a table used to derive fixed probabilities; (d) is an illustration for explaining the closest reference image; and (e) is an illustration for explaining the closest reference image.
Figure 25:
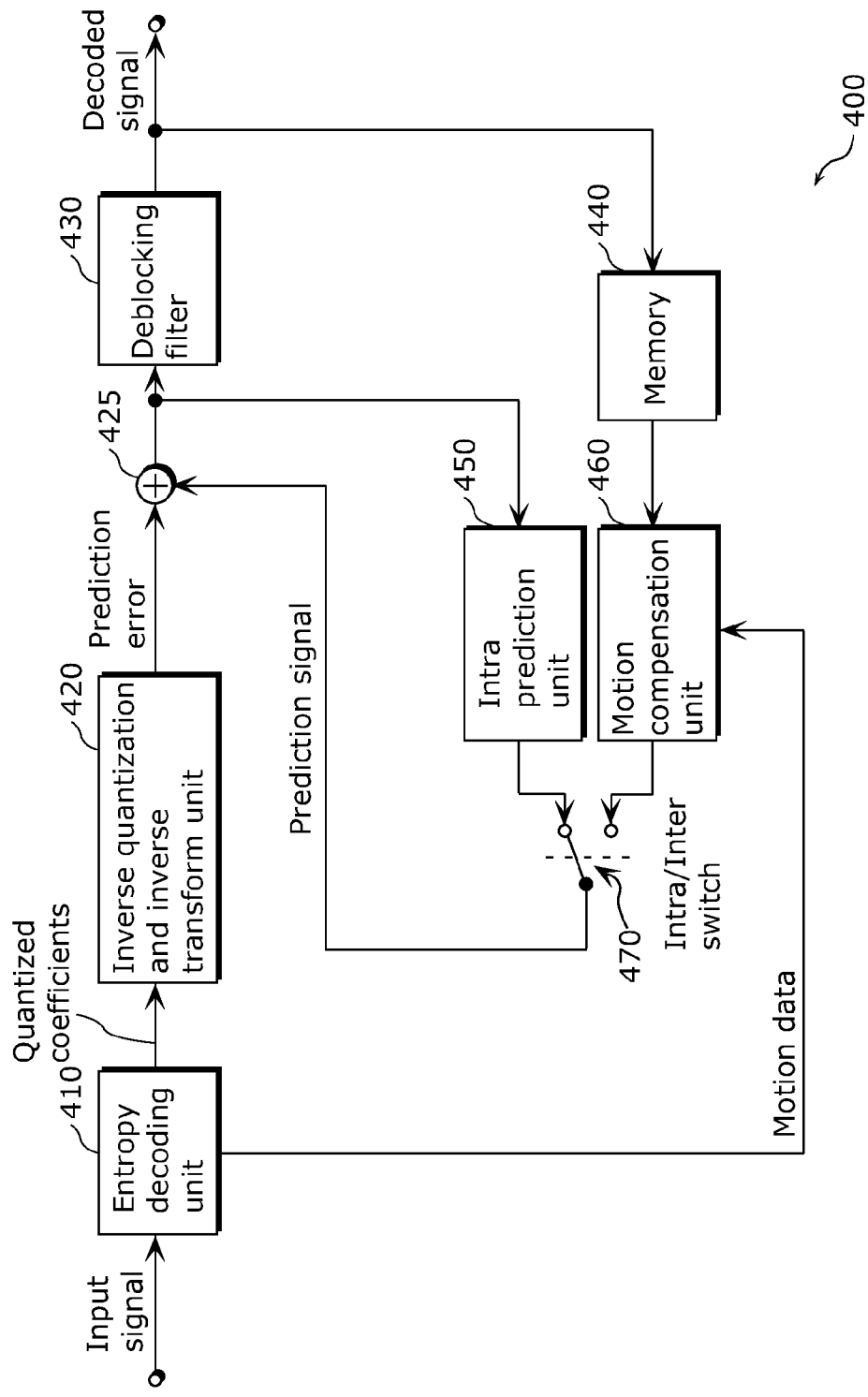
FIG. 25 is a block diagram of an example of the structure of an image decoding apparatus according to Embodiment B1 of the present invention.
Figure 26:
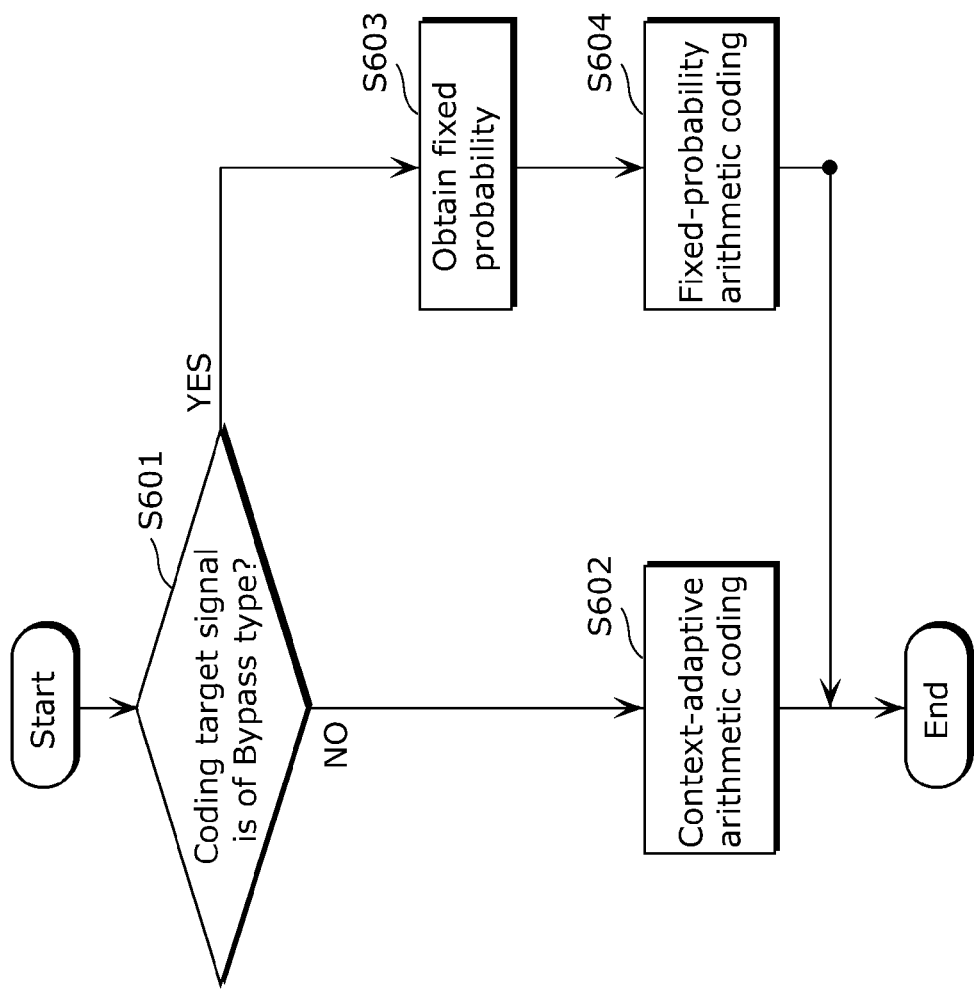
FIG. 26 is a flowchart of operations performed by an arithmetic coding unit according to Embodiment B2 of the present invention.
Figure 27:
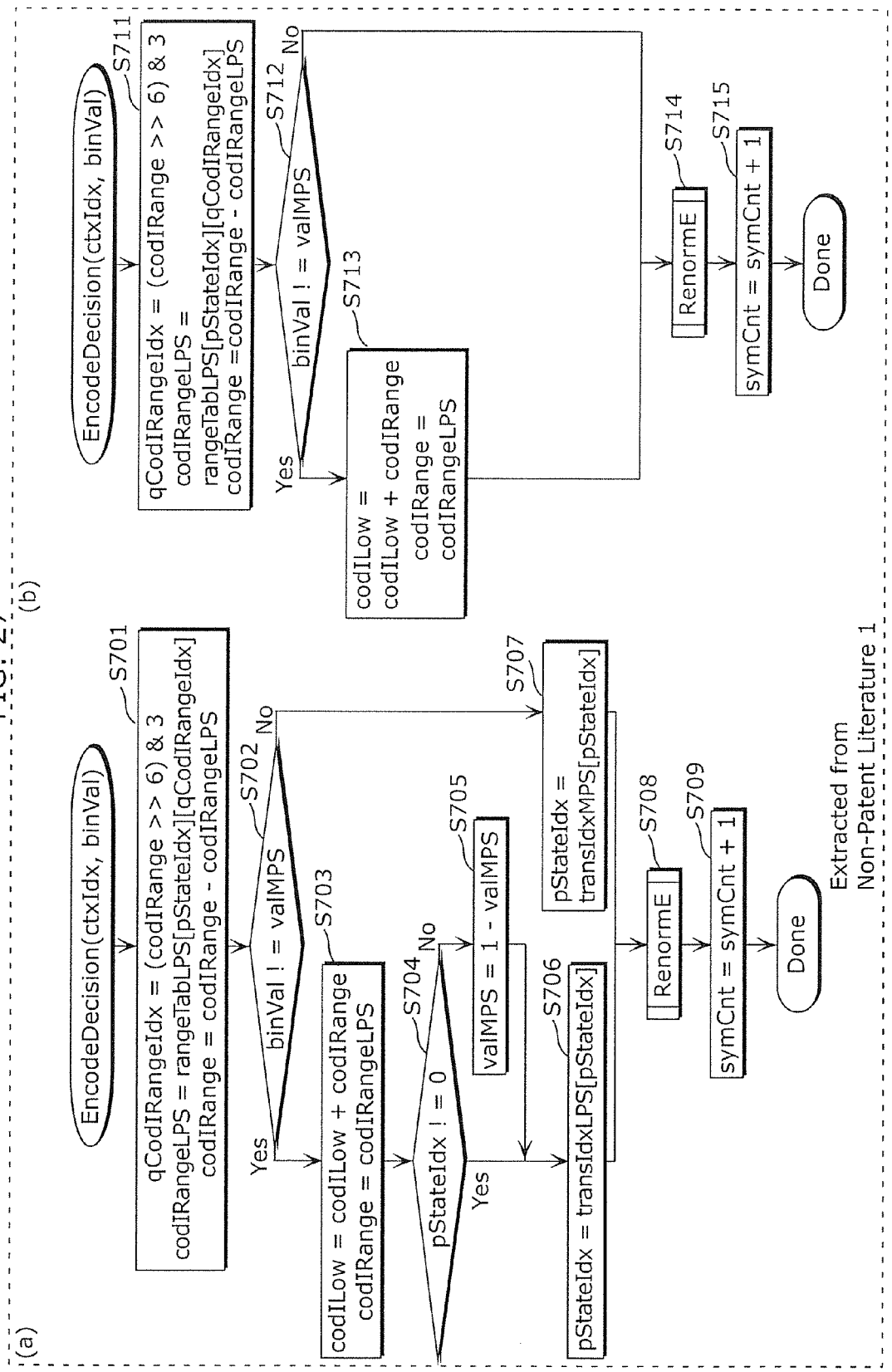
In FIG. 27, (a) is a flowchart of context-adaptive arithmetic decoding in an arithmetic coding method according to Embodiment B2 of the present invention; and (b) is a flowchart of fixed-probability arithmetic decoding in the arithmetic coding method according to Embodiment B2 of the present invention.
Figure 28:
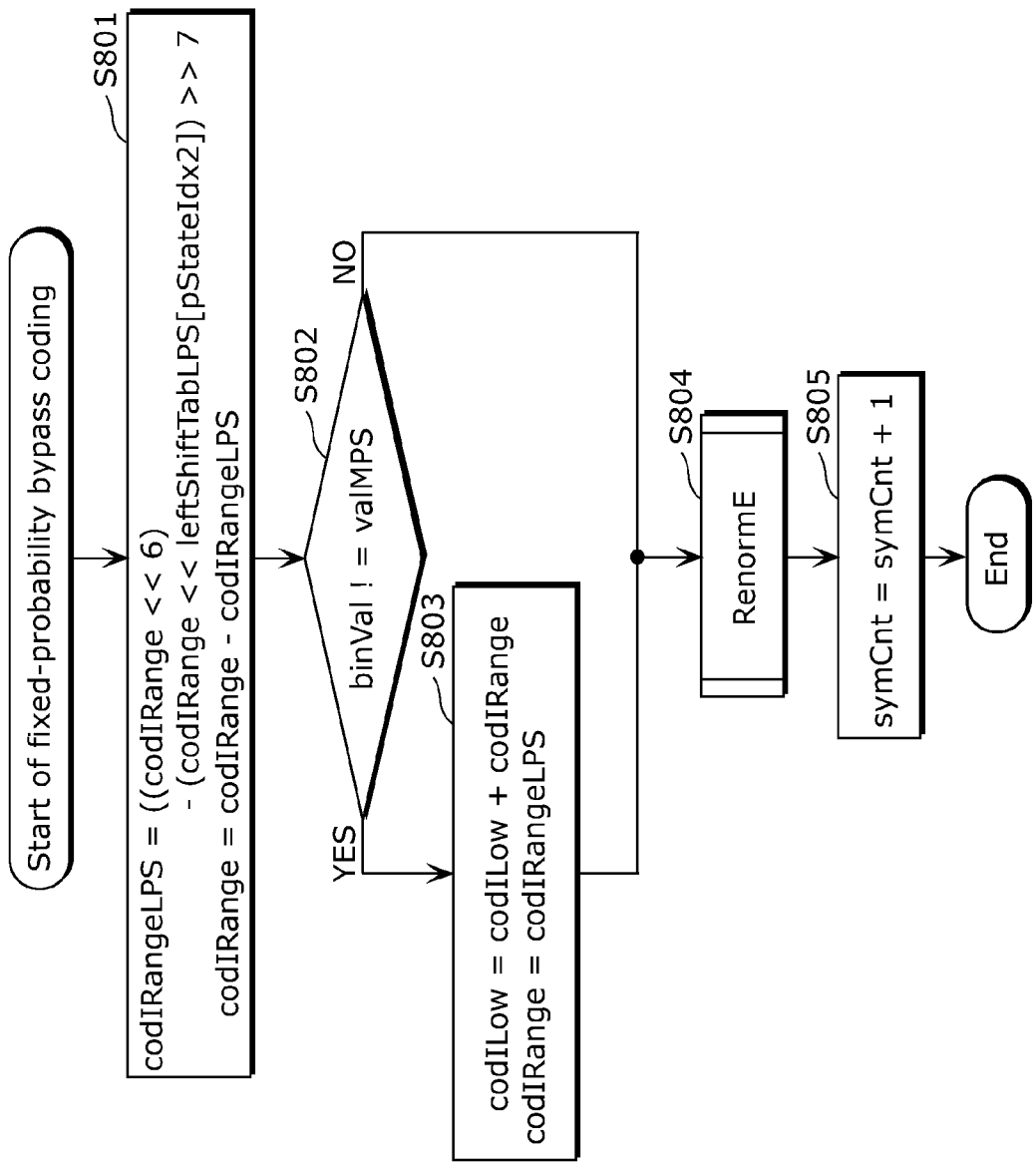
FIG. 28 is a flowchart of another example (different from the example in FIG. 7B) of the fixed-probability arithmetic decoding in the arithmetic coding method according to Embodiment B2 of the present invention.
Figure 29:
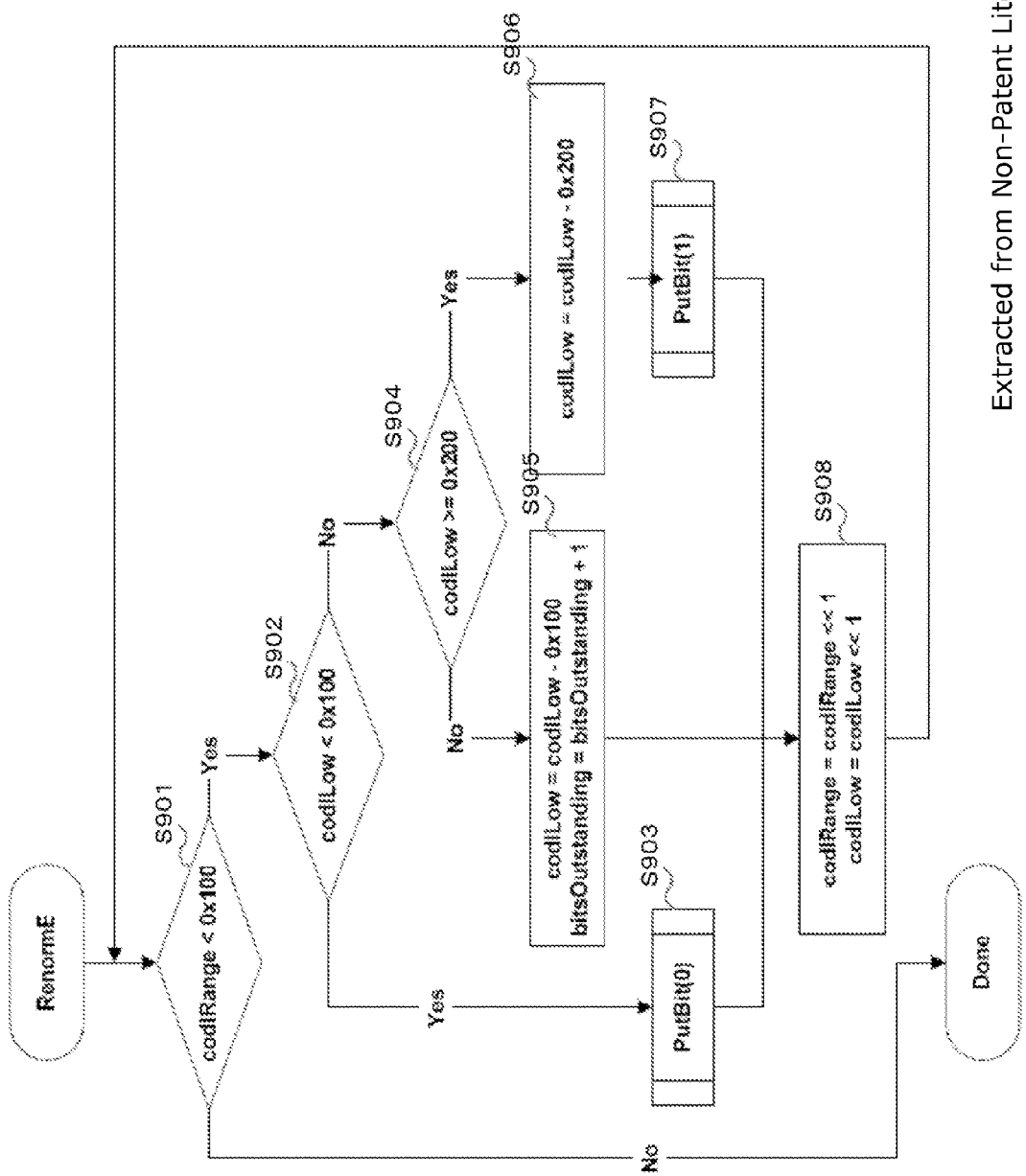
FIG. 29 is a flowchart of normalization in an arithmetic coding method according to Embodiment B2 of the present invention.

Next, a description is given of a flow of processes of the arithmetic decoding method performed by an arithmetic decoding unit according to this embodiment. FIG. 21 is a flowchart of processes performed by the arithmetic decoding unit according to Embodiment B1 of the present invention. The arithmetic decoding unit according to the present invention firstly obtains a bit stream to be a decoding target, and determines whether or not the decoding target signal is of a bypass type (Step S101). This determination may be made in advance with reference to a rule predetermined for each type of a target signal. For example, a sign (+ or −) showing whether or not the value of a coded difference transform image signal is positive or negative is used for bypass processing, and a signal (for example, 0 or 1) showing whether or not the value of a coded difference transform image signal is 0 or non-0 is used for a context-adaptive type.

Here, when the type is not the bypass type (NO in Step S101), the context-adaptive arithmetic decoding is performed (S102). This processing may be the same as the processing in the conventional arithmetic decoding method. On the other hand, when the target signal is of a bypass type (YES in Step S101), a fixed probability is obtained (Step S103). A method for obtaining a fixed probability is described later. Next, fixed-probability arithmetic decoding is performed based on the obtained fixed probability (Step S104). When the probability obtained in Step S103 is 50%, it is possible to perform the conventional bypass arithmetic decoding (FIG. 18), or to determine the probability to be a fixed-probability of 50% in a later-described fixed-probability arithmetic decoding. In the former case, it is possible to use a circuit according to a conventional technique. In the latter case, it is possible to share circuits and thereby produce an advantage of being able to reduce the circuit scale.

The processing performed when performing arithmetic decoding using the obtained fixed probability is further described in detail with reference to FIG. 2 and FIG. 3.

FIG. 2 is a flowchart of fixed-probability arithmetic decoding in the arithmetic decoding unit according to the present invention.

In the arithmetic decoding, a context (ctxIdx) determined based on the signal type is input first.

The value pStateIdx2 obtained here is the value showing the fixed probability for each ctxIdx determined according to the type of a signal.

Next, codIRangeLPS showing the first parameter value at the time of the occurrence of the LPS is calculated based on the first parameter codIRang showing the current internal state of the arithmetic decoding apparatus and the aforementioned fixed probability pStateIdx2. More specifically, this value is calculated according to Expression 1.

codIRangeLPS=((codIRange<<6)−
 (codIRange<<leftShiftTabLPS[pS tateIdx2]))>>7 (Expression 1)

Where leftShiftTabLPS[ ] is a value in a range from 0 to 5. When the value is 0, 0 shows the probability of $63/128$, whereas when the value is n, n shows the probability of $(64-2*n)/128$. It is to be noted that Expression 1 may be transformed into the expression shown below.

$$\text{codIRangeLPS} = ((\text{codIRange} \ll 6) - (\text{codIRange} \ll \text{leftShiftTabLPS}[pStateIdx2]) + 1) \gg 7 \quad \text{(Expression 2)}$$

Where leftShiftTabLPS[ ] is a value in a range from 0 to 6. When the value is 0, 0 shows the probability of 64/128 (50%), when the value is n, n shows the probability of $(64-2*n+1)/128$, and when the value is 6, 6 shows the probability of $1/128$.

In other words, pStateIdx2 is an index showing any one of the fixed probability values, and is derived in a fixed-probability obtaining step (S103).

Here, these values can be calculated by performing a right shift by 7 as an example. In the case of presenting finer probabilities, it is possible to perform a right shift by 10 or the like. The right shift by 10 or the like makes it possible to present finer probabilities, but requires a high internal bit accuracy.

In addition, a value obtained by subtracting the aforementioned codIRangeLPS from the current codIRange is included in codIRange (Step S201). Next, the calculated codIRange is compared with a second parameter codIOffset showing the internal state of the arithmetic decoding apparatus (Step SB02). When the codIOffset is greater than or equal to codIRange (YES in Step S202), it is determined that the symbol of the LPS has occurred, and a value different from a value of valMPS is set to binVal that is a decoding output value. This valMPS value is an MPS value (0 or 1) specifying the one of the symbols 0 and 1 which has the highest occurrence probability, and the different value is 0 when valMPM=1 is satisfied or 1 when valMPM=0 is satisfied. In addition, a value obtained through the subtraction of codIRange is set to the second parameter codIOffset showing the internal state of the arithmetic decoding apparatus, and, since the LPS has occurred, the value of codIRangeLPS calculated in Step S201 is set to the first parameter codIRange showing the internal state of the arithmetic decoding apparatus (Step S203).

In addition, when codIOffset is small (NO in S202), it is determined that the symbol of the MPS has occurred, valMPS is set to binVal that is the decoding output value, and the pStateIdx value is updated based on the transform table transIdxMPS at the time of the occurrence of the MPS (Step S204).

Lastly, the normalization (RenormD) is performed (Step S205) to end the arithmetic decoding. Here, this normalization may be performed in the same manner as conventional, or may be performed with reference to a table storing combinations previously calculated according to the types of fixed probabilities.

In addition, FIG. 3 shows a variation in which the range of possible fixed probabilities is widened but the processing amount slightly increases. Although the processing amount slightly increases, the processing does not involve an update of a probability as in the conventional context-adaptive arithmetic decoding (see FIG. 17). Thus, the processing provides an advantageous effect of making it possible to share the circuits.

The arithmetic decoding firstly involves inputting a context (ctxIdx) determined based on the signal type, and obtaining a pStateIdx value derived in the fixed-probability deriving step.

Next, the arithmetic decoding next involves calculating a value qCodIRangeIdx derived from a parameter codIRange showing the current internal state of the arithmetic decoding apparatus, and obtaining codIRangeLPS with reference to the table (rangeTableLPS) based on these two values. Here, this codIRangeLPS denotes a value that is a parameter showing the internal state of the arithmetic decoding apparatus at the time of the occurrence of an LPS (this LPS specifies one of the symbols 0 and 1 that has the lower occurrence probability) with respect to a first parameter codIRange showing the internal state of the arithmetic decoding apparatus.

In addition, a value obtained by subtracting the aforementioned codIRange LPS from the current codIRange is included in codIRange (Step S301). Next, the calculated codIRange is compared with a second parameter codIOffset showing the internal state of the arithmetic decoding apparatus (Step S302). When the codIOffset is greater than or equal to codIRange (YES in Step S302), it is determined that the symbol of the LPS has occurred, and a value different from a value of valMPS is set to binVal that is a decoding output value. This valMPS value is an MPS value (0 or 1) specifying the one of the symbols 0 and 1 which has the higher occurrence probability, and the different value is 0 when valMPM=1 is satisfied or 1 when valMPM=0 is satisfied. In addition, a value obtained through the subtraction of codIRange is set to the second parameter codIOffset showing the internal state of the arithmetic decoding apparatus, and, since the LPS has occurred, the value of codIRangeLPS calculated in Step S301 is set to the first parameter codIRange showing the internal state of the arithmetic decoding apparatus (Step S303). In addition, when codIOffset is small (NO in S302), it is determined that the symbol of the MPS has occurred, valMPS is set to binVal that is the decoding output value (Step S304).

Lastly, the normalization (RenormD) is performed (Step S305) to end the arithmetic decoding. Here, the normalization may be performed in the same manner as in the conventional method described with reference to FIG. 20.

Next, the fixed probability deriving method is described with reference to FIG. 4. FIG. 4 is a conceptual diagram for illustrating a method of deriving fixed probabilities.

In FIG. 4, (a) is a flowchart of operations for determining a fixed probability. The method firstly involves obtaining a related parameter corresponding to CtxIdx that is a decoding target (S401). Related parameters are included in a table as shown in (b) of FIG. 4, and shared between the coding side and the decoding side. For example, when the decoding target CtxIdx is a value within the range from S to T, it is only necessary to obtain a quantization parameter QP as the related parameter. The method next involves calculating a fixed provability value based on the obtained parameter (S402). This parameter is derived, for example, according to Expression 3.

$$\text{FixedCtxState} = \text{Clip3}(1,126,(m*\text{Clip3}(0,51,QP)) \gg 4) + n) \quad \text{(Expression 3)}$$

Here, Clip3 (A, B, C) shows a function for clipping the value of C to a value within a range starting with A and ending before B. In addition, when FixedCtxState calculated here is equal to or smaller than 63, FixedProb–pStateIdx is a value obtained by subtracting FixedCtxState that is StateIdx showing a fixed probability from 63, assuming the valMPS (the value of the MPS) is 0.

On the other hand, when FixedCtxState calculated here is larger than 63, FixedProb–pStateIdx that is StateIdx showing a fixed probability StateIdx is a value obtained by subtracting 64 from FixedCtxState, assuming the valMPS (the value of the MPS) is 1. Here, the FixedProb–pStateIdx calculated here may be used as pStateIdx in the decoding method shown in FIG. 3. On the other hand, for example, a value converted from a probability value shown in (c) of FIG. 4 is used in the decoding method shown in FIG. 2.

Here, each of the values denoted as m and n is an initialization parameter previously determined for a corresponding CtxIdx, and is shared between the decoding side and the coding side. A plurality of parameters may be shared as the values of CtxIdx, or a single parameter may be determined for each CtxIdx value.

Alternatively, as shown in (b) of FIG. 4, the distance to or from the closest reference image may be used as the related parameter. This parameter is described with reference to (d) and (e) of FIG. 4.

Each of (d) and (e) of FIG. 4 is a schematic illustration of a method for decoding a decoding target picture included in temporally different pictures (in a time sequence from left to right) with reference to an already decoded picture using a motion vector for generating a prediction image. In FIG. 4: (d) shows an example where a decoding target picture refers to the closest reference image among the pictures that precedes the decoding target picture by one frame (precedes by 1/30 seconds in the case where the frame rate is 30 fps); and (e) shows an example where a decoding target picture refers to the closest reference image among the pictures that precedes or succeeds the decoding target picture by two frames (precedes or succeeds by 2/30 seconds in the case where the frame rate is 30 fps). For example, by using the frame rate as the unit of calculation, the fixed probability in the case of (d) of FIG. 4 is calculated assuming that the shortest distance MinDist=1, and the fixed probability in the case of (e) of FIG. 4 is calculated assuming that the shortest distance MinDist=2. These fixed probabilities are derived, for example, by performing a calculation according to Expression 4 or the like.

$$\text{FixedCtxState} = \text{Clip3}(1, 126, (m*\text{MinDist})) + n) \quad \text{(Expression 4)}$$

Here, Clip3 (A, B, C) shows a function for clipping the value of C to a value within a range from A to B inclusive. In addition, when FixedCtxState calculated here is equal to or smaller than 63, FixedProb−pStateIdx is a value obtained by subtracting FixedCtxState that is StateIdx showing a fixed probability from 63, assuming the valMPS (the value of the MPS) is 0.

On the other hand, when FixedCtxState calculated here is larger than 63, FixedProb−pStateIdx that is StateIdx showing a fixed probability StateIdx is a value obtained by subtracting 64 from FixedCtxState, assuming the valMPS (the value of the MPS) is 1.

Likewise, an input image resolution is derived by, for example, substituting the value of a maximum number of processing block units, the value of a resolution, or the like instead of the value of MinDist in Expression 4.

Here, the related parameter may be replaced with a plurality of related parameters. In this case, for example ParamA and ParamB are derived according to Expression 5.

$$\text{FixedCtxState} = \text{Clip3}(1, 126, (a*\text{ParamA} + b*\text{ParamB})) + n) \quad \text{(Expression 5)}$$

Here, Clip3 (A, B, C) shows a function for clipping the value of C to a value within a range from A to B inclusive. In addition, when FixedCtxState calculated here is equal to or smaller than 63, FixedProb−pStateIdx is a value obtained by subtracting FixedCtxState that is StateIdx showing a fixed probability from 63, assuming the valMPS (the value of the MPS) is 0.

On the other hand, when FixedCtxState calculated here is larger than 63, FixedProb−pStateIdx that is StateIdx showing a fixed probability StateIdx is a value obtained by subtracting 64 from FixedCtxState, assuming the valMPS (the value of the MPS) is 1.

Here, each of the values denoted as a, b, and c is an initialization parameter previously determined for a corresponding CtxIdx, and is shared between the decoding side and the coding side. A plurality of parameters may be shared as the values of CtxIdx, or a single parameter may be determined for each CtxIdx value.

It is to be noted that the arithmetic decoding unit according to Embodiment B1 of the present invention is included in the image decoding apparatus which decodes coded image data resulting from compression coding. FIG. 5 is a block diagram of an example of the structure of an image decoding apparatus 400 according to Embodiment B1 of the present invention.

The image decoding apparatus 400 decodes the compression-coded image data. For example, the image decoding apparatus 400 receives, for each of blocks of an image, an input of coded image data as a decoding target signal. The image decoding apparatus 400 reconstructs the image data by performing variable length decoding, and inverse quantization and inverse transform on the input decoding target signal.

As shown in FIG. 5, the image decoding apparatus 400 includes: an entropy decoding unit 410, an inverse quantization and inverse transform unit 420, an adder 425, a deblocking filter 430, a memory 440, an intra prediction unit 450, a motion compensation unit 450, and an intra/inter switch 470.

The entropy decoding unit 410 reconstructs quantized coefficients by performing variable length decoding on the input signal (input stream). Here, the input signal (input stream) is the decoding target signal, and corresponds to block data included in the coded image data. In addition, the entropy decoding unit 410 obtains motion data from the input signal, and outputs the obtained motion data to the motion compensation unit 460.

The inverse quantization and inverse transform unit 420 reconstructs the transform coefficients by performing inverse quantization on the quantized coefficients reconstructed by the entropy decoding unit 410. Then, the inverse quantization and inverse transform unit 420 reconstructs a prediction error by performing inverse transform on the reconstructed transform coefficients.

The adder 425 adds the reconstructed prediction error and a prediction signal to generate a decoded image.

The deblocking filter 430 performs deblocking filtering on the generated decoded image. The decoded image processed by the deblocking filter is output as a decoded signal.

The memory 440 is a memory for storing reference images for use in motion compensation. More specifically, the memory 440 stores decoded images processed by the deblocking filter.

The intra prediction unit 450 performs intra prediction to generate a prediction signal (an intra prediction signal). More specifically, the intra prediction unit 450 performs intra prediction with reference to images surrounding the decoding target block (input signal) in the decoded image generated by the adder 425 to generate an intra prediction signal.

The motion compensation unit 460 performs motion compensation based on motion data output from the entropy decoding unit 410 to generate a prediction signal (an inter prediction signal).

The intra/inter switch 470 selects any one of an intra prediction signal and an inter prediction signal, and outputs the selected signal as the prediction signal to the adder 425.

With the above structure, the image decoding apparatus 400 according to Embodiment B2 of the present invention decodes the compression-coded image data.

In the image decoding apparatus 400, the arithmetic decoding unit according to Embodiment B1 of the present invention is included by the entropy decoding unit 410. In other words, the arithmetic decoding unit performs arithmetic decoding and a multi-value conversion on the coded image data resulting from predictive coding as the input decoding target signal. In addition, signal type information indicates information such as the positions of the quantized coefficients, the motion data, or an intra prediction direction for use by the intra prediction unit 450.

As described above, the image decoding apparatus and the image decoding method according to Embodiment B1 of the present invention make it possible to appropriately reconstruct a signal coded using a fixed probability.

In this way, it is possible to accurately decode the signal having an increased coding efficiency. More specifically, as shown in Embodiment B1, it is possible to use fixed probability information as coded probability information, for parameters whose occurrence probabilities vary depending on quantization parameters, image resolutions, the positional relationships with reference images irrespective of whether the occurrence probabilities are 50% or not. This makes it possible to increase the coding efficiency.

In short, it is possible to reduce the processing amount and to increase the coding efficiency.

In this way, the image decoding apparatus and the image decoding method according to Embodiment B1 of the present invention allows accurate decoding of the signal having the coding efficiency increased in this way.

In addition, the prepared table facilitates the estimation of required processing time. Thus, it is possible to achieve a high-speed operation circuit that is required, for example, in the real-time reproduction of a high-resolution video.

Embodiment B2

A description is given of the outline of an arithmetic coding method according to this embodiment. The arithmetic coding method according to this embodiment selectively performs, according to a coding target signal, context-adaptive arithmetic coding and a fixed-probability arithmetic coding using a fixed probability without updating the probability for each context. In addition, the arithmetic coding method is intended to adaptively change probabilities according to information such as a quantization parameter QP, information about the distance to the closest reference image, and an image resolution, instead of using a fixed probability of 50%. In this way, this embodiment makes it possible to reduce the processing amount and generate a bit stream having a high coding efficiency.

The outline of the arithmetic coding method according to this embodiment has been described above. The same method as in the conventional arithmetic coding method can be performed unless otherwise explained.

Next, a description is given of a flow of processes of the arithmetic coding method performed by an arithmetic coding unit according to this embodiment.

FIG. 6 is a flowchart of processes performed by the arithmetic coding unit according to Embodiment B2 of the present invention. The arithmetic coding unit according to the present invention obtains a coding target signal first, and determines whether or not the coding target signal is of a bypass type (Step S601). This determination may be made with reference to a rule predetermined for each type of a target signal. For example, a sign (+ or −) showing whether or not the value of a difference transform image signal is positive or negative is used for bypass processing, and a signal (for example, 0 or 1) showing whether or not the value of a difference transform image signal is 0 or non-0 is used for a context-adaptive type.

Here, when the type is not the bypass type (NO in Step S601), the context-adaptive arithmetic coding is performed (S602). This processing may be the same as the conventional arithmetic coding method (see (a) of FIG. 7).

On the other hand, when the target signal is determined to be of a bypass type (YES in Step S601), a fixed probability is obtained according to a predetermined method (Step S603). This method corresponds to Step S103 in decoding. The details of this determination method are the same as those of the method described with reference to FIG. 4, and thus are not described here again Next, fixed-probability arithmetic decoding is performed based on the obtained fixed probability (Step S604). When the probability obtained in Step S603 is 50%, it is possible to perform the conventional bypass arithmetic decoding, or to determine the probability to be a fixed-probability of 50% in a later-described fixed-probability arithmetic decoding. In the former case, it is possible to use a circuit according to a conventional technique. In the latter case, it is possible to share circuits and thereby produce an advantage of being able to reduce the circuit scale.

This processing is further described with reference to FIG. 7.

In FIG. 7, (a) is a flowchart (extracted from Non-patent Literature 1) of processes of context-adaptive arithmetic coding (S602). These processes are performed in manners similar to those shown in Non-patent Literature 1 unless otherwise explained.

First, for the first parameter codIRange showing the internal state of the arithmetic coding unit, a codIRange value and a codIRangeLPS that is a value in the case where an LPS signal has occurred as in the conventional decoding are calculated (corresponding to Steps S701 and SB01). Next, a determination is made as to whether a current coding target signal binVal is a symbol valMPS having a high symbol occurrence probability (S702). When the current target signal is an LPS (YES in S702), the codIRange value calculated in Step S701 is added to the second parameter codILow showing the internal state of the arithmetic coding unit, and the codIRange LPS value is set to codIRange (Step S703). Next, an update of pStateIdx is performed based on the fact that the LPS has occurred in Steps S704 to S706, as in Steps SB04 to SB06.

On the other hand, when the coding target signal is an MPS (NO in Step S702), an update of pStateIdx is performed (corresponding to Steps S707 and SB07). Next, a later-described normalization RenormE (S708) is performed, and the counter is incremented (S709) to terminate the processing.

In FIG. 7, (b) is a flowchart of processes of fixed-probability arithmetic coding according to the present invention. First, pStateIdx showing the corresponding probability is obtained, and a calculation is performed as in Step S701 (as in Step SB01) (Step S711). Next, a determination is made as to whether a current coding target signal binVal is a symbol valMPS having a high symbol occurrence probability (S712). When the current target signal is an LPS (YES in S712), the codIRange value calculated in Step S701 is added to the second parameter codILow showing the internal state of the arithmetic coding unit, and the codIRange LPS value is set to codIRange (Step S713). On the other hand, when the coding target signal is an MPS (NO in Step S712), normalization (RenormE, S714) is performed without performing any other processing. Lastly, the counter is incremented (S715) to terminate the processing. In other words, this shows that fixed-probability arithmetic coding is always performed without updating pStateIdx.

FIG. 8 shows an operation flow of an arithmetic coding method using a shift operation for reducing the processing amount corresponding to the arithmetic decoding in FIG. 2.

First, codIRangeLPS in the case where an LPS has occurred is calculated using the shift operation (the detailed operation is the same as that in S201 of FIG. 2), and codIRange is also calculated as in S7101 and S711. Next, a determination is made as to whether a current coding target signal binVal is a symbol valMPS having a high symbol occurrence probability (S802). When the current target signal is an LPS (YES in S802), the codIRange value calculated in Step S801 is added to the second parameter codILow showing the internal state of the arithmetic coding unit, and the codIRange LPS value is set to codIRange (Step S803). On the other hand, when the coding target signal is an MPS (NO in Step S802), normalization (RenormE, S804) is performed without performing any other processing. Lastly, the counter is incremented (S805) to terminate the processing. This method uses a number of kinds of fixed probabilities fewer than the number of kinds of fixed probabilities used in the method shown in (b) of FIG. 7, but makes it possible to use the fixed probabilities in the entire processing, and to thereby increase the coding efficiency.

FIG. 9 is a flowchart (extracted from Non-patent Literature 1) showing operations in the processes corresponding to the aforementioned normalization processes (Steps S709, S715, and S805). These processes are performed in manners similar to those shown in Non-patent Literature 1 unless otherwise explained.

When codIRange is greater than or equal to 0x100 in the hexadecimal notation (256 in the decimal system) (NO in S901), the normalization process is terminated. On the other hand, a numerical code 0 is written (Step S903) when codIRange (the first parameter showing the internal state of the arithmetic coding apparatus) is smaller than 0x100 in the hexadecimal notation (256 in the decimal system) (YES in S901), and when codILow (the second parameter showing the internal state of the arithmetic coding apparatus) is smaller than 0x100 in the hexadecimal notation (256 in the decimal system) (YES in S902). On the other hand, when codILow is greater than or equal to 0x100 in the hexadecimal notation (256 in the decimal system) and smaller than 0x200 in the hexadecimal notation (512 in the decimal system) (NO in S902, and NO in S904), 0x100 in the hexadecimal notation (256 in the decimal system) is subtracted from codILow, and the counter showing bitsOutstanding that indicates an amount of bits to be written in sequence at the time of bit output is incremented by 1 (Step S905). On the other hand, when codILow is a value greater than or equal to 0x200 in the hexadecimal notation (512 in the decimal system) (NO in S902, and YES in S904), 0x200 in the hexadecimal notation (512 in the decimal system) is subtracted from codILow (S906), and a numerical code 1 is written (Step S907). When the value of bitsOutstanding is non-0 at the time of code writing (S903 or S907), the codes inverse to the codes specified as being written in the respective steps are written by the amount shown as bitOutstanding, and the value of bitOutstanding is reset to 0. Then, codIRange is shifted to the left by 1 (doubled), codILow is shifted to the left by 1 (doubled) (S908), and a return is made to Step S901. With these processes, arithmetic coding is realized.

Here, when performing a probability shift operation as in FIG. 8, it is also good to prepare and use a table that specifies the numbers of loops for update in encoding previously calculated, in the same manner as in the table shown in FIG. 4. In this way, it is possible to reduce the processing amount.

Figure 30:
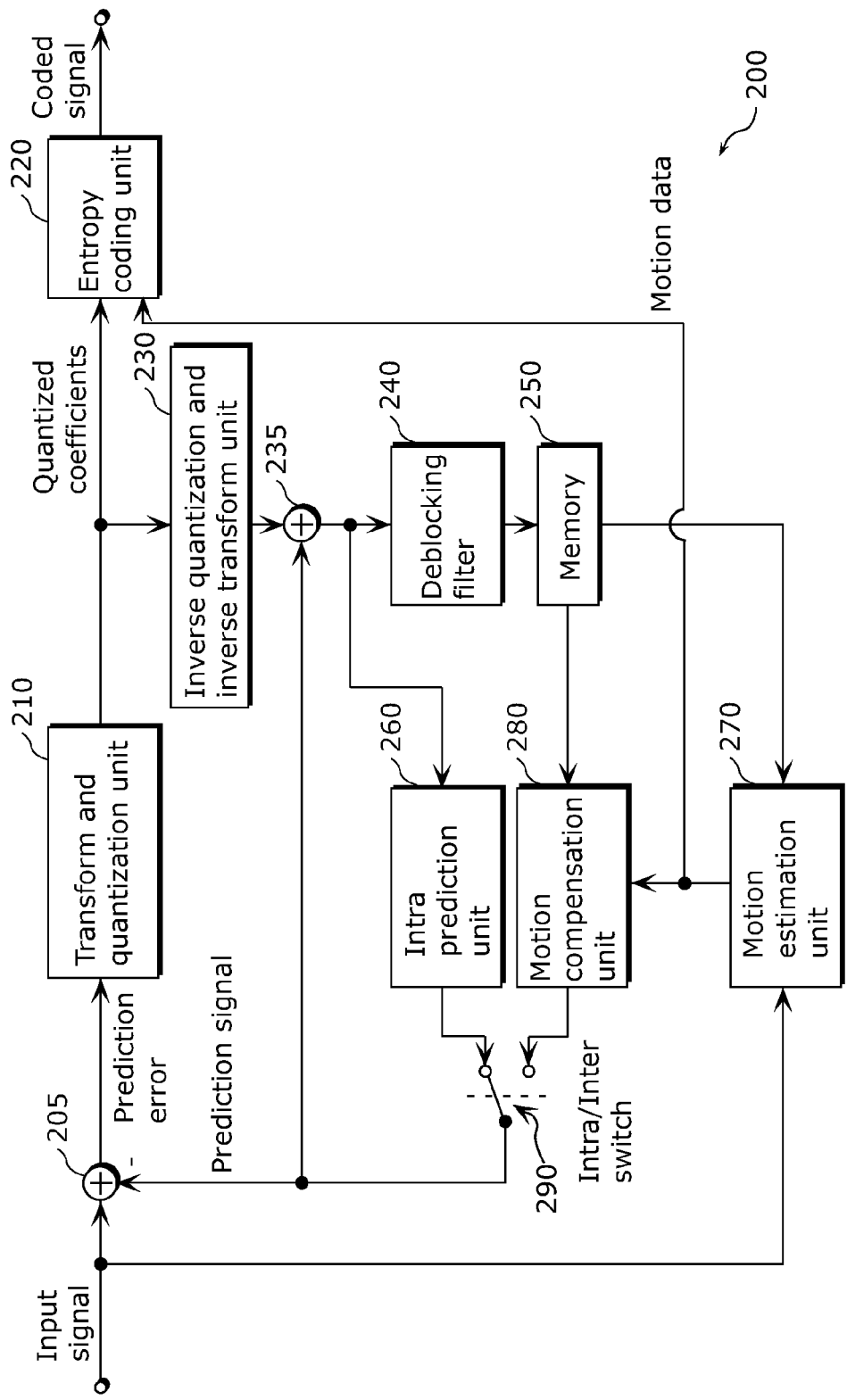
FIG. 30 is a block diagram of an example of the structure of an image coding apparatus according to Embodiment B2 of the present invention.

It is to be noted that the arithmetic coding unit according to Embodiment B2 of the present invention is included in the image coding apparatus which compression codes the image data. FIG. 30 is a block diagram of an example of the structure of an image coding apparatus 200 according to Embodiment B2 of the present invention.

The image coding apparatus 200 codes the compression-coded image data. For example, the image coding apparatus 200 receives, for each of blocks of an image, an input of image data as an input signal. The image coding apparatus 200 generates a coded signal by performing transform, quantization, and variable length coding on the input signal.

As shown in FIG. 30, the image coding apparatus 200 includes: a subtractor 205, a transform and quantization unit 210, an entropy coding unit 220, an inverse quantization and inverse transform unit 230, an adder 235, a deblocking filter 240, a memory 250, an intra prediction unit 260, a motion estimation unit 270, a motion compensation unit 280, and an intra/inter switch 290.

The subtractor 205 calculates a prediction error that is the difference between the input signal and the prediction signal.

The transform and quantization unit 210 transforms the prediction error in the spatial domain into transform coefficients in the frequency domain. For example, the transform and quantization unit 210 performs Discrete Cosine Transform (DCT) on the prediction error to generate transform coefficients. Furthermore, the transform and quantization unit 210 quantizes the transform coefficients to generate quantized coefficients.

The entropy coding unit 220 performs variable length coding of the quantized coefficients to generate a coded signal. In addition, the entropy coding unit 220 codes motion data (such as a motion vector) estimated by the motion estimation unit 270, adds the motion data to the coded signal, and outputs the coded signal.

The inverse quantization and inverse transform unit 230 reconstructs the transform coefficients by performing inverse quantization on the quantized coefficients. Furthermore, the inverse quantization and inverse transform unit 230 reconstructs a prediction error by performing inverse transform on the reconstructed transform coefficients. Here, the reconstructed prediction error has lost a part of its information through the quantization, and thus does not match the prediction error that is generated by the subtractor 205. In other words, the reconstructed prediction error includes a quantization error.

The adder 235 adds the reconstructed prediction error and the prediction signal to generate a local decoded image.

The deblocking filter 240 performs deblocking filtering on the generated local decoded image.

The memory 250 is a memory for storing reference images for use in motion compensation. More specifically, the memory 250 stores the local decoded images processed by the deblocking filter.

The intra prediction unit 260 performs intra prediction to generate a prediction signal (an intra prediction signal). More specifically, the intra prediction unit 260 performs intra prediction with reference to images surrounding the coding target block (input signal) in the local decoded image generated by the adder 235 to generate an intra prediction signal.

The motion estimation unit 270 estimates motion data (such as a motion vector) between the input signal and a reference image stored in the memory 250.

The motion compensation unit 280 performs motion compensation based on the estimated motion data to generate a prediction signal (an inter prediction signal).

The intra/inter switch 290 selects any one of an intra prediction signal and an inter prediction signal, and outputs the selected signal as the prediction signal to the subtractor 205 and the adder 235.

With this structure, the image coding apparatus 200 according to Embodiment B1 of the present invention compression codes the image data.

In FIG. 30, the arithmetic coding unit according to Embodiment B2 of the present invention is included by the entropy coding unit 220. In other words, the arithmetic coding unit obtains, as an input signal, values obtained by binarizing quantized coefficients, and performs arithmetic coding. In addition, signal type information indicates information such as the positions of the quantized coefficients, the motion data shown in FIG. 30, or an intra prediction direction for use by the intra prediction unit 260.

As described above, the image coding apparatus and the image coding method according to this embodiment of the present invention make it possible to perform arithmetic coding of signals based on a quantization parameter QP, the distance to a reference image, and an image resolution even when the signals has a fixed occurrence probability other than 50%, and to thereby perform high-speed processing.

More specifically, by skipping an update of the probability for each bit coding (decoding) according to a context, it is possible to maintain a coding efficiency, and, for example, to achieve a high-speed operation circuit required in the real-time code transmission of a high-resolution video.

Embodiment B3

This embodiment describes coding and decoding methods involving recording, as header information of a stream, the shortest reference distance information used in fixed probability obtaining steps (S103 and S603) (see FIG. 4). A description is given of the structure of data to be stored.

Figure 31:
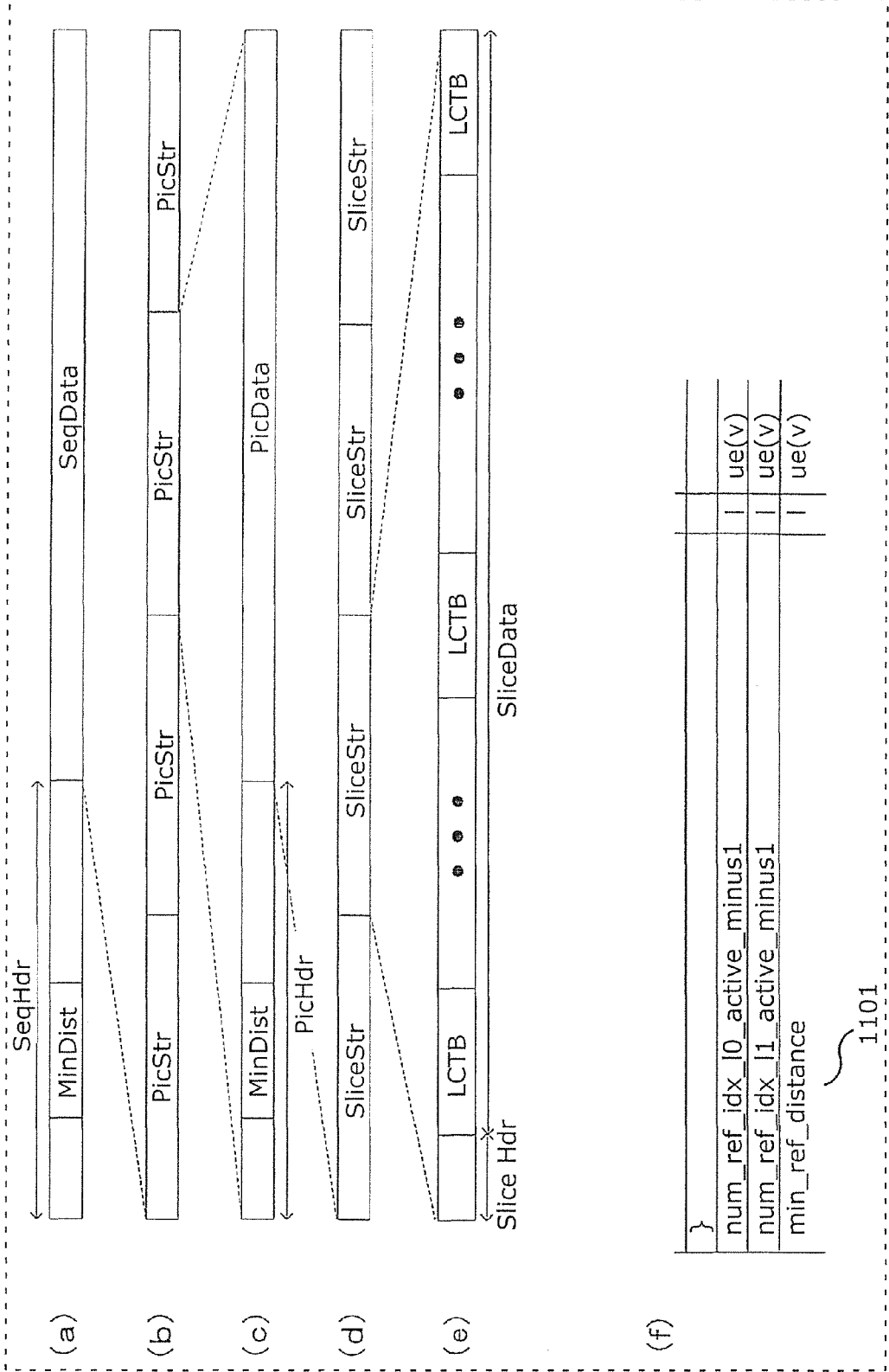
FIG. 31 is composed of schematic illustrations of data structures according to the present invention.

FIG. 31 shows the structure of a code string in the image coding method according to the present invention. FIG. 31 shows the structure of an output code string in the image coding method according to the present invention. In FIG. 31, (a) shows a coded signal corresponding to a video sequence that is composed of at least one picture, and is composed of sequence data SeqData that is the data of all the at least one picture and a sequence header SeqHdr that is the data common among all the at least one picture.

The shortest reference distance information MinDist is information showing, for example, the distance from the reference image as described in Embodiment B1.

The sequence header may include the shortest reference distance information MinDist. Normally, the shortest reference distance information is stored for each picture. The distance is always 1 in the case of sequences having a low-delay structure. Thus, it is possible to reduce the codes for each picture by storing the information in the sequence header.

In FIG. 31, (b) shows the structure of sequence data SeqData that includes picture signals PicStr each of which is a coded signal of the whole picture.

In FIG. 31, (c) shows the structure of a picture signal PicStr composed of picture data PicData that is the data of the whole picture and a picture header PicHdr that is the data common in the entire picture. For example, the picture header PicHdr may include the shortest reference distance information MinDist. In FIG. 31, (d) shows the structure of the picture data PicData that includes a slice signal SliceStr that is a coded signal of a slice composed of a set of block units.

In FIG. 31, (e) shows the structure of the slice signal SliceStr composed of slice data SliceData that is the data of the slice and a slice header sliceHdr that is the data common in the entire data of the slice. The slice header SliceHdr may include the shortest reference distance information MinDist. In FIG. 31, (d) shows the structure of picture data PicData that may include a picture. In this way, it is possible to accurately decode the received coded signal even when appropriate switching is performed for each slice data SliceData.

Here, when the sequence data SeqData includes a plurality of picture signals PicStr, it is also good to include the shortest reference distance information MinDist only in one or some of the picture headers PicHdr instead of including the same in all the picture headers PicHdr. Likewise, when the picture data PicData includes a plurality of slice signals SliceStr, it is also good to include the shortest reference distance information MinDist only in one or some of the slice headers SliceHdr instead of including the same in all the slice headers SliceHdr. When the slice header SliceHdr as shown in (e) of FIG. 31 does not include any shortest reference distance information MinDist, it is also possible to use as a substitute the shortest reference distance information MinDist of another one of the slice headers SliceHdr as long as the same shortest reference distance information MinDist is commonly used among the slices. In this way, it is possible to prevent the number of bits from being increased by repeatedly storing the same shortest reference distance information MinDist.

More specifically, it is also good to directly code a parameter such as a parameter 1101 in (f) of FIG. 31 and include in the picture parameter set (the picture header).

In addition, when transmitting data in the form of, for example, packets that are small data units instead of transmitting the data in the form of a bit stream that is a continuous code string, it is also good to separate the header portion and the data portion other than the header portion and transmit these portions separately. In this case, unlike the bit stream shown in FIG. 31, there is no possibility that the header portion and the data portion are included in one bit stream. However, the concept using packets is the same as the concept using a bit stream in FIG. 31. This is because the header portion and the data portion corresponding to the header portion are transmitted in separate packets when the header portion and the data portion are transmitted in a non-sequential manner even when these portions are not included in the same single bit stream.

In addition, the code string coded according to the aforementioned approach is decoded according to the decoding method of the present invention. The procedure of the decoding method is described below. The decoding method firstly involves obtaining the shortest reference distance information MinDist included in each sequence header SeqHdr, and storing the obtained information. The decoding method next involves obtaining the shortest reference distance information MinDist included in each picture header PicHdr, and updating the obtained information. Here, when all or some of the picture headers do not include such shortest reference distance information MinDist, the information included in the sequence header SeqHdr is retained. The decoding method further involves obtaining the shortest reference distance information MinDist included in each slice header SliceHdr, and updating the obtained information.

In this way, it is possible to decode the code string more accurately.

As described above, an image decoding method according to an aspect of the present invention is an image decoding method of decoding coded image data, including selectively performing arithmetic decoding methods according to the type of a decoding target signal. The arithmetic decoding methods include: a first arithmetic decoding method which is performed based on a symbol occurrence probability obtained according to a context, and involves update of the occurrence probability according to a decoding symbol; and a second arithmetic decoding method which is performed based on a symbol occurrence probability obtained according to a context, and which does not involve update of the occurrence probability according to a decoding symbol. Symbol occurrence probabilities for use in decoding according to the second arithmetic decoding method are modified based on already decoded parameters. This makes it possible to increase the coding efficiency.

In addition, for example, in the second arithmetic decoding method, the fixed probabilities may be determined based on quantization parameters. This makes it possible to increase the coding efficiency.

In addition, for example, in the second arithmetic decoding method, the fixed probabilities may be determined based on image resolutions. This makes it possible to increase the coding efficiency.

In addition, for example, in the second arithmetic decoding method, the fixed probabilities may be determined based on shortest distances from reference images. This makes it possible to increase the coding efficiency.

In addition, for example, information showing the shortest distances from the reference images is coded. This makes it possible to increase the error resilience.

In addition, for example, in the second arithmetic decoding method, the fixed probabilities may be determined based on combinations of the parameters arbitrarily selected from parameters recited in Points (2) to (4). This makes it possible to increase the coding efficiency.

In addition, an image coding method according to an aspect of the present invention is an image coding method of coding image data to be coded, including selectively performing arithmetic coding methods according to the type of a coding target signal. The arithmetic coding methods include: a first arithmetic coding method which is performed based on a symbol occurrence probability obtained according to a context, and involves update of the occurrence probability according to a coding symbol; and a second arithmetic coding method which is performed based on a symbol occurrence probability obtained according to a context, and which does not involve update of the occurrence probability according to a coding symbol. Symbol occurrence probabilities for use in coding according to the second arithmetic coding method are modified based on already coded parameters. This makes it possible to increase the coding efficiency.

In addition, for example, in the second arithmetic coding method, the fixed probabilities may be determined based on quantization parameters.

In addition, for example, in the second arithmetic coding method, the fixed probabilities may be determined based on image resolutions.

In addition, for example, in the second arithmetic coding method, the fixed probabilities may be determined based on shortest distances from reference images. This makes it possible to increase the coding efficiency.

In addition, for example, information showing the shortest distances from the reference images is coded.

In addition, for example, in the second arithmetic coding method, the fixed probabilities may be determined based on combinations of the parameters arbitrarily selected from parameters recited in Points (2) to (4).

(Underlying Knowledge C Forming Basis of the Present Invention)

Recent years have seen an increase in the number of applications for services of video on demand types etc. Examples of such services include video-conferencing through the Internet, digital video broadcasting, and streaming of video contents. These applications depend on transmission of video information. When the video data is transmitted or recorded, a considerable amount of data is transmitted through a conventional transmission path having a limited bandwidth, or is recorded onto a conventional recording medium having a limited data capacity. Accordingly, in order to transmit the video information using such a conventional transmission channel or to record the video information onto a conventional recording medium, it is inevitable to compress or reduce the amount of digital data.

For the purpose of compressing such video data, a plurality of video coding standards has been developed. Such video coding standards are, for instance, International Telecommunication Union Telecommunication Standardization Sector (ITU-T) standards denoted with H.26× and ISO/IEC standards denoted with MPEG-x. The most advanced video coding standard is currently the standard denoted as H.264/AVC or MPEG-4/AVC (see Non-patent Literature 1).

The data compression processes in the H.264/AVC standard is roughly divided into prediction, transform, quantization, and entropy coding. The entropy coding is intended to reduce redundant information in information that is used for the prediction and quantized information. Representatives of entropy coding include variable-length coding, adaptive coding, and fixed-length coding. Representatives of variable-length coding include Huffman coding, run-length coding, and arithmetic coding. Among these, the arithmetic coding is known as a method which is intended to determine output codes while calculating symbol occurrence probabilities and which provides a high coding efficiency by determining contexts according to the features of image data, compared to Huffman coding which uses a fixed coding table.

A conventional arithmetic decoding method is described with reference to FIG. 32 to FIG. 36.

First, a flow of the arithmetic decoding method is described below with reference to FIG. 32 to FIG. 36.

Figure 32:
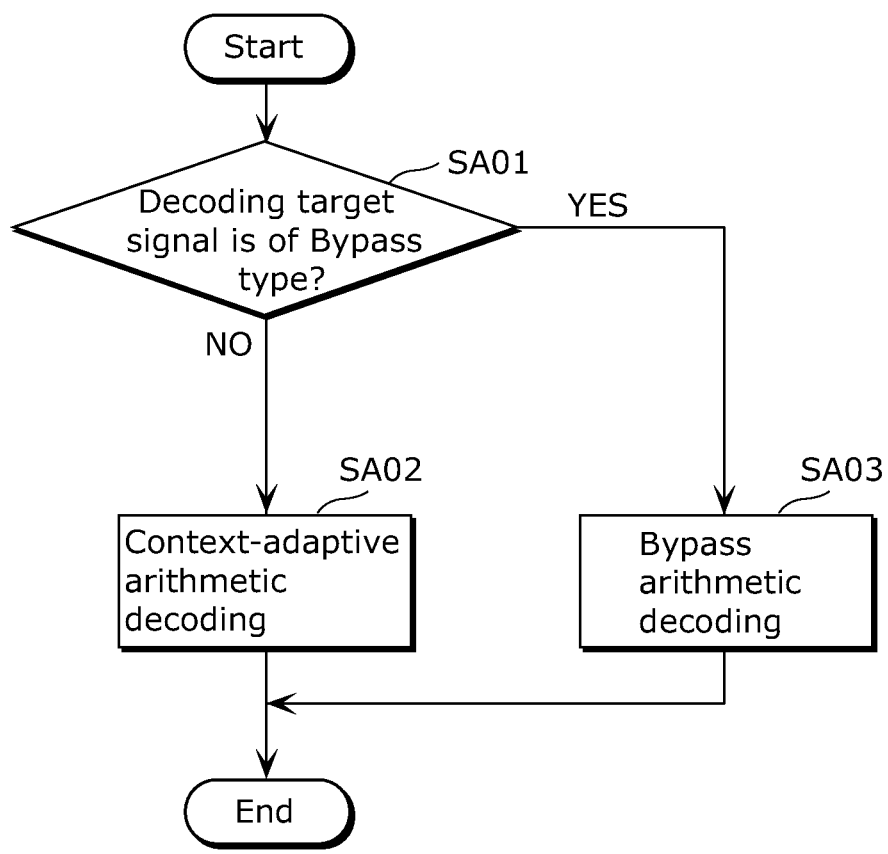
FIG. 32 is a flowchart of a conventional arithmetic decoding method.

FIG. 32 is a flowchart of arithmetic decoding processes performed by an arithmetic decoding unit according to the conventional H.264/AVC standard. As shown in FIG. 32, the arithmetic decoding unit determines whether or not the type of a decoding target signal is of a Bypass type (SA01). When the decoding target signal is of the Bypass type (YES in SA01), bypass arithmetic decoding is performed (SA03). On the other hand, when the decoding target signal is not of the Bypass type (NO in SA01), context adaptive arithmetic decoding is performed based on the type of the decoding target signal (SA02).

Figure 33:
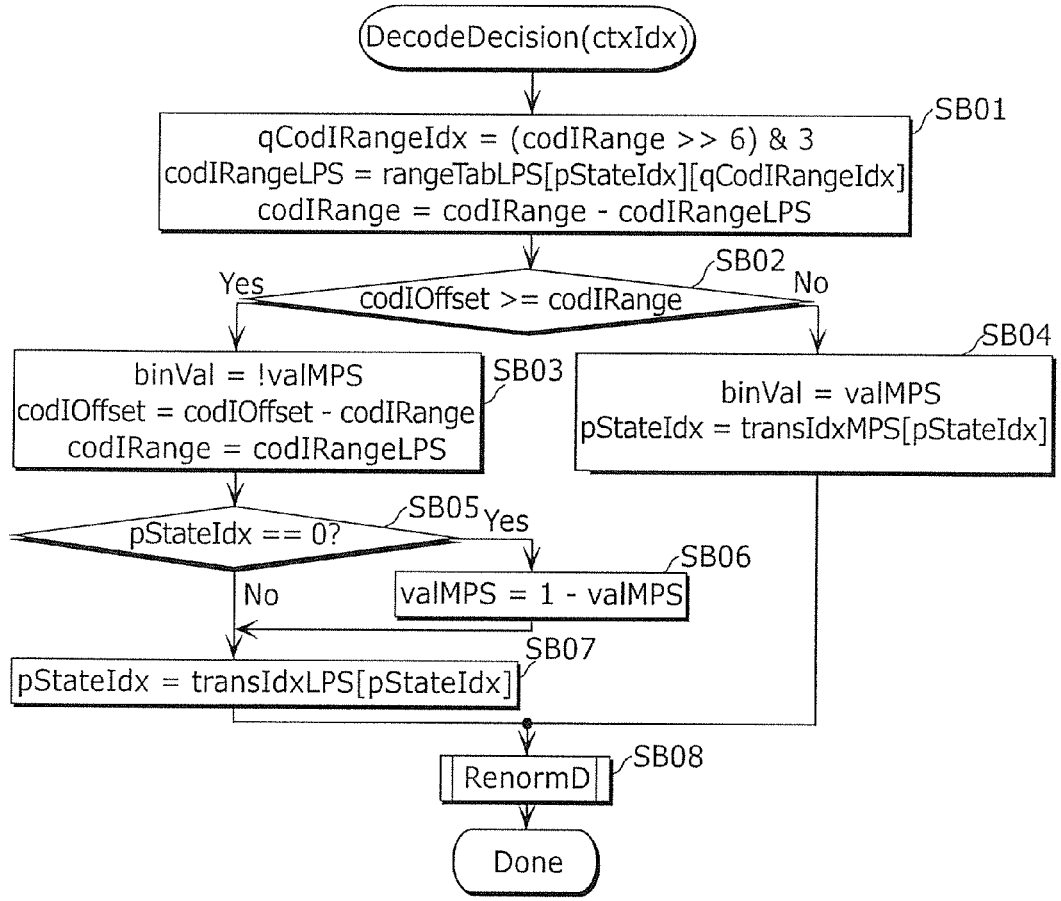
FIG. 33 is a flowchart of context-adaptive arithmetic decoding in the conventional arithmetic decoding method.

FIG. 33 is a flowchart of the aforementioned conventional context adaptive arithmetic decoding. This flowchart is extracted from Non-patent Literature 1, and is the same as in Non-patent Literature 1 unless otherwise explained.

In the arithmetic decoding, a context (ctxIdx) determined based on the signal type is input first.

This is followed by: the calculation of a value qCodIRangeIdx derived from a parameter codIRange showing a current internal state of the arithmetic decoding apparatus; the obtainment of a pStateIdx value that is a state value corresponding to ctxIdx; and the obtainment of codIRangeLPS with reference to a table (rangeTableLPS) based on these two values of qCodIRangeIdx and pStateIdx. Here, this codIRangeLPS denotes a value that is a parameter showing the internal state of the arithmetic decoding apparatus at the time of the occurrence of an LPS (this LPS specifies one of the symbols 0 and 1 that has the lower occurrence probability) with respect to a first parameter codIRange showing the internal state of the arithmetic decoding apparatus.

In addition, a value obtained by subtracting the aforementioned codIRangeLPS from the current codIRange is included in codIRange (Step SB01). Next, the calculated codIRange is compared with a second parameter codIOffset showing the internal state of the arithmetic decoding apparatus (Step SB02). When the codIOffset is greater than or equal to codIRange (YES in Step SB02), it is determined that the symbol of the LPS has occurred, and a value different from a value of valMPS is set to binVal that is a decoding output value. This valMPS value is an MPS value (0 or 1) specifying the one of the symbols 0 and 1 which has the higher occurrence probability, and the different value is 0 when valMPM=1 is satisfied or 1 when valMPM=0 is satisfied. In addition, a value obtained through the subtraction of codIRange is set to the second parameter codIOffset showing the internal state of the arithmetic decoding apparatus, and, since the LPS has occurred, the value of codIRangeLPS calculated in Step SB01 is set to the first parameter codIRange showing the internal state of the arithmetic decoding apparatus (Step SB03). Here, when the pStateIdx value that is a state value corresponding to the aforementioned ctxIdx is 0 (YES in Step SB05), it is shown that the probability of the LPS exceeds the probability of the MPS, and thus valMPS is changed to the opposite value (changed to 0 when valMPM=1, and to 1 when valMPM=0) (Step SB06). On the other hand, when the pStateIdx value is 0 (NO in Step SB05), the pStateIdx value is updated based on a transform table transIDxLPS that is used at the time of the occurrence of the LPS (Step SB07).

In addition, when codIOffset is smaller (NO in SB02), it is determined that the symbol of the MPS has occurred, valMPS is set to binVal that is the decoding output value, and the pStateIdx value is updated based on a transform table transIdxMPS that is used at the time of the occurrence of the MPS (Step SB04).

Lastly, the normalization (RenormD) is performed (Step SB08) to end the arithmetic decoding.

Figure 34:
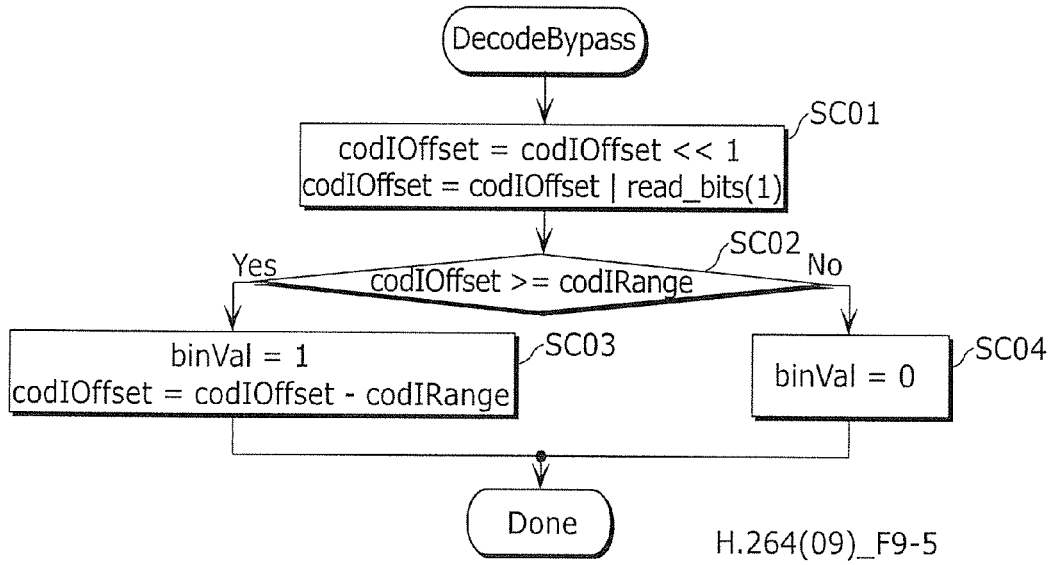
FIG. 34 is a flowchart of bypass arithmetic decoding in the conventional arithmetic decoding method.

FIG. 34 is a flowchart of the aforementioned conventional bybass arithmetic decoding. This flowchart is extracted from Non-patent Literature 1, and is the same as in Non-patent Literature 1 unless otherwise explained.

First, the second parameter codIOffset showing a current internal state of the arithmetic decoding apparatus is shifted to the left (doubled), and 1 bit is read out from a bit stream. Here, this (doubled) value is set when the read-out bit is 0, whereas a value obtained by adding 1 thereto is set when the read-out bit is 1 (SC01).

Next, when codIOffset is greater than or equal to the first parameter codIRange showing the internal state of the arithmetic decoding apparatus (YES in SC02), "1" is set to binVal that is a decoding output value, and a value obtained through the subtraction of codIRange is set to codIOffset (Step SC03). On the other hand, when codIOffset is smaller than the first parameter codIRange showing the internal state of the arithmetic decoding apparatus (NO in SC02), "0" is set to binVal that is a decoding output value (Step SC04).

FIG. 35 is a table of codIRangeLPS used in Step SB01 in FIG. 33, for illustrating in detail a method of deriving the LPS. This table is extracted from Non-patent Literature 1, and is the same as in Non-patent Literature 1 unless otherwise explained.

FIG. 35 is a table for deriving codIRangeLPS from pStateIdx and qCodIRangeIdx. As described above, pStateIdx shows the state determined for each of contexts, and shows that the occurrence probability of the LPS is smaller (the occurrence probability of the MPS is greater) as the occurrence probability of the LPS is on the increase and approaches closer to 50%. Here, qCodIRangeIdx is a value obtained by extracting a second bit and a third bit (the value obtained by performing a bitwise AND on 3 and codIRange shifted to the right by 6) among the most significant 3 bits in the parameter codIRange showing the internal state of the arithmetic coding apparatus, and codIRange is a value within a range from 256 to 511. Thus, qCodIRangeIdx is one of four ranges from 0 to 3 divided according to the codIRange value. More specifically, these divided four ranges of 0, 1, 2, and 3 are determined to be 256-319, 320-383, 384-447, and 448-511, respectively (D01). More specifically, when pStateIdx is 1, a value of 128, 167, 197, or 227 is output according to the codIRange value (D02). For example, 128 is output both when codIRange is 256 assuming that the occurrence probability of the LPS is exactly 50% and when codIRange is 300 assuming that the occurrence probability of the LPS is 42.7%. In addition, as another example, 197 is output when codIRange is 400 assuming that the occurrence probability of the LPS is exactly 49.25%.

Likewise, when pStateIdx is 43: 15 is output both when codIRange is 256 and when codIRange is 300 assuming that the occurrence probability of the LPS is 5.9% and 5%, respectively; and 22 is output when codIRange is 400 assuming that the occurrence probability of the LPS is 5.5%.

This eliminates the necessity of multiplications in the decoding. However, there remains a problem that it is impossible to increase the coding efficiency by reflecting the probability value estimated for each context in the coding because the probability value shown as pStateIdx varies depending on codIRange as described above.

Figure 36:
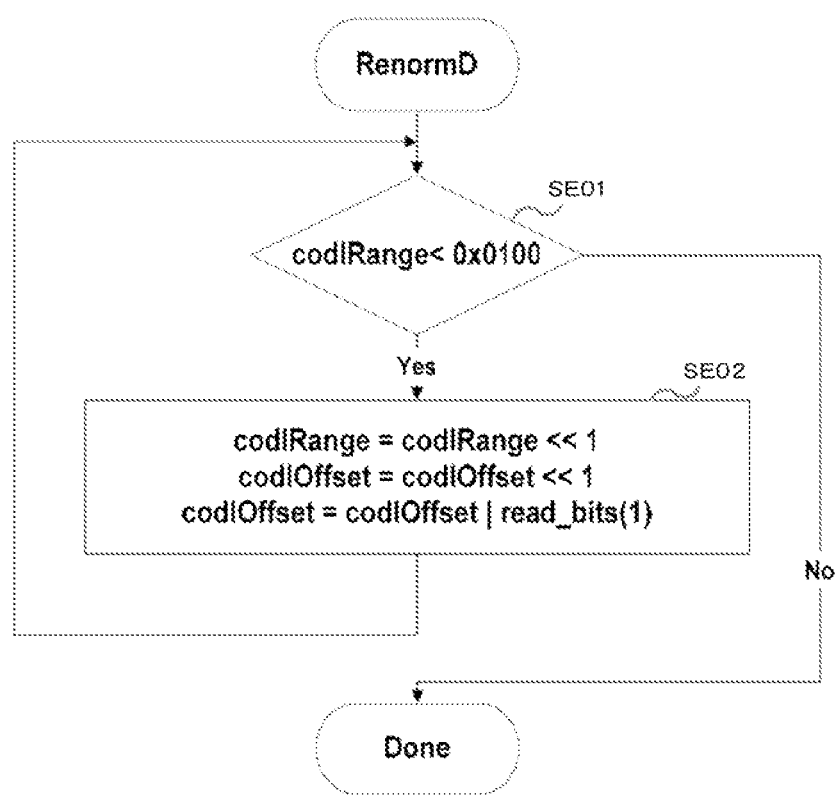
FIG. 36 is a flowchart of normalization in the conventional arithmetic decoding method.

FIG. 36 is a flowchart for illustrating in detail normalization (RenormD) shown in Step SB08 in FIG. 33. This table is extracted from Non-patent Literature 1, and is the same as in Non-patent Literature 1 unless otherwise explained.

When the first parameter codIRange showing the internal state of the arithmetic decoding apparatus in arithmetic decoding is smaller than 0x100 (in the hexadecimal notation that is 256 in the decimal system) (YES in Step SE01), codIRange is shifted to the left (doubled), the second parameter codIffset showing the internal state of the arithmetic decoding apparatus is shifted to the left (doubled), and 1 bit is read out from the bit stream. This (doubled) value is set when the read-out bit is 0, whereas a value obtained by adding 1 thereto is set when the read-out bit is 1 (SE02).

This processing is completed when codIRange reaches or exceeds 256 at last (NO in Step SE01).

Arithmetic decoding is performed by performing the above processes.

However, although the aforementioned conventional technique makes it possible to perform bypass processing on a signal having a probability of 50%, it makes it possible to perform only normal context adaptive arithmetic decoding on a signal having a probability other than 50%. For this reason, bypass processing that requires less update processing can be performed on signals of the limited signal type, and thus the decoding amount is large.

The present invention has been conceived to solve the aforementioned conventional problems, and aims to provide an image coding method and an image decoding method which make it possible to reduce the coding amounts and increase the coding efficiency.

In order to solve the above problems, an image decoding method according to an aspect of the present invention is an image decoding method for compression coding image data.

This method is intended to perform arithmetic decoding based on a probability specified based on a context determined according to the type of a decoding target signal and on a symbol occurrence probability determined corresponding to the context without based on a first parameter showing the internal state of the arithmetic decoding apparatus, and not to update the symbol occurrence probability.

In addition, this method is further intended to decode parameters in the bit stream to obtain the probability to be specified, and sets the probability.

In this way, it is possible to increase the number of types of signals that require such update processing, and reduce the required processing amount, and to thereby perform arithmetic decoding using the symbol occurrence probability independent of the internal state and to increase the coding efficiency.

In addition, the coding side estimates an appropriate probability and writes it in the bit stream. Thus, it is possible to reduce the processing amount in the decoding, and to thereby increase the coding efficiency.

It is to be noted that the present invention can be realized or implemented not only as image coding methods and image decoding methods, but also apparatuses which include processing units for performing the processing steps included in the image coding methods and image decoding methods. In addition, the present invention may be realized as programs for causing computers to execute these steps. Furthermore, the present invention may be implemented as recording media such as computer-readable Compact Disc-Read Only Memories (CD-ROMs) including the programs recorded thereon, and information, data, and/or signals representing the programs.

Some or all of the structural elements which make up any one of the image coding apparatuses and the image decoding apparatuses may be configured in the form of a single system Large Scale Integration (LSI). Such a system LSI is a super multifunctional LSI manufactured by integrating plural structural element units on a single chip. For example, the system LSI is a computer system configured to include a macro processor, a ROM, a Random Access Memory (RAM), and the like.

The present invention makes it possible to increase the coding efficiency and reduce the processing amount.

Hereinafter, embodiments of the present invention are described with reference to the drawings.

Embodiment C1

A description is given of the outline of an arithmetic decoding method according to this embodiment. The arithmetic decoding method according to this embodiment is for selectively performing, according to a decoding target signal, context-adaptive arithmetic decoding and a fixed-probability arithmetic decoding using a fixed probability without updating the probability for each context. In addition, the arithmetic decoding method is further intended to decode parameters in a bit stream for fixed probabilities, and determines the values of the fixed probabilities. In this way, this embodiment makes it possible to reduce the processing amount and decode a bit stream having a high coding efficiency.

The outline of the arithmetic decoding method according to this embodiment has been described above. The same method as in the conventional arithmetic decoding method can be performed unless otherwise explained.

Next, a description is given of a flow of processes of the arithmetic decoding method performed by an arithmetic decoding unit according to this embodiment.

Figure 37:
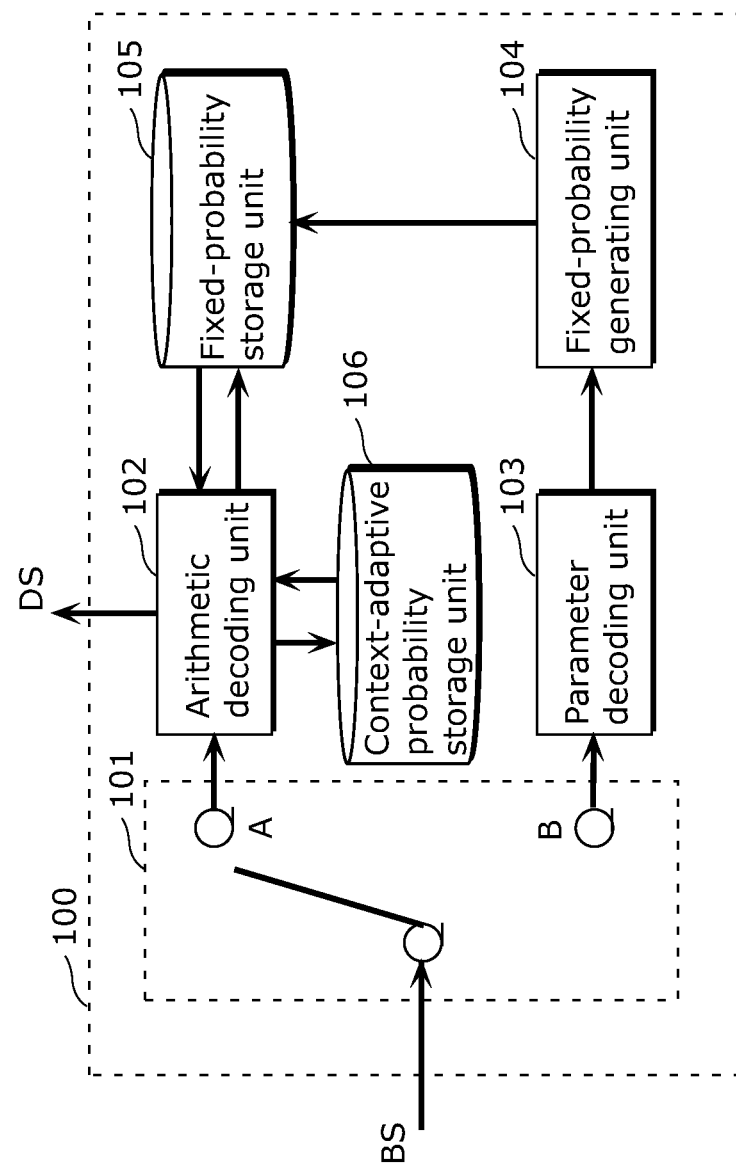
FIG. 37 is a block diagram of an example of the structure of an entropy decoding unit which performs an arithmetic decoding method according to Embodiment C1 of the present invention.
Figure 38:
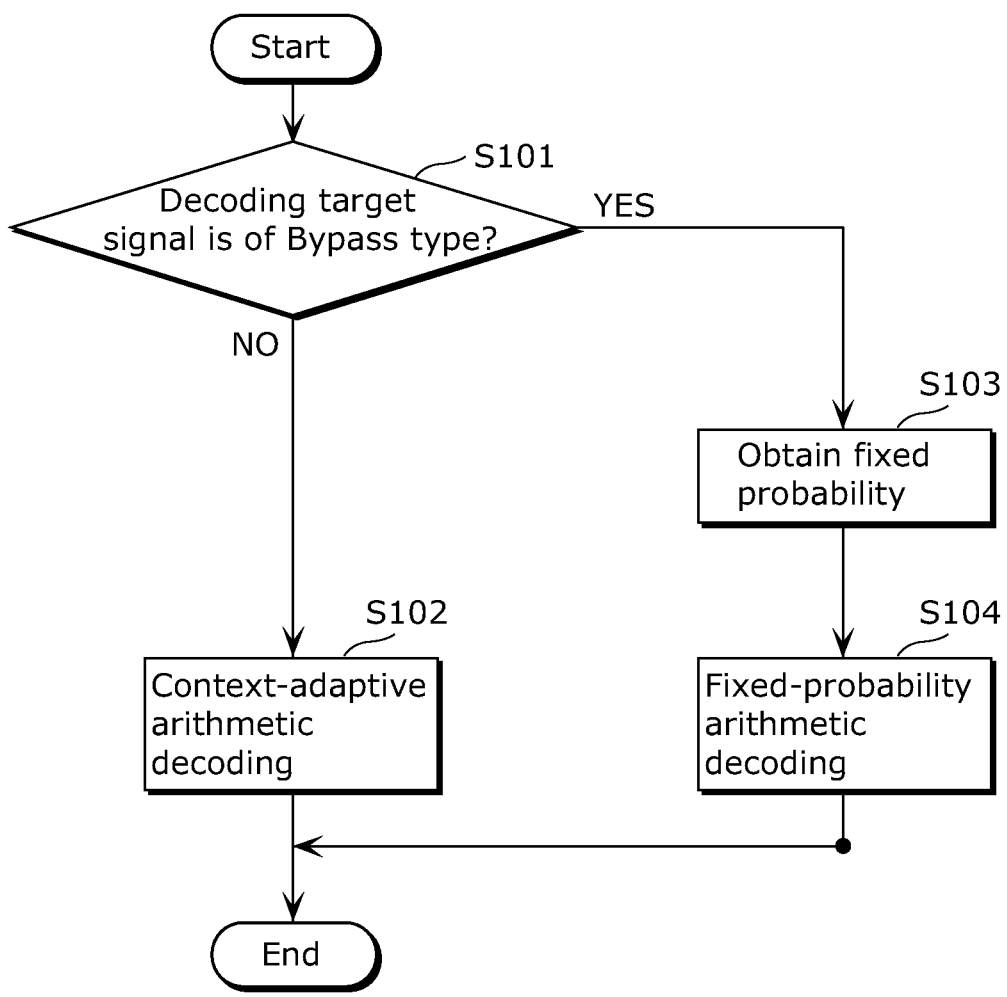
FIG. 38 is a flowchart of an example of an arithmetic decoding method according to Embodiment C1 of the present invention.

FIG. 37 is a block diagram of an example of the structure of an image decoding unit according to Embodiment C1 of the present invention. In addition, FIG. 38 is a flowchart of processes performed by the arithmetic decoding unit according to Embodiment C1 of the present invention.

The entropy decoding unit 100 includes: a switch 101, an arithmetic decoding unit 102, a parameter decoding unit 103, a fixed-probability generating unit 104, a fixed-probability storage unit 105, and a context-adaptive probability storage unit.

First, the entropy decoding unit 100 obtains the bit stream BS, and outputs it to the switch 101. The switch 101 switches to A in the case where a target signal is an arithmetic-coded signal, and switches to B in the case where a target signal is a parameter signal indicating a fixed probability. The arithmetic decoding unit 102 determines whether the signal type of the decoding target signal is of a bypass type or not based on the bit stream (Step S101). This determination may be made with reference to a rule predetermined for each type of a target signal. For example, a sign (+ or −) showing whether or not the value of a coded difference transform image signal is positive or negative is used for bypass processing, and a signal (for example, 0 or 1) showing whether or not the value of a coded difference transform image signal is 0 or non-0 is used for a context-adaptive type.

Here, when the target signal is not of the bypass type (NO in Step S101), the arithmetic decoding unit 102 obtains a predetermined probability from the context-adaptive probability storage unit 106 according to the signal type (context), and performs arithmetic decoding (S102). In addition, the arithmetic decoding unit 102 updates the probability value inside the context-adaptive probability storage unit 106 according to the decoded symbol. This processing may be the same as the processing in the conventional arithmetic decoding method. On the other hand, when the target signal is of the bypass type (YES in Step S101), a fixed probability is obtained (Step S103). The method of obtaining this fixed probability is described later. On the other hand, when a bit stream BS is a parameter signal indicating a fixed probability, the switch 101 switches to B, decodes the fixed-probability derivation parameter according to a predetermined method, and outputs the decoded parameter to the fixed-probability generating unit 104. The parameter decoding unit 103 performs the decoding according to a decoding method using a variable length coding/decoding table of codes such as the Huffman codes. These fixed-probability derivation parameters are described in detail in Embodiment C3.

The fixed-probability generating unit 104 generates a fixed probability for each of the types of target signals based on the obtained fixed probability parameters, and outputs it to the fixed-probability storage unit 105. The fixed-probability storage unit 105 accumulates the fixed probability for each of the types (contexts) of the target signals.

Next, the arithmetic decoding unit 102 obtains the fixed probability corresponding to the type of the target signal from the fixed-probability storage unit, and performs fixed-probability arithmetic decoding based on the obtained fixed probability (Step S104). When the probability obtained in Step S103 is 50%, it is possible to perform the conventional bypass arithmetic decoding (FIG. 34), or to determine the probability to be a fixed-probability of 50% in a later-described fixed-probability arithmetic decoding. In the former case, it is possible to use a circuit according to a conventional technique. In the latter case, it is possible to share circuits and thereby produce an advantage of being able to reduce the circuit scale.

The processing performed when performing arithmetic decoding using the obtained fixed probability is further described in detail with reference to (a) and (b) of FIG. 39.

In FIG. 39, (a) is a flowchart of a fixed-probability arithmetic decoding performed by an arithmetic decoding unit according to the present invention.

In the arithmetic decoding, a context (ctxIdx) determined based on the signal type is input first.

The value pStateIdx2 obtained here is the value showing the fixed probability for each ctxIdx determined according to the type of a signal.

Next, codIRangeLPS showing the first parameter value at the time of the occurrence of the LPS is calculated based on the first parameter codIRang showing the current internal state of the arithmetic decoding apparatus and the aforementioned fixed probability pStateIdx2. More specifically, this value is calculated according to Expression 1.

codIRangeLPS=((codIRange<<6)−
(codIRange<<leftShiftTabLPS[pS tateIdx2]))>>7 (Expression 1)

Where leftShiftTabLPS[ ] is a value in a range from 0 to 5. When the value is 0, 0 shows the probability of $63/128$, whereas when the value is n, n shows the probability of $(64-2*n)/128$. It is to be noted that Expression 1 may be transformed into the expression shown below.

codIRangeLPS=((codIRange<<6)−
(codIRange<<leftShiftTabLPS[pS tateIdx2])+
1)>>7 (Expression 2)

Where leftShiftTabLPS[ ] is a value in a range from 0 to 6. When the value is 0, 0 shows the probability of 64/128 (50%), when the value is n, n shows the probability of $(64-2*n+1)/128$, and when the value is 6, 6 shows the probability of $1/128$.

In other words, pStateIdx2 is an index showing any one of the fixed probability values, and is derived in a fixed-probability obtaining step (S103).

Here, these values can be calculated by performing a right shift by 7 as an example. In the case of presenting finer probabilities, it is possible to perform a right shift by 10 or the like. The right shift by 10 or the like makes it possible to present finer probabilities, but requires a high internal bit accuracy.

In addition, a value obtained by subtracting the aforementioned codIRange LPS from the current codIRange is included in codIRange (Step S201). Next, the calculated codIRange is compared with a second parameter codIOffset showing the internal state of the arithmetic decoding apparatus (Step S802). When the codIOffset is greater than or equal to codIRange (YES in Step S202), it is determined that the symbol of the LPS has occurred, and a value different from a value of valMPS is set to binVal that is a decoding output value. This valMPS value is an MPS value (0 or 1) specifying the one of the symbols 0 and 1 which has the highest occurrence probability, and the different value is 0 when valMPM=1 is satisfied or 1 when valMPM=0 is satisfied. In addition, a value obtained through the subtraction of codIRange is set to the second parameter codIOffset showing the internal state of the arithmetic decoding apparatus, and, since the LPS has occurred, the value of codIRangeLPS calculated in Step S201 is set to the first parameter codIRange showing the internal state of the arithmetic decoding apparatus (Step S203).

In addition, when codIOffset is small (NO in S202), it is determined that the symbol of the MPS has occurred, valMPS is set to binVal that is the decoding output value, and the pStateIdx value is updated based on the transform table transIdxMPS at the time of the occurrence of the MPS (Step S204).

Lastly, the normalization (RenormD) is performed (Step S205) to end the arithmetic decoding. Here, this normalization may be performed in the same manner as conventional, or may be performed with reference to a table storing combinations previously calculated according to the types of fixed probabilities.

In addition, (b) of FIG. 39 shows a variation in which the range of possible fixed probabilities is widened but the processing amount slightly increases. Although the processing amount slightly increases, the processing does not involve an update of probability as in the conventional context-adaptive arithmetic decoding (see FIG. 33). Thus, the processing provides an advantageous effect of making it possible to share the circuits.

The arithmetic decoding firstly involves inputting a context (ctxIdx) determined based on the signal type, and obtaining a pStateIdx value derived in the fixed-probability deriving step.

Next, the arithmetic decoding next involves calculating a value qCodIRangeIdx derived from a parameter codIRange showing the current internal state of the arithmetic decoding apparatus, and obtaining codIRangeLPS with reference to the table (rangeTableLPS) based on these two values. Here, this codIRangeLPS denotes a value that is a parameter showing the internal state of the arithmetic decoding apparatus at the time of the occurrence of an LPS (this LPS specifies one of the symbols 0 and 1 that has the lowest occurrence probability) with respect to first parameter codIRange showing the internal state of the arithmetic decoding apparatus.

In addition, a value obtained by subtracting the aforementioned codIRange LPS from the current codIRange is included in codIRange (Step S301). Next, the calculated codIRange is compared with a second parameter codIOffset showing the internal state of the arithmetic decoding apparatus (Step S302). When the codIOffset is greater than or equal to codIRange (YES in Step S302), it is determined that the symbol of the LPS has occurred, and a value different from a value of valMPS is set to binVal that is a decoding output value. This valMPS value is an MPS value (0 or 1) specifying the one of the symbols 0 and 1 having the highest occurrence probability, and the different value is 0 when valMPM=1 is satisfied or 1 when valMPM=0 is satisfied. In addition, a value obtained through the subtraction of codIRange is set to the second parameter codIOffset showing the internal state of the arithmetic decoding apparatus, and since the LPS has occurred, the value of codIRangeLPS calculated in Step S301 is set to the first parameter codIRange showing the internal state of the arithmetic decoding apparatus (Step S303). In addition, when codIOffset is small (NO in S302), it is determined that the symbol of the MPS has occurred, valMPS is set to binVal that is the decoding output value (Step S304).

Lastly, the normalization (RenormD) is performed (Step S305) to end the arithmetic decoding. Here, the normalization may be performed in the same manner as in the conventional method described with reference to FIG. 36.

Figure 40:
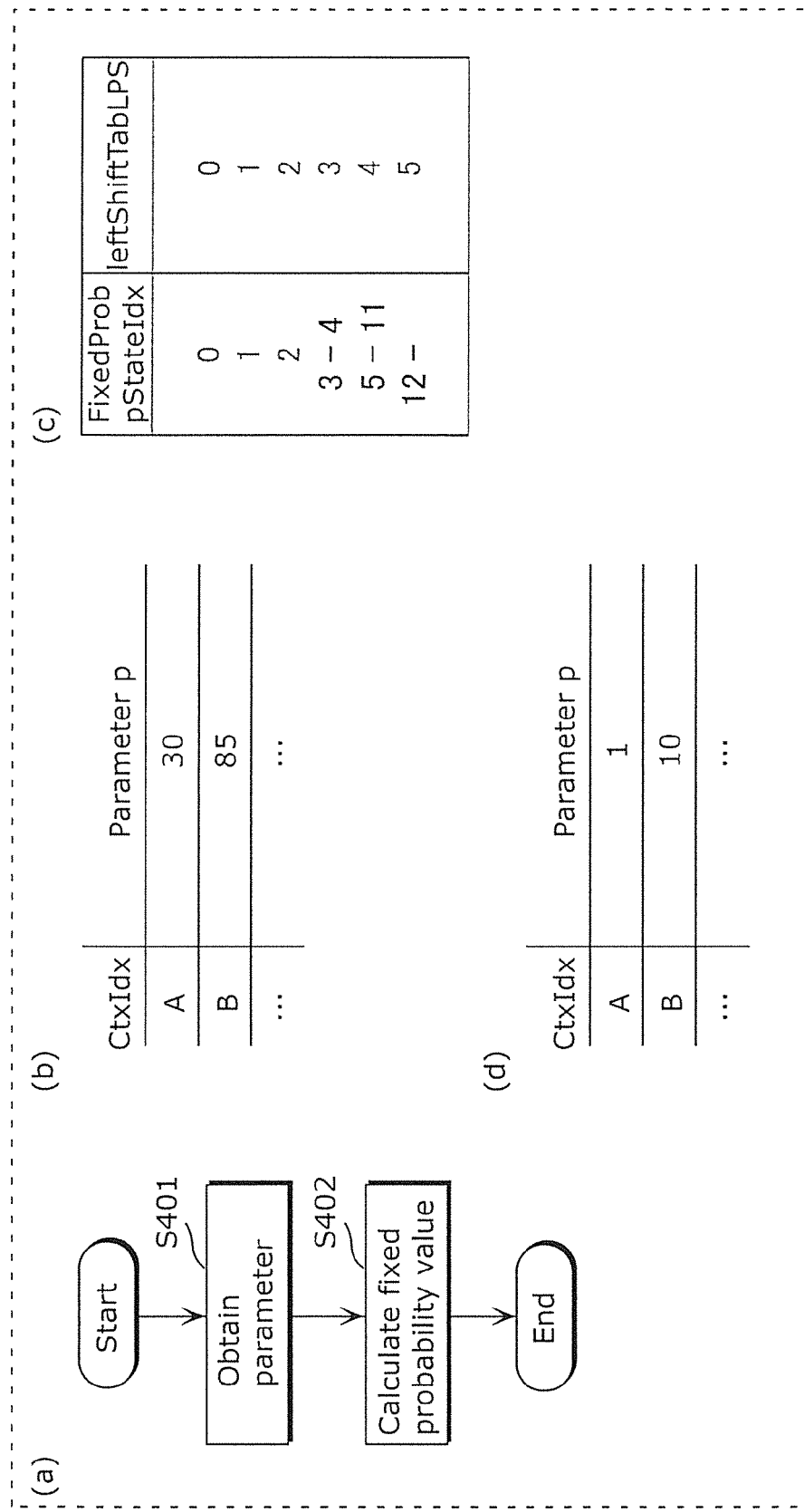
In FIG. 40: (a) is a flowchart of exemplary processes of a fixed-probability determining method in the arithmetic decoding method according to Embodiment C1 of the present invention; (b) is a table of the associations between CtxIdx of signals and the parameters related thereto; (c) is an example of a table that is used to derive fixed probabilities; and (d) is a table of the associations between CtxIdx of signals and the parameters related thereto.

Next, the fixed probability deriving method is described with reference to FIG. 40. FIG. 40 is a conceptual diagram for illustrating a method of deriving fixed probabilities.

In FIG. 40, (a) is a flowchart of operations for determining a fixed probability. The method firstly involves obtaining a parameter corresponding to CtxIdx that is a decoding target (S401). This parameter is assumed to be, for example, information as shown in (b) of FIG. 40. For example, p=30 is satisfied when the decoding target CtxIdx is A, and p=85 is satisfied when the decoding target CtxIdx is B. The method next involves calculating a fixed provability value based on the obtained parameter (S402). This parameter is derived, for example, according to Expression 3.

(Expression 3)

```
if(p <=63)
{
        FixedProb-pStateIdx = 63-p;
        valMPS=0;
}
else
{       FixedProb-pStateIdx = p-64;
        valMPS=1;
}
```

When the obtained parameter p is smaller than or equal to 63, FixedProb-pStateIdx that is StateIdx showing the fixed probability is a value obtained by subtracting p from 63, and valMPS (the value of the MPS) is 0.

On the other hand, when the obtained parameter p is larger than 63, FixedProb-pStateIdx that is StateIdx showing the fixed probability is a value obtained by subtracting 64 from p, and valMPS (the value of the MPS) is 1.

Here, the FixedProb-pStateIdx calculated here may be used as pStateIdx in the decoding method shown in (b) of FIG. 39. On the other hand, for example, a value converted from a probability value shown in (c) of FIG. 40 is used in the decoding method in (a) of FIG. 39. Alternatively, it is also good to use Expression 4 assuming that a transmission parameter itself to be a small value as shown in (d) of FIG. 40. In this way, it is possible to reduce the value of the transmission parameter. This provides an advantageous effect of reducing the coding amount.

(Expression 4)

```
if(p <=5)
{
        leftShiftTabLPS=FixedProb-pStateIdx = 5-p;
        valMPS=0;
}
else
{       leftShiftTabLPS=FixedProb-pStateIdx = p-6;
        valMPS=1;
}
```

The parameter p may be transmitted each time for each CtxIdx. Alternatively, it is possible to use an initial parameter when no parameter p is transmitted for a current CtxIdx. Alternatively, it is also possible to share a parameter by a plurality of signal types (context CtxIdx).

Figure 41:
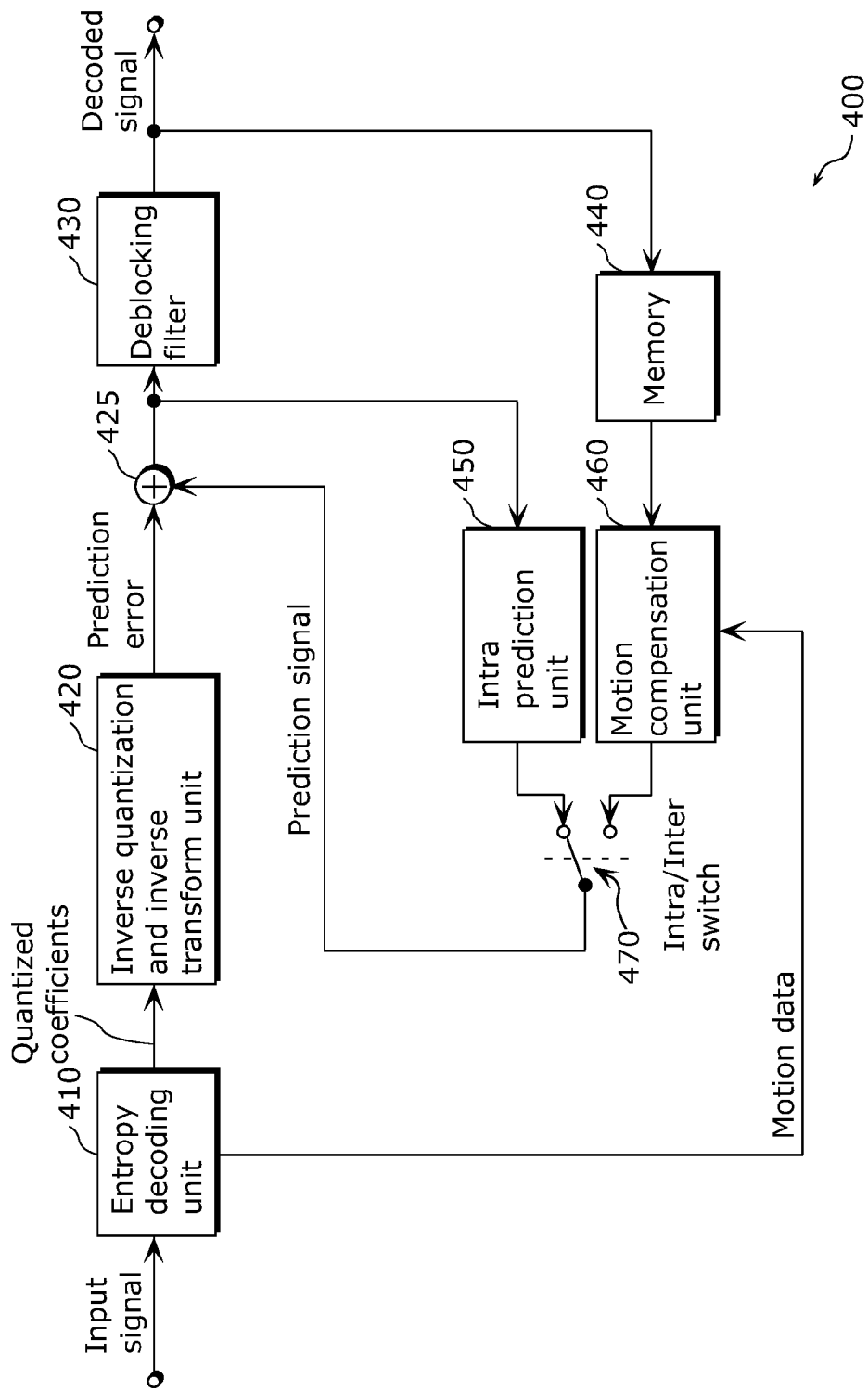
FIG. 41 is a block diagram of an example of the structure of an image decoding apparatus according to Embodiment C1 of the present invention.

It is to be noted that the arithmetic decoding unit according to Embodiment C1 of the present invention is included in the image decoding apparatus which decodes coded image data resulting from compression coding. FIG. 41 is a block diagram of an example of the structure of an image decoding apparatus 400 according to Embodiment C1 of the present invention. Here, the entropy decoding unit 100 in FIG. 37 is an element of the entropy decoding unit 410.

The image decoding apparatus 400 decodes the compression-coded image data. For example, the image decoding apparatus 400 receives, for each of blocks of an image, an input of coded image data as a decoding target signal. The image decoding apparatus 400 reconstructs the image data by performing variable length decoding, and inverse quantization and inverse transform on the input decoding target signal.

As shown in FIG. 41, the image decoding apparatus 400 includes: an entropy decoding unit 410, an inverse quantization and inverse transform unit 420, an adder 425, a deblocking filter 430, a memory 440, an intra prediction unit 450, a motion compensation unit 450, and an intra/inter switch 470.

The entropy decoding unit 410 reconstructs quantized coefficients by performing variable length decoding on the input signal (input stream). Here, the input signal (input stream) is the decoding target signal, and corresponds to block data included in the coded image data. In addition, the entropy decoding unit 410 obtains motion data from the input signal, and outputs the obtained motion data to the motion compensation unit 460.

The inverse quantization and inverse transform unit 420 reconstructs the transform coefficients by performing inverse quantization on the quantized coefficients reconstructed by the entropy decoding unit 410. Then, the inverse quantization and inverse transform unit 420 reconstructs a prediction error by performing inverse transform on the reconstructed transform coefficients.

The adder 425 adds the reconstructed prediction error and a prediction signal to generate a decoded image.

The deblocking filter 430 performs deblocking filtering on the generated decoded image. The decoded image processed by the deblocking filter is output as a decoded signal.

The memory 440 is a memory for storing reference images for use in motion compensation. More specifically, the memory 440 stores decoded images processed by the deblocking filter.

The intra prediction unit 450 performs intra prediction to generate a prediction signal (an intra prediction signal). More specifically, the intra prediction unit 450 performs intra prediction with reference to images surrounding the decoding target block (input signal) in the decoded image generated by the adder 425 to generate an intra prediction signal.

The motion compensation unit 460 performs motion compensation based on motion data output from the entropy decoding unit 410 to generate a prediction signal (an inter prediction signal).

The intra/inter switch 470 selects any one of an intra prediction signal and an inter prediction signal, and outputs the selected signal as the prediction signal to the adder 425.

With the above structure, the image decoding apparatus 400 according to Embodiment C2 of the present invention decodes the compression-coded image data.

In the image decoding apparatus 400, the arithmetic decoding unit according to Embodiment C1 of the present invention is included by the entropy decoding unit 410. In other words, the arithmetic decoding unit performs arithmetic decoding and a multi-value conversion on the coded image data resulting from predictive coding as the input decoding target signal. In addition, signal type information indicates information such as the positions of the quantized coefficients, the motion data, or an intra prediction direction for use by the intra prediction unit 450.

As described above, the image decoding apparatus and the image decoding method according to Embodiment C1 of the present invention make it possible to appropriately reconstruct a signal coded using a fixed probability.

In this way, it is possible to accurately decode the signal having an increased coding efficiency. More specifically, as shown in Embodiment C1, it is possible to use, as coded probability information, the probability information fixed at a probability that may be other than 50%, and thus it is possible to increase the coding efficiency.

In short, it is possible to reduce the processing amount and to increase the coding efficiency.

In this way, the image decoding apparatus and the image decoding method according to Embodiment C1 of the present invention allows accurate decoding of the signal having the coding efficiency increased in this way.

In addition, the prepared table facilitates the estimation of required processing time. Thus, it is possible to achieve a high-speed operation circuit that is required, for example, in the real-time reproduction of a high-resolution video.

Embodiment C2

A description is given of the outline of an arithmetic coding method according to this embodiment. The arithmetic coding method according to this embodiment selectively performs, according to a coding target signal, context-adaptive arithmetic coding and a fixed-probability arithmetic coding using a fixed probability without updating the probability for each context. The arithmetic coding method is further intended to determine fixed probabilities to increase the coding efficiency, and code the parameters for deriving the fixed probabilities. In this way, this embodiment enables reduction in the processing amount and generates a bit stream having a high coding efficiency.

The outline of the arithmetic coding method according to this embodiment has been described above. The same method as in the conventional arithmetic coding method can be performed unless otherwise explained.

Next, a description is given of a flow of processes of the arithmetic coding method performed by an arithmetic coding unit according to this embodiment.

Figure 42:
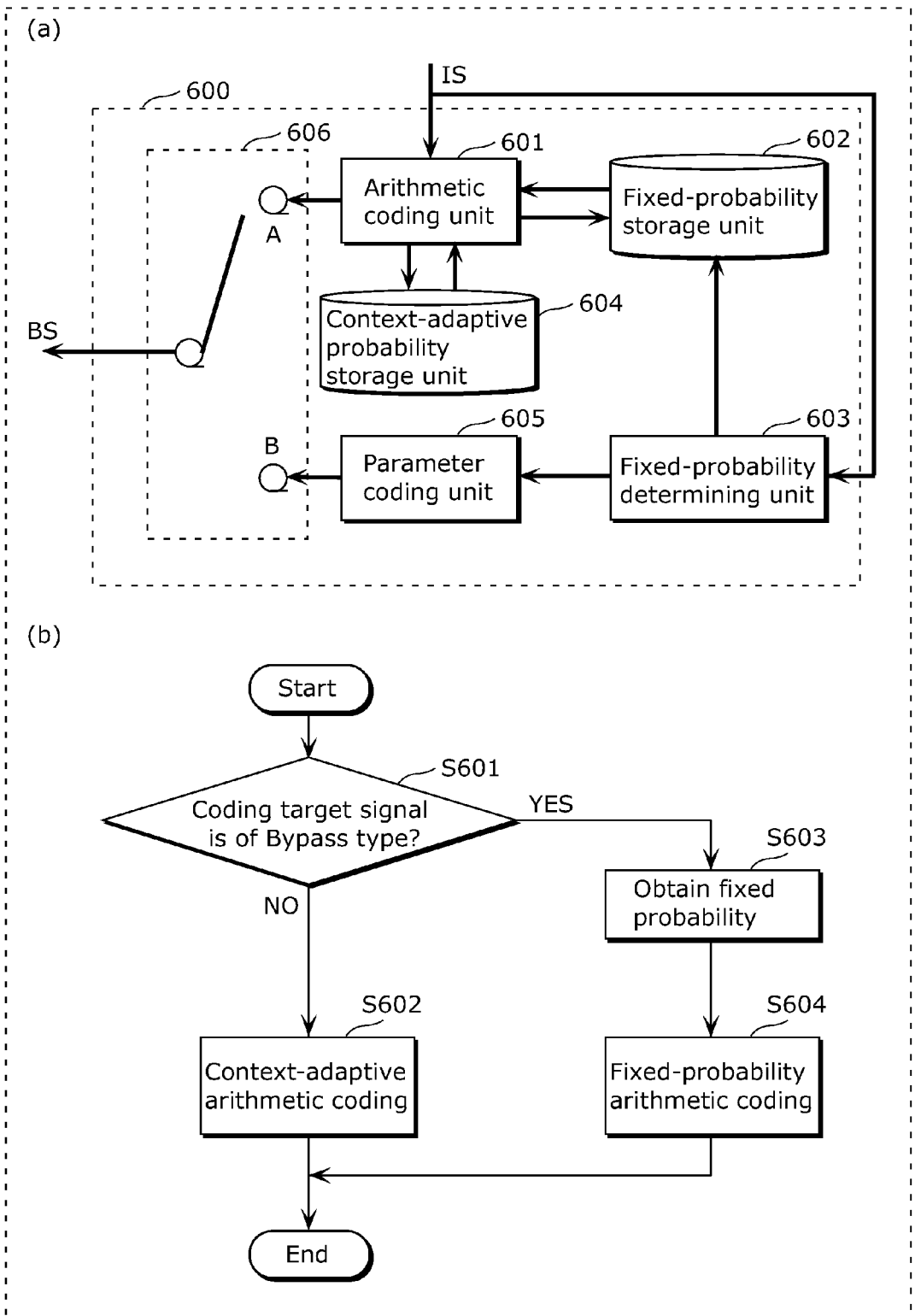
In FIG. 42: (a) is a block diagram showing an exemplary structure of an entropy coding unit according to Embodiment C2 of the present invention; and (b) is a flowchart of processes performed by the arithmetic coding unit according to Embodiment C2 of the present invention.

In FIG. 42: (a) is a block diagram showing an exemplary structure of an entropy coding unit according to Embodiment C2 of the present invention; and (b) is a flowchart of processes performed by the arithmetic coding unit according to Embodiment C2 of the present invention.

The entropy coding unit 600 according to the present invention includes: an arithmetic coding unit 601, a fixed-probability storage unit 602, a fixed-probability determining unit 603, a context-adaptive probability storage unit 604, a parameter coding unit 605, and a switch 606.

The arithmetic coding unit 601 according to the present invention obtains a coding target signal IS first, and determines whether or not the coding target signal is of a bypass type (Step S601). This determination may be made with reference to a rule predetermined for each type of a target signal. For example, a sign (+ or −) showing whether or not the value of a coded difference transform image signal is positive or negative is used for bypass processing, and a signal (for example, 0 or 1) showing whether or not the value of a coded difference transform image signal is 0 or non-0 is used for a context-adaptive type.

Here, when the target signal is not of a bypass type (NO in Step S601), the arithmetic coding unit 601 obtains the probability value corresponding to the type (context) of the target signal from the context-adaptive probability storage unit 604, and performs arithmetic coding (S602). At this time, the arithmetic coding unit updates the probability value stored in the context-adaptive probability storage unit according to the coded symbol. This processing may be the same as the conventional arithmetic coding method (see (a) of FIG. 43). Here, the coding result is output to the terminal A of the switch 606, and is output as an output bit stream BS.

On the other hand, when the target signal is of a bypass type (YES in Step S601), a fixed probability is obtained from the fixed-probability storage unit 602 (Step S603). The fixed probability obtained here is a value previously determined by the fixed-probability determining unit 603 as a value for the type of a coding target signal that has a coding amount smaller than the coding amount of an input signal IS and that can suppress image deterioration. The fixed-probability value determined by the fixed-probability determining unit 603 is variable-length coded by the parameter coding unit 605, output to the terminal B, and written in the bit stream. The fixed-probability determining unit 603 is described in detail later with reference to FIG. 46.

The parameter coding unit 605 codes the signal in a manner corresponding to Step S103 in decoding, and the specific parameters are the same as those described with reference to FIG. 40.

Next, fixed-probability arithmetic coding is performed based on the obtained fixed probability (Step S604). When the probability obtained in Step S603 is 50%, it is possible to perform the conventional bypass arithmetic decoding, or to determine the probability to be a fixed-probability of 50% in a later-described fixed-probability arithmetic decoding. In the former case, it is possible to use a circuit according to a conventional technique. In the latter case, it is possible to share circuits and thereby produce an advantage of being able to reduce the circuit scale This processing is further described with reference to FIG. 43.

Figure 43:
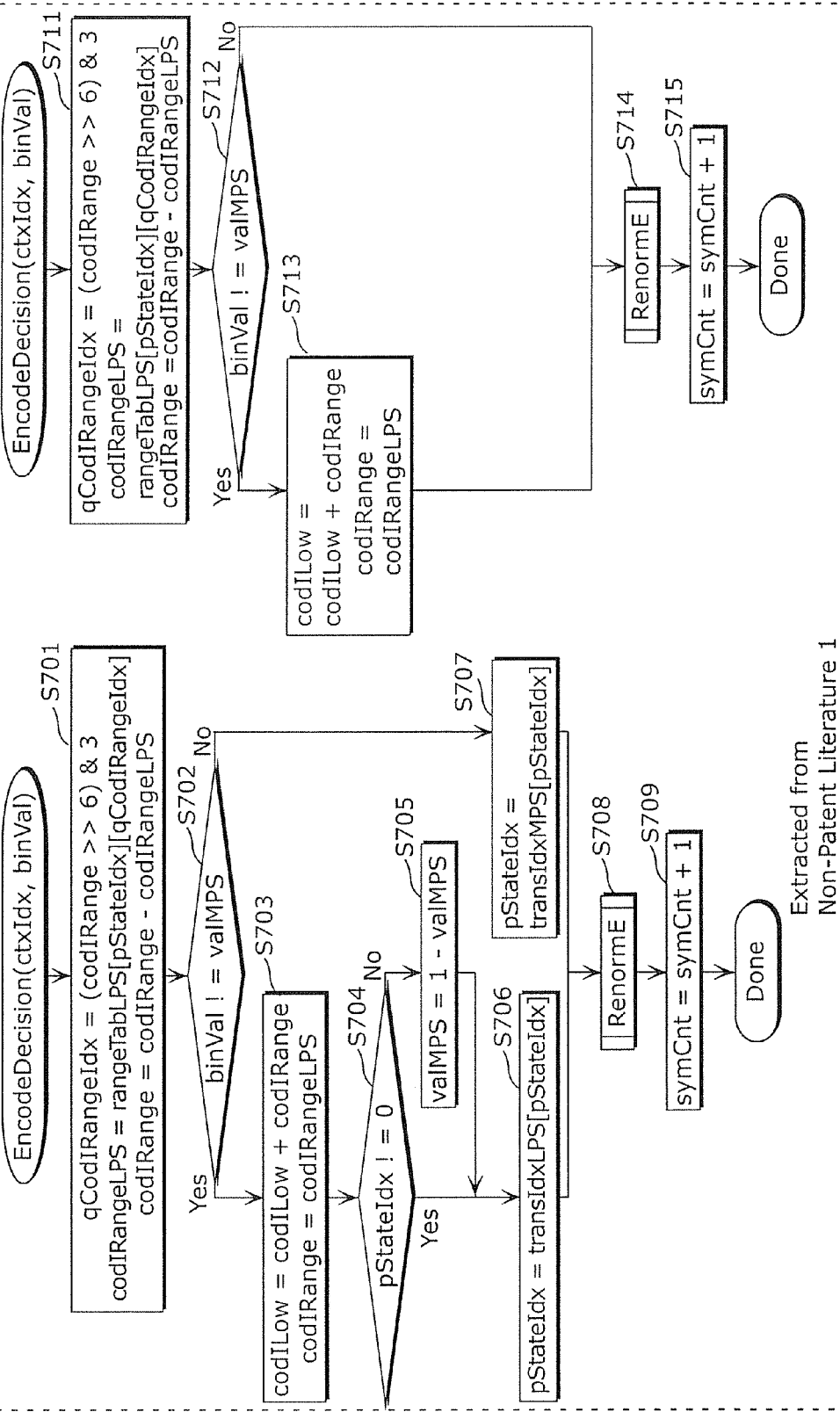
In FIG. 43, (a) is a flowchart of context-adaptive arithmetic decoding in an arithmetic coding method according to Embodiment C2 of the present invention; and (b) is a flowchart of fixed-probability arithmetic decoding in the arithmetic coding method according to Embodiment C2 of the present invention.
Figure 44:
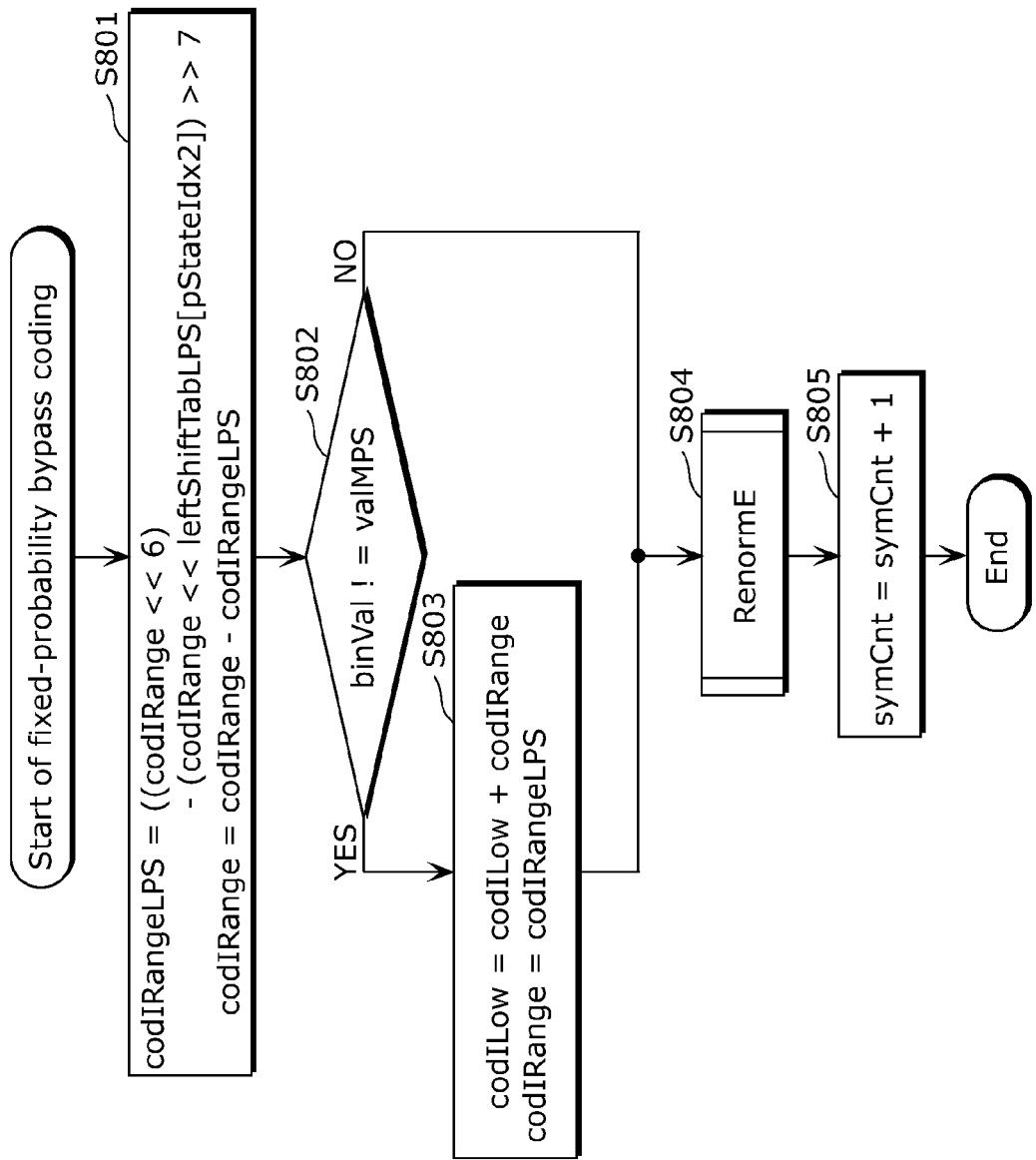
FIG. 44 is a flowchart of another example (different from the example in (b) of FIG. 43) of the fixed-probability arithmetic decoding in the arithmetic coding method according to Embodiment C2 of the present invention.
Figure 45:
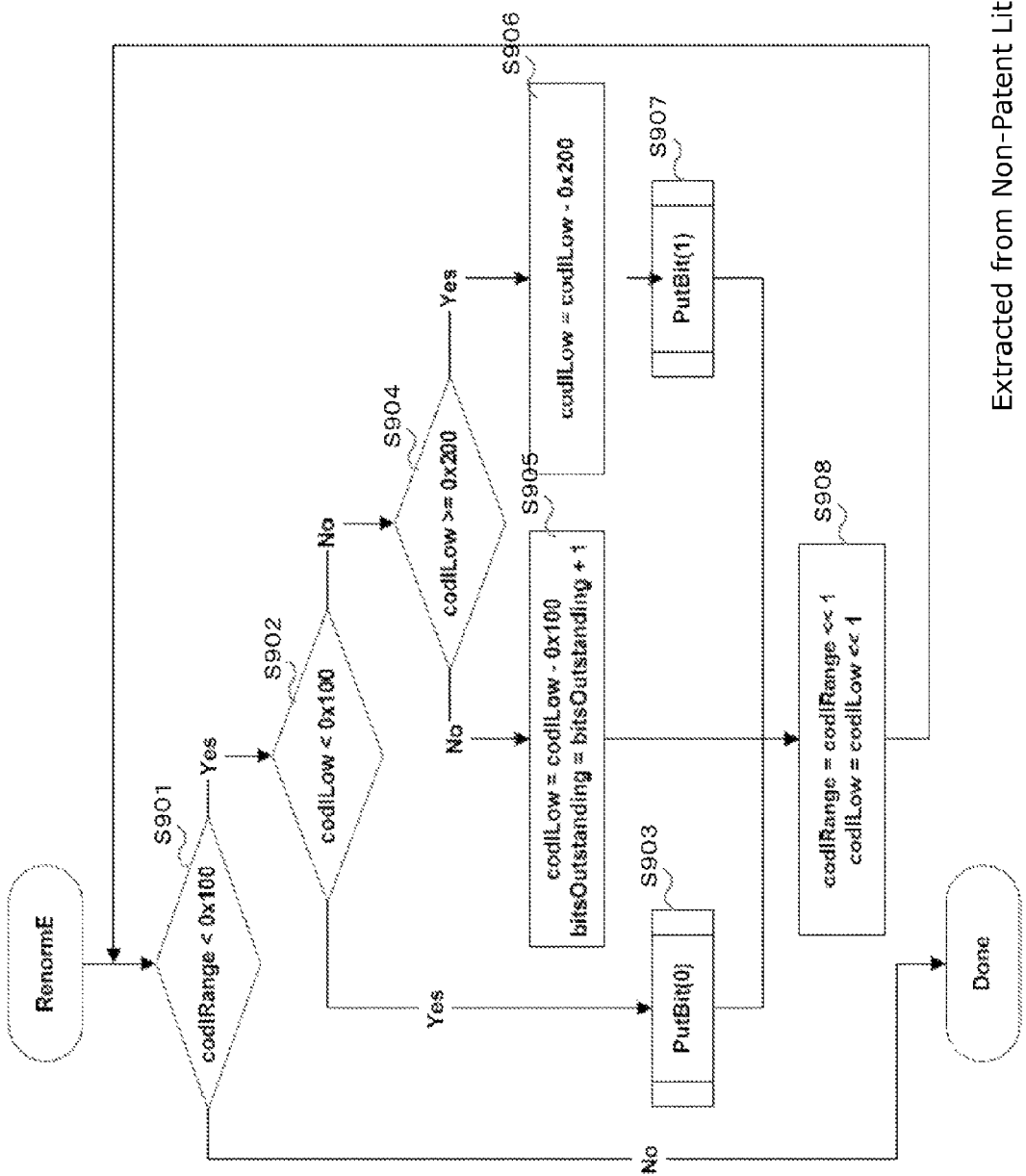
FIG. 45 is a flowchart of normalization in an arithmetic coding method according to Embodiment C2 of the present invention.

In FIG. 43, (a) is a flowchart (extracted from Non-patent Literature 1) of processes of context-adaptive arithmetic coding (S602). These processes are performed in manners similar to those shown in Non-patent Literature 1 unless otherwise explained.

First, for the first parameter codIRange showing the internal state of the arithmetic coding unit, a codIRange value and a codIRangeLPS that is a value in the case where an LPS signal has occurred as in the conventional decoding are calculated (corresponding to Steps S701 and SB01). Next, a determination is made as to whether a current coding target signal binVal is a symbol valMPS having a high symbol occurrence probability (S702). When the current target signal is an LPS (YES in S702), the codIRange value calculated in Step S701 is added to the second parameter codILow showing the internal state of the arithmetic coding unit, and the codIRange LPS value is set to codIRange (Step S703). Next, an update of pStateIdx is performed based on the fact that the LPS has occurred in Steps S704 to S706, as in Steps SB04 to SB06. The detailed description is the same as in the description in FIG. 33.

On the other hand, when the coding target signal is an MPS (NO in Step S702), an update of pStateIdx is performed (corresponding to Steps S707 and SB07). Next, a later-described normalization RenormE (S708) is performed, and the counter is incremented (S709) to terminate the processing.

In FIG. 43, (b) is a flowchart of processes of fixed-probability arithmetic coding according to the present invention. First, pStateIdx showing the corresponding probability is obtained, and a calculation is performed as in Step S701 (as in Step SB01) (Step S711). Next, a determination is made as to whether a current coding target signal binVal is a symbol valMPS having a high symbol occurrence probability (S712). When the current target signal is an LPS (YES in S712), the codIRange value calculated in Step S701 is added to the second parameter codILow showing the internal state of the arithmetic coding unit, and the codIRange LPS value is set to codIRange (Step S713). On the other hand, when the coding target signal is an MPS (NO in Step S712), normalization (RenormE, S714) is performed without performing any other processing. Lastly, the counter is incremented (S715) to terminate the processing. In other words, this shows that fixed-probability arithmetic coding is always performed without updating pStateIdx.

FIG. 8 shows an operation flow of an arithmetic coding method using a shift operation for reducing the processing amount corresponding to the arithmetic decoding in FIG. 38.

First, codIRangeLPS in the case where an LPS has occurred is calculated using the shift operation (the detailed operation is the same as that in S201 of FIG. 38), and codIRange is also calculated as in S7101 and S711. Next, a determination is made as to whether a current coding target signal binVal is a symbol valMPS having a high symbol occurrence probability (S802). When the current target signal is an LPS (YES in S802), the codIRange value calculated in Step S801 is added to the second parameter codILow showing the internal state of the arithmetic coding unit, and the codIRange LPS value is set to codIRange (Step S803). On the other hand, when the coding target signal is an MPS (NO in Step S802), normalization (RenormE, S804) is performed without performing any other processing. Lastly, the counter is incremented (S805) to terminate the processing. This method uses a number of kinds of fixed probabilities fewer than the number of kinds of fixed probabilities used in the method shown in (b) of FIG. 43, but makes it possible to use the fixed probabilities in the entire processing, and to thereby increase the coding efficiency. The details are the same as the details described in Embodiment C1.

FIG. 9 is a flowchart (extracted from Non-patent Literature 1) showing operations in the processes corresponding to the aforementioned normalization processes (Steps S709, S715, and S805). These processes are performed in manners similar to those shown in Non-patent Literature 1 unless otherwise explained.

When codIRange is greater than or equal to 0x100 in the hexadecimal notation (256 in the decimal system) (NO in S901), the normalization process is terminated. On the other hand, a numerical code 0 is written (Step S903) when codIRange (the first parameter showing the internal state of the arithmetic coding apparatus) is smaller than 0x100 in the hexadecimal notation (256 in the decimal system) (YES in S901), and when codILow (the second parameter showing the internal state of the arithmetic coding apparatus) is smaller than 0x100 in the hexadecimal notation (256 in the decimal system) (YES in S902). On the other hand, when codILow is greater than or equal to 0x100 in the hexadecimal notation (256 in the decimal system) and smaller than 0x200 in the hexadecimal notation (512 in the decimal system) (NO in S902, and NO in S904), 0x100 in the hexadecimal notation (256 in the decimal system) is subtracted from codILow, and the counter showing bitsOutstanding that indicates an amount of bits to be written in sequence at the time of bit output is incremented by 1 (Step S905). On the other hand, when codILow is a value greater than or equal to 0x200 in the hexadecimal notation (512 in the decimal system) (NO in S902, and YES in S904), 0x200 in the hexadecimal notation (512 in the decimal system) is subtracted from codILow (S906), and a numerical code 1 is written (Step S907). When the value of bitsOutstanding is non-0 at the time of code writing (S903 or S907), the codes inverse to the codes specified as being written in the respective steps are written by the amount shown as bitOutstanding, and the value of bitOutstanding is reset to 0. Then, codIRange is shifted to the left by 1 (doubled), codILow is shifted to the left by 1 (doubled) (S908), and a return is made to Step S901. With these processes, arithmetic coding is realized.

Here, when performing a probability shift operation as in FIG. 8, it is also good to prepare and use a table that specifies the numbers of loops for update in encoding previously calculated, in the same manner as in the table shown in FIG. 40. In this way, it is possible to reduce the processing amount.

Figure 47:
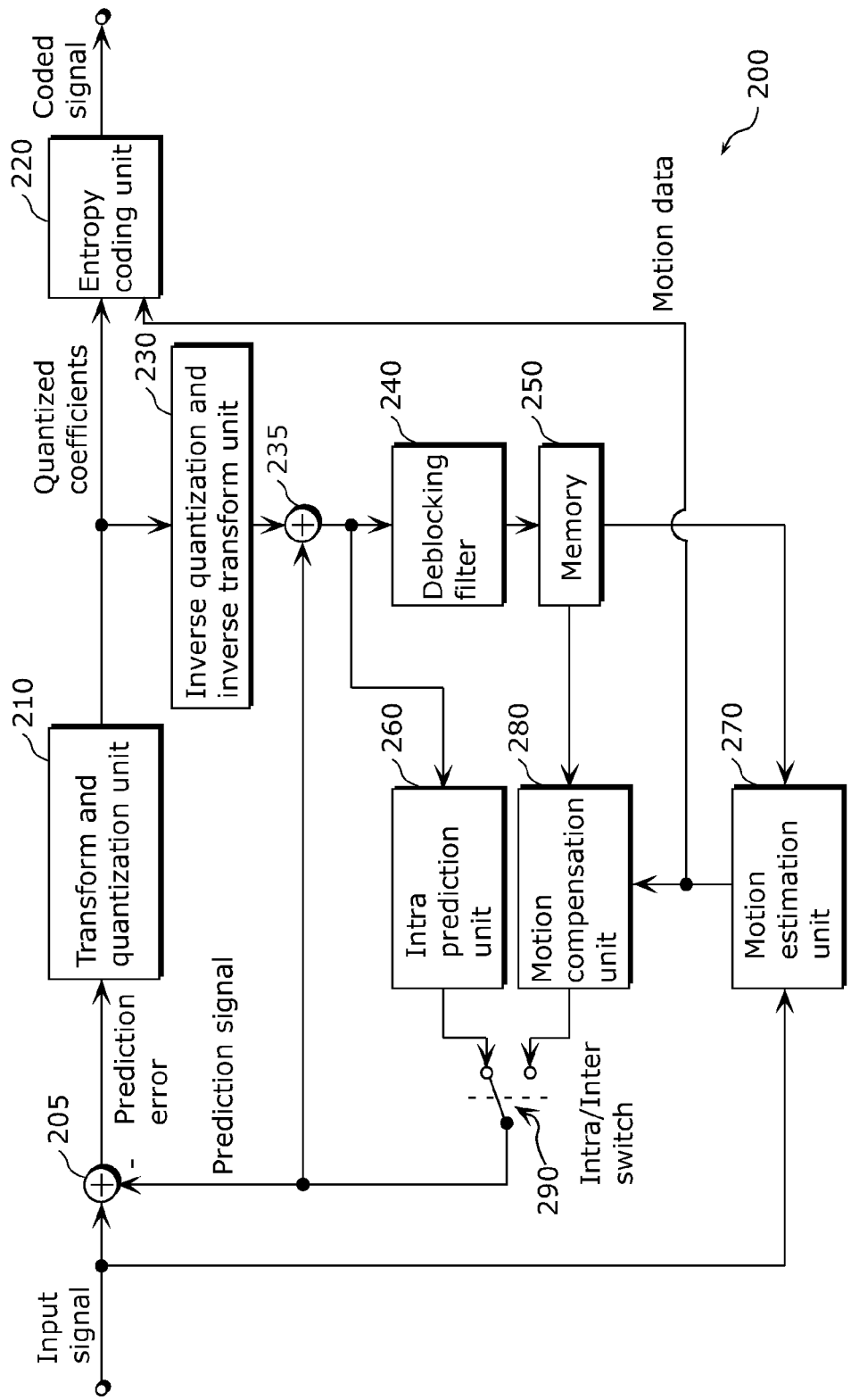
FIG. 47 is a block diagram of an example of the structure of an image coding apparatus according to Embodiment C2 of the present invention.

It is to be noted that the arithmetic coding unit according to Embodiment C2 of the present invention is included in the image coding apparatus which compression codes the image data. FIG. 47 is a block diagram of an example of the structure of an image coding apparatus 200 according to Embodiment C2 of the present invention.

The image coding apparatus 200 codes the compression-coded image data. For example, the image coding apparatus 200 receives, for each of blocks of an image, an input of image data as an input signal. The image coding apparatus 200 generates a coded signal by performing transform, quantization, and variable length coding on the input signal.

Figure 46:
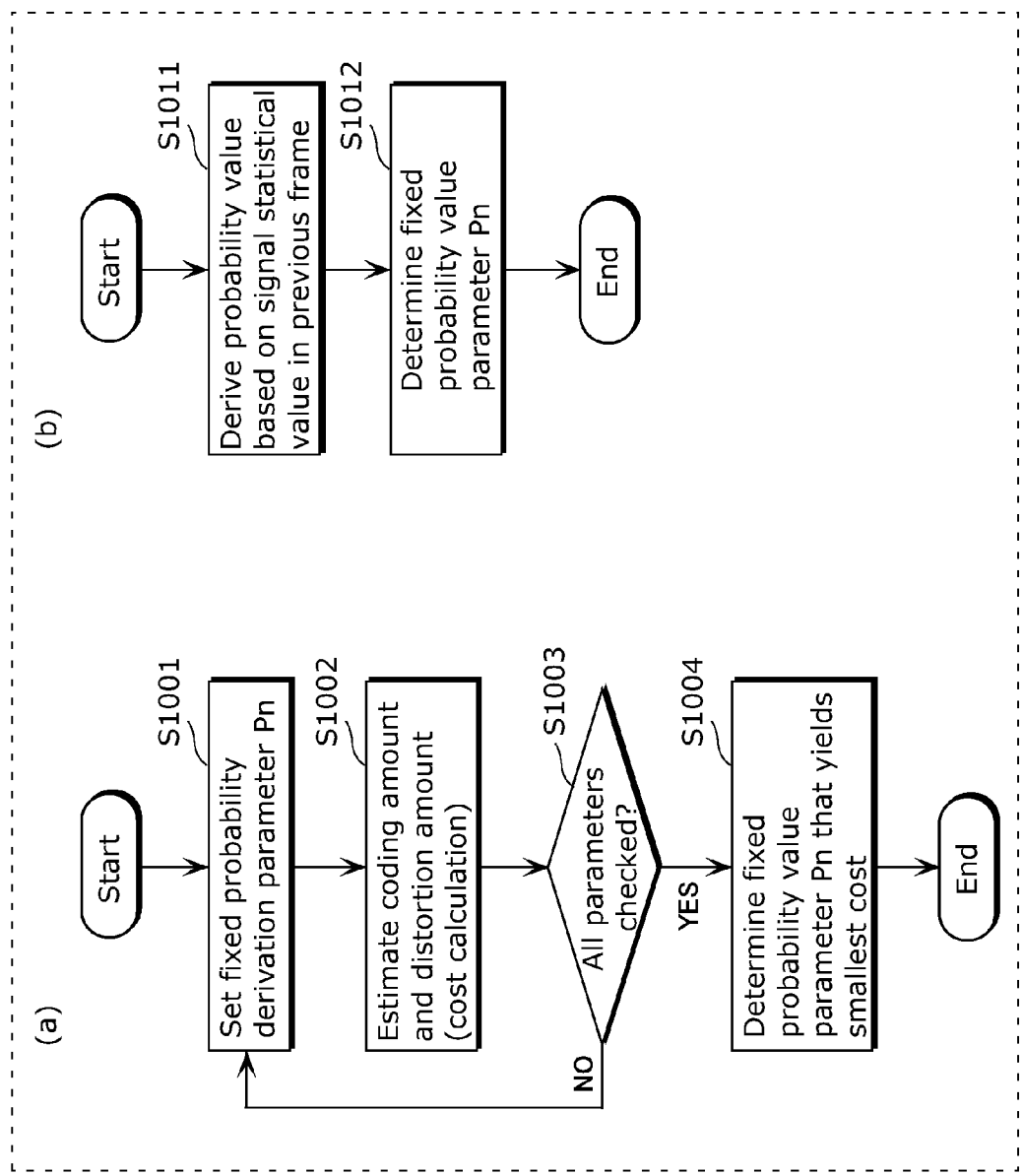
In FIG. 46, each of (a) and (b) is a flowchart of exemplary operations performed by the fixed-probability determining unit 603.

In FIG. 46, each of (a) and (b) is a flowchart of exemplary operations performed by the fixed-probability determining unit 603. First, (a) of FIG. 46 illustrates an example case where the coding side performs an extremely large amount of processing. The coding side sets a fixed-probability derivation parameter Pn for each context to be a coding target (Step S1001). This fixed-probability derivation parameter corresponds to the parameter p described in Embodiment C1. This value is converted into a probability value for use according to Expression 3 or Expression 4. Next, the coding side estimates the coding amount and the distortion amount obtainable in the case where coding is performed using the specified probability value, and performs a cost calculation. This cost calculation is to calculate a cost value that includes a coding amount and a distortion amount. The coding amount is, for example, a weighted sum of (i) a coding amount and (ii) the difference signal amount between an input image and a decoded image. A small cost value means that a decoding image with a small distortion can be obtained using only a small coding amount. In Step S1002, the coding side derives the cost based on the set fixed probability, and stores it (S1002). When all probability derivation parameters have not yet been checked (NO in S1003), a return is made to Step S1001. On the other hand, when cost calculations for all the probability derivation parameters have already been checked (YES in S1003), the coding side determines the fixed probability value that yields the smallest cost, and the parameter coding unit codes the parameter Pn (S1004). The above-described calculation makes it possible to derive a probability value that yields a high coding efficiency even for such a parameter that has been conventionally coded using a provability value of 50%, and to thereby generate a bit stream having a high coding efficiency. This derivation processing requires a large processing amount, but requires only decoding of parameters at the time of decoding. Thus, the decoding apparatus can perform processing at high speed.

The deriving method described here is for searching all the probabilities, but deriving methods are not limited thereto. For example, it is also good to narrow down the candidate fixed probabilities to at least two of the candidates based on the already obtained coding results, and perform the above-described procedure in order to derive the at least two candidates. In this way, it is possible to reduce the processing amount required for the coding side.

On the other side, (b) of FIG. 46 shows a method for further reducing the processing amount required for the coding side. According to the method, the coding side derives (S1011) the probability value for each of the types (contexts) of signals using the occurrence probability of the coding signal in a previous (already-processed) frame without performing any cost calculation, and the parameter coding unit codes the corresponding parameter Pn using the derived value as a fixed-probability value (S1012). This method requires only one processing loop at the coding side (no return occurs), and thus makes it possible to reduce the processing amount significantly.

As shown in FIG. 47, the image coding apparatus 200 includes: a subtractor 205, a transform and quantization unit 210, an entropy coding unit 220, an inverse quantization and inverse transform unit 230, an adder 235, a deblocking filter 240, a memory 250, an intra prediction unit 260, a motion estimation unit 270, a motion compensation unit 280, and an intra/inter switch 290.

The subtractor 205 calculates a prediction error that is the difference between the input signal and the prediction signal.

The transform and quantization unit 210 transforms the prediction error in the spatial domain into transform coefficients in the frequency domain. For example, the transform and quantization unit 210 performs Discrete Cosine Transform (DCT) on the prediction error to generate transform coefficients. Furthermore, the transform and quantization unit 210 quantizes the transform coefficients to generate quantized coefficients.

The entropy coding unit 220 performs variable length coding of the quantized coefficients to generate a coded signal. In addition, the entropy coding unit 220 codes motion data (such as a motion vector) estimated by the motion estimation unit 270, adds the motion data to the coded signal, and outputs the coded signal.

The inverse quantization and inverse transform unit 230 reconstructs the transform coefficients by performing inverse quantization on the quantized coefficients. Furthermore, the inverse quantization and inverse transform unit 230 reconstructs a prediction error by performing inverse transform on the reconstructed transform coefficients. Here, the reconstructed prediction error has lost a part of its information through the quantization, and thus does not match the prediction error that is generated by the subtractor 205. In other words, the reconstructed prediction error includes a quantization error.

The adder 235 adds the reconstructed prediction error and the prediction signal to generate a local decoded image.

The deblocking filter 240 performs deblocking filtering on the generated local decoded image.

The memory 250 is a memory for storing reference images for use in motion compensation. More specifically, the memory 250 stores the local decoded images processed by the deblocking filter.

The intra prediction unit 260 performs intra prediction to generate a prediction signal (an intra prediction signal). More specifically, the intra prediction unit 260 performs intra prediction with reference to images surrounding the coding target block (input signal) in the local decoded image generated by the adder 235 to generate an intra prediction signal.

The motion estimation unit 270 estimates motion data (such as a motion vector) between the input signal and a reference image stored in the memory 250.

The motion compensation unit 280 performs motion compensation based on the estimated motion data to generate a prediction signal (an inter prediction signal).

The intra/inter switch 290 selects any one of an intra prediction signal and an inter prediction signal, and outputs the selected signal as the prediction signal to the subtractor 205 and the adder 235.

With this structure, the image coding apparatus 200 according to Embodiment C1 of the present invention compression codes the image data.

In FIG. 47, the entropy coding unit 600 according to Embodiment C2 of the present invention is included in the entropy coding unit 220. In other words, the arithmetic coding unit obtains, as an input signal, values obtained by binarizing quantized coefficients or the like, and performs arithmetic coding. In addition, signal type information indicates information such as the positions of the quantized coefficients, the motion data shown in FIG. 46, or an intra prediction direction for use by the intra prediction unit 260.

As described above, the image coding apparatus and the image coding method according to the present invention make it possible to perform arithmetic coding even in the case of a probability other than 50% by transmitting the probability, and to thereby perform high-speed processing.

Embodiment C3

This embodiment describes a method of storing a fixed probability parameter FP as header information of a stream, and coding and decoding the stream. A description is given of the structure of data to be stored.

Figure 48:
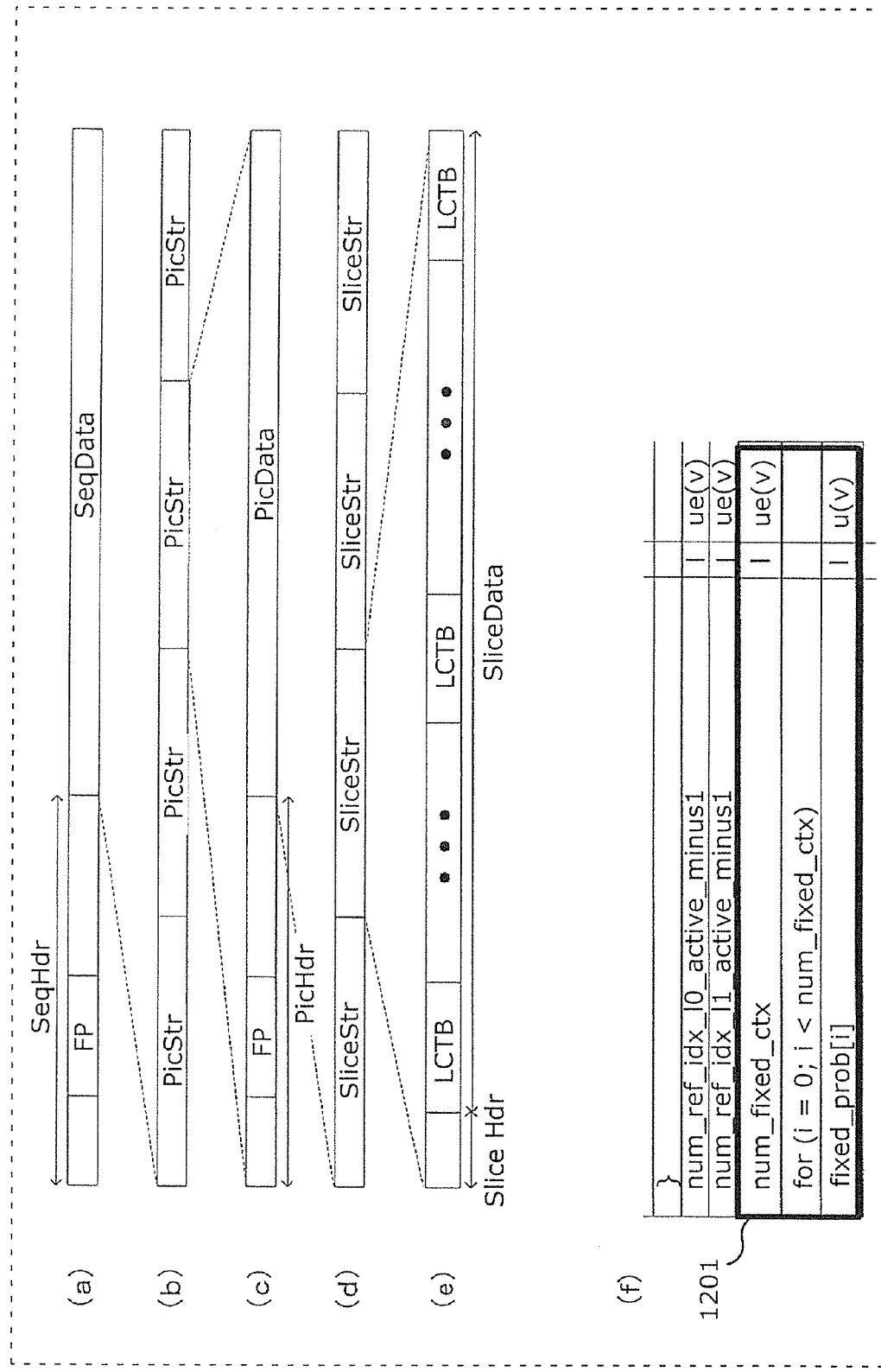
FIG. 48 is composed of schematic illustrations of data structures according to the present invention.

FIG. 48 shows the structure of a code string in the image coding method according to the present invention. FIG. 48 shows the structure of an output code string in the image coding method according to the present invention. In FIG. 48, (a) shows a coded signal corresponding to a video sequence that is composed of at least one picture, and is composed of sequence data SeqData that is the data of all the at least one picture and a sequence header SeqHdr that is all the data common among all the at least one picture.

The fixed probability parameter FP is, for example, a parameter for deriving a fixed probability illustrated in Embodiments C1 and C2.

This fixed probability parameter FP may be included in a sequence header. Normally, this fixed probability parameter is stored for each picture. The distance is always 1 in the case of sequences having a low-delay structure. Thus, it is possible to reduce the codes for each picture by storing the information in the sequence header.

In FIG. 48, (b) shows the structure of sequence data SeqData that includes picture signals PicStr that are coded picture signals each corresponding to one of the at least one picture.

In FIG. 48, (c) shows the structure of a picture signal PicStr composed of picture data PicData that is the data of the picture and a picture header PicHdr that is the data common in the entire picture. For example, this fixed probability parameter FP may be included in a picture header PicHdr. In FIG. 48, (d) shows the structure of the picture data PicData that includes a slice signal SliceStr that is a coded signal of a slice composed of a set of block units.

In FIG. 48, (e) shows the structure of the slice signal SliceStr composed of slice data SliceData that is the data of the slice and a slice header sliceHdr that is the data common in the entire data of the slice. The fixed probability parameter FP may be included in this slice header SliceHdr. In FIG. 48, (d) shows the structure of picture data PicData that may include a picture. In this way, it is possible to accurately decode the received coded signal even when appropriate switching is performed for each slice data SliceData.

Here, when the sequence data SecData includes a plurality of picture signals PicStr, it is also good to include a fixed probability parameter FP in each of some of the picture headers PicHdr, instead of including a fixed probability parameter FP in each of all the picture headers PicHdr. Likewise, when the picture data PicData includes a plurality of slice signals SliceStr, it is also good to include a fixed probability parameter FP in each of some of the slice headers SliceHdr, instead of including a fixed probability parameter FP in each of all the slice headers SliceHdr. When no fixed probability parameter FP is included in one of the slice headers SliceHdr as shown in (e) of FIG. 48, it is also possible to substitute the fixed probability parameter FP of another one of the slice headers SliceHdr as long as the fixed probability parameter FP is common among the slices. In this way, it is possible to prevent the number of bits from being increased by repeatedly storing the fixed probability parameter FP.

More specifically, as shown in 1201 of (f) of FIG. 48, it is also good to code (in a picture header) as a picture parameter set including a parameter (num_fixed_ctx) indicating the number of types and a parameter (fixed_prob [i]) indicating each of contexts.

In addition, when transmitting data in the form of, for example, packets that are small data units instead of transmitting the data in the form of a bit stream that is a continuous code string, it is also good to separate the header portion and the data portion other than the header portion and transmit these portions separately. In this case, unlike the bit stream shown in FIG. 48, there is no possibility that the header portion and the data portion are included in one bit stream. However, the concept using packets is the same as the concept using a bit stream in FIG. 48. This is because the header portion and the data portion corresponding to the header portion are transmitted in separate packets when the header portion and the data portion are transmitted in a non-sequential manner even when these portions are not included in the same single bit stream.

In addition, the code string coded according to the aforementioned approach is decoded according to the decoding method of the present invention. The procedure of the decoding method is described below. The decoding method firstly involves obtaining the fixed probability parameter FP included in the sequence header SeqHdr, and storing the obtained information. The decoding method next involves obtaining the fixed probability parameter FP included in the picture header PicHdr, and updating the obtained information. Here, when all or some of the fixed probability parameters FP are not included therein, the information included in the sequence header SeqHdr is retained. The decoding method further involves obtaining the fixed probability parameter FP included in the slice header SliceHdr, and updating the obtained information.

In this way, it is possible to decode the code string more accurately.

As described above, an image decoding method according to an aspect of the present invention is an image decoding method of decoding coded image data, including selectively performing arithmetic decoding methods according to the type of a decoding target signal. The arithmetic decoding methods include: a first arithmetic decoding method which is performed based on a symbol occurrence probability obtained according to a context, and involves update of the occurrence probability according to a decoding symbol; and a second arithmetic decoding method which is performed based on a symbol occurrence probability obtained according to a context, and which does not involve update of the occurrence probability according to a decoding symbol. Symbol occurrence probabilities for use in decoding according to the second arithmetic decoding method are modified based on parameters decoded in the decoding. This makes it possible to increase the coding efficiency.

In addition, for example, the symbol occurrence probabilities for use in the second arithmetic decoding include a symbol occurrence probability that is other than 50%. This makes it possible to increase the coding efficiency.

In addition, for example, in the decoding, at least two kinds of probability parameters are used. This makes it possible to increase the coding efficiency.

In addition, an image coding method according to an aspect of the present invention is an image coding method of coding image data to be coded, including selectively performing arithmetic coding methods according to the type of a coding target signal. The arithmetic coding methods include: a first arithmetic coding method which is performed based on a symbol occurrence probability obtained according to a context, and involves update of the occurrence probability according to a coding symbol; and a second arithmetic coding method which is performed based on a symbol occurrence probability obtained according to a context, and which does not involve update of the occurrence probability according to a coding symbol. Each of the arithmetic coding methods includes writing, in a bit stream, the symbol occurrence probability for use in the arithmetic coding. Symbol occurrence probabilities for use in coding according to the second arithmetic coding method are modified based on parameters decoded in the coding. This makes it possible to increase the coding efficiency.

In addition, for example, the symbol occurrence probabilities for use in the second arithmetic coding include a symbol occurrence probability that is other than 50%. This makes it possible to increase the coding efficiency.

In addition, for example, the probability information is stored in a picture header in the second arithmetic coding method. This makes it possible to increase the coding efficiency.

(Underlying Knowledge D Forming Basis of the Present Invention)

In the High Efficiency Video Coding (HEVC) Standard that is one of the next-generation image coding standards, various considerations for increasing coding efficiency have been made (Non-patent Literature 1). This scheme conforms to the conventional standards such as the ITU-T Standard denoted as H.26x (this standard is made by the International Telecommunication Union Telecommunication Standardization Sector) and the ISO-IEC Standard denoted as MPEG-x. The most advanced video coding standard is the standard that is currently being considered as the standard next to the standard denoted as H.264/AVC or MPEG-4/AVC (see Non-patent Literature 2).

Figure 49:
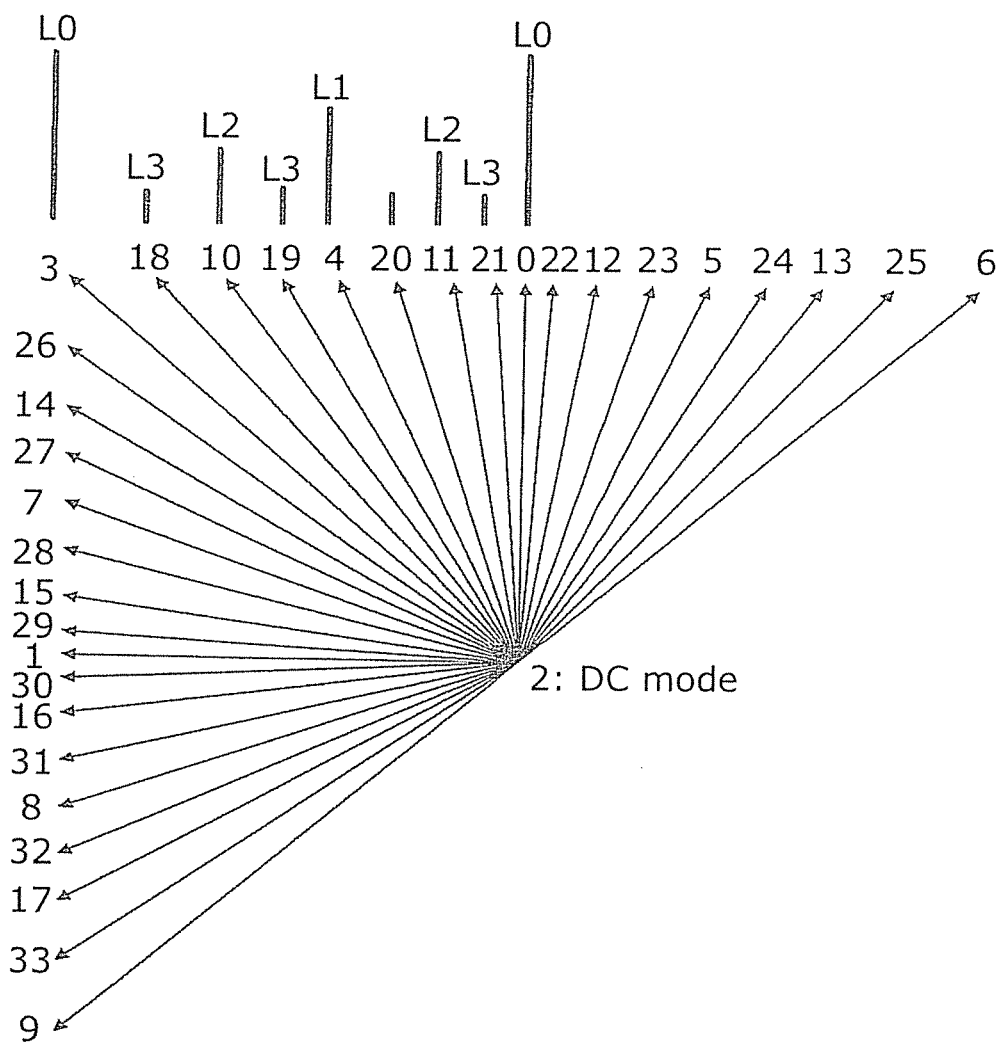
FIG. 49 is a schematic diagram for illustrating conventional decoding mode numbers.

Especially in intra coding involving compression with reference to pixel information within a picture, modes are prepared in number (intraPredModeNum) corresponding to the predetermined sizes of coding target blocks (the predetermined sizes are, for example, the values of log 2TrafoSize and the types of Prediction Units) in order to differentiate the directions etc. for generating intra prediction pixels. For example, it is currently considered to prepare 34 modes (the values of intraPredModeNum are 34) for blocks each having a value of the size log 2TrafoSize within a range from 3 to 5 inclusive (FIG. 49).

This mode is called as an intra prediction mode (IntraPredMode). The value of the mode is a value that represents a corresponding prediction direction. For example, a value (or a label) "0" of an intra prediction mode shows the vertical (direction), a value "1" shows the horizontal (direction), a value "2" shows no direction called a DC mode prediction, and values of 3 and larger (values between 3 and 33 inclusive for blocks having a predetermined size) show predetermined-angle directions associated respectively thereto. L0 to L3 in the diagram show hierarchical levels having accuracies that are currently being considered. Hereinafter, these 34 numbers (or 17 numbers or the like up to L2) are called as "decoding mode numbers" in the present Description. The values of codes associated with corresponding numbers of the "decoding mode numbers" (the values are coded according to predetermined coding schemes and reconstructed from code strings) are referred to as "coding mode numbers" in order to differentiate these coding mode numbers from the decoding mode numbers.

Such mode information that is "information for identifying which one of the modes should be used" for a decoding target block (such as a luminance block) that is the target of intra prediction is coded and then decoded as coded information of each of prediction units (PU) of the decoding target.

At present, it is currently considered that mode information includes three information pieces as indicated below.

(1) A "prediction mode use flag" (prev_intra_luma_pred_flag) that is a flag determining whether or not to use the value of the mode of an adjacent intra prediction PU decoded before (2) A "prediction mode numbers" (mpm_idx) that is an index indicating the association with one of the modes when there are at least two candidate modes (the index is, for example, the first one (a default value is a value "0")

(3) A "coding mode number" (rem_intra_luma_pred_mode) that is a code (value) associated with a corresponding "decoding mode number"

In the decoding process, (1) the "coding mode number" is extracted from the code string first according to a predetermined variable length decoding scheme etc. (arithmetic decoding method etc.), and, using the extracted value, (2) the "decoding mode number" (any one of the aforementioned 34 modes from 0 to 33 inclusive) is derived (or information used for the derivation is derived).

Figure 51:
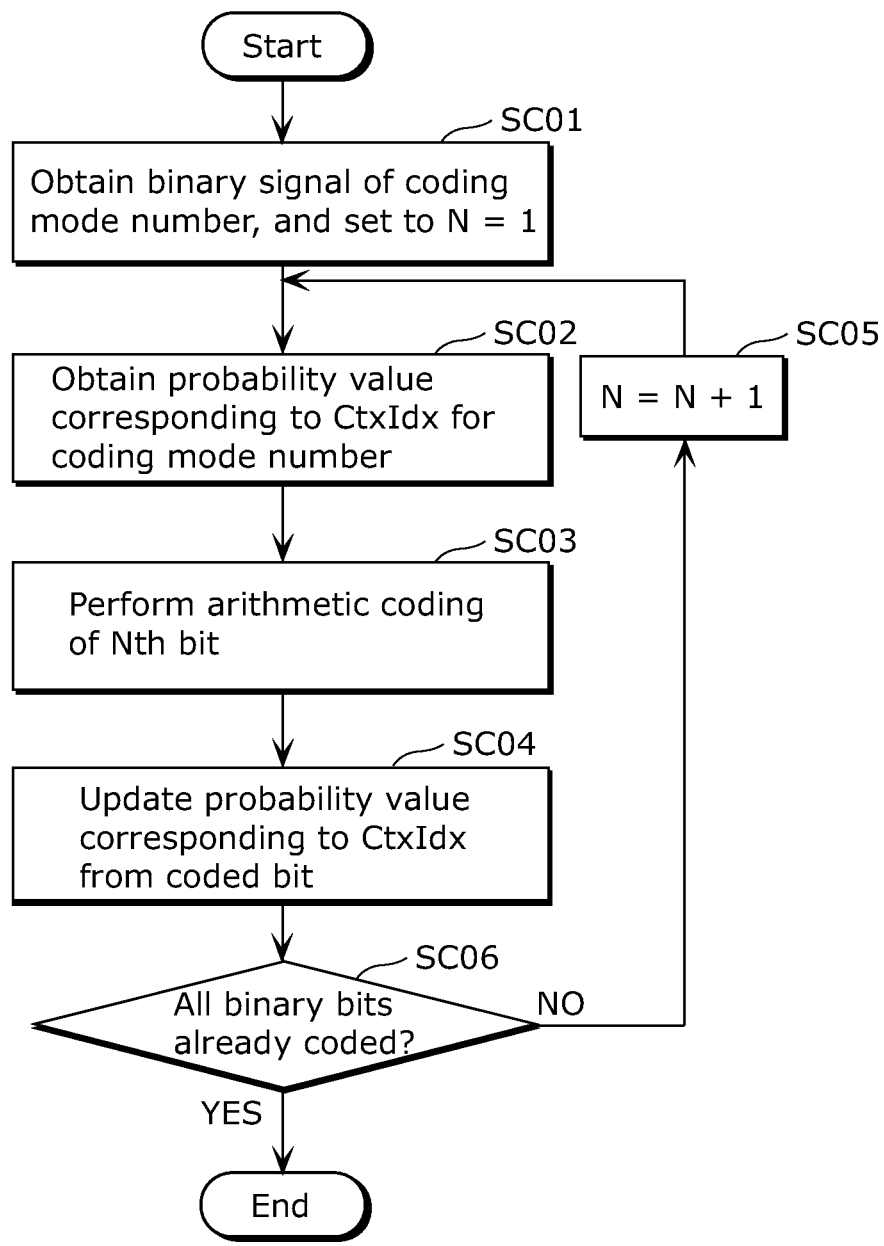
FIG. 51 is a flowchart of operations in an arithmetic coding method according to a conventional coding mode.

In addition, the "coding mode number" is binarized and shown as bins ((a) and (b) of FIG. 50). In FIG. 50, (a) is an example of binarization in the case where the number of modes is 17, and (b) is an example of binarization in the case where the number of modes is 34. In the arithmetic coding, the coding mode number is binarized (SC01), and a probability value corresponding to the context number CtxIdx indicating the coding mode number is obtained (the probability value is specifically an index pStateIdx for referring to the probability value (SC02). Based on the obtained probability, arithmetic coding is performed on the Nth bit (SC03). Based on information indicating whether or not the coded Nth bit is "0" or "1", the probability value (pStateIdx) corresponding to CtxIdx is updated (SC04). When not all the bits are yet coded (No in SC06), the number N is incremented by 1 (SC05), and a next bit is coded. Here, CtxIdx for the coding mode number is one. In the arithmetic coding of the N-bit signal, the probability value (pStateIdx) corresponding to the same CtxIdx is used. More specifically, the probability value (pStateIdx) updated each time of coding of one bit is used for coding. At the time when coding of all the binary bits is completed (YES in SC06), the processing is terminated (FIG. 51).

In arithmetic coding and decoding, "coding mode numbers" are binarized as shown in FIG. 50. Furthermore, in arithmetic coding, binary signals of "0" and/or "1" shown in bins are sequentially coded. In this case, there is no relevance in the order of occurrence probabilities of "0" and "1" in bins having each mode number. Thus, it is difficult to estimate a probability value even when applying the same probability value to a different bit value as in the conventional approach. Therefore, it is impossible to sufficiently increase the coding efficiency. In addition, in the case of arithmetic coding and decoding, the probability is updated each time of coding and decoding of one bit. This increases the processing amount, and moreover this requires sequential processing. Therefore, it is impossible to perform high-speed coding and decoding.

In view of this, the present invention makes it possible to easily perform high-speed methods of coding and decoding "coding mode numbers".

According to a first aspect (a coding method) of the present invention, parameters obtained by binarizing the coding mode numbers are subjected to arithmetic coding using fixed probabilities.

According to a second aspect (a coding method) of the present invention, binarization methods are selectively switched to a Bypass mode in the arithmetic coding based on the relationships between the selection frequencies of the coding mode numbers and the binary parameters in the binarization of the coding mode numbers, such that the occurrence frequencies of symbols "0" and "1" are approximately 50%.

According to a third aspect (a decoding method) of the present invention, arithmetic decoding is performed using predetermined fixed probabilities when decoding coding mode numbers from a bit stream.

According to a fourth aspect (a decoding method) of the present invention, arithmetic decoding is performed using the Bypass mode when decoding coding mode numbers from a bit stream.

With the structure, it is possible to implement a coding apparatus and a decoding apparatus which do not need to update probability models (sStateIdx corresponding to contexts) each time of coding and decoding of a binary signal having a coding mode number, and to thereby reduce the processing amount significantly.

Hereinafter, descriptions about numerical ranges in this Description conform to the Range notation disclosed in Non-patent Literature 1. For example, when x=Y . . . z is described, x is an integer in a range from y to z inclusive according to "x takes on integer values starting from y to z, inclusive, with x, y, and z being integer numbers".

Embodiment D1

Figure 52:
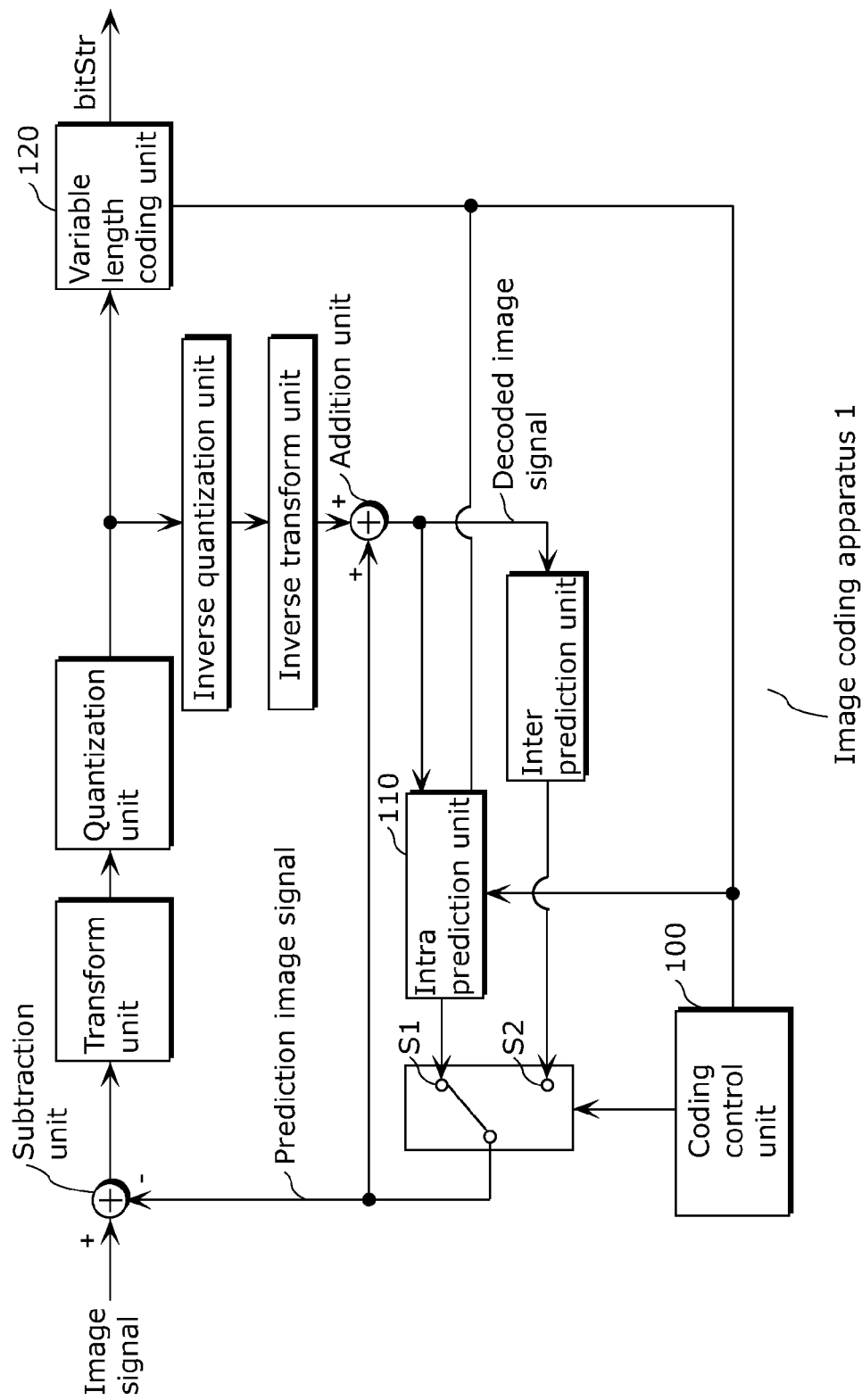
FIG. 52 is a block diagram of a structure of a coding apparatus 1 according to Embodiment D1.

FIG. 52 is a functional block diagram for illustrating a coding apparatus according to the present invention.

The image coding apparatus includes: a transform unit, a quantization unit, an inverse quantization unit, an inverse transform unit, an addition unit, an inter prediction unit, a subtraction unit, a coding control unit 100, an intra prediction unit 110, and a variable length coding unit 120.

The image coding apparatus 1 receives an input of an image signal, and outputs a bit stream (bitStr) that is output from the variable length coding unit.

The coding control unit 100 holds a "decoding mode number" and a "variable length coding scheme" that should be applied to a coding target block (or a block included in a predetermined prediction unit block, and this is applied hereinafter) determined according to a predetermined evaluation standard. The evaluation standard is set, for example, so as to reduce the number of bits of code strings that are output under a condition for achieving a predetermined prediction accuracy.

According to the "decoding mode number" specified by the coding control unit 100, the intra prediction unit 110 predicts the pixel value of a current coding target block by utilizing a prediction pixel located in a direction specified by a mode.

In addition, the intra prediction unit 110 generates the "coding mode number" using the "decoding mode number".

The variable length coding unit 120 performs entropy coding such as arithmetic coding of the "coding mode number" generated by the intra coding unit, according to the "variable length coding" signal specified by the coding control unit 200 so as to output a bit stream (bitStr).

Figure 53:
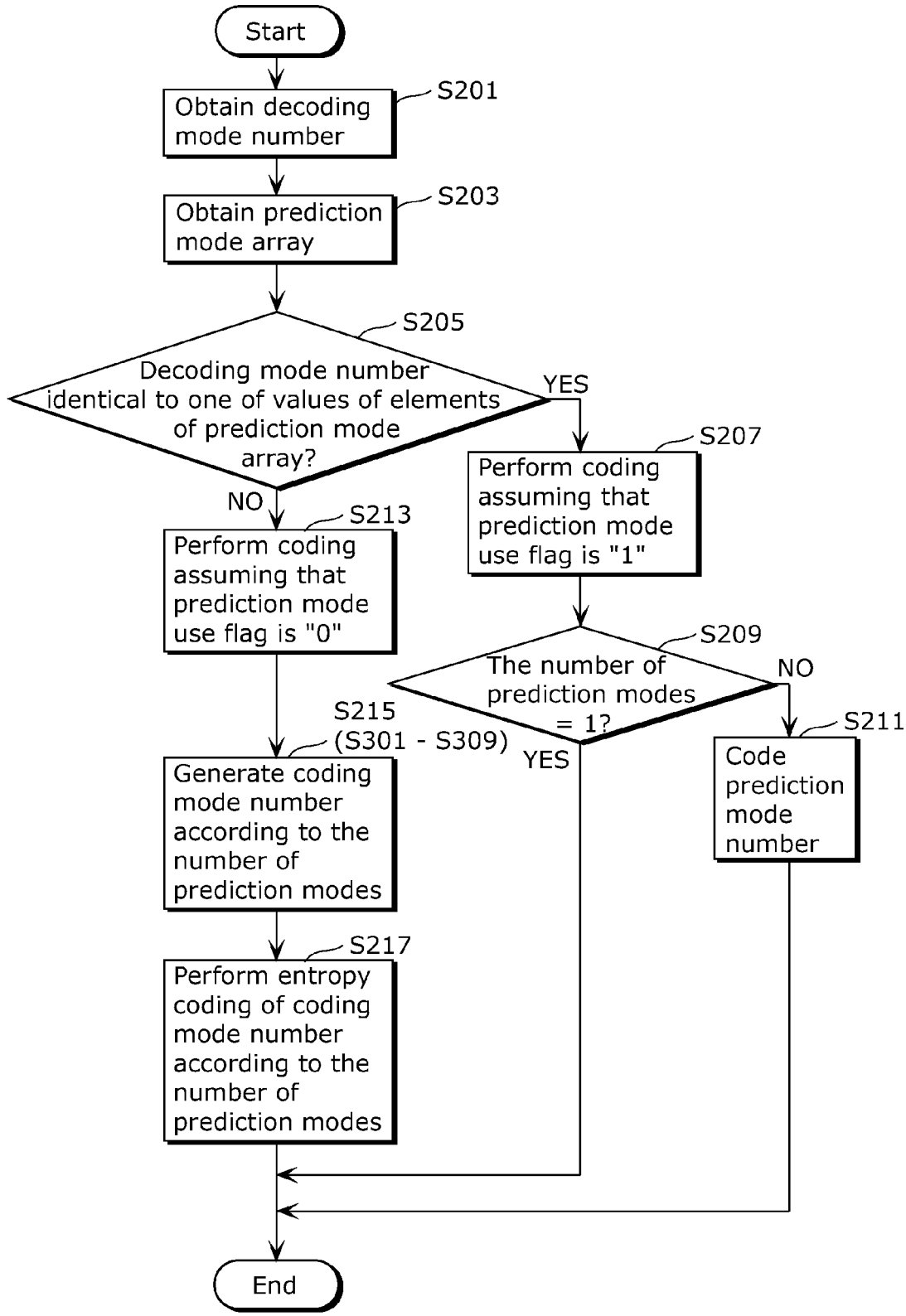
FIG. 53 is a flowchart of a coding method according to Embodiment D1.

FIG. 53 is a flowchart of a method of coding the "decoding mode number" executed by the coding apparatus in FIG. 52.

First, the "decoding mode number" of the coding target block is obtained (S201).

Next, a "prediction mode array" (candModeList) for this block is obtained (S203). This array is an array in which the "prediction mode number" to be described later is an index value (starting with 0) of the array elements.

Next, whether or not the decoding mode number matches the value of any one of the elements of the prediction mode array is determined (S205).

(Case where Decoding Mode Number Matches Value of any One of Elements of Prediction Mode Array)

When the determination in Step S205 shows that "the decoding mode number matches the value of any one of the elements of the prediction mode array" (YES in S205), processes in Steps S207 to 211 are performed.

First, the value of a prediction mode use flag is determined to be "1", and this value is coded (S207).

Next, whether or not the value of the "number of prediction modes" (NumMLMCand) is 1 (whether or not there is only one effective prediction value) is determined (S209). Typically, the number of prediction modes is the number of elements of the prediction mode array for this block. More strictly, the number of the prediction modes is "the number of elements of the prediction mode array including an effective value".

Lastly, when there is a plurality of prediction modes, the prediction mode numbers (the index values in the prediction mode array) are subjected to variable length coding according to a specified scheme, in order to identify which one of the prediction modes is used (S211).

(Case where Decoding Mode Number does not Match Value of any One of Elements of Prediction Mode Array)

When the determination in Step S205 shows that "the decoding mode number does not match the value of any one of the elements of the prediction mode array" (NO in S205), processes in Steps S213 to 217 are performed.

First, the "prediction mode use flag" is determined to be 0, and this value is coded (S213).

Next, based on the decoding mode number and the number of prediction modes, a "coding mode number" (the value of rem_intra_luma_pred_mode") is generated (S215). This step is a step of generating, based on the decoding mode number, a coding mode number that varies according to the number of prediction modes even in the case of the same decoding mode number. This step is described later with reference to FIG. 54.

Lastly, the coding mode number generated according to the number of prediction modes is coded according to the specified variable length coding method (S217). This step is described later with reference to FIG. 55.

Figure 54:
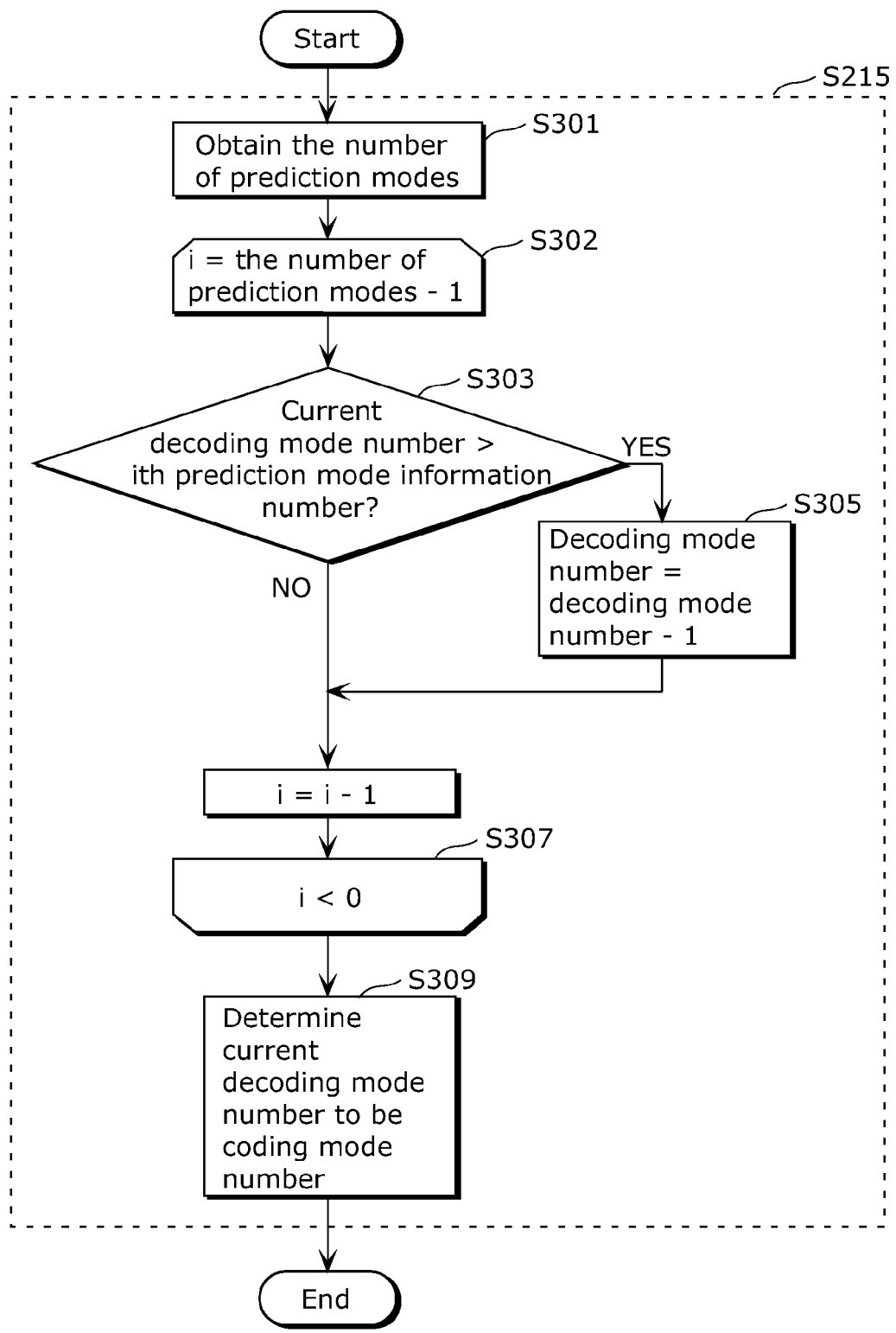
FIG. 54 is a flowchart for illustrating Step S215 in detail.

FIG. 54 is a flowchart for explaining details of Step 215 of generating a coding mode number according to the number of prediction modes.

First, the number of prediction modes is obtained (S301).

Next, the loop specified as Step S302 to Step S307 is repeated by the number of times specified by the value of the number of prediction modes. For example, when the number of prediction modes is 2, Step S303 (and Step S305 depending on the determination in S303) is executed twice such that the values of the indices (i) are 1 and 0. For example, when the number of prediction modes is 1, Step S303 (and Step S305 depending on the determination in S303) is executed once.

In Step S303, a determination is made on whether or not the value of the decoding mode number at a current time point is larger than the value of the element specified by the index (i) in the prediction mode array.

When the determination shows that the value of the decoding mode number at the current time point is larger than the value of the specified element, the value of the decoding mode number at the current time point is decremented by 1 (S305).

This is repeated by the number of times specified by the value of the aforementioned number of prediction modes, and the decoding mode number reflecting the result of the decrement or the like in Step S305 is finally determined to be the "coding mode number" (S309).

The process of Step S215 is equivalent to determining the value of the "decoding mode number" which takes, for example, any one of the 34 values from 0 . . . 33 in association with the "coding mode number", by selectively switching for use between the associations in Table 1 and the associations in Table 2 according to the number of prediction modes.

Table 1 is a table showing the associations between (a) decoding mode numbers and (b) "coding mode numbers" in the case where the "number of prediction modes" is 2 (there are indices 0 and 1).

TABLE 1

| (the number of prediction modes is 2) Associations between decoding mode numbers and coding mode numbers | | | | | | | | | | | |
|---|---|---|---|---|---|---|---|---|---|---|---|
| (a) Decoding mode number 0 . . . 33 | 0 | 1 | 2 | . . . | i | . . . | . . . | 31 | 32 | 33 |
| (i = −1) S305 | 0 | 0 | 0 | 0 | S205 Yes | 0 | 0 | 0 | 0 | 0 | −1 |
| (i = 0) S305 | 0 | 0 | 0 | 0 | 0 | −1 | −1 | −1 | −1 | S205 Yes | −1 |
| (b) Coding mode number (0 . . . 31) | 0 | 1 | 2 | . . . | Unnecessary (S205) | . . . | | 30 | Unnecessary (S205) | 31 |

For example, when the value of the second element (the element having an index value of 1) in the prediction mode array is "32" and the value of the prediction mode array [0] is "i", it is possible to perform derivation as shown below according to the value of the decoding mode number.

(1) The decoding mode number matches the coding mode number when 0≤the decoding mode number<the value of the first element of the prediction mode array is satisfied.

(2) The coding mode number is a number smaller than the decoding mode number by 1 when the value of the first element of the prediction mode array<the decoding mode number<the value of the second element of the prediction mode array is satisfied.

(3) The coding mode number is a number smaller than the decoding mode number by 2 when the value of the second element of the prediction mode array<the decoding mode number is satisfied.

Table 2 shows the associations between decoding mode numbers and coding mode numbers when the number of prediction modes is 1.

TABLE 2

(the number of prediction modes is 1) Associations between decoding mode numbers and coding mode numbers

| | 0 | 1 | 2 | ... | i | ... | ... | 31 | 32 | 33 |
|---|---|---|---|---|---|---|---|---|---|---|
| (a) Decoding mode number 0 ... 33 | | | | | | | | | | |
| (i = 0) S305 | 0 | 0 | 0 | 0 | Match | −1 | −1 | −1 | −1 | −1 −1 |
| (b) Coding mode number (0 ... 31) | 0 | 1 | 2 | ... | Unnecessary (S205) | ... | | 30 | 31 | 32 |

(i) The decoding mode number matches the coding mode number when 0≤the decoding mode number<the value of the first element of the prediction mode array is satisfied.

(2) The coding mode number is a number smaller than the decoding mode number by 1 when the value of the first element of the prediction mode array<the decoding mode number is satisfied.

In other words, when the prediction mode array is composed of k number of elements, it is possible to sort the elements based on the values in the prediction mode array, compare the decoding mode number with each of the elements arranged in the prediction mode array to determine the position of the element at which the decoding mode number is larger than the value last in the prediction mode array.

(k) The coding mode number is smaller than the decoding mode number by k−1 when the value of the (k−1)th element of the prediction mode array<the decoding mode number<the value of the kth element.

Figure 55:
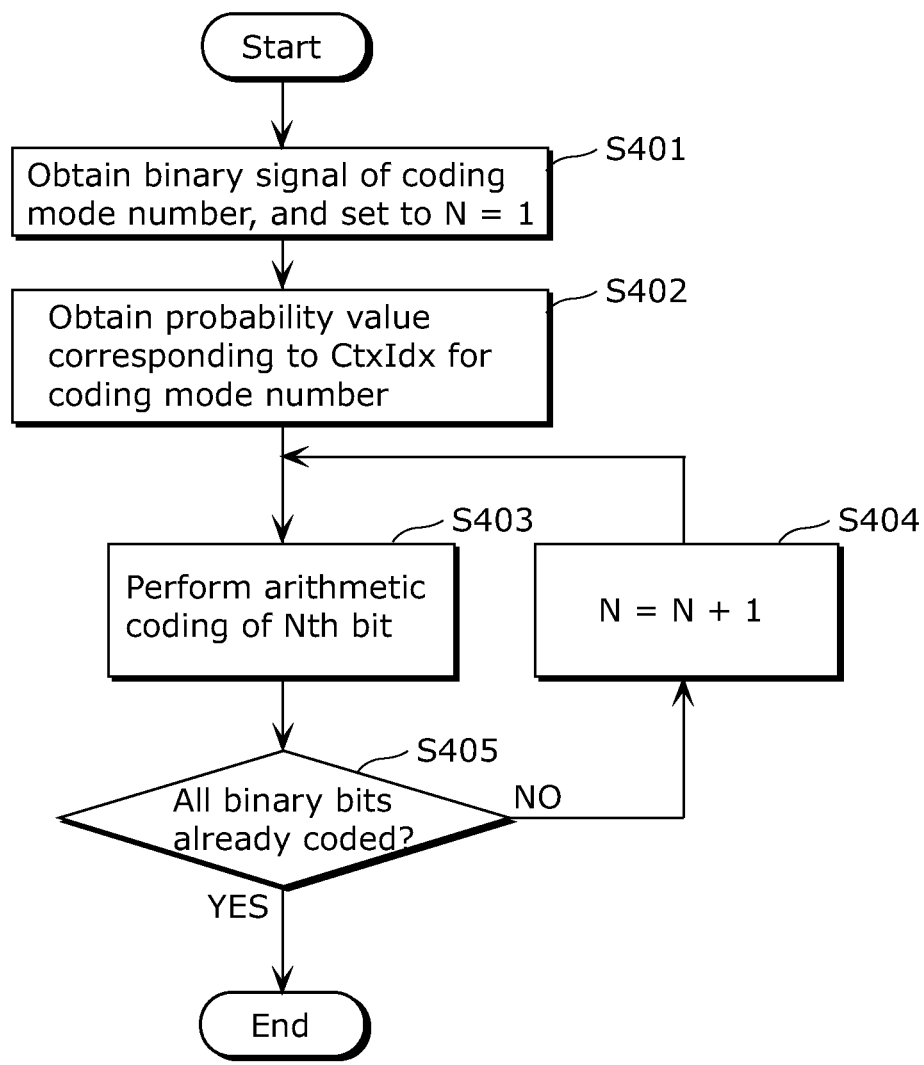
FIG. 55 is a flowchart of operations in an arithmetic coding method according to coding modes in Embodiment D1.

FIG. 55 is a flowchart of processes of a method of coding the above-described coding modes according to the present invention.

The coding mode numbers are binarized as shown in FIG. 50 as a specific example. In arithmetic coding, binary signals each showing "0" or "1" specified by bins are coded sequentially.

First, the arithmetic coding unit obtains binary information of a coded mode number, and sets to N=1 (resets a coding bit sequential order (S401). Next, the arithmetic coding unit obtains a fixed probability value corresponding to a context number CtxIdx showing the coding mode number, more specifically, obtains the index pStateIdx that refers to the fixed probability value (S402). Based on the fixed probability, arithmetic coding is performed on the Nth bit (S403). When not all the bits are yet coded (No in S405), the number N is incremented by 1 (S404), and a next bit is coded. Here, CtxIdx for the coding mode number is one, and the fixed probability value (pStateIdx) corresponding to the same CtxIdx is used for the arithmetic coding of the Nth bit. At the time when coding of all the binary bits is completed (YES in S405), the processing is terminated.

Here, this fixed-probability arithmetic coding method is described in detail in Embodiment D2.

Figure 56:
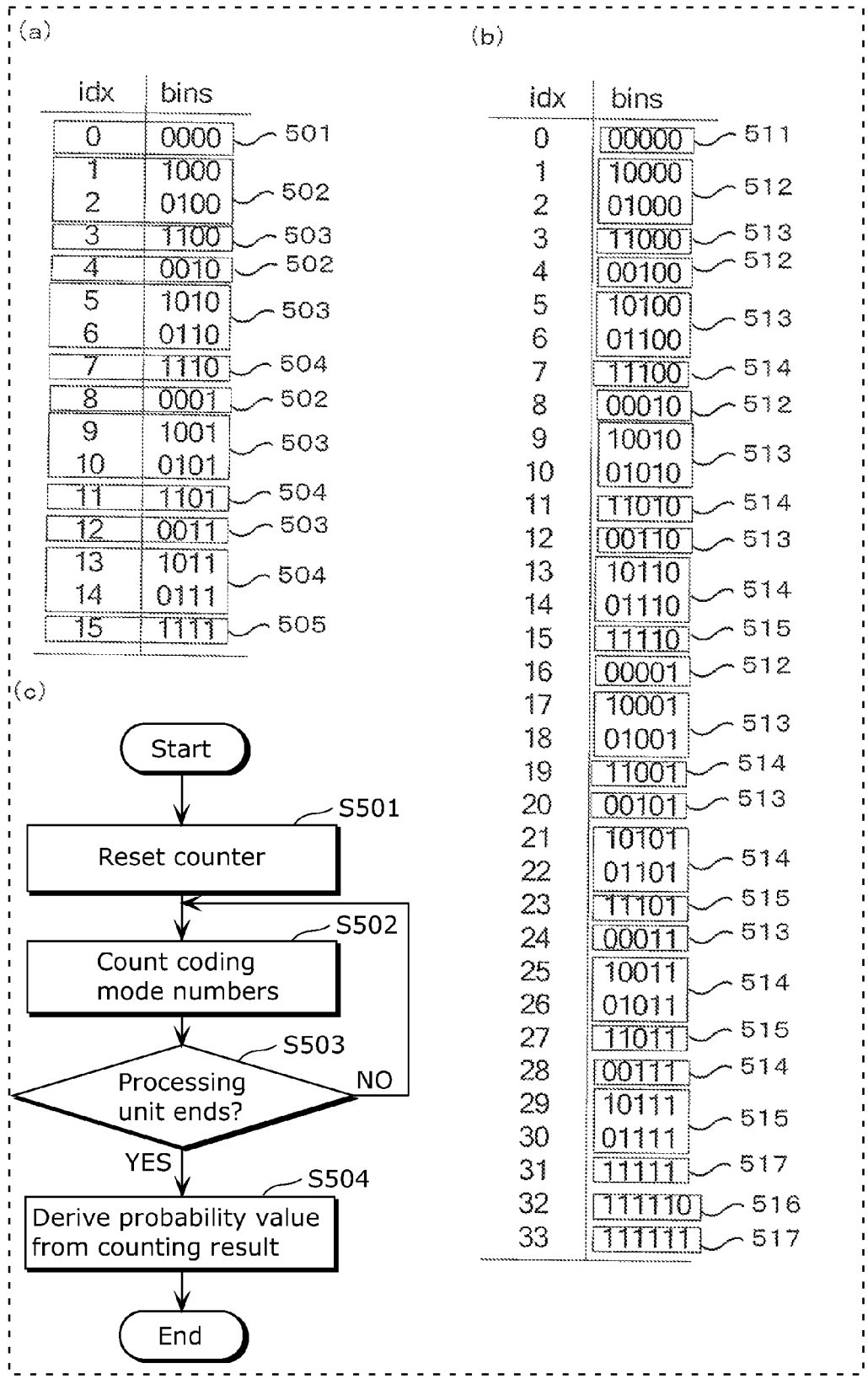
In FIG. 56 according to Embodiment D1: (a) is a schematic diagram of illustrating the relationships between coding mode numbers and binary strings; (b) is a schematic diagram of illustrating the relationships between coding mode numbers and binary strings; and (c) is a flowchart of exemplary operations for deriving a fixed probability value.

In comparison with the conventional coding method, this method enables high-speed calculations because the loop in this method are composed only of S403 and S404 and not include any probability value obtainment step and update step. Here, selections of fixed probability values are important in order not to decrease the coding efficiency. FIG. 56 is composed of conceptual diagrams for illustrating a method of selecting fixed probability values. In FIG. 56: (a) corresponds to (a) of FIG. 50, and shows a case where the number of modes is 17; and (b) corresponds to (b) of FIG. 50, and shows a case where the number of modes is 34.

In (a) of FIG. 56, idx shows the coding mode number before binarization, and bins shows a binary code string. The occurrence probabilities of "1" in the binary code string can be grouped into 501 to 505. In other words, 501 shows 0% (0/4), 502 shows 25% (1/4), 503 shows 50% (2/4), 504 shows 75% (3/4), and 505 shows 100% (4/4).

In (b) of FIG. 56, idx shows the coding mode number before binarization, and bins shows a binary code string. The occurrence probabilities of "1" in the binary code string can be grouped into 511 to 517. In other words, 511 shows 0% (0/5), 512 shows 20% (2/5), 513 shows 40% (2/5), 514 shows 60% (3/5), 515 shows 80% (4/5), 516 shows approximately 83% (5/6), and 517 shows 100% (5/5 or 6/6)

On the other hand, there is a tendency that a small number is coded for the coding mode number such that the number of prediction modes is smaller by 1 only for a certain number as described above. In addition, the number is a number depending on a prediction direction as shown in FIG. 49, it is necessary to consider also the occurrence frequency of the coding mode number.

For example, it is generally known that the selection rates of decoding mode numbers "0", "1", and "2" for modes showing the horizontal, vertical, and average-value predictions are high, and thus the occurrence probability of 1 is smaller than 50%. For this reason, it is impossible to use a bypass-mode arithmetic coding for use in the case of a probability of 50% (the coding efficiency is decreased if used)

In view of the above statistically known tendency, it is also good to determine, in advance, the fixed probability at the time of coding the "coding mode number". In addition, the occurrence frequencies vary in the cases where the number of modes is 17 and where the number of modes is 34, and thus it is also good to determine different fixed probabilities (that is, to determine two types of fixed probabilities for use in the coding of the coding mode numbers).

Alternatively, it is good to use the coding method as shown in (c) of FIG. 56 in order to derive a finer fixed probability. First, an occurrence frequency counter is reset (set to 0) (S501). Next, the coding mode numbers are counted (S502). More specifically, the number of bits and the number of bits "1" are separately counted. However, the number of bits may be replaced with the number of times of coding of all the coding mode numbers (The numbers of bits are 4 bits in the case of 17 modes and approximately 5 bits in the case of 34 modes, and thus it is possible to reduce memory.). Next, whether or not a current processing unit is shown by a counter is determined (S503). When the processing unit is not yet completed, the next coding mode number is counted (NO in S503). On the other hand, when the processing unit is reached (YES in S503), the occurrence probability of "1" is derived from the result of counting the coding mode numbers, and is determined to be a fixed probability value that is used for the following coding (or decoding).

Here, the processing unit may be a coding block (a unit of processing in coding), or a combination of coding blocks, or a larger processing unit called as a slice. It is possible to increase the coding efficiency by using finer units of processing, while it is possible to reduce the processing amount by using larger units of processing.

Here, in this case, the derived fixed probability may be written in header information in a bit stream, or may be derived by performing the same processing at the decoding side. Writing the derived fixed probability in the bit stream is advantageous because it is possible to reduce the processing amount at the decoding side, while performing the same processing at the decoding side is advantageous because additional coding amount is not necessary.

Here, the method of coding fixed probability information in a bit stream is described in detail in Embodiment D5.

With the above-described structure, it is possible to increase the coding speed for coding mode numbers and to suppress decrease in the coding efficiency or to increase the coding efficiency.

Variation of Embodiment D1

Variation of Embodiment D1 described above is described. Embodiment D1 is intended to perform coding by calculating a fixed probability value in advance or coding based on a calculation result. However, Variation of Embodiment D1 describes an example of modifying the aforementioned binarization method so that the bypass mode in the conventional arithmetic coding can be used for coding assuming that the fixed probability=50%. It is to be noted that portions that are not specifically described here are the same as in Embodiment D1.

Figure 57:
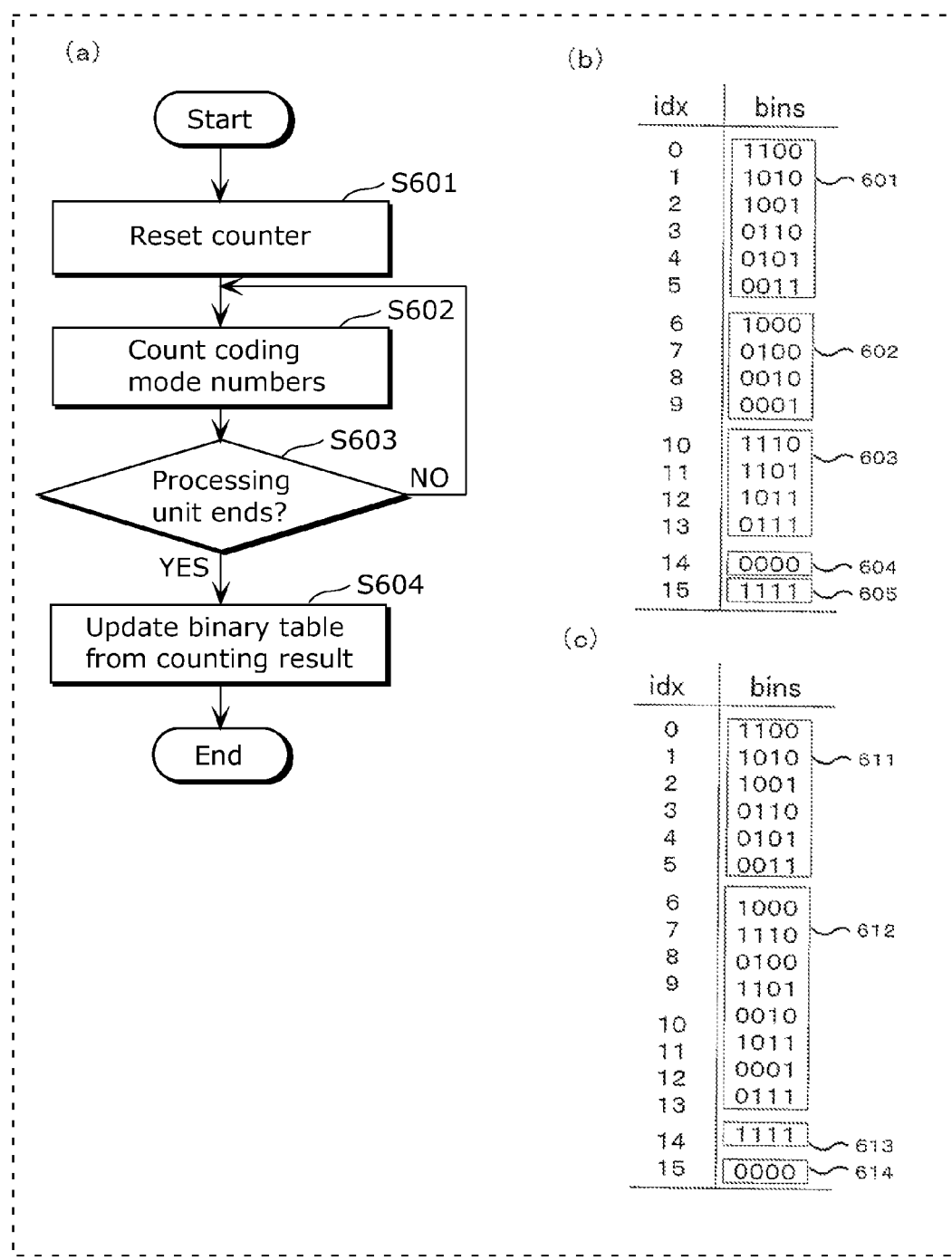
In FIG. 57 according to a variation of Embodiment D1: (a) is a flowchart of exemplary operations in a method of deriving an association table of coding mode numbers and binary strings; (b) is a schematic diagram for illustrating selection examples of binary strings with respect to selection frequencies of coding mode numbers; and (c) is a schematic diagram for illustrating selection examples of binary strings with respect to selection frequencies of coding mode numbers.

In FIG. 57, (a) is a flowchart of operations in a step of determining a binarization method. First, an occurrence frequency counter is reset (set to 0) (S601). Next, the coding mode numbers are counted (S602). More specifically, the frequencies of the indices of the coded coding mode numbers are counted. Next, whether or not a current processing unit is shown by a counter is determined (S603). When the processing unit is not yet completed, the next coding mode number is counted (NO in S603). On the other hand, when the processing unit is reached (YES in S603), a table is determined which is for determining a new binarization method for a sequential order higher than the counting result. For example, when the coding mode numbers from 0 to 15 are arranged in the descending order of their selection frequencies, it is possible to classify, based on the occurrence probabilities of the binary symbols in binary codes associated with the respective coding mode numbers, into: a first set (601) of coding mode numbers each associated with a binary code string composed of 1 with an occurrence probability of 50% and 0 with the same occurrence probability of 50%; a second set (602) of coding mode numbers each associated with a binary code string including 1 with an occurrence probability of 25%; a second set (603) of coding mode numbers each associated with a binary code string including 0 with an occurrence probability of 25%; a coding mode number (604) associated with a binary code string composed only of 0 with an occurrence probability of 100%; and a coding mode number (605) associated with a binary code string composed only of 1 with an occurrence probability of 100%. Alternatively, as shown in (c) of FIG. 57, it is possible to classify into: a first set (611) of coding mode numbers each associated with a binary code string composed of 1 with an occurrence probability of 50% and 0 with the same occurrence probability of 50%; a second set (612) of coding mode numbers each associated with a binary code string including 0 with an occurrence probability of 25% or a binary code string including 1 with an occurrence probability of 25% such that one of the binary code strings including 0 with the occurrence probability of 25% is placed at the top of the second set; a coding mode number (613) associated with a binary code string composed only of 1 with an occurrence probability of 100%; and a coding mode number (614) associated with a binary code string composed only of 0 with an occurrence probability of 100%.

Here, the processing unit may be a coding block (a unit of processing in coding), or a combination of coding blocks, or a larger processing unit called as a slice. It is possible to increase the coding efficiency by using finer units of processing, while it is possible to reduce the processing amount by using larger units of processing.

Alternatively, it is also good to allow the coding side and the decoding side to share the binarization result designed in this step in advance. This provides an advantage of being able to reduce the processing amount at the decoding side, and provides an advantage of not requiring additional coding amount when performing the same processing at the decoding side.

Although the case of 17 modes has been described above, a binarization table is determined also in the case of 34 modes.

The conventional variable length coding involves (i) coding for assigning a shorter code to a code having a higher signal occurrence frequency (for example, the Huffman codes) or (ii) arithmetic coding (such as context-adaptive arithmetic coding) involving updates of an occurrence probability according to a signal occurrence frequency. However, this embodiment is characterized by changing codes such that the occurrence frequencies are made to be even (made to be closer to 50%). According to this approach, it is possible to reduce the processing amount and to suppress decrease in the coding efficiency.

Embodiment D2

This embodiment is intended to describe an arithmetic coding method utilizing fixed probabilities for use in the present invention. This processing is described in detail with reference to FIG. 58.

Figure 58:
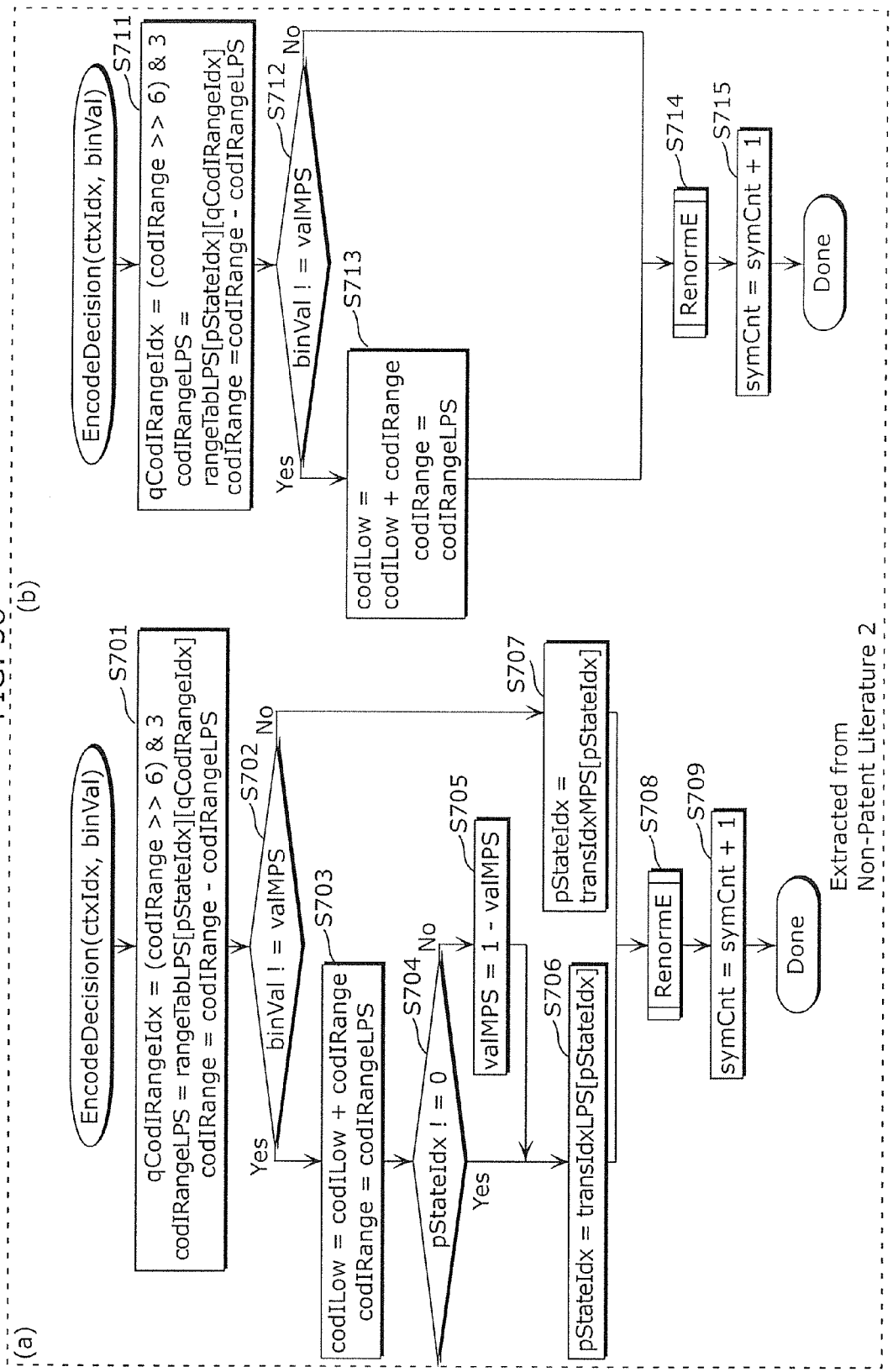
In FIG. 58 according to Embodiment D1: (a) is a flowchart of context-adaptive arithmetic coding processes in an arithmetic coding method; and (b) is a flowchart of fixed-probability arithmetic coding processes.

In FIG. 58, (a) is a flowchart of context-adaptive arithmetic coding processes (extracted from Non-patent Literature 2). The same operations as shown in Non-patent Literature 2 are performed unless particularly explained.

First, as in the conventional arithmetic decoding, a value of codIRangeLPS in the case where an LPS signal occurs and the value of a codIRange are calculated for a first parameter codIRange showing an internal state of an arithmetic coding unit (Step S701, corresponding to SB01). Next, a determination is made as to whether or not a coding target signal binVal is a symbol valMPS having a high symbol occurrence probability (S702). When the coding target signal is an LPS (YES in S702), the codIRange calculated in S701 is added to a second parameter codLow showing an internal state of the arithmetic coding unit, and the value of the codIRange LPS is set to the codIRrange (Step S703). Next, as in SB04 to SB06, pStateIdx is updated based on the occurrence of the LPS in S704 to S706. The detailed descriptions are the same as in those given with reference to FIG. 50.

On the other hand, when a coding target signal is an MPS (NO in S702), pStateIdx is updated (S707, corresponding to SB07). Next, a later-described normalization process RenormE (S708) is performed, and a counter is incremented (S709) to terminate the processing.

In FIG. 58, (b) is a flowchart showing exemplary operations in fixed-probability arithmetic coding according to the present invention. First, pStateIdx showing a corresponding probability is obtained, and calculations are performed as in Step S701 (in the same manner as in SB01) (S711). Next, a determination is made as to whether or not a coding target signal binVal is a symbol valMPS having a high symbol occurrence probability (S712). When the coding target signal is an LPS (YES in S712), the codIRange calculated in S701 is added to a second parameter codLow showing an internal state of the arithmetic coding unit, and the value of the codIRange LPS is set to the codIRrange (Step S713). On the other hand, when a coding target signal is an MPS (NO in S712), such processes are not performed, and a normalization process (RenormE, S714) is performed. Lastly, the counter is incremented (S715) to terminate the processing. In other words, this shows that arithmetic coding is performed by always using a fixed probability when not updating pStateIdx.

Figure 59:
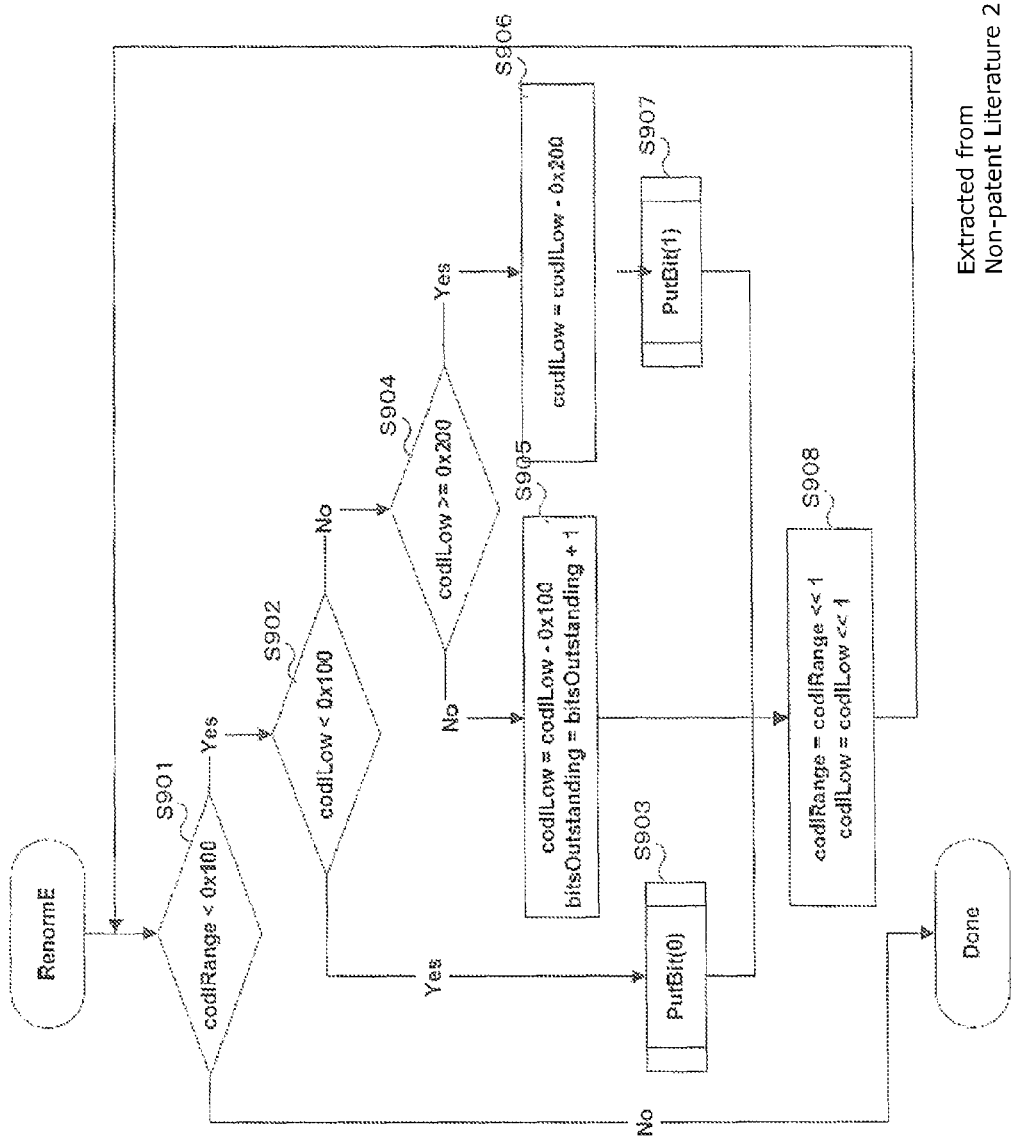
FIG. 59 is a flowchart of normalization processes of an arithmetic coding method according to the present invention.

FIG. 59 is a flowchart of operations in the process corresponding to the aforementioned normalization processes (S709, S715) (extracted from Non-patent Literature 1). The same operations as shown in Non-patent Literature 1 are performed unless particularly explained.

When codIRange is larger than or equal to 0x100 in hexadecimal representation (256 in decimal numbers) (NO in S901), the normalization process is terminated. A code 0 is written (S903) when codIRange (a first parameter showing an internal state of the arithmetic coding apparatus) is smaller than 0x100 in hexadecimal representation (256 in decimal numbers) (YES in S901), and when codILow (a second parameter showing an internal state of the arithmetic coding apparatus) is smaller than 0x100 in hexadecimal representation (256 in decimal numbers) (YES in S902). When codLow is larger than or equal to 0x100 in hexadecimal representation (256 in decimal numbers) and smaller than 0x200 hexadecimal representation (512 in decimal numbers) (NO in S902, No in S904), 0x100 in hexadecimal representation (256 in decimal numbers) is subtracted from codILow, and a counter showing the amount for sequential writing at the time of bit output is incremented by 1 (S905). This amount is called as bitsOutstanding. When codILow is larger than or equal to 0x200 in hexadecimal representation (512 in decimal numbers) (NO in S902, YES in S904), 0x200 in hexadecimal representation (512 in decimal numbers) is subtracted from codILow (S906), and a code 1 is written (S907). Here, when the value of bitsOutstanding is not 0 at the time of code writing (S903 or S907), a code inverse to the code specified as being written in each step is written by the amount corresponding to bitOutstanding, and the value of bitOutstanding is reset to 0. Then, codIRange is shifted to the left by 1 (doubled), codILow is shifted to the left (doubled) (S908), and a return is made to Step S901. This process makes it possible to achieve arithmetic coding.

Here, in the case of performing coding with a fixed probability of 50%, it is possible to perform arithmetic calculations according to the bypass mode shown in Non-patent Literature 2, or to include a 50% probability in the scheme shown in (b) of FIG. 58. In the former case, it is possible to generate a circuit designed for 50% probability in advance, and to thereby increase the processing speed. In the latter case, a circuit can be shared.

Using an arithmetic coding method for performing a fixed-probability coding according to Embodiment D2 makes it possible to accurately execute a coding mode number coding processes shown in Embodiment D1 and Variation of Embodiment D1.

Embodiment D3

Figure 60:
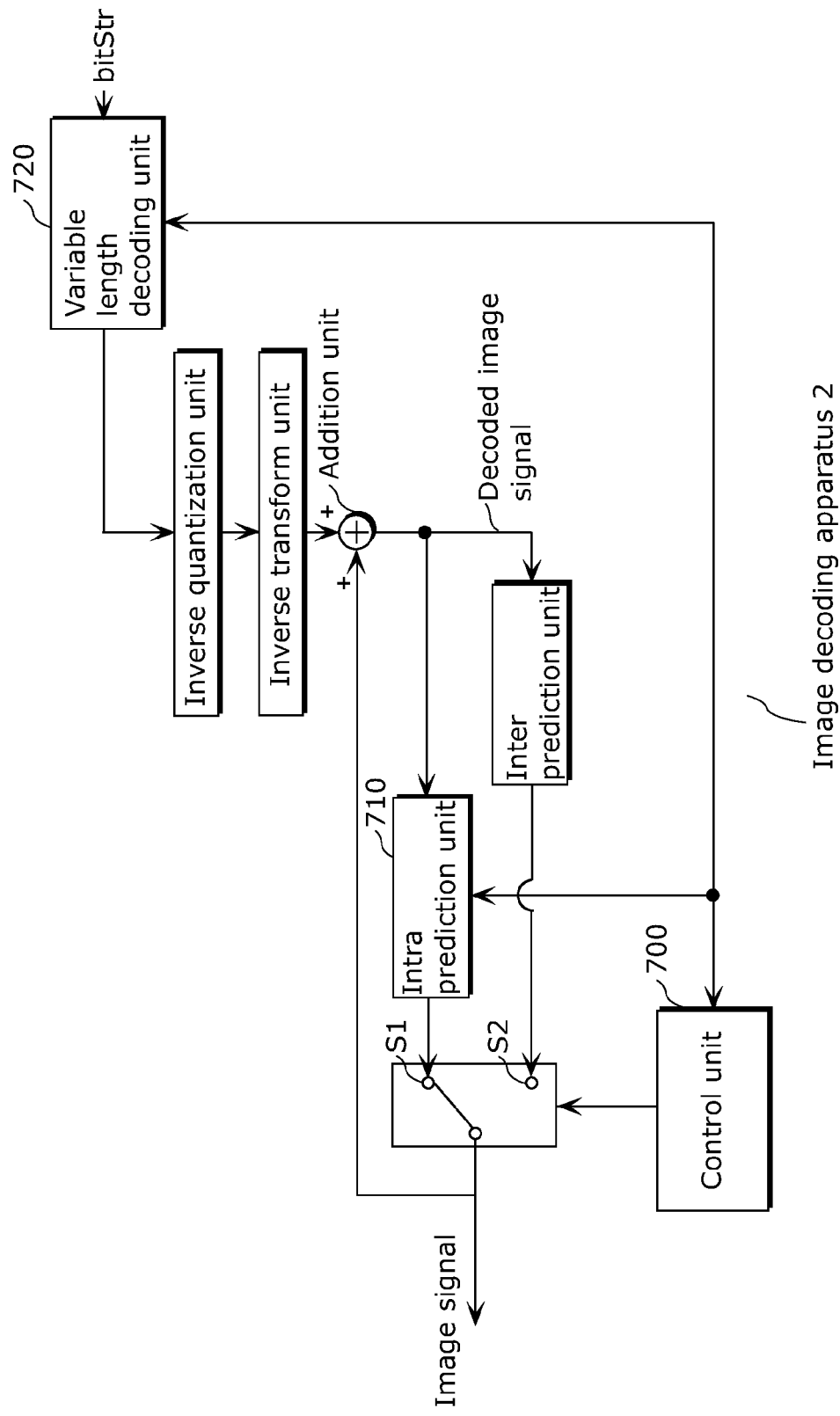
FIG. 60 is a block diagram of a structure of a decoding apparatus 2 according to Embodiment D2.

FIG. 60 is a functional block diagram of a decoding apparatus according to Embodiment D3.

The image decoding apparatus 2 includes: a variable length decoding unit 720, an inverse quantization unit, an inverse transform unit, an addition unit which synthesizes a prediction image and a difference value, an intra prediction unit 710, a control unit 700, etc.

The image decoding apparatus 2 is an apparatus which receives an input of a bit stream (bitStr), and outputs an image signal.

According to the present invention, the bit stream (bitStr) to be input is especially a part of the bit stream generated using the coding method according to Embodiment D1. A "coding mode number" "rem_intra_luma_pred_mode) is obtained, and a "decoding mode number" is reproduced.

The variable length decoding unit 720 performs operations inverse to operations by the variable length coding unit 120. In other words, the variable length decoding unit 720 receives an input of the bit stream, and obtains the "coding mode number" etc. from the bit stream according to the number of prediction modes (NumMPMCand). Furthermore, the variable length decoding unit 720 performs processing of obtaining the "decoding mode number" from the "coding mode number".

The intra prediction unit 710 performs approximately the same operations as operations by the intra prediction unit 110 in FIG. 52. According to the "decoding mode number", the intra prediction unit 710 predicts the pixel value of a current block that is a coding target block by utilizing a prediction pixel located in a direction specified by a mode.

The control unit 700 provides the variable length decoding unit 720 with information necessary for obtaining the decoding mode number. The necessary information in the decoding method according to the present invention may be "any information for reproducing a "decoding mode number" from a bit stream output in coding". For example, when the variable length decoding unit does not hold such information, a prediction mode array (candModeList) about the decoding target block (or an initial value of this list) is provided thereto. In addition, a bit string etc. output using entropy coding is provided for each predetermined unit associated with this block.

Figure 61:
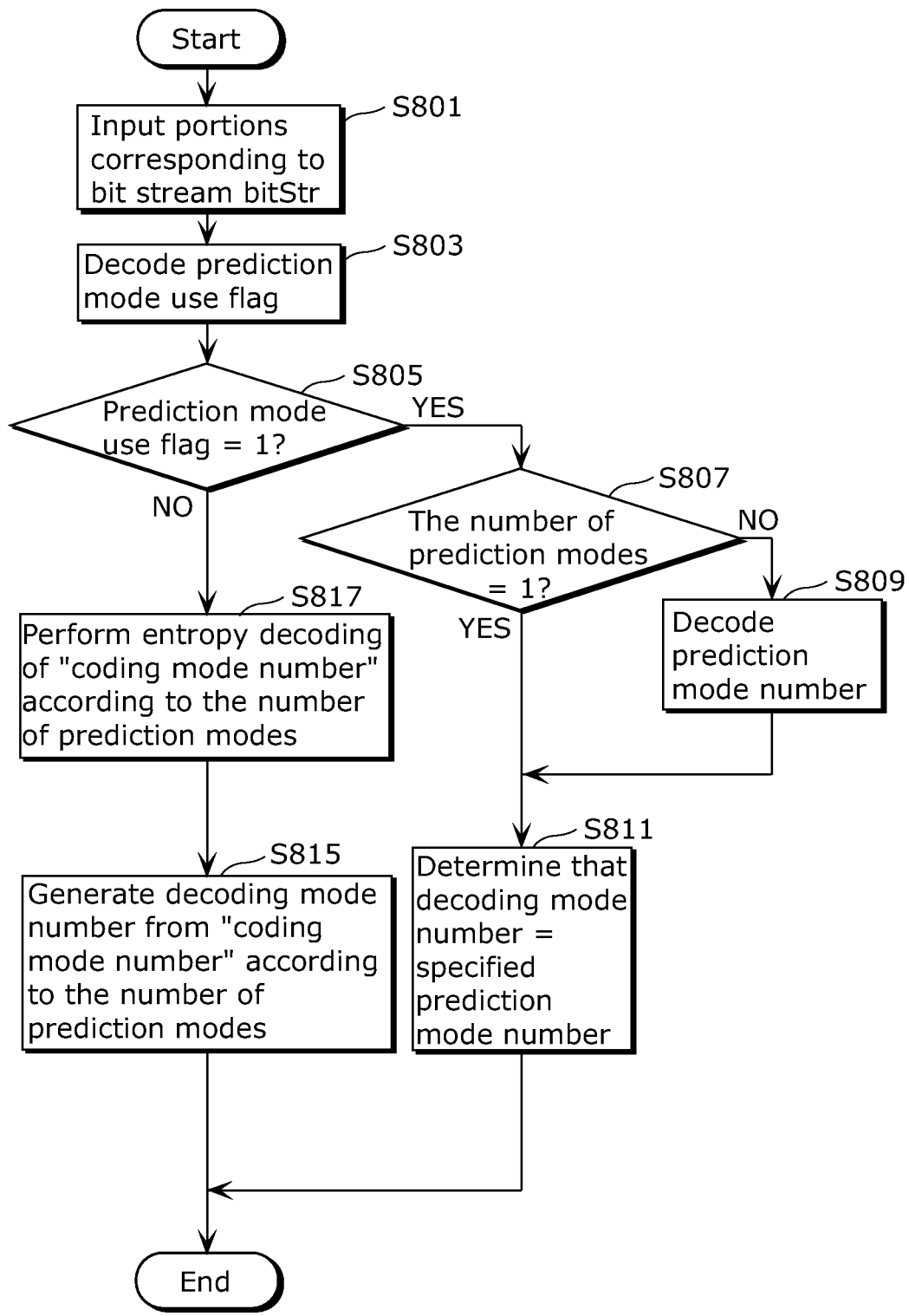
FIG. 61 is a flowchart of a decoding method according to Embodiment D2.

FIG. 61 is a flowchart of a method of decoding the "decoding mode number" (the 34-direction intra prediction mode shown in FIG. 49) executed by the image decoding apparatus in FIG. 60. A description is given assuming that each of these steps is executed by the variable length decoding unit 720.

First, the variable length decoding unit 720 receives an input of a corresponding part of the bit stream (bitStr) obtained by coding the decoding mode number for the current block using the coding method according to Embodiment D1 (S801). The corresponding part corresponds to a bit string obtained by performing entropy coding on one of a "prediction mode use flag" (prev_intra_luma_pred_flag), a "prediction mode number" (mpm_idx), and (3) a "coding mode number" (rem_intra_lyma_pred_mode) which are structured according to a prediction mode syntax (Prediction unit syntax) explained with reference to FIG. 57.

Next, the "decoding mode number" is decoded according to the syntax explained with reference to FIG. 57.

First, the value of the "prediction mode use flag" (prev_intra_luma_pred_flag) is reconstructed according to a predetermined entropy decoding method (S803). Hereinafter, unless specifically explained, the following descriptions, the words in the diagrams, and the values have the same meaning as those in the coding method according to Embodiment D1 and the descriptions about the syntax in FIG. 57. When the value of the "prediction mode use flag" is 1, the steps from S807 to S811 are executed to determine (S811), as the "decoding mode number", the value (candModeList [mpm_idx] of the element having the element number (mpm_idx) in the prediction mode array (candModeList), according to the value of the number of prediction modes (NumMPMCand).

Next, a description is given of a case where the prediction mode use flag shows that "the decoding mode number does not match the value of any one of the elements of the prediction mode array" (the case where the determination in S805 is NO).

First, the coding mode number is obtained from the bit string according to "the number of prediction modes" (S817). This obtainment process is inverse to the process in Step S217 in FIG. 53.

Figure 62:
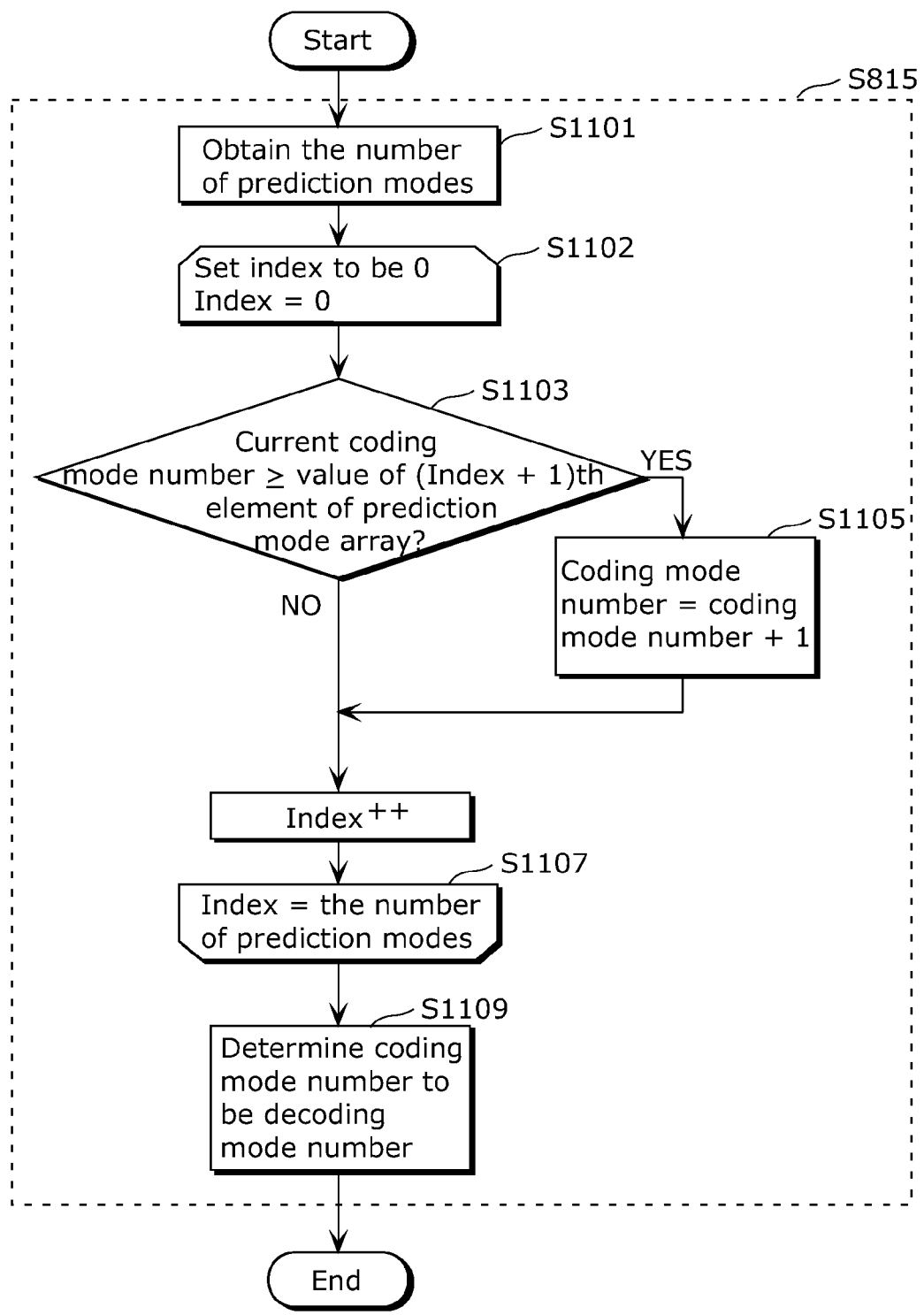
FIG. 62 is a flowchart for illustrating Step S815 in detail.

FIG. 62 is a flowchart for explaining Step S815 of FIG. 59 in detail. In this step, the "decoding mode number" is obtained from the "coding mode number" obtained in Step S817. The respective steps in FIG. 62 are executed as the steps inverse to the steps of obtaining the "coding mode number" from the "decoding mode number".

First, the number of prediction modes (NumMPSCand) is obtained (S1101). For example, when two effective values are obtained as elements of the prediction mode array, the value is 2.

Next, a loop from Step S1102 to S1107 is executed.

For example, when the number of prediction modes (Num-MPMCand) is 2, Step S1103 (and Step S1105) is (are) executed twice in total when the values of the indices are 0 and 1.

For example, when the number of prediction modes (Num-MPMCand) is 1 (when the number of elements having an effective value in the prediction mode array is 1), Step S1103 (and Step S1105) is (are) executed once.

First, a candidate index candIdx is set to 0 (Step S1102).

Next, the coding mode number obtained in Step S817 is compared with the value of the element specified by a value 0 of a candidate index candIdx in the prediction mode array (CandModeList) (the value of the first element candModeList [candIdx]) (S1103).

When the comparison in Step S1103 shows that the coding mode number is larger than or equal to the value of the first element candModeList [0] in the prediction mode array, the coding mode number is incremented by 1 (S1105). Here, the coding mode number is also incremented by 1 also in the case where the value of the coding mode number is the same as the value of the element candModeList [0] in the prediction mode array. The loop from S1102 to S1107 is repeated while incrementing the candidate index number candIdx by 1 until the comparison about all the candidate indices is completed.

Through this processing, the coding mode number is reconstructed into the decoding mode number according to the number of prediction modes. Here, reconstructing the "decoding mode number" from the "coding mode number" according to the number of prediction modes is equivalent to performing the process in Table 1 and Table 2 from the lowermost line to the uppermost line.

For example, when the number of prediction modes (the value of NumMPMCand) is 2, the associations between coding mode numbers and decoding mode numbers are as shown in Table 12. This table is for explaining an exemplary case where the value of the first element (having an index 0) of the prediction mode array is assumed to be "i" and the value of the second element (having an index 1) of the prediction mode array is assumed to be "j".

TABLE 12

(the number of prediction modes is 2) Associations between decoding mode numbers and coding mode numbers

| (d) Coding mode number (0 . . . 31) | 0 | 1 | i (candModeList Value of first candidate) | . . . | j (candModeList Value of second candidate) | . . . | 30 | 31 |
|---|---|---|---|---|---|---|---|---|
| S1105 | 0 | 0 | +1 | +1 | +1 | +1 | +1 | +1 |
| S1105 | 0 | 0 | 0 | 0 | +1 | +1 | +1 | +1 |
| (a) | 0 | 1 | Unnecessary | . . . | Unnecessary | . . . | 32 | 33 |

TABLE 12-continued (the number of prediction modes is 2) Associations between decoding mode numbers and coding mode numbers

| Decoding mode number 0 . . . 33 | candModeList [0] | candModeList [1] |
|---|---|---|

In addition, when the number of prediction modes (the value of NumMPMCand) is 1, the associations between coding mode numbers and decoding mode numbers are as shown in Table 13. This table is for explaining such associations in an exemplary case where the value of the -1th element (having an index 0) of the prediction mode array is assumed to be "i".

TABLE 13

(the number of prediction modes is 1) Associations between decoding mode numbers and coding mode numbers

| (d) Coding mode number (0 . . . 32) | 0 | 1 | 2 | . . . | i that matches value of first candidate | . . . | 30 | 31 | 32 |
|---|---|---|---|---|---|---|---|---|---|
| S1105 | 0 | 0 | 0 | 0 | +1 | +1 | +1 | +1 | +1 |
| (a) Decoding mode number 0 . . . 33 | 0 | 1 | 2 | . . . | unnecessary | | 31 | 32 | 33 |

In this way, the decoding apparatus and decoding method according to Embodiment D2 firstly switch the associations with CodeNum and the "coding mode numbers" according to the CAVLD scheme according to the numbers of prediction modes (or based on the numbers of prediction modes), and switch methods of associating the "coding mode numbers" with the binary arrays according to the CABAC scheme (S817). Furthermore, the associations between coding mode numbers and decoding mode numbers are switched according to the numbers of prediction modes (S815).

With the structure, it is possible to reconstruct the original "decoding mode number" from the bit stream according to Embodiment D1 generated by switching the schemes for coding the decoding mode number according to the number of prediction modes, with an increased coding efficiency.

Each of the coding control unit 100 in FIG. 52 and the control unit 700 in FIG. 60 is shown in relation with other processing units necessary for explaining only inputs and outputs of information to and from the coding control unit 100 or the coding control unit 700. However, the coding control unit 100 and the control unit 700 may input and output information necessary for other processing units via not-shown signal lines. The coding control unit or the control unit may be considered to be a controller for controlling the processing by each of the processing units.

Figure 63:
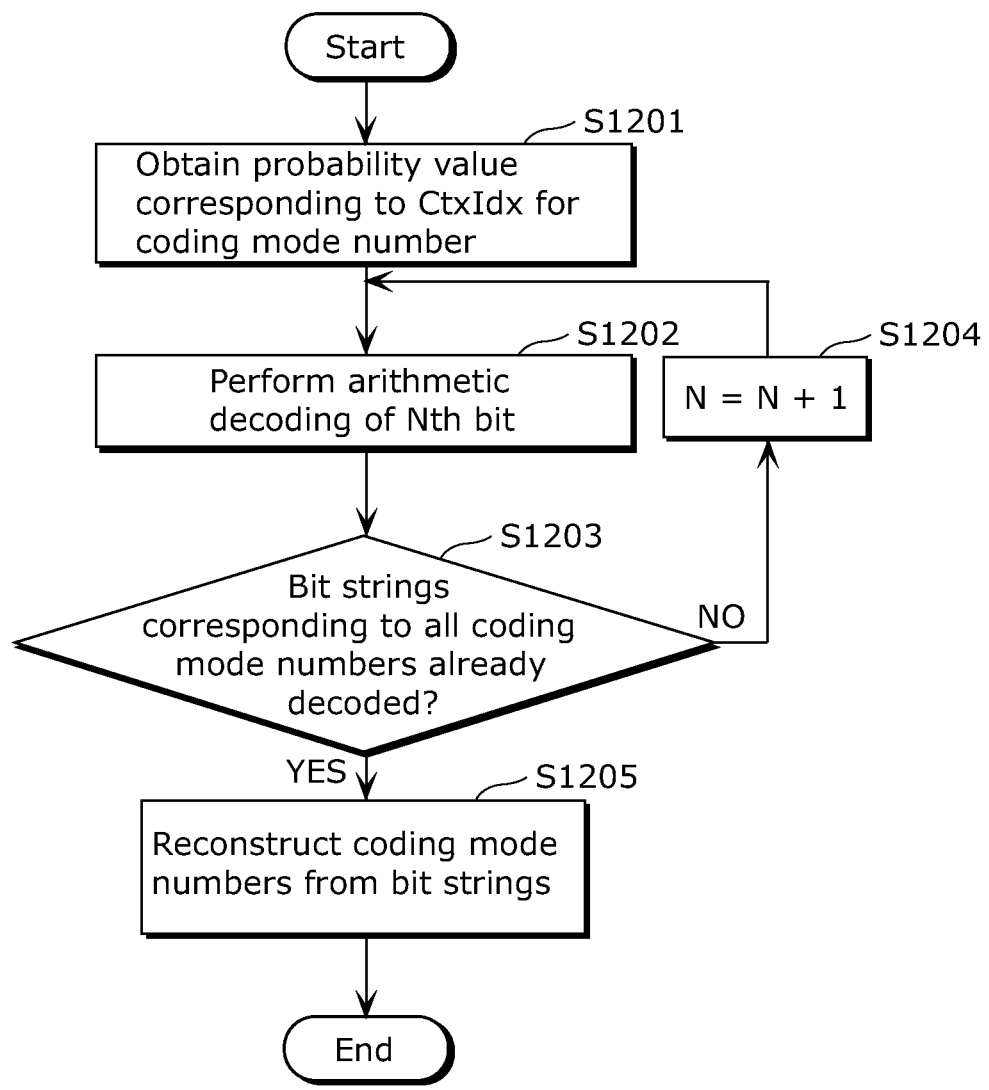
FIG. 63 is a flowchart of operations in an arithmetic decoding method according to Embodiment D2.

FIG. 63 is a flowchart of processes of a decoding method according to the above-described coding modes described in the present invention.

First, a probability value corresponding to CtxIdx for a coding mode number is obtained (S1201). This probability value is not updated at least when decoding one coding mode number. In other words, the same fixed value (pStateIdx) corresponding to CtxIdx is used in arithmetic decoding of an N-bit signal. Here, the fixed probability that is obtained here may be a value predetermined together with the coding side, or may be calculated and updated as indicated in Embodiment D1. More specifically, the fixed probability is determined according to the unit of processing in the process (Embodiment D1) at the coding side.

Sequentially from N=1, an arithmetic decoding process for the Nth bit string is performed (S1202). Here, the arithmetic decoding method using this fixed probability is described in detail in Embodiment D4.

When not all the bits are yet coded (NO in S1203), the number N is incremented by 1 (S1204), and a next bit is decoded. An exemplary case of making such a determination on as to whether or not the bit string is the last one is given here. When using binary code strings in FIG. 50, it is determined that a fixed bit length of 4 bits is used in the case of 17 modes, and that, in the case of 34 modes, 5 bits are always decoded and the sixth bit is additionally decoded when all the 5 bits are 1. When the decoding processes for all the binary bit strings are completed (YES in S1203), the coding mode numbers are reconstructed from the decoded binary bit strings (S1205). Reconstructing the coding mode numbers means obtaining the coding mode numbers which match the binary bit strings (FIG. 50) used in the coding.

When the binary bit strings are modified as shown in Variation of Embodiment D1 (for example, in (b) or (c) of FIG. 57), it is possible to reconstruct the accurate coding mode numbers by referring to the modified binary bit strings and their indices, and the corresponding coding mode numbers.

In comparison with the conventional decoding method, this method enables high-speed calculations because the loop in this method are composed only of S1202 and not include any probability value obtainment step and update step. Here, selections of fixed probability values are important in order not to decrease the coding efficiency. The fixed probability derivation method is assumed to be the same as the derivation method at the time of coding described in Embodiment D1 (for example, the method described with reference to FIG. 56). In addition, when a fixed probability is written in a bit stream, the value is decoded, and the decoded value is used as the probability obtained as described with reference to FIG. 63 (S1201). Decoding of information written in a bit stream is described in detail in Embodiment D5.

With the structure, it is possible to increase the processing speed of decoding of coding mode numbers and to suppress decrease in the coding efficiency, or accurately decode the bit stream with an increased coding efficiency.

Variation of Embodiment D2

Variation of Embodiment D2 described above is described. Embodiment D2 is intended to perform decoding by setting a fixed probability value in advance or decoding based on a calculation result. However, Variation of Embodiment D2 describes an example of modifying the aforementioned binarization method so that the bypass mode in the conventional arithmetic decoding can be used for decoding assuming that the fixed probability=50%. It is to be noted that portions that are not specifically described here are the same as in Embodiment D2.

Figure 64:
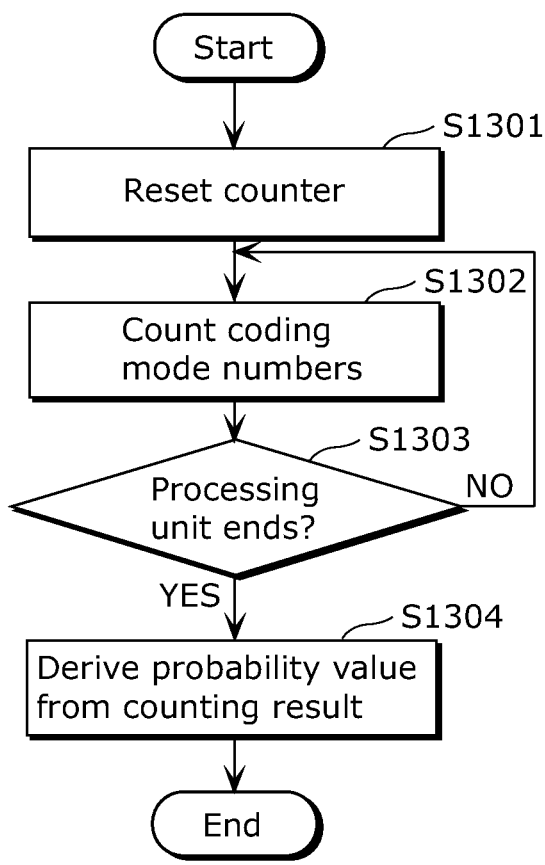
FIG. 64 is a flowchart of exemplary processes for deriving a fixed probability value according to Embodiment D2.

More specifically, the decoding method is a method of generating, at the decoding side, (b) and (c) of FIG. 57 shown in Embodiment D1. FIG. 64 is a flowchart of exemplary operations in this case. This corresponds to (a) of FIG. 57. First, an occurrence frequency counter is reset (set to 0) (S1301). Next, the decoded coding mode numbers are counted (S1302). More specifically, the frequencies of the indices of the decoded coding mode numbers are counted. Next, whether or not a current processing unit is shown by a counter is determined (S1303). When the processing unit is not yet completed, the next coding mode number is counted (NO in S1303). On the other hand, when the processing unit is reached (YES in S1303), a table is determined which is for determining a new binarization method for a sequential order higher than the counting result. For example, when the coding mode numbers from 0 to 15 are arranged in the descending order of their selection frequencies, it is possible to classify, based on the occurrence probabilities of the binary symbols in binary codes associated with the respective coding mode numbers, into: a first set (601) of coding mode numbers each associated with a binary code string composed of 1 with an occurrence probability of 50% and 0 with the same occurrence probability of 50%; a second set (602) of coding mode numbers each associated with a binary code string including 1 with an occurrence probability of 25%; a second set (603) of coding mode numbers each associated with a binary code string including 0 with an occurrence probability of 25%; a coding mode number (604) associated with a binary code string composed only of 0 with an occurrence probability of 100%; and a coding mode number (605) associated with a binary code string composed only of 1 with an occurrence probability of 100%. Alternatively, as shown in (c) of FIG. 57, it is possible to classify into: a first set (611) of coding mode numbers each associated with a binary code string composed of 1 with an occurrence probability of 50% and 0 with the same occurrence probability of 50%; a second set (612) of coding mode numbers each associated with a binary code string including 0 with an occurrence probability of 25% or a binary code string including 1 with an occurrence probability of 25% such that one of the binary code strings including 0 with the occurrence probability of 25% is placed at the top of the second set; a coding mode number (613) associated with a binary code string composed only of 1 with an occurrence probability of 100%; and a coding mode number (614) associated with a binary code string composed only of 0 with an occurrence probability of 100%.

Here, the processing unit may be a coding block (a unit of processing in coding and decoding), or a combination of coding blocks, or a larger processing unit called as a slice. Any other unit in the coding method used to generate a bit stream is possible. It is possible to increase the coding efficiency by using finer units of processing, while it is possible to reduce the processing amount by using larger units of processing.

Alternatively, it is also good to allow the coding side and the decoding side to share the binarization result designed in this step in advance. This provides an advantage of being able to reduce the processing amount at the decoding side, and provides an advantage of not requiring additional coding amount when performing the same processing at the decoding side.

Although the case of 17 modes has been described above, a binarization table is determined also in the case of 34 modes.

The conventional variable length coding involves (i) coding for assigning a shorter code to a code having a higher signal occurrence frequency (for example, Huffman codes) or (ii) arithmetic coding (such as context-adaptive arithmetic coding) involving updates of an occurrence probability according to a signal occurrence frequency. However, this embodiment is characterized by changing codes such that the occurrence frequencies are made to be even (made to be closer to 50%). According to this approach, it is possible to reduce the processing amount and to suppress decrease in the coding efficiency. According to Variation of this embodiment, it is possible to perform accurate decoding even in the case of a bit stream generated in the manner as shown above.

Embodiment D4

This embodiment is intended to describe an arithmetic decoding method utilizing fixed probabilities for use in the present invention.

This processing is described in detail with reference to FIGS. 65 and 66.

In FIG. 65, (a) is a flowchart of context-adaptive arithmetic coding processes (extracted from Non-patent Literature 2). The same operations as shown in Non-patent Literature 2 are performed unless particularly explained.

In the arithmetic decoding, a context (ctxIdx) determined based on the type of a signal is firstly input.

Next, a derivation value qCodIRangeIdx is calculated from a parameter codIRange showing an internal state of the arithmetic decoding apparatus at a current time point, and a state value pStateIdx corresponding to ctxIdx is obtained. Based on these two values, codIRangeLPS is obtained with reference to a table (rangeTableLPS). Here, codIRangeLPS shows a value that is a parameter showing an internal state of the arithmetic decoding apparatus in the case where an LPS (showing the one of the symbols 0 and 1 which has the lower occurrence probability) occurs with respect to a first parameter codIRange showing the internal state of the arithmetic decoding apparatus. In addition, a value obtained by subtracting the aforementioned codIRangeLPS from a current codIRange is preset to codIRange (Step SB01). Next, the calculated codIRange is compared with a second parameter codIOffset indicating an internal state of the arithmetic decoding apparatus (Step SB02). When codIOffset is larger than or equal to codIRange (YES in SB02), it is determined that the symbol of an LPS has occurred. Then, a value different from valMPS is set to binVal that is a decoding output value, specifically, the different value (0 in the case of valMPM=1, and 1 in the case of valMPM=0) is different from valMPS (indicating the value of the other one of the symbols 0 and 1 which has the higher occurrence probability). In addition, a value obtained by subtracting codIRange is set to the second parameter codIOffset indicating the internal state of the arithmetic decoding unit, and a value calculated in Step SB01 is set to the first parameter codIRange because the LPS has occurred (Step SB03). Here, when the value of pStateIdx that is a state value corresponding to the aforementioned ctxIdx is 0 (YES in Step SB05), it is shown that the probability of the LPS exceeds the probability of the MPS. Thus, valMPM is switched (to 0 in the case of valMPM=1, and to 1 in the case of valMPM=0) (Step SB06). On the other hand, when the value of pStateIdx is 0 (NO in Step SB05), the value of pStateIdx is updated based on a transform table transIdxLPS in the case where the LPS has occurred (Step SB07).

In addition, when codIOffset is smaller (NO in SB02), it is determined that the symbol of an MPS has occurred, valMPS is set to binVal that is a decoding output value, and the value of pStateIdx is updated based on the transform table transIdxMPS in the case where the MPS has occurred (Step SB04).

Lastly, normalization process (RenormD) is performed (Step SB08), and arithmetic decoding is terminated.

The flow of operations in the case of performing arithmetic decoding based on fixed probabilities according to the present invention is described with reference to the flowchart of (b) of FIG. 65.

In the arithmetic decoding, a context (ctxIdx) determined based on the type of a signal is firstly input, and a pStateIdx value derived in the step of deriving the fixed probability is obtained.

Next, a derivation value qCodIRangeIdx is calculated from a parameter codIRange showing an internal state of the arithmetic decoding apparatus at a current time point, and a state value pStateIdx corresponding to ctxIdx is obtained. Based on these two values, codIRangeLPS is obtained with reference to a table (rangeTableLPS). Here, codIRangeLPS shows a value that is a parameter showing an internal state of the arithmetic decoding apparatus in the case where an LPS (showing the one of the symbols 0 and 1 which has the lower occurrence probability) occurs with respect to a first parameter codIRange showing the internal state of the arithmetic decoding apparatus.

In addition, a value obtained by subtracting the aforementioned codIRangeLPS from a current codIRange is preset to codIRange (Step S1401). Next, the calculated codIRange is compared with a second parameter codIOffset indicating an internal state of the arithmetic decoding apparatus (Step S1402). When codIOffset is larger than or equal to codIRange (YES in S1402), it is determined that the symbol of an LPS has occurred. Then, a value different from valMPS is set to binVal that is a decoding output value, specifically, the different value (0 in the case of valMPM=1, and 1 in the case of valMPM=0) is different from valMPS (indicating the value of the other one of the symbols 0 and 1 which has the higher occurrence probability). In addition, a value obtained by subtracting codIRange is set to the second parameter codIOffset indicating the internal state of the arithmetic decoding unit, and a value calculated in Step S1401 is set to the first parameter codIRange because the LPS has occurred (Step S1403). In addition, when codIOffset is smaller (NO in S1402), it is determined that the symbol of the MPS has occurred, and valMPS is set to binVal that is a decoding output value (Step S1404).

Lastly, a normalization process (RenormD) is performed (Step S1405), and arithmetic decoding is terminated.

Figure 66:
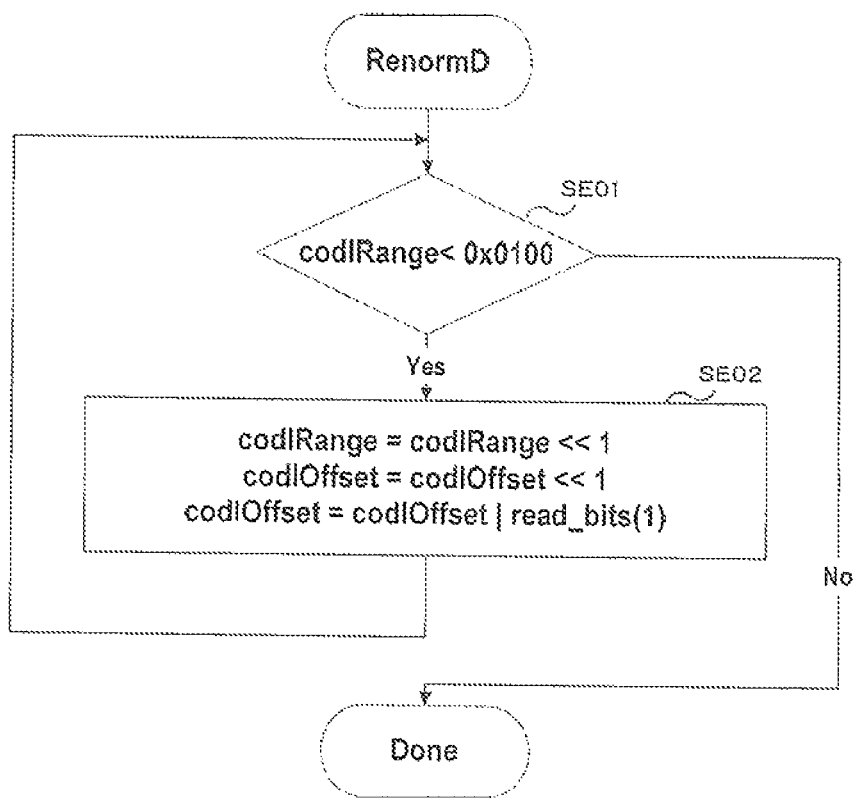
FIG. 66 is a flowchart of normalization processes of an arithmetic decoding method according to the present invention.

FIG. 66 is a flowchart specifically explaining the normalization processes (RenormD) shown in Step S808 of (a) of FIG. 65 and Step S1405 of (b) of FIG. 65. This flowchart is extracted from Non-patent Literature 1, and is the same as the one shown in Non-patent Literature 1 unless specifically explained.

When the first parameter codIRange indicating an internal state of the arithmetic decoding apparatus is smaller than 0x100 (in hexadecimal representation: 256 (in decimal numbers)) in arithmetic decoding (YES in Step SE01), codIRange is shifted to the left (doubled), the second parameter codIOffset indicating an internal state of the arithmetic decoding apparatus is shifted to the left (doubled), and one bit is read out from a bit stream. When the read-out bit is 1, 1 is further added thereto, while the raw (doubled) value is set when the read-out bit is 0 (SE02).

This processing is terminated when codIRange reaches or exceeds 256 at last (NO in Step SE01).

By performing the above-described processing, the signal coded using a fixed probability is appropriately reconstructed.

In this way, it is possible to accurately decode the signal coded with an increased coding efficiency. More specifically, as shown in Embodiment D1, it is possible to perform decoding based on an occurrence frequency irrespective of whether or not the occurrence frequency is 50%, and to thereby increase the coding efficiency.

In other words, it is possible to reduce the processing amount, and to increase the coding efficiency.

The image decoding apparatus and the image decoding method according to Embodiment D4 of the present invention make it possible to accurately decode signals coded with an increased coding efficiency as described above.

Furthermore, it is possible to facilitate estimation of processing time by preparing a table in advance. Thus, for example, such advantages can be provided by a high-speed calculation circuit necessary for real-time reproduction of high-resolution videos.

Embodiment D5

This embodiment is intended to describe methods of recording, as the header information of streams, fixed probabilities used in Embodiment D1 and Embodiment D3 and binarization tables used in Variation of Embodiment D1 and Variation of Embodiment D3, and coding and decoding the header information. The structure of data to be held is described.

Figure 67:
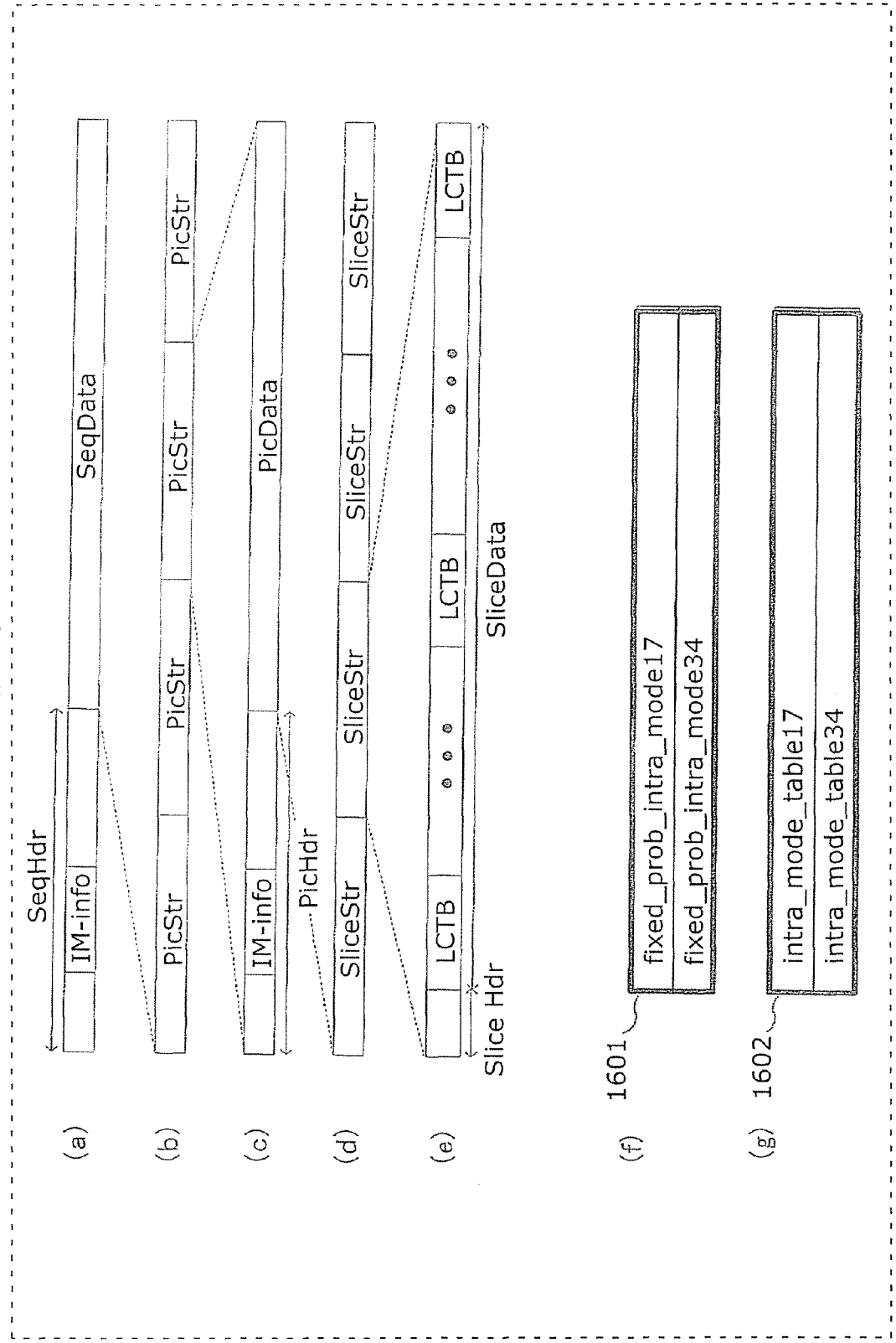
FIG. 67 is composed of schematic diagrams for illustrating data structures according to the present invention; specifically, (a) is a diagram showing an exemplary structure of a code string of a coded image corresponding to a video sequence, (b) is a diagram showing an exemplary structure of the data of the sequence, (c) is a diagram showing an exemplary structure of the signal of a picture, (d) is a diagram showing an exemplary structure of the data of the picture, (e) is a diagram showing an exemplary structure of the signal of a slice, (f) is an example of a syntax that shows an exemplary structure of data including header parameters, and (g) is an example of a syntax that shows an exemplary structure of the data including the header parameters.

FIG. 67 is composed of structural diagrams of a code string according to an image coding method of the present invention. FIG. 67 is composed of structural diagrams of the output code string according to the image coding method of the present invention. In FIG. 67, (a) shows a coded signal corresponding to a video sequence composed of at least one picture, and composed of sequence data SeqData that is the all data of each of the at least one picture and a sequence header SeqHdr that is the data common to all of the at least one picture.

Coding mode number related information IM-info in this embodiment is, for example, information required to reconstruct fixed probabilities for use in Embodiment D1 and Embodiment D3 and binarization tables for use in Variation of Embodiment D1 and Variation of Embodiment D3.

The sequence header may include the coding mode number related information IM-info. Normally, the coding mode number related information is held on a picture-by-picture basis. However, it is possible to reduce codes per picture by storing the coding mode number related information in the sequence header because the distance in the case of a sequence having a low-delay structure is always 1.

In FIG. 67, (b) shows the structure of the sequence data SeqData. This sequence data SeqData is composed of picture signals PicStr that are coded picture signals.

In FIG. 67, (c) shows the structure of one of the picture signals PicStr. This picture signal PicStar is composed of picture data PicData that is data of a whole picture and a picture header PicHdr that is data common in the whole picture. For example, the picture header PicHdr may include the coding mode number related information IM-info. In FIG. 67, (d) shows the structure of the picture data PicData. This picture data PicData includes a slice signal SliceStr that is a coded signal of a slice composed of a set of blocks.

In FIG. 67, (e) shows the structure of the slice signal SliceStr.

This slice signal SliceStr is composed of slice data SliceData that is the data of a whole slice and a slice header SliceHdr that is the data common in the whole data of the slice. The slice header SliceHdr may include the coding mode number related information IM-info. In FIG. 67, (d) shows the structure of picture data PicData. This picture data PicData may include a picture. In this way, it is possible to accurately decode the received coded signal even when appropriate switching is performed on a per slice data SliceData basis.

Here, when the sequence data SeqData includes a plurality of picture signals PicStr, it is also good to include such coding mode number related information IM-info only for one or some of PicHdr, instead of including such coding mode number related information IM-info for each of PicHdr. Likewise, when the picture data PicData includes a plurality of slice signals SliceStr, it is also good to include such coding mode number related information IM-info only for one or some of slice headers SliceHdr, instead of including such coding mode number related information IM-info for each of the slice headers SliceHdr. In the case where the details of the coding mode number related information IM-info is common among the slices, it is possible to suppress increase in the number of bits that is caused if coding mode number related information IM-info is repeatedly included, by substituting the coding mode number related information IM-info of the other slice header SliceHdr when the slice header SliceHdr does not include any coding mode number related information IM-info as shown in (e) of FIG. 67.

More specifically, it is possible to directly code, as the coding mode number related information IM-info, the values fixed_prob_intra_mode17 and fixed_prob_intra_mode34 for deriving fixed probabilities for 17 modes and 34 modes as shown in 1601 of (f) of FIG. 67. Here, these parameters that are two values m and n shown by Expression 1 may be written in a stream as functions of quantization parameters.

$$P=(m*QP)/16+n \qquad \text{(Expression 1)}$$

These binary parameters are handled as initial parameters at the time of arithmetic coding and decoding to be updated in a context adaptive manner. These binary parameters are highly compatible with the conventional arithmetic coding method, and therefore reduction in circuit modification scale can be expected.

In addition, the same probability values for 17 modes and 34 modes may be assigned.

Alternatively, it is also good to directly code, as the coding mode number related information IM-info, coding mode numbers as shown in 1602 of (g) of FIG. 67 and the values intra_mode_table17 and intra_mode_table34 (for 17 modes and 34 modes, respectively) for deriving tables of binary strings. The tables of binary strings may be directly coded. However, such direct coding produces too much information. Thus, for example, it is also good to prepare some tables in advance according to the methods shown in Variations of Embodiments D1 and D3, and code indices for switching the tables. Alternatively, it is also good to separately transmit the header portions and the data portions other than the header portions when transmitting packets or the like that are small data units instead of a bit stream composed of a continuous code string. In this case, there is no possibility that the header portion and the data portion are integrated into a bit stream as shown in FIG. 67. However, the concept using packets is the same as the concept using the bit stream described with reference to FIG. 66. This is because, although these portions are not included in the bit stream, the header portion and the data portion corresponding to the header portion are transmitted in separate packets when the header portion and the data portion are transmitted in a non-sequential manner.

In addition, the code string coded according to the aforementioned approach is decoded according to the decoding method of the present invention. The procedure of the decoding method is described below. First, the coding mode number related information IM-info included in the sequence header SeqHdr is obtained, and each of information items is stored. Next, the coding mode number related information IM-info included in the picture header PicHdr is obtained, and each of information items is stored. Here, when some or all of the coding mode number related information IM-info are not included therein, the information included in the sequence header SeqHdr is stored therein. Likewise, the coding mode number related information IM-info included in the slice header SliceHdr is obtained, and each of the information items is updated.

In this way, it is possible to decode the code string more accurately.

As described above, an image decoding method according to an aspect of the present invention is an image decoding method of decoding coded image data, including an arithmetic decoding method of decoding a coding mode number. The arithmetic decoding method includes: obtaining a probability for decoding a binary signal string stored in a bit stream and associated with a coding mode number; and performing arithmetic decoding on a first binary signal based on the obtained probability, and performing arithmetic decoding on a second binary signal without updating an occurrence probability using a decoding symbol. This makes it possible to reduce the processing amount.

In addition, for example, symbol occurrence probabilities for use in the arithmetic decoding method include a symbol occurrence probability that is other than 50%. This makes it possible to increase the coding efficiency.

In addition, for example, the probabilities for use in the arithmetic decoding method are obtained from the bit stream. This makes it possible to increase the coding efficiency.

In addition, for example, an image decoding method according to the present invention is an image decoding method of decoding coded image data, including an arithmetic decoding method of decoding a coding mode number. The arithmetic decoding method includes performing arithmetic decoding on a first binary signal according to a method assuming that the binary signal string has an occurrence probability of 50%, and performing arithmetic decoding on a second binary signal without updating an occurrence probability using a decoding symbol, when decoding a binary signal string stored in a bit stream and associated with a coding mode number. This makes it possible to reduce the processing amount.

In addition, for example, the binary signal string is determined such that each of binary signals 0 and 1 has an occurrence probability of approximately 50%. This makes it possible to increase the coding efficiency In addition, for example, the image decoding method further includes deriving an association table of binary signal strings and coding mode numbers. This makes it possible to increase the coding efficiency.

In addition, for example, the image decoding method further includes obtaining, from the bit stream, the association table of the binary signal strings and the coding mode numbers. This makes it possible to increase the coding efficiency.

In addition, an image coding method according to an aspect of the present invention is an image coding method of coding image data, including an arithmetic coding method of coding a coding mode number. The arithmetic coding method includes: obtaining a probability for coding a binary signal string corresponding to a coding mode number; and performing arithmetic decoding on a first binary signal based on the obtained probability, and performing arithmetic decoding on a second binary signal without updating an occurrence probability using a coding symbol. This makes it possible to reduce the processing amount.

In addition, for example, symbol occurrence probabilities for use in the arithmetic coding method include a symbol occurrence probability that is other than 50%. This makes it possible to increase the coding efficiency.

In addition, for example, the probabilities for use in the arithmetic coding method are written in the bit stream. This makes it possible to increase the coding efficiency.

In addition, for example, an image coding method of coding image data includes arithmetic coding method of coding a coding mode number. The arithmetic coding method includes: performing arithmetic coding on a first binary signal according to a method assuming that the binary signal string has an occurrence probability of 50%, and performing arithmetic coding on a second binary signal without updating an occurrence probability using a coding symbol, when coding a binary signal string associated with a coding mode number. This makes it possible to reduce the processing amount.

In addition, for example, the binary signal string is determined such that each of binary signals 0 and 1 has an occurrence probability of approximately 50%. This makes it possible to increase the coding efficiency.

In addition, for example, the image decoding method further includes deriving an association table of binary signal strings and coding mode numbers. This makes it possible to increase the coding efficiency.

In addition, for example, the image coding method further includes writing, in the bit stream, the association table of the binary signal strings and the coding mode numbers. This makes it possible to increase the coding efficiency.

(Underlying Knowledge E Forming Basis of the Present Invention)

Context Adaptive Binary Arithmetic Coding (CABAC) has been conventionally used for image coding (for example, Patent Literature 1 and Patent Literature 2). An image coding apparatus which supports CABAC codes an image on a block-by-block basis. The image coding apparatus adaptively codes a coding target block according to the state of blocks that surround the coding target block.

More specifically, the image coding apparatus which supports CABAC codes the data of the coding target block using probability information indicating the occurrence probability (the occurrence probability of a symbol) of the data. Then, the arithmetic coding apparatus updates probability information according to the data of the coding target block. Then, the arithmetic coding apparatus codes the data of the next coding target block using the updated probability information. In this way, the image coding apparatus codes the image on a block-by-block basis while updating the probability information.

In this way, the image coding apparatus is capable of coding the image according to the image characteristics. Accordingly, the coding efficiency is increased.

In addition, the image decoding apparatus decodes the data of the decoding target block using the probability information in the same manner as the image coding apparatus. The image decoding apparatus updates the probability information according to the data of the decoding target block. Then, the image decoding apparatus decodes the data of the next decoding target block using the updated probability information. In the manner as described, the image decoding apparatus decodes the image on a block-by-block basis while updating the probability information.

In this way, the probability information in the decoding side is updated in the same manner as in the coding side. Accordingly, there is no need to code and decode the updated probability information. For this reason, the high coding efficiency is maintained.

However, the conventional image coding method requires that the probability information is updated each time a block is coded, and thus requires a large processing amount. Furthermore, such update of probability information does not always increase the coding efficiency.

For example, in the case of a particular type of a data item, the occurrence probability of the data may not change. The update of the probability information in such a case decreases the processing efficiency. In addition, for example, probability information may be updated using a peculiar data item of a part of an image. This may decrease the coding efficiency.

On the other hand, Patent Literature 2 shows a bypass mode in which a probability fixed at 50% is used. However, when the actual occurrence probability of a certain data item is different from the fixed probability of 50%, the coding efficiency is decreased.

In view of this, the present invention aims to provide an image coding method which allows image coding using appropriate probability information with suppressed increase in the processing amount and/or an image decoding method which allows image decoding using the appropriate probability information with suppressed increase in the processing amount.

In order to solve the aforementioned problems, an image coding method according to the present invention is an image coding method of coding an image on a block-by-block basis, including: performing arithmetic coding on the image on a block-by-block basis, selectively using variable probability information and fixed probability information which indicate occurrence probabilities of respectively corresponding data items while updating only the variable probability information, so as to generate a coded stream; initializing the fixed probability information using a fixed value; and adding, to the coded stream, fixed value information indicating the fixed value.

In addition, an image decoding method according to the present invention is an image decoding method of decoding an image included in a coded stream on a block-by-block basis, including: performing arithmetic decoding on the image on a block-by-block basis, selectively using variable probability information and fixed probability information which indicate occurrence probabilities of respectively corresponding data items while updating only the variable probability information; obtaining, from the coded stream, fixed value information for initializing the fixed probability information; and initializing the fixed probability information using a fixed value indicated by the fixed value information.

According to the present invention, increase in the processing amount to code and decode an image is suppressed, and appropriate probability information is used therein.

Hereinafter, embodiments of the present invention are described in detail with reference to the Drawings. Each of the embodiments described below shows a preferred specific example of the present invention. The numerical values, shapes, materials, structural elements, the arrangement and connection of the structural elements, steps, the processing order of the steps etc. shown in the following embodiments are mere examples, and therefore do not limit the present invention. The present invention is defined only by the scope of the Claims. Therefore, among the structural elements in the following embodiments, the structural elements not recited in any one of the independent Claims defining the most generic concept of the present invention are not necessarily required to achieve the aim of the present invention. Such optional structural elements are described as structural elements of corresponding ones of preferred embodiments.

Embodiment E1

Figure 68:
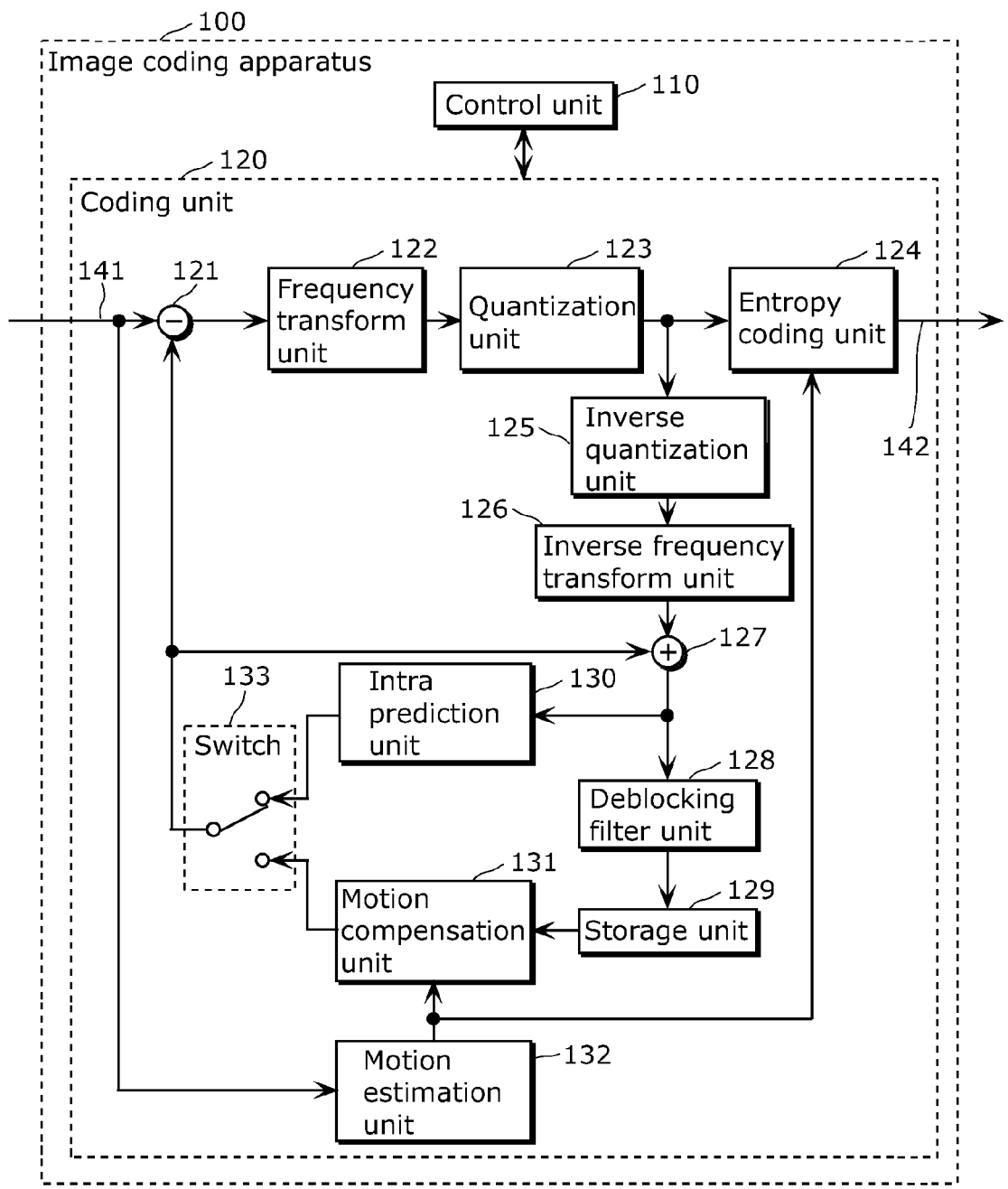
FIG. 68 is a diagram of a first example of a structure of an image coding apparatus according to Embodiment E1.

FIG. 68 is a diagram of a structure of an image coding apparatus according to Embodiment E1. The image coding apparatus 100 shown in FIG. 68 includes a control unit 110 and a coding unit 120. The coding unit 120 includes: a subtraction unit 121, a frequency transform unit 122, a quantization unit 123, an entropy coding unit 124, an inverse quantization unit 125, an inverse frequency transform unit 126, an addition unit 127, a deblocking filter unit 128, a storage unit 129, an intra prediction unit 130, a motion compensation unit 131, a motion estimation unit 132, and a switch 133.

As shown in FIG. 68, the coding unit 120 codes an image 141 on a block-by-block basis to generate a coded stream 142. At this time, the subtraction unit 121 of the coding unit 120 subtracts a pixel block composed of pixel values in a prediction image, from a pixel block composed of pixel values in the image 141. The frequency transform unit 122 transforms the pixel block resulting from the subtraction into a coefficient block composed of frequency components. The quantization unit 123 quantizes the coefficient block generated by the frequency transform unit 122.

On the other hand, the motion estimation unit 132 estimates a motion vector using the pixel block of the image 141. Next, the entropy coding unit 124 generates a coded stream 142 by performing entropy coding on a prediction type, the motion vector, a prediction mode (an intra prediction mode), a quantization parameter, a quantized coefficient block, etc.

In addition, the inverse quantization unit 125 performs inverse quantization on the quantized coefficient block. Then, the inverse frequency transform unit 126 transforms the coefficient block already subjected to the inverse quantization into a pixel block. Next, the addition unit 127 adds the pixel block of the prediction image to the pixel block generated by the inverse frequency transform unit 126. The deblocking filter unit 128 removes block distortion from the pixel block generated by the addition unit 127, and stores the resulting block as a reference image to the storage unit 129.

The intra prediction unit 130 performs intra-picture prediction (intra prediction) using the pixel block generated by the addition unit 127, according to an intra prediction mode. The motion compensation unit 131 performs inter-picture prediction (inter prediction) using a reference image in the storage unit 129 and a motion vector. The switch 133 inputs the pixel block of the prediction image obtained through intra prediction or inter prediction to the subtraction unit 121 and the addition unit 127.

In addition, the control unit 110 controls the coding unit 120. For example, the control unit controls parameters based on the amount of data of a coded stream 142.

The image coding apparatus 100 codes the image 141 according to the aforementioned operations. The image coding apparatus 100 reduces the amount of data of the coded stream 142 by performing various kinds of processes such as frequency transform, quantization, intra prediction, inter prediction, and entropy coding.

Figure 69:
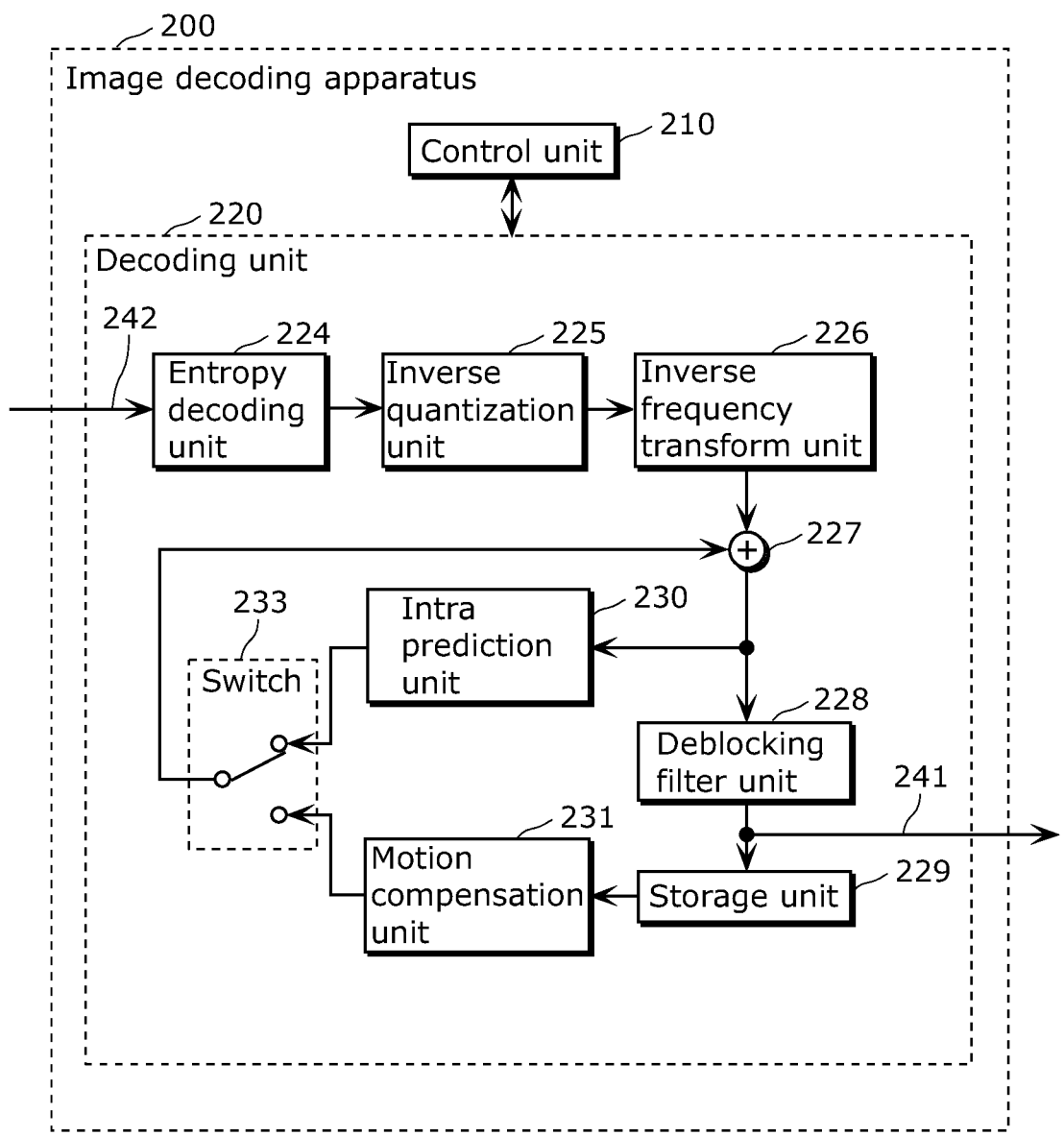
FIG. 69 is a diagram of a first example of a structure of an image decoding apparatus according to Embodiment E1.

FIG. 69 is a diagram of a structure of an image decoding apparatus corresponding to the image coding apparatus 100 shown in FIG. 68. The image decoding apparatus 200 shown in FIG. 69 includes a control unit 210 and a decoding unit 220. The decoding unit 220 includes: an entropy decoding unit 224, an inverse quantization unit 225, an inverse frequency transform unit 226, an addition unit 227, a deblocking filter unit 228, a storage unit 229, an intra prediction unit 230, a motion compensation unit 231, and a switch 233.

As shown in FIG. 69, the decoding unit 220 decodes an image 241 included in a coded stream 242 on a block-by-block basis. At this time, the entropy decoding unit 224 of the decoding unit 220 performs entropy decoding on the coded stream 242 to obtain a prediction type, a motion vector, an intra prediction mode, a quantization parameter, a quantized coefficient block, etc.

The control unit 210 transforms the prediction type, the motion vector, the intra prediction mode, the quantized parameter, etc. to have forms that can be processed by the respective processing units of the decoding unit 220. The control unit 210 controls operations by the decoding unit 220.

The inverse quantization unit 225 of the decoding unit 220 performs inverse quantization on the quantized coefficient block. Then, the inverse frequency transform unit 226 transforms the coefficient block already subjected to the inverse quantization into a pixel block.

The addition unit 227 adds the pixel block of the prediction image to the pixel block generated by the inverse frequency transform unit 226. The deblocking filter unit 228 removes block distortion from the pixel block generated by the addition unit 227. Then, the deblocking filter unit 228 stores a reference image composed of pixel blocks into the storage unit 229. The deblocking filter unit 228 also outputs the image 241 composed of the pixel blocks.

When a current prediction type is an intra prediction, the intra prediction unit 230 performs intra prediction using the pixel block generated by the addition unit 227, according to the intra prediction mode. When a current prediction type is an inter prediction, the motion compensation unit 231 performs inter prediction using the motion vector and the reference image in the storage unit 229. The switch 233 inputs the pixel block of the prediction image obtained through intra prediction or inter prediction to the addition unit 227.

The image decoding apparatus 200 decodes the image 241 included in the coded stream 242 on a block-by-block basis, by performing operations corresponding to the operations performed by the image coding apparatus 100.

Figure 70:
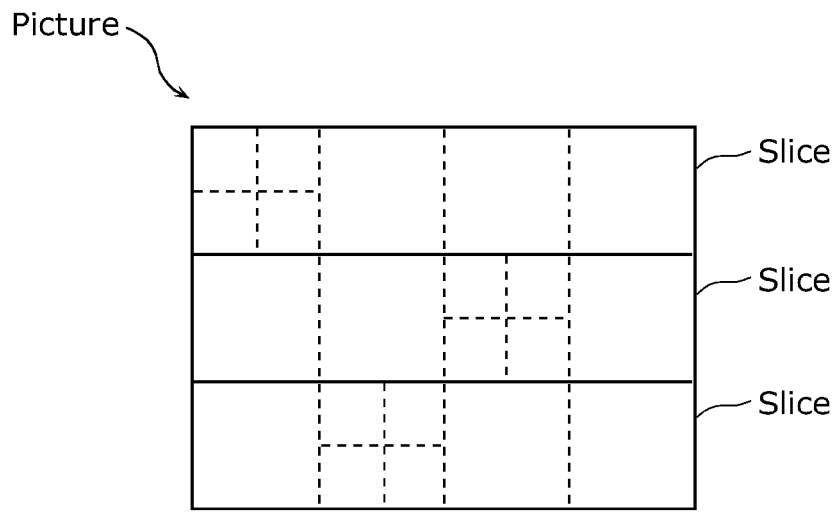
FIG. 70 is an illustration of an example of a structure of a picture according to Embodiment E1.

FIG. 70 is an illustration of an exemplary structure of a picture coded by the image coding apparatus 100 shown in FIG. 68 and to be decoded by the image decoding apparatus 200 shown in FIG. 69. The image is composed of a plurality of pictures. The picture shown in FIG. 70 includes a plurality of slices. Each of the slices includes a plurality of coding units (CU).

The coding unit is a data unit corresponding to a macroblock that is a block of an image. The coding unit is configured to have a square shape. The coding unit corresponds to an area obtainable by dividing a slice using a quadtree.

In addition, the coding units have a hierarchical structure. In other words, one of the coding units may include some of the coding units. Among the coding units, the largest coding unit located at the top of the hierarchy is specifically called as the Largest Coding Unit (LCU).

The image coding unit 100 codes the image composed of the plurality of pictures on a per coding unit basis. The image decoding unit 200 decodes the image composed of the plurality of pictures on the per coding unit basis.

Figure 71:
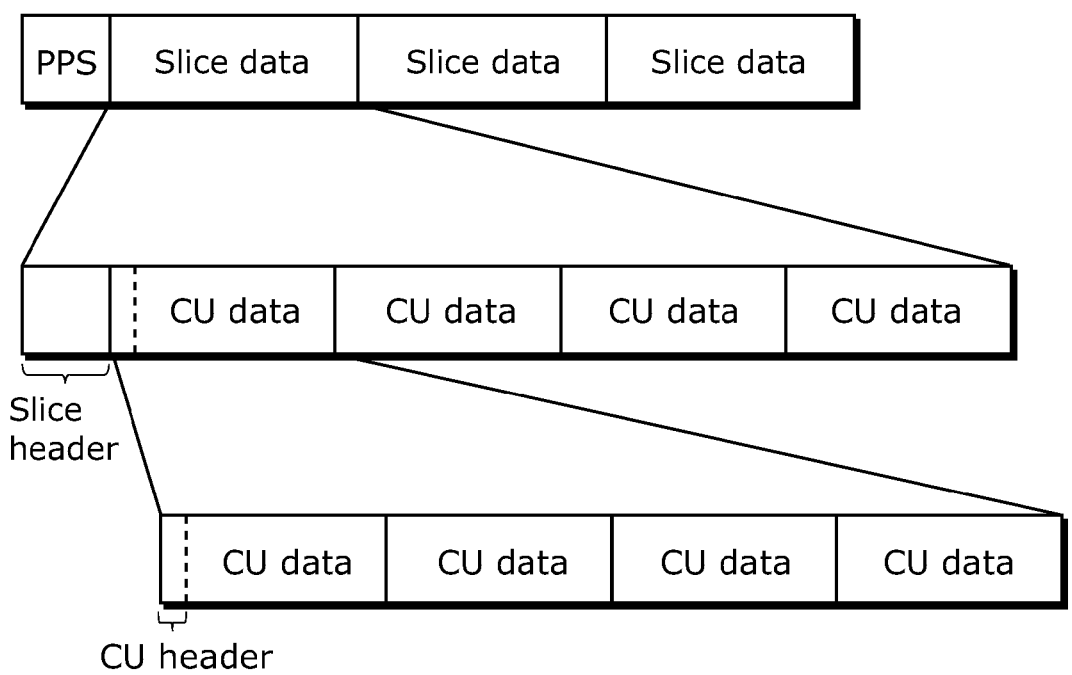
FIG. 71 is an illustration of an example of a structure of a coded stream according to Embodiment E1.

FIG. 71 is an illustration of an exemplary structure of a coded stream corresponding to the picture shown in FIG. 70. The coded stream in FIG. 71 includes a Picture Parameter Set (PPS) and a plurality of slice data items. The slice data includes a slice header, and a plurality of coding unit data (CU data) items. Furthermore, one of the coding unit data items may include some of the coding unit data items. In addition, each of the coding unit data items includes a coding unit header (CU header).

The coded stream in FIG. 71 is a mere example. Coded streams for use in the image coding apparatus 100 and the image decoding apparatus 200 are not limited to the example in FIG. 71. A coded stream may be composed of a plurality of pictures. Such coded stream may include a Sequence Parameter Set (SPS).

Figure 72:
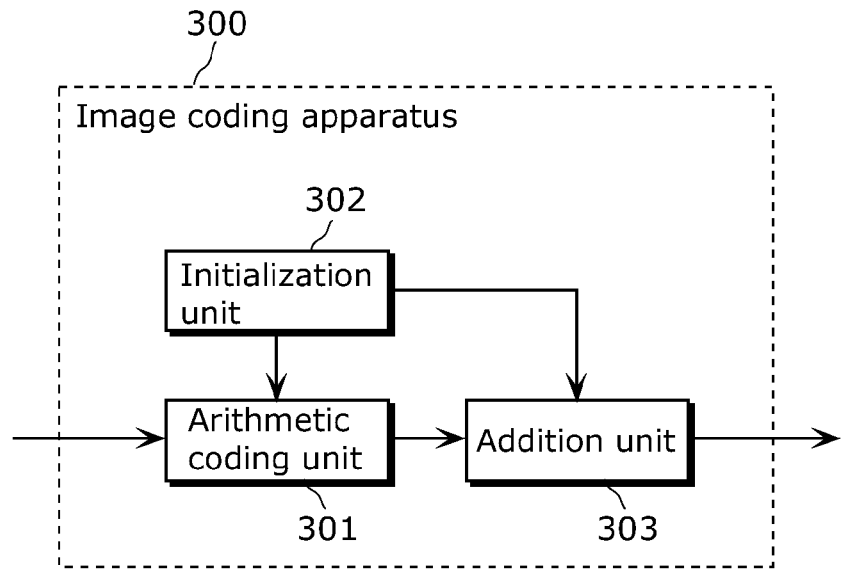
FIG. 72 is a diagram of a second example of a structure of an image coding apparatus according to Embodiment E1.

FIG. 72 is a diagram of a structure of the image coding apparatus including the unique structural elements of the image coding apparatus 100 shown in FIG. 68. The image coding apparatus 300 shown in FIG. 72 codes an image on a block-by-block basis. For example, a block is a coding unit. The image coding apparatus 300 includes: an arithmetic coding unit 301, an initialization unit 302, and an addition unit 303. The arithmetic coding unit 301, the initialization unit 302, and the addition unit 303 may be included in the entropy coding unit 124 of the image coding apparatus 100.

The arithmetic coding unit 301 codes the image on a block-by-block basis using variable probability information and fixed probability information. At this time, the arithmetic coding unit 301 updates only the variable probability information. The variable probability information and the fixed probability information show occurrence probabilities of data items respectively corresponding thereto. The arithmetic coding unit 301 selectively uses the variable probability information and the fixed probability information, according to the data type of a current block. The arithmetic coding unit 301 generates a coded stream.

The initialization unit 302 initializes, using a fixed value, the fixed probability information as necessary. The fixed value is a value corresponding to a predetermined probability. For example, the predetermined probability may be a probability other than 50%. When the fixed probability information is initialized using the fixed value, the addition unit 303 adds the fixed value information indicating the fixed value to the coded stream.

Figure 73:
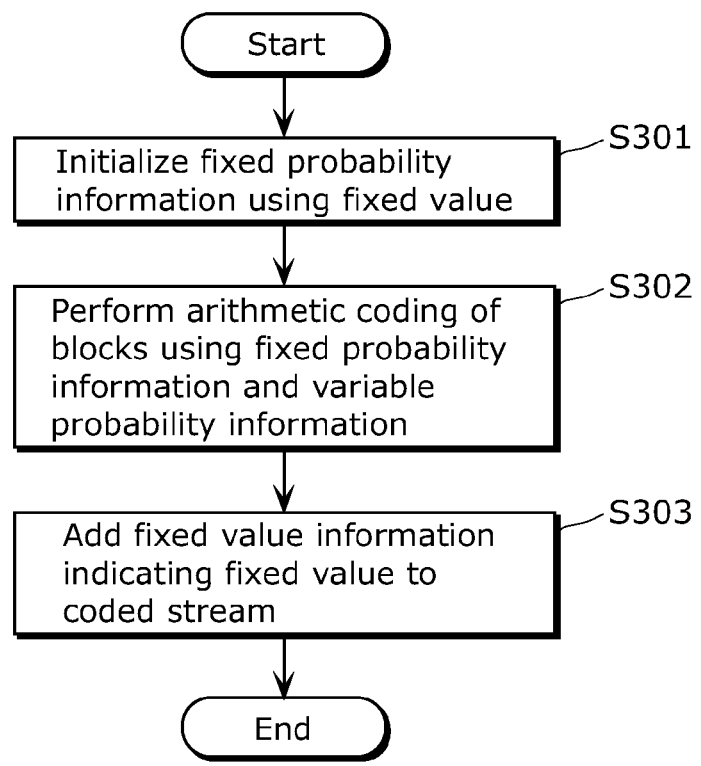
FIG. 73 is a flowchart of operations performed by an image coding apparatus according to Embodiment E1.

FIG. 73 is a flowchart of operations performed by the image coding apparatus 300 shown in FIG. 72. First, the initialization unit 302 initializes the fixed probability information using the fixed value as necessary (S301).

For example, the initialization unit 302 initializes the fixed probability information immediately before starting the coding of the image. Alternatively, the initialization unit 302 may initialize fixed probability information before coding the block located at the top of a slice. Alternatively, the initialization unit 302 may initialize fixed probability information at the top of an I-slice, the top of a Group Of Pictures (GOP), or the top of an LCU. Alternatively, the initialization unit 302 may initialize fixed probability information before coding an arbitrary block.

Alternatively, the initialization unit 302 may initialize fixed probability information according to a content, for example, when scenes are switched.

Such fixed value is determined according to the image characteristics and the data type. For example, when the image characteristics are pre-set, or detected, a fixed value is determined according to the characteristics. Examples of such image characteristics include: a video with large motions, a still image, an animation, a 3D video, the resolution of an image, etc. The initialization unit 302 may determine a fixed value for initializing fixed probability information according to any one of these characteristics.

Alternatively, the initialization unit 302 may determine a fixed value, based on statistical information of a plurality of coded blocks. At this time, the initialization unit 302 may determine a fixed value, based on the statistical information of a plurality of blocks coded before a block coded immediately before a current block. For example, the initialization unit 302 may determine a fixed value from information of a slice before a slice immediately before a current coding target slice in coding order. In this way, coding of the coding target slice is executed smoothly without any delay.

Alternatively, the initialization unit 302 may determine a fixed value from a picture different from the coding target picture and already coded. In this way, the image coding apparatus 300 is capable of coding, in parallel, a plurality of slices included in the coding target picture, using appropriate fixed probability information items.

In addition, data items to be coded are of various data types. Examples of such data types include: a coefficient block (residual coefficient information), a prediction type, a motion vector, an intra prediction mode, and partition information about the division of coding units. The initialization unit 302 may determine a fixed value for initializing fixed probability information according to any one of these characteristics.

Next, the arithmetic coding unit 301 generates a coded stream by performing arithmetic coding on cording target blocks, using variable probability information and fixed probability information (S302). Then, the arithmetic coding unit 301 updates the variable probability information according to the data of the coding target block. Next, when the fixed probability information is initialized, the addition unit 303 adds the fixed value information indicating the fixed value to the coded stream (S303).

The image coding apparatus 300 repeats the aforementioned operations to code images on a block-by-block basis so as to generate the coded stream. Here, the sequence in which the operations are performed is not limited to the aforementioned sequence. The image coding apparatus 300 may execute the operations in another arbitrary sequence. For example, it is also good that the addition unit 303 outputs fixed value information, and then the arithmetic coding unit 301 outputs the coded blocks. In this way, the coded stream with the fixed value information is output.

Figure 74:
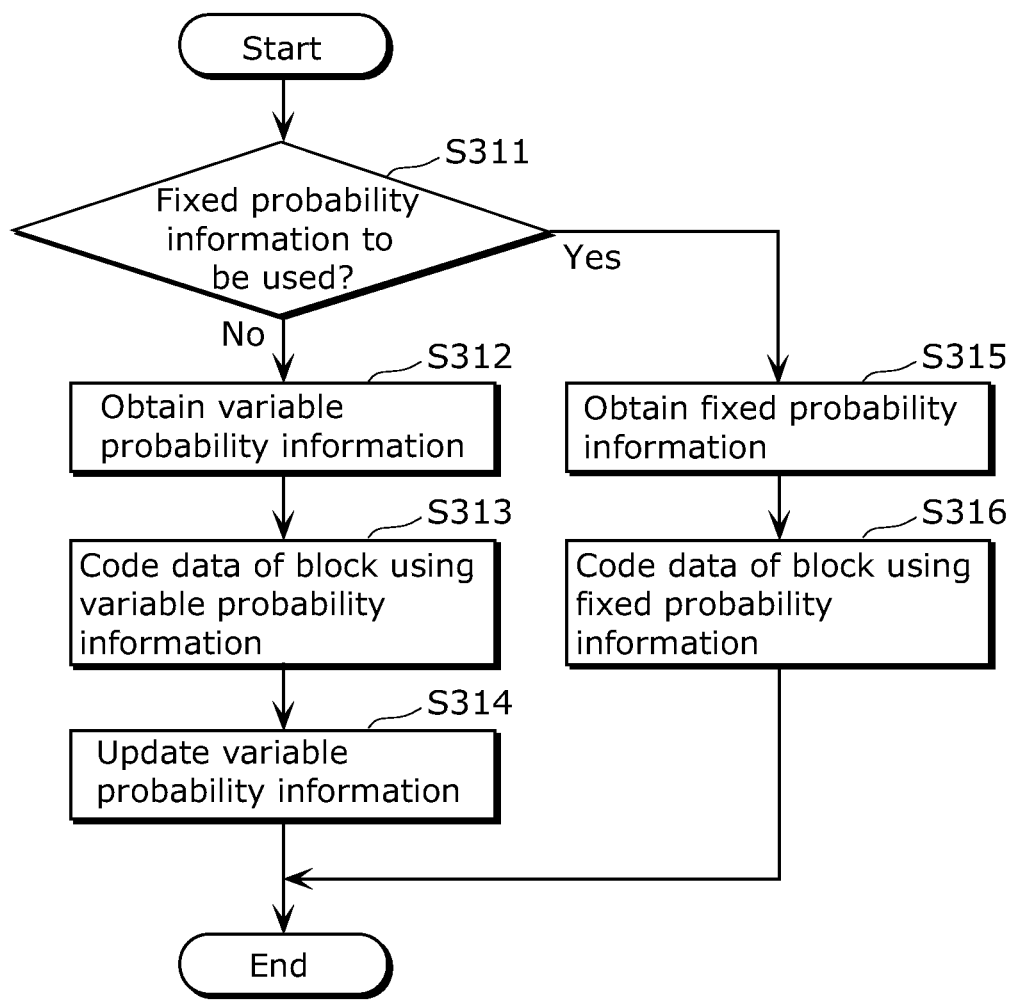
FIG. 74 is a flowchart of operations performed by an arithmetic coding apparatus according to Embodiment E1.

FIG. 74 is a flowchart of operations performed by the arithmetic coding unit 301 shown in FIG. 72. The flowchart of FIG. 74 corresponds to the operations in the arithmetic coding (S302) in FIG. 73.

First, the arithmetic coding unit 301 determines whether or not fixed probability information is used or not, based on the data type of a coding target data item in a coding target block (S311). When no fixed probability information is used (No in S311), the arithmetic coding unit 301 obtains variable probability information corresponding to the data type (S312). Then, the arithmetic coding unit 301 codes the coding target data item using the variable probability information so as to generate a coded stream (S313). Then, the arithmetic coding unit 301 updates the variable probability information according to the coding target data item.

When fixed probability information is used (YES in S311), the arithmetic coding unit 301 obtains fixed probability information corresponding to the data type (S315). Then, the arithmetic coding unit 301 codes the coding target data item using the fixed probability information so as to generate a coded stream (S316). In this case, the arithmetic coding unit 301 does not perform update of the fixed probability information.

The arithmetic coding unit 301 repeats the aforementioned operations, according to the data types of the coding target blocks. In this way, the arithmetic coding unit 301 generates the coded stream by coding the cording target blocks using the variable probability information and fixed probability information while updating the variable probability information.

As described above, the arithmetic coding unit 301 executes the operations according to the data types. However, the arithmetic coding unit 301 may selectively use fixed probability information and variable probability information on a block-by-block basis, without being based on the data types. In this way, the operations are simplified.

In addition, as in Patent Literature 1, conventional CABAC supports three modes of decision, bypass, and terminate. The mode for using the aforementioned fixed probability information may be added to these three modes, or may replace one of these three modes. In addition, an implementation of using the aforementioned fixed probability information may be incorporated in part of any one of these three modes.

With the structure and operations shown in FIG. 72, FIG. 73, and FIG. 74, the image coding apparatus 300 does not perform update of fixed probability information that does not need to be updated. The image coding apparatus 300 initializes (updates) fixed value information using a fixed value only when required. When the fixed probability information is initialized using the fixed value, the image coding apparatus 300 adds the fixed value information indicating the fixed value to the coded stream.

In this way, the fixed probability information at the coding side matches the fixed probability information at the decoding side. Accordingly, the image coding apparatus 300 is capable of reducing unnecessary processes, and using probabilities more appropriate than a probability fixed at 50%.

Figure 75:
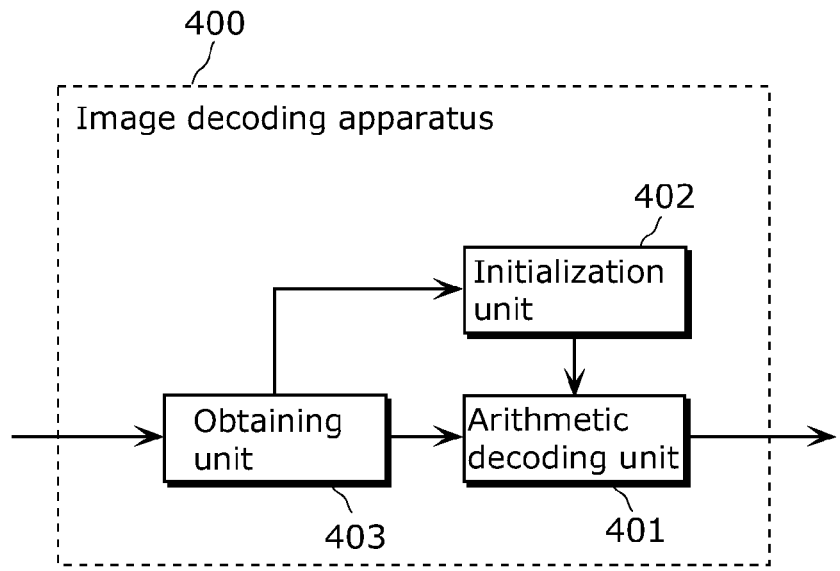
FIG. 75 is a diagram of a second example of a structure of an image decoding apparatus according to Embodiment E1.

FIG. 75 is a diagram of a structure of an image decoding apparatus including the unique structural elements of the image decoding apparatus 200 shown in FIG. 69. The image decoding apparatus 400 shown in FIG. 75 decodes an image included in a coded stream on a block-by-block basis. The image decoding apparatus 400 includes: an arithmetic decoding unit 401, an initialization unit 402, and an obtaining unit 403. The arithmetic decoding unit 401, the initialization unit 402, and the obtaining unit 403 may be included in the entropy decoding unit 224 of the image decoding apparatus 200.

The arithmetic decoding unit 401 decodes the image included in the coded stream on a block-by-block basis, using variable probability information and fixed probability information. At this time, the arithmetic decoding unit 401 updates only the variable probability information. The variable probability information and the fixed probability information show occurrence probabilities of data items respectively corresponding thereto. The arithmetic decoding unit 401 selectively uses the variable probability information and the fixed probability information, according to the data type of a current block.

The obtaining unit 403 obtains, from the coded stream, fixed value information for initializing the fixed probability information that is used by the arithmetic decoding unit 401. The initialization unit 402 initializes, as necessary, the fixed probability information, using a fixed value shown by the fixed value information.

Figure 76:
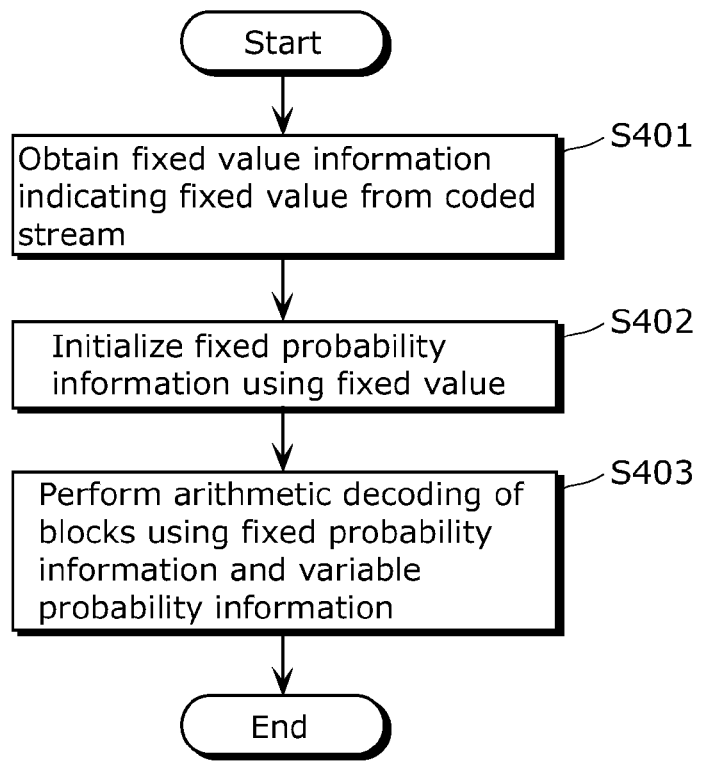
FIG. 76 is a flowchart of operations performed by an image decoding apparatus according to Embodiment E1.

FIG. 76 is a flowchart of operations performed by the image decoding apparatus 400 shown in FIG. 75. First, when the fixed value information indicating the fixed value is added to the coded stream, the obtaining unit 403 obtains the fixed value information from the coded stream (S401). The fixed value information is added when the fixed probability information is initialized in the image coding apparatus 300.

Next, when the fixed value information is obtained, the initialization unit 402 initializes the fixed probability information, using the fixed value indicated by the fixed value information (S402). In this way, the fixed probability information is initialized through operations as in operations by the initialization unit 302 of the image coding apparatus 300.

Next, the arithmetic decoding unit 401 performs arithmetic decoding on decoding target blocks included in the coded stream, using the variable probability information and fixed probability information (S403). Then, the arithmetic decoding unit 401 updates the variable probability information according to the data of the decoding target block.

The image decoding apparatus 400 decodes the image included in the coded stream on a block-by-block basis, by repeating the aforementioned operations. Here, the sequence in which the operations are performed is not limited to the aforementioned sequence. The image decoding apparatus 400 may execute the operations in another arbitrary sequence.

Figure 77:
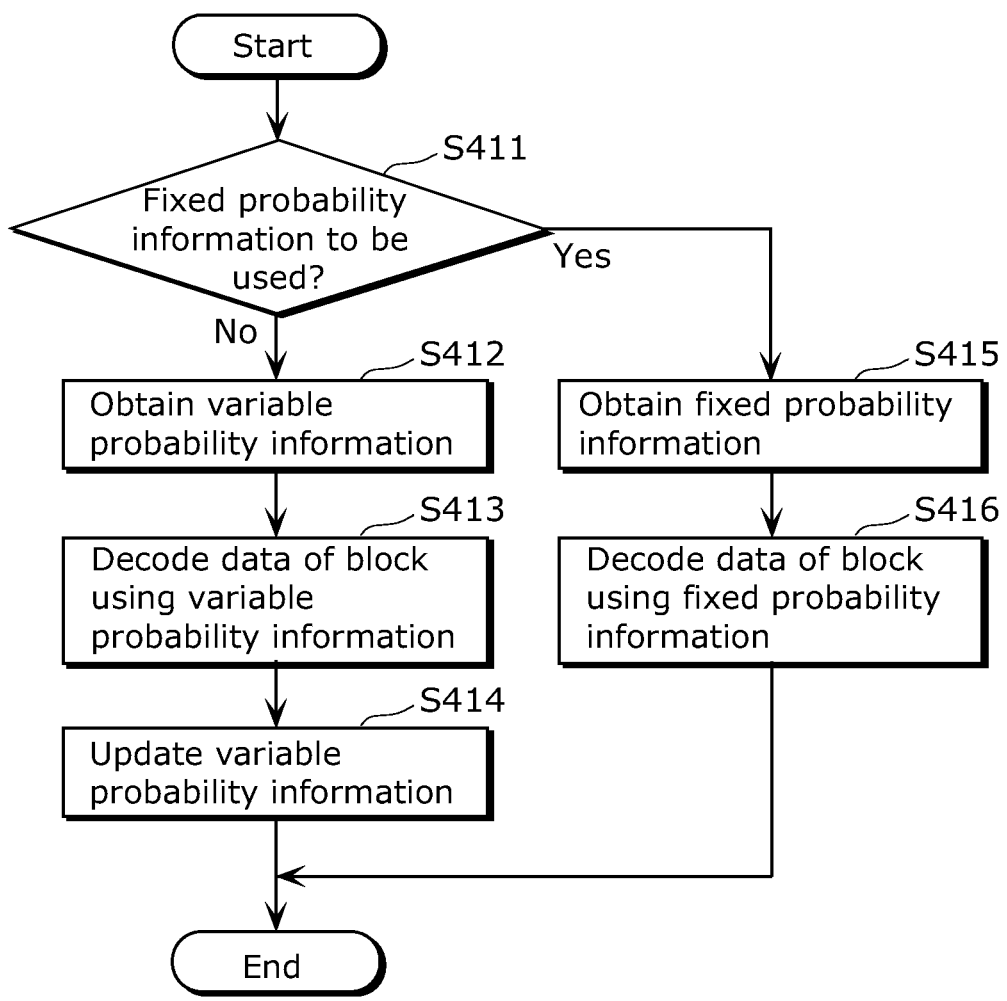
FIG. 77 is a flowchart of operations performed by an arithmetic decoding apparatus according to Embodiment E1.

FIG. 77 is a flowchart of operations performed by the arithmetic decoding unit 401 shown in FIG. 75. The flowchart of FIG. 77 corresponds to the operations in the arithmetic decoding (S403) in FIG. 76.

First, the arithmetic decoding unit 401 determines whether or not to use fixed probability information, according to the data type of a current decoding target data item in a current decoding target block (S411). When no fixed probability information is used (No in S411), the arithmetic decoding unit 401 obtains variable probability information corresponding to the data type (S412). Then, the arithmetic decoding unit 401 decodes the decoding target data item using the variable probability information (S413). Then, the arithmetic decoding unit 401 updates the variable probability information according to the decoding target data item (S414).

When fixed probability information is used (Yes in S411), the arithmetic decoding unit 401 obtains fixed probability information corresponding to the data type (S415). Then, the arithmetic decoding unit 401 decodes the decoding target data item using the fixed probability information (S416). In this case, the arithmetic decoding unit 401 does not perform update of the fixed probability information.

The arithmetic decoding unit 401 repeats the aforementioned operations, according to the data types of the decoding target blocks. In this way, the arithmetic decoding unit 401 decodes the decoding target blocks included in the coded stream by using the variable probability information and fixed probability information while updating the variable probability information.

As described above, the arithmetic decoding unit 401 executes the operations according to the data types. However, the arithmetic decoding unit 401 may selectively use fixed probability information and variable probability information on a block-by-block basis, without being based on the data types.
In this way, the operations are simplified.

In addition, as in the coding side, an implementation using the aforementioned fixed probability information may be added to, replaced by, or incorporated into three modes of decision, bypass, and terminate in the conventional CABAC.

With the structure and operations shown in FIG. 75, FIG. 76, and FIG. 77, the image decoding apparatus 400 does not perform update of fixed probability information that does not need to be updated. Then, the image decoding apparatus 400 initializes (updates) the fixed probability information, using a fixed value only when fixed value information indicating a fixed value is obtained.

In this way, the fixed probability information at the coding side matches the fixed probability information at the decoding side. Accordingly, the image decoding apparatus 400 is capable of reducing unnecessary processes, and using probabilities more appropriate than a probability fixed at 50%.

Figures 78, 79:
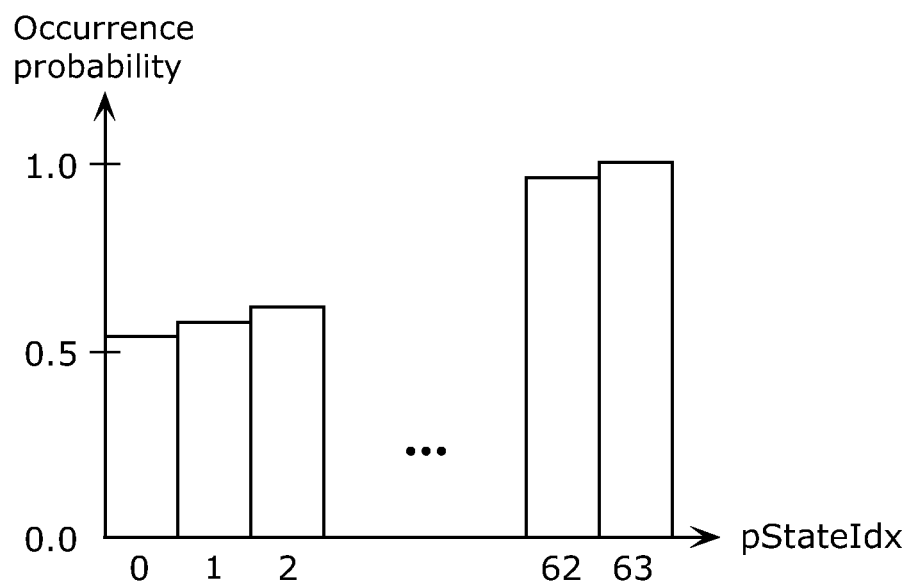
FIG. 78 is a table of an example of probability information according to Embodiment E1.
FIG. 79 is a graph of an example of occurrence probabilities according to Embodiment E1.

FIG. 78 is a table of examples of probability information for use in the image coding apparatus 300 shown in FIG. 72 and the image decoding apparatus 400 shown in FIG. 75. The probability information shown in FIG. 78 conforms to formats of both the fixed probability information and the variable probability information.

The probability information shown in FIG. 78 is composed of a context index (ctxIdx), an occurrence probability index (pStateIdx), and an MPS value (valMPS).

The context indices are uniquely determined based on conditions such as the slice types that are I-slice, P-slice, and B-slice, and the data types. The occurrence probability index is an index for identifying an occurrence probability corresponding to a context index. An MPS means the symbol having the highest probability (Most Probable Symbol). Each of MPS values is a value of "0" or "1" either of which has the higher occurrence probability.

In other words, the probability that the data corresponding to the context index is an MPS value is identified by a corresponding occurrence probability index.

As for each of I-slices, only intra prediction among inter prediction and intra prediction is used. As for each of P-slices, a single reference picture per block is used for inter prediction. As for each of B-slices, two reference pictures per block are used for inter prediction.

Here, the slice types of I-slice, P-slice, and B-slice are used for identifying context indices. However, it is also possible to use picture types of I-picture, P-picture, and B-picture. The I-picture, P-picture, and B-picture respectively correspond to I-slice, P-slice, and B-slice. The slice types are identified on a per slice basis while the picture types are identified on a per picture basis.

FIG. 79 is a graph showing examples of occurrence probabilities corresponding to the probability information shown in FIG. 78. As shown in FIG. 79, the occurrence probabilities are identified based on the occurrence probability indices. The occurrence probabilities are higher as the occurrence probability indices are larger.

For example, the arithmetic coding unit 301 of the image coding apparatus 300 updates a current occurrence probability index and a current MPS value of the variable probability information corresponding to the format of FIG. 78. In addition, for example, the initialization unit 302 of the image coding apparatus 300 initializes the current occurrence probability index and the current MPS value of the fixed probability information corresponding to the format of FIG. 78. The arithmetic coding unit 301 codes a current image on a block-by-block basis, using the context index, the occurrence probability index, and the MPS value while updating the value of the occurrence probability index and the MPS value in the variable probability information.

Likewise, for example, the arithmetic decoding unit 401 of the image decoding apparatus 400 updates a current occurrence probability index and a current MPS value of the variable probability information corresponding to the format of FIG. 78. In addition, for example, the initialization unit 402 of the image decoding apparatus 400 initializes the current occurrence probability index and the current MPS value of the fixed probability information corresponding to the format of FIG. 78. The arithmetic decoding unit 401 decodes a current image on a block-by-block basis, using the context index, the occurrence probability index, and the MPS value while updating the values of the occurrence probability index and the MPS value in the variable probability information.

Figure 80:
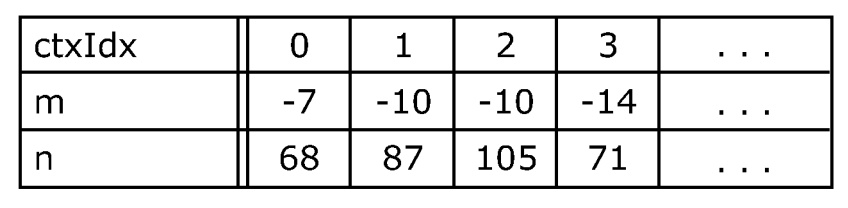

FIG. 80 is a graph showing examples of numerical values for initializing the probability information shown in FIG. 78. FIG. 80 shows the numerical values for the initialization as values denoted as m and n. Each of the combinations of m and n is uniquely identified by a corresponding one of the context indices. Each of the values of m and n is a predetermined set of values, and is set for both the arithmetic coding unit 301 of the image coding apparatus 300 and the arithmetic decoding unit 401 of the image decoding apparatus 400. By using any one of the sets of the values, the initial value of probability information is calculated.

FIG. 81 is a diagram showing how to calculate an initial value from numerical values shown in FIG. 80. As shown in FIG. 81, an occurrence probability index and an MPS value are calculated from m, n, and SliceQP$_Y$. More specifically, the occurrence probability index and the MPS value are calculated by multiplying SliceQP$_Y$ by m, and adding n to the multiplication result.

Here, SliceQP$_Y$ shows a quantization parameter determined for each slice. The quantization parameter shows the magnitude of a quantization width in quantization, and is typically determined for each block according to the coding amount. SliceQP$_Y$ is determined for each slice, as a reference quantization parameter determined for each block. Here, each quantization parameter is determined by the control unit 110 in FIG. 68. The quantization parameter is added to the coded stream by the entropy coding unit 124.

The arithmetic coding unit 301 of the image coding apparatus 300 and the arithmetic decoding unit 401 of the image decoding apparatus 400 calculate an initial value at the top of each slice according to the calculation in FIG. 81, and initializes variable probability information in the form of FIG. 78 using the initial value.

Furthermore, the initialization unit 302 of the image coding apparatus 300 and the initialization unit 402 of the image decoding apparatus 400 may calculate a fixed value using m and n according to the calculation in FIG. 81, and initialize fixed probability information in the form of FIG. 78 using the fixed value.

In addition, the initialization unit 302 of the image coding apparatus 300 may determine m and n according to the image characteristics and the data types. Furthermore, the addition unit 303 of the image coding apparatus 300 may add the m and n to the coded stream. The obtaining unit 403 of the image decoding apparatus 400 may obtain the m and n from the coded stream. Then, the initialization unit 402 of the image decoding apparatus 400 may initialize the fixed probability information using the m and n. In this way, the fixed probability information at the coding side matches the fixed probability information at the decoding side.

Here, the expression shown in FIG. 81 is an example, and expressions that can be used to calculate initial values of variable probability information and fixed values of fixed probability information are not limited to the expression in FIG. 81. For example, in the example of FIG. 81, SliceQP$_Y$ is used. However, it is also possible to use, in the calculation, a distance to a reference picture instead of SliceQP$_Y$. Alternatively, it is also possible to use a resolution of an image in the calculation. Alternatively, it is also possible to use, in the calculation, a combination of the distance to the reference picture and the resolution of the image.

For example, the image coding apparatus 300 may code a coding target picture with reference to a plurality of reference pictures according to inter prediction. Likewise, the image decoding apparatus 400 may decode a decoding target picture with reference to a plurality of reference pictures according to inter prediction.

In this case, the initialization unit 302 of the image coding apparatus 300 may calculate a fixed value using the distance to the reference picture that is temporally closest from the coding target picture. For example, depending on a data type, there is a possibility that an occurrence probability is higher as the distance between the coding target picture and the reference picture is closer. In the case of such data type, the initialization unit 302 calculates the fixed value such that the occurrence probability is higher as the distance between the coding target picture and the reference picture is closer.

More specifically, the initialization unit 302 multiplies the distance between the coding target picture and the reference picture by a magnification corresponding to the correlation between the distance and the occurrence probability. Then, the initialization unit 302 adds a value obtained from the multiplication to a predetermined offset value. According to such calculation, the initialization unit 302 may calculate a fixed value.

Then, the addition unit 303 of the image coding apparatus 300 may add, to the coded stream information that is used as fixed value information in the calculation. For example, the addition unit 303 may add the magnification and the offset value that are used as fixed value information to the coded stream.

On the other hand, according to the operation performed by the coding side, the obtaining unit 403 of the image decoding apparatus 400 obtains the fixed value information from the coded stream. The initialization unit 402 of the image decoding apparatus 400 calculates the fixed value using the distance to the reference picture that is temporally closest from a decoding target picture and the obtained fixed value information. The initialization unit 402 initializes the fixed probability information using the calculated fixed value.

For example, the obtaining unit 403 may obtain, from the coded stream, the magnification and the offset value as the fixed value information, according to the operations by the coding side. The initialization unit 402 may calculate a fixed value by multiplying the distance by a magnification and adding an offset value to the multiplication result. The initialization unit 402 initializes the fixed probability information using the calculated fixed value.

In addition, a resolution of an image may be used to calculate a fixed value instead of such a distance or in combination with the distance. In this case, the addition unit 303 of the image coding apparatus 300 adds, to a coded stream, fixed value information for calculating a fixed value using the resolution of the image. Then, the obtaining unit 403 of the image decoding apparatus 400 obtains, from the coded stream, the fixed value information for calculating the initial value using the resolution of the image.

The formats of the probability information shown in FIG. 78 to FIG. 81 are examples. Thus, the formats of variable probability information and fixed probability information for use in the arithmetic coding unit 301 and the arithmetic decoding unit 401 are not limited to these examples. Each of the variable probability information and the fixed probability information may directly show the occurrence probability of a data item without using any context index, occurrence probability index, and MPS value.

Figure 82:
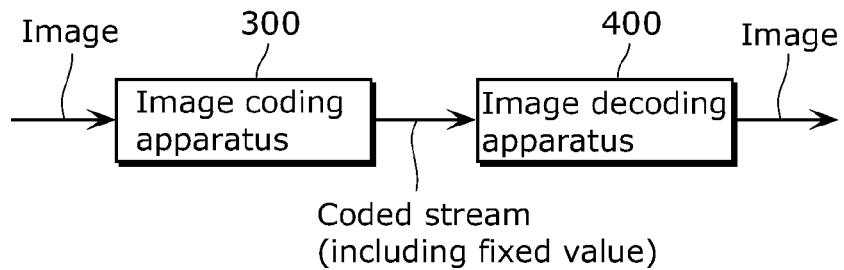
FIG. 82 is a diagram of a first example of fixed value information according to Embodiment E1.

FIG. 82 is a diagram showing a first example of fixed value information for use in the image coding apparatus 300 shown in FIG. 72 and the image decoding apparatus 400 shown in FIG. 75. In the example of FIG. 82, the addition unit 303 of the image coding apparatus 300 adds, as the fixed value information, a fixed value used to initialize the fixed probability information to the coded stream. In other words, the addition unit 303 adds the raw value of the occurrence probability to the coded stream.

The obtaining unit 403 of the image decoding apparatus 400 obtains the raw fixed value of the occurrence probability as the fixed value information from the coded stream. Then, the initialization unit 402 of the image decoding apparatus 400 initializes the fixed probability information using the fixed value obtained from the coded stream. In this way, the fixed probability information at the coding side matches the fixed probability information at the decoding side.

In the example of FIG. 82, the raw fixed value is transmitted to the decoding side. Accordingly, the amount of calculations in the processing is small. In addition, there are few restrictions in the determination of fixed values. Thus, the initialization unit 302 of the image coding apparatus 300 is capable of determining fixed values appropriately at small intervals. Accordingly, the coding efficiency is increased.

Figure 83:
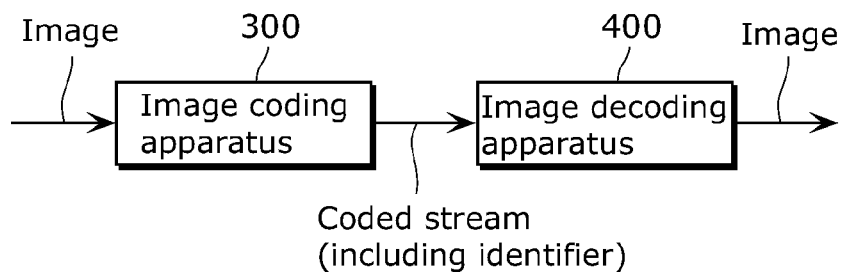
FIG. 83 is a diagram of a second example of fixed value information according to Embodiment E1.

FIG. 83 is a diagram showing a second example of fixed value information for use in the image coding apparatus 300 shown in FIG. 72 and the image decoding apparatus 400 shown in FIG. 75.

In the example of FIG. 83, the addition unit 303 of the image coding apparatus 300 adds, as the fixed value information, an identifier indicating a fixed value used to initialize the fixed probability information to the coded stream. In other words, the addition unit 303 adds the identifier indicating the occurrence probability to the coded stream. The correspondence relationship between the identifier and the occurrence probability is predefined, and is set, in advance, in the initialization unit 302 of the image coding apparatus 300 and the initialization unit 402 of the image decoding apparatus 400.

The obtaining unit 403 of the image decoding apparatus 400 obtains the identifier as the fixed value information from the coded stream. The initialization unit 402 of the image decoding apparatus 400 initializes the fixed probability information using the fixed value shown by the identifier. In this way, the fixed probability information at the coding side matches the fixed probability information at the decoding side.

In the example of FIG. 83, the identifier showing the fixed value is transmitted to the decoding side. Accordingly, the information amount is reduced. For this reason, the coding efficiency is increased.

Figure 84:
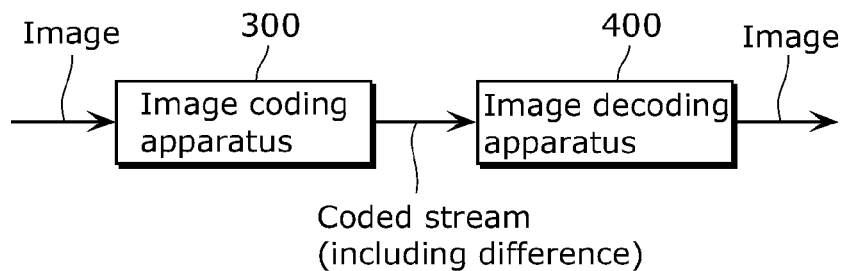
FIG. 84 is a diagram of a third example of fixed value information according to Embodiment E1.

FIG. 84 is a diagram showing a third example of fixed value information for use in the image coding apparatus 300 shown in FIG. 5 and the image decoding apparatus 400 shown in FIG. 75. In the example of FIG. 84, the addition unit 303 of the image coding apparatus 300 adds a difference as the fixed value information to the coded stream. This difference is a difference between the fixed value used to initialize the fixed probability information and a previous fixed value used to previously initialize fixed probability information.

The obtaining unit 403 of the image decoding apparatus 400 obtains the difference as the fixed value information from the coded stream. Then, the initialization unit 402 of the image decoding apparatus 400 initializes (updates) the fixed probability information by adding the difference to the value of the fixed probability information. In this way, the fixed probability information at the coding side matches the fixed probability information at the decoding side.

In the example of FIG. 84, the difference is transmitted to the decoding side. Accordingly, the information amount for the transmission is reduced. For this reason, the coding efficiency is increased. In addition, there are few restrictions in the determination of fixed values. Thus, the initialization unit 302 of the image coding apparatus 300 is capable of determining fixed values appropriately at small intervals. Accordingly, the coding efficiency is further increased.

Figure 85:
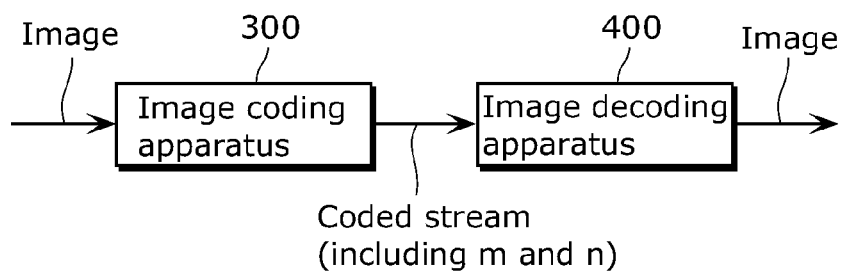
FIG. 85 is a diagram of a fourth example of fixed value information according to Embodiment E1.

FIG. 85 is a diagram showing a fourth example of fixed value information for use in the image coding apparatus 300 shown in FIG. 72 and the image decoding apparatus 400 shown in FIG. 75. In the example of FIG. 85, the addition unit 303 of the image coding apparatus 300 adds, as the fixed value information, m and n used to initialize the fixed probability information to the coded stream. These m and n are values corresponding to m and n shown in FIG. 80 etc.

In other words, the initialization unit 302 of the image coding apparatus 300 updates m and n for initialization based on the image characteristics and so on. Then, as shown in FIG. 81, the initialization unit 302 calculates a fixed value using the modified m and n. The initialization unit 302 initializes the fixed probability information using the calculated fixed value. In addition, the addition unit 303 adds the modified m and n to the coded stream.

The obtaining unit 403 of the image decoding apparatus 400 obtains m and n as the fixed value information from the coded stream. Then, the initialization unit 402 of the image decoding apparatus 400 calculates a fixed value using m and n, and initializes the fixed probability information using the calculated fixed value. In this way, the fixed probability information at the coding side matches the fixed probability information at the decoding side.

In the example of FIG. 85, m and n are transmitted to the decoding side. Then, both the coding side and the decoding side initialize the fixed probability information using m and n. When variable probability information is also initialized using m and n, the fixed probability information and the variable probability information are initialized in the same manner. Accordingly, the operations are the same, and thus the image coding apparatus 300 and the image decoding apparatus 400 are simplified.

The examples of FIG. 82 and FIG. 85 described above may be used in combination. For example, when a raw fixed value is added, fixed probability information initialized using the fixed value may be applied only to a single corresponding slice. When m and n are added, the fixed probability information initialized using m and n may be applied to all the succeeding slices.

Figure 86:
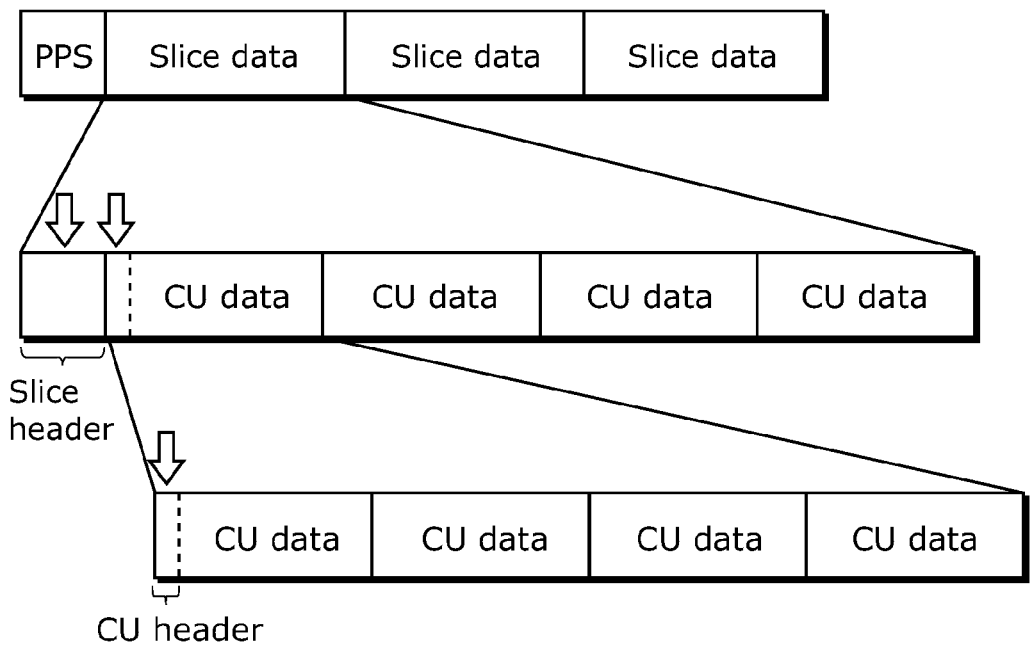
FIG. 86 is an illustration of an example of fixed value information according to Embodiment E1.

FIG. 86 is an illustration of an example of storage destinations of fixed value information in the coded stream shown in FIG. 71. The portions shown by arrows in FIG. 86 are the exemplary storage destinations of the fixed value information. For example, the addition unit 303 of the image coding apparatus 300 may store the fixed value information into each slice header. The addition unit 303 may store the fixed value information in each coding unit header. In addition, the addition unit 303 may store the fixed value information in the header of the maximum coding unit.

The addition unit 303 determines the storage destination(s) according to a time point at which the initialization unit 302 initializes the fixed probability information, and stores the fixed value information at the determined storage destination(s). For example, when the initialization unit 302 initializes the fixed probability information at the top of each slice, the addition unit 303 stores the fixed value information into a corresponding slice header. In addition, for example, when the initialization unit 302 initializes the fixed probability information in the middle of each slice, the addition unit 303 stores the fixed value information into a corresponding coding unit header. In this way, the initialization timing is transmitted.

Here, FIG. 86 shows the examples of the storage destinations, and thus storage destinations are not limited to the examples in FIG. 86. For example, fixed value information may be stored in a picture parameter set, or in a sequence parameter set.

In addition, the addition unit 303 may add hierarchical depth information for identifying a storage destination in any one of a sequence parameter set, a picture parameter set, or a slice header. As described above, the coding units have a hierarchical structure. The hierarchical depth information shows the depth of a coding unit having a header in which fixed value information is stored, in the hierarchy composed of the coding units.

In a deep hierarchical layer, a coding unit is comparatively small. When initialization on such a small data unit basis is frequently performed, the coding efficiency is decreased by the transmission of information for the initialization. To prevent this, the initialization unit 302 performs initialization of fixed probability information only in one or more hierarchical layers shallower than a predetermined hierarchical layer. In this way, the decrease of the coding efficiency is suppressed. In addition, the addition unit 303 adds hierarchical information indicating the predetermined hierarchical layer to the coded stream. In this way, the obtaining unit 403 of the image decoding apparatus 400 is capable of efficiently identifying the coding unit header in which the fixed value information is stored.

The obtaining unit 403 of the image decoding apparatus 400 obtains fixed value information from the aforementioned storage destinations of the fixed value information.

Then, the initialization unit 402 of the image decoding apparatus 400 initializes the fixed probability information at the decoding side according to the storage destinations from which the fixed value information is obtained. In this way, the fixed probability information at the decoding side is initialized according to a time point at which the fixed probability information at the coding side is initialized.

Figure 87:
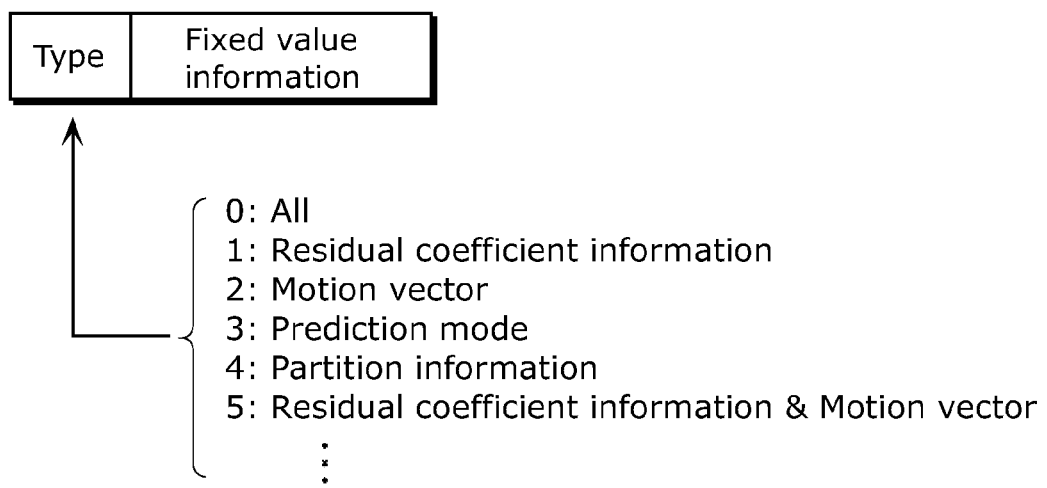
FIG. 87 is an illustration of an example of a storage format of fixed value information according to Embodiment E1.

FIG. 87 is an illustration of an example of a storage format of fixed value information that is stored in storage destinations shown in FIG. 86. In the example of FIG. 87, the fixed value information is stored together with the identifier of a type (a data type). Examples of the type include, residual coefficient information (a coefficient block), a motion vector, a prediction mode, and partition information. The fixed value information shows a fixed value corresponding to the type.

Furthermore, the identifier that is stored in the coded stream may be an identifier showing a plurality of types. In this case, the fixed value information may show one or more fixed values corresponding to the types. Alternatively, the fixed value information may show a single fixed value corresponding to the types.

For example, "0" in FIG. 87 shows all the types. In this case, the fixed value information shows the fixed values corresponding to all the types.

Alternatively, the fixed value information may show a single fixed value corresponding to all the types.

In addition, the identifier that is stored in the coded stream may show whether or not the type shown by the identifier is a type of data for which fixed probability information is used. In this way, whether or not the fixed probability information is to be used is switched for each type.

In the example of FIG. 87, the addition unit 303 of the image coding apparatus 300 adds the identifier indicating a type and fixed value information indicating the fixed value corresponding to the type to the coded stream. The obtaining unit 403 of the image decoding apparatus 400 obtains, from the coded stream, the identifier showing the type and the fixed value information showing the fixed value corresponding to the type.

In addition, the initialization unit 302 of the image coding apparatus 300 may initialize the fixed probability information using a plurality of fixed values. The addition unit 303 of the image coding apparatus 300 may add, to the coded stream, the fixed value information indicating the plurality of fixed values and a single identifier of the plurality of types. The obtaining unit 403 of the image decoding apparatus 400 may obtain the fixed value information indicating the plurality of fixed values and the single identifier of the plurality of types from the coded stream. In addition, the initialization unit 402 of the image coding apparatus 400 may initialize the fixed probability information using the plurality of fixed values.

As described above, the image coding apparatus 300 according to this embodiment does not perform unnecessary update of fixed probability information. The image coding apparatus 300 initializes (updates) fixed probability information using a fixed value only when required. When the fixed probability information is initialized using the fixed value, the image coding apparatus 300 adds the fixed probability information indicating the fixed value to the coded stream. In this way, the fixed probability information at the coding side matches the fixed probability information at the decoding side. Accordingly, the image coding apparatus 300 is capable of reducing unnecessary processes, and using appropriate probability information.

In addition, the image decoding apparatus 400 according to this embodiment does not perform unnecessary update of fixed probability information. Then, the image decoding apparatus 400 initializes (updates) the fixed probability information, using a fixed value only when fixed value information indicating a fixed value is obtained. In this way, the fixed probability information at the coding side matches the fixed probability information at the decoding side. Accordingly, the image coding apparatus 400 is capable of reducing unnecessary processes, and using appropriate probability information.

The image coding apparatus and image decoding apparatus according to the present invention have been described above, but the present invention is not limited to these embodiments. Those skilled in the art will readily appreciate that many modifications are possible in the exemplary embodiments and other embodiments are possible by arbitrarily combining the structural elements of the embodiments. Accordingly, all of such modifications and other embodiments are intended to be included within the scope of the present invention.

For example, some of the processes performed by a particular one of the processing units may be executed by another processing unit or another one of the processing units. Alternatively, the sequence in which the processes are executed may be modified, or some of the processes may be executed in parallel. Alternatively, an exclusive or shared storage unit for storing various kinds of information may be added to the configuration of the image coding and/or decoding apparatus.

Furthermore, the present invention can be implemented not only as an image coding apparatus and an image decoding apparatus, but also an image coding method and an image decoding method which have the steps corresponding to the processing units of the image coding apparatus and the image decoding apparatus. For example, these steps are executed by one or more computers. Furthermore, the present invention can be implemented as one or more programs for causing the one or more computers to execute the steps of the methods. Furthermore, the present invention can be implemented as a non-transitory computer-readable recording medium such as a CD-ROM on which the programs are recorded.

The structural elements of the image coding apparatus and the image decoding apparatus may be implemented as one or more Large Scale Integrated circuits. Each of these structural elements may be made on a one chip, or some or all of these structural elements may be integrated into a single chip. For example, the structural elements other than the storage unit may be integrated into a single chip. The name used here is an LSI, but it may also be referred to as an IC, a system LSI, a super LSI, or an ultra LSI, depending on the degree of integration.

Moreover, ways to achieve such integration are not limited to the LSI, and special circuit or general purpose processor and so forth can also achieve the integration. A Field Programmable Gate Array (FPGA) that can be programmed or a reconfigurable processor that allows re-configuration of the connection or configuration of LSI can be used for the same purpose.

Furthermore, when a circuit integration technology for replacing LSIs with new circuits appears in the future with advancement in semiconductor technology and derivative other technologies, the circuit integration technology may be naturally used to integrate functional the structural elements of the image coding apparatus and the image decoding apparatus.

As described above, an image coding method according to an aspect of the present invention is an image coding method of coding an image on a block-by-block basis, including: performing arithmetic coding on the image on a block-by-block basis, selectively using variable probability information and fixed probability information which indicate occurrence probabilities of respectively corresponding data items while updating only the variable probability information, so as to generate a coded stream; initializing the fixed probability information using a fixed value; and adding, to the coded stream, fixed value information indicating the fixed value.

In addition, for example, in the adding, the fixed value is added as the fixed value information to the coded stream.

In addition, for example, in the adding, an identifier of the fixed value is added as the fixed value information to the coded stream.

In addition, for example, in the adding, a difference between a fixed value used to initialize the fixed probability information and a previous fixed value used to initialize previous fixed probability information is added as the fixed value information to the coded stream.

In addition, for example, in the adding, at least one of a multiplication coefficient and an addition coefficient is added as the fixed value information to the coded stream, the multiplication coefficient and the addition coefficient being for calculating the fixed value by performing calculations including a multiplication and an addition based on a quantization parameter that is determined for each of slices included in the image.

In addition, for example, in the adding, the fixed value information is added to a header of a slice included in the image, or a header of a coding unit that is a block included in the image.

In addition, for example, in the adding, the fixed value information indicating the fixed value and an identifier indicating a type of a data item for which the fixed probability information initialized using the fixed value is used are added to the coded stream.

In addition, for example, in the generating, the coded stream is generated by performing arithmetic coding on the image on a block-by-block basis, using the variable probability information and the fixed probability information indicating the occurrence probabilities of corresponding types of the data items, in the initializing, the fixed probability information is initialized using fixed values, and in the adding, the fixed value information indicating the fixed values and a single identifier for identifying the types of the data items for which the fixed probability information initialized using the fixed values is used are added to the coded stream.

In addition, An image decoding method of decoding an image included in a coded stream on a block-by-block basis, including: performing arithmetic decoding on the image on a block-by-block basis, selectively using variable probability information and fixed probability information which indicate occurrence probabilities of respectively corresponding data items while updating only the variable probability information; obtaining, from the coded stream, fixed value information for initializing the fixed probability information; and initializing the fixed probability information using a fixed value indicated by the fixed value information.

In addition, for example, in the obtaining, the fixed value is obtained as the fixed value information from the coded stream.

In addition, for example, in the obtaining, an identifier of the fixed value is obtained as the fixed value information from the coded stream.

In addition, for example, in the obtaining, a difference between a fixed value used to initialize the fixed probability information and a previous fixed value used to initialize previous fixed probability information is obtained as the fixed value information from the coded stream.

In addition, for example, in the obtaining, at least one of a multiplication coefficient and an addition coefficient is obtained as the fixed value information from the coded stream, the multiplication coefficient and the addition coefficient being for calculating the fixed value by performing calculations including a multiplication and an addition based on a quantization parameter that is determined for each of slices included in the image.

In addition, for example, in the obtaining, the fixed value information is obtained from a header of a slice included in the image, or a header of a decoding unit that is a block included in the image.

In addition, for example, in the obtaining, the fixed value information indicating the fixed value and an identifier indicating a type of a data item for which the fixed probability information initialized using the fixed value is used are obtained from the coded stream.

In addition, for example, in the performing arithmetic decoding, the arithmetic decoding is performed on the image on a block-by-block basis, using the variable probability information and the fixed probability information indicating the occurrence probabilities of corresponding types of the data items; in the obtaining, the fixed value information indicating the fixed values and a single identifier for identifying the types of the data items for which the fixed probability information is used are obtained from the coded stream; and in the initializing, the fixed probability information is initialized using the fixed values indicated by the fixed value information.

In addition, an image coding apparatus according to an aspect of the present invention is an image coding apparatus which codes an image on a block-by-block basis, including: an arithmetic coding unit configured to perform arithmetic coding on the image on a block-by-block basis, selectively using variable probability information and fixed probability information which indicate occurrence probabilities of respectively corresponding data items while updating only the variable probability information, so as to generate a coded stream; an initialization unit configured to initialize the fixed probability information using a fixed value; and an addition unit configured to add, to the coded stream, fixed value information indicating the fixed value.

In addition, an image coding apparatus according to an aspect of the present invention is an image decoding apparatus which decodes an image included in a coded stream on a block-by-block basis, including: an arithmetic decoding unit configured to perform arithmetic decoding on the image on a block-by-block basis, selectively using variable probability information and fixed probability information which indicate occurrence probabilities of respectively corresponding data items while updating only the variable probability information; an obtaining unit configured to obtain, from the coded stream, fixed value information for initializing the fixed probability information; and an initialization unit configured to initialize the fixed probability information using a fixed value indicated by the fixed value information.

(Underlying Knowledge F Forming Basis of the Present Invention)

Context Adaptive Binary Arithmetic Coding (CABAC) has been conventionally used for image coding (for example, Patent Literature 1). An image coding apparatus which supports CABAC codes an image on a block-by-block basis. The image coding apparatus adaptively codes a coding target block according to the state of blocks that surround the coding target block.

More specifically, the image coding apparatus which supports CABAC codes the data of the coding target block using probability information indicating the occurrence probability of the data. Then, the arithmetic coding apparatus updates probability information according to the data of the coding target block. Then, the arithmetic coding apparatus codes the data of the next coding target block using the updated probability information. In this way, the image coding apparatus codes the image on a block-by-block basis while updating the probability information.

In this way, the image coding apparatus is capable of coding the image according to the image characteristics. Accordingly, the coding efficiency is increased.

In addition, the image decoding apparatus decodes the data of the decoding target block using the probability information in the same manner as the image coding apparatus. The image decoding apparatus updates the probability information according to the data of the decoding target block. Then, the image decoding apparatus decodes the data of the next decoding target block using the updated probability information. In the manner as described, the image decoding apparatus decodes the image on a block-by-block basis while updating the probability information.

In this way, the probability information in the decoding side is updated in the same manner as in the coding side. Accordingly, there is no need to code and decode the updated probability information. For this reason, the high coding efficiency is maintained.

However, the probability information at the coding side and the probability information at the decoding side need to match each other at an early stage before the probability information is updated by data of a processing target block. For this reason, the conventional image coding apparatus and image decoding apparatus uniformly initialize the probability information according to a predetermined method.

Typically, the image coding apparatus divide an image into a plurality of slices and code these slices in parallel in order to increase the processing speed. At this time, the image coding apparatus initializes the probability information according to three patterns of I-slice, P-slice, and B-slice at the top of each slice. The image decoding apparatus also initializes the probability information in the same manner as the image coding apparatus. In this way, the probability information at the coding side and the probability information at the decoding side match each other.

However, the probability information loses image characteristics due to the uniform initialization. As a result, the effect of increasing the coding efficiency is decreased.

In view of this, the present invention aims to provide an image coding method which allows image coding using appropriate probability information and/or an image decoding method which allows image decoding using the appropriate probability information.

In order to solve the aforementioned problems, an image coding method according to the present invention is an image coding method of coding an image on a block-by-block basis, including: performing arithmetic coding on the image on a block-by-block basis, using probability information indicating occurrence probabilities of data while updating the probability information, so as to generate a coded stream; initializing the probability information using an initial value; and adding, to the coded stream, a numerical value that indicates the initial value and is different from an identifier.

In addition, an image decoding method according to the present invention is an image decoding method of decoding an image included in a coded stream on a block-by-block basis, including: performing arithmetic decoding on the image included in the coded stream on a block-by-block basis, using probability information indicating occurrence probabilities of data while updating the probability information; obtaining, from the coded stream, a numerical value that indicates the initial value for initializing the probability information and is different from an identifier; and initializing the probability information using the initial value indicated by the numerical value.

According to the present invention, more appropriate probability information is used in the coding and decoding of an image.

Hereinafter, embodiments of the present invention are described in detail with reference to the Drawings. Each of the embodiments described below shows a preferred specific example of the present invention. The numerical values, shapes, materials, structural elements, the arrangement and connection of the structural elements, steps, the processing order of the steps etc. shown in the following embodiments are mere examples, and therefore do not limit the present invention. The present invention is defined only by the scope of the Claims. Therefore, among the structural elements in the following embodiments, the structural elements not recited in any one of the independent Claims defining the most generic concept of the present invention are not necessarily required to achieve the aim of the present invention. Such optional structural elements are described as structural elements of corresponding ones of preferred embodiments.

Embodiment F1

Figure 88:
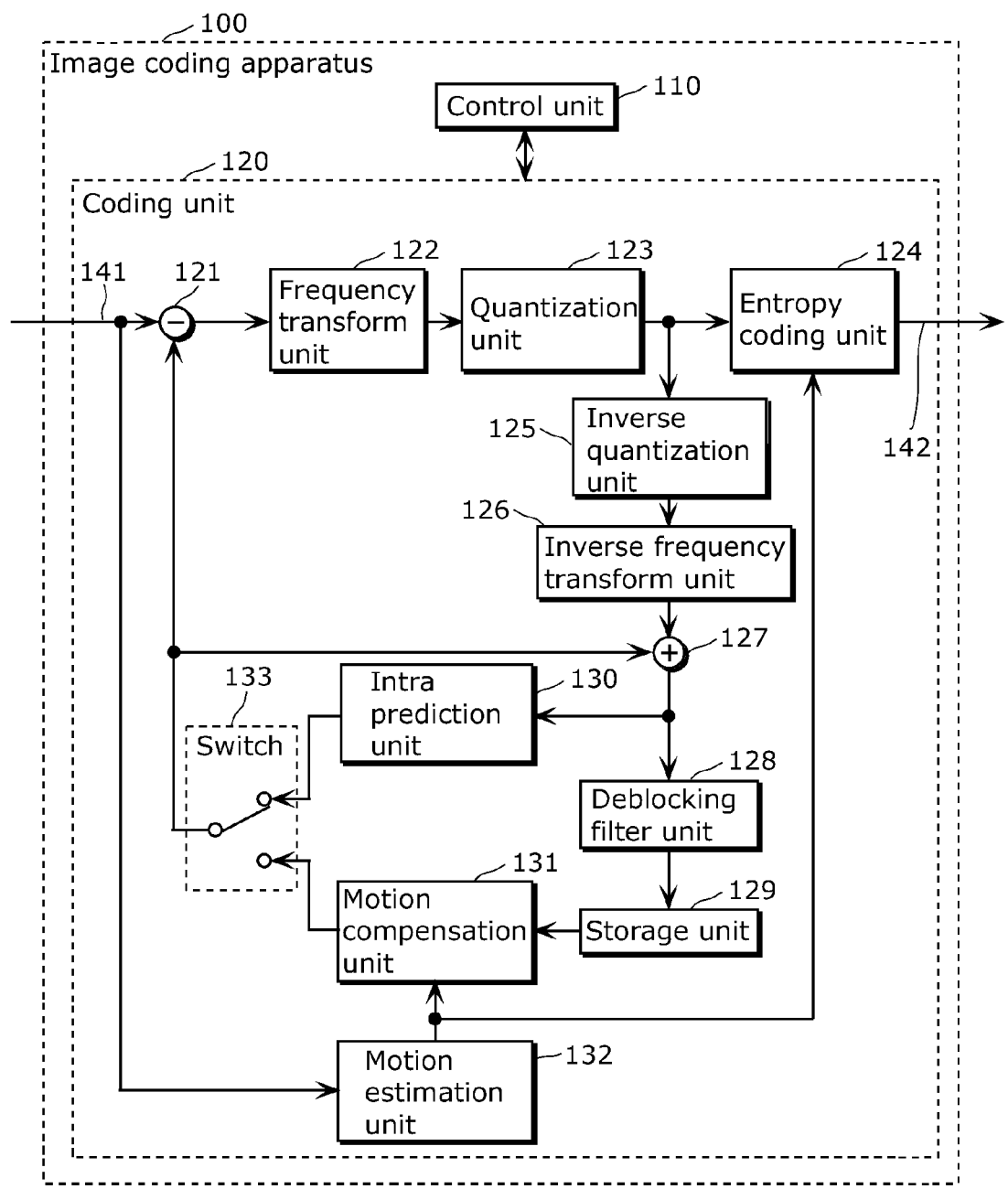
FIG. 88 is a diagram of a first example of a structure of an image coding apparatus according to Embodiment F1.

FIG. 88 is a diagram of a structure of an image coding apparatus according to Embodiment F1. The image coding apparatus 100 shown in FIG. 88 includes a control unit 110 and a coding unit 120. The coding unit 120 includes: a subtraction unit 121, a frequency transform unit 122, a quantization unit 123, an entropy coding unit 124, an inverse quantization unit 125, an inverse frequency transform unit 126, an addition unit 127, a deblocking filter unit 128, a storage unit 129, an intra prediction unit 130, a motion compensation unit 131, a motion estimation unit 132, and a switch 133.

As shown in FIG. 88, the coding unit 120 codes an image 141 on a block-by-block basis to generate a coded stream 142.

At this time, the subtraction unit 121 of the coding unit 120 subtracts a pixel block composed of pixel values in a prediction image, from a pixel block composed of pixel values in the image 141. The frequency transform unit 122 transforms the pixel block resulting from the subtraction into a coefficient block composed of frequency components. The quantization unit 123 quantizes the coefficient block generated by the frequency transform unit 122.

On the other hand, the motion estimation unit 132 estimates a motion vector using the pixel block of the image 141. Next, the entropy coding unit 124 generates a coded stream 142 by performing entropy coding on a prediction type, the motion vector, a prediction mode (an intra prediction mode), a quantization parameter, a quantized coefficient block, etc.

In addition, the inverse quantization unit 125 performs inverse quantization on the quantized coefficient block. Then, the inverse frequency transform unit 126 transforms the coefficient block already subjected to the inverse quantization into a pixel block. Next, the addition unit 127 adds the pixel block of the prediction image to the pixel block generated by the inverse frequency transform unit 126. The deblocking filter unit 128 removes block distortion from the pixel block generated by the addition unit 127, and stores the resulting block as a reference image to the storage unit 129.

The intra prediction unit 130 performs intra-picture prediction (intra prediction) using the pixel block generated by the addition unit 127, according to an intra prediction mode. The motion compensation unit 131 performs inter-picture prediction (inter prediction) using a reference image in the storage unit 129 and a motion vector. The switch 133 inputs the pixel block of the prediction image obtained through intra prediction or inter prediction to the subtraction unit 121 and the addition unit 127.

In addition, the control unit 110 controls the coding unit 120. For example, the control unit controls parameters based on the amount of data of a coded stream 142.

The image coding apparatus 100 codes the image 141 according to the aforementioned operations. The image coding apparatus 100 reduces the amount of data of the coded stream 142 by performing various kinds of processes such as frequency transform, quantization, intra prediction, inter prediction, and entropy coding.

Figure 89:
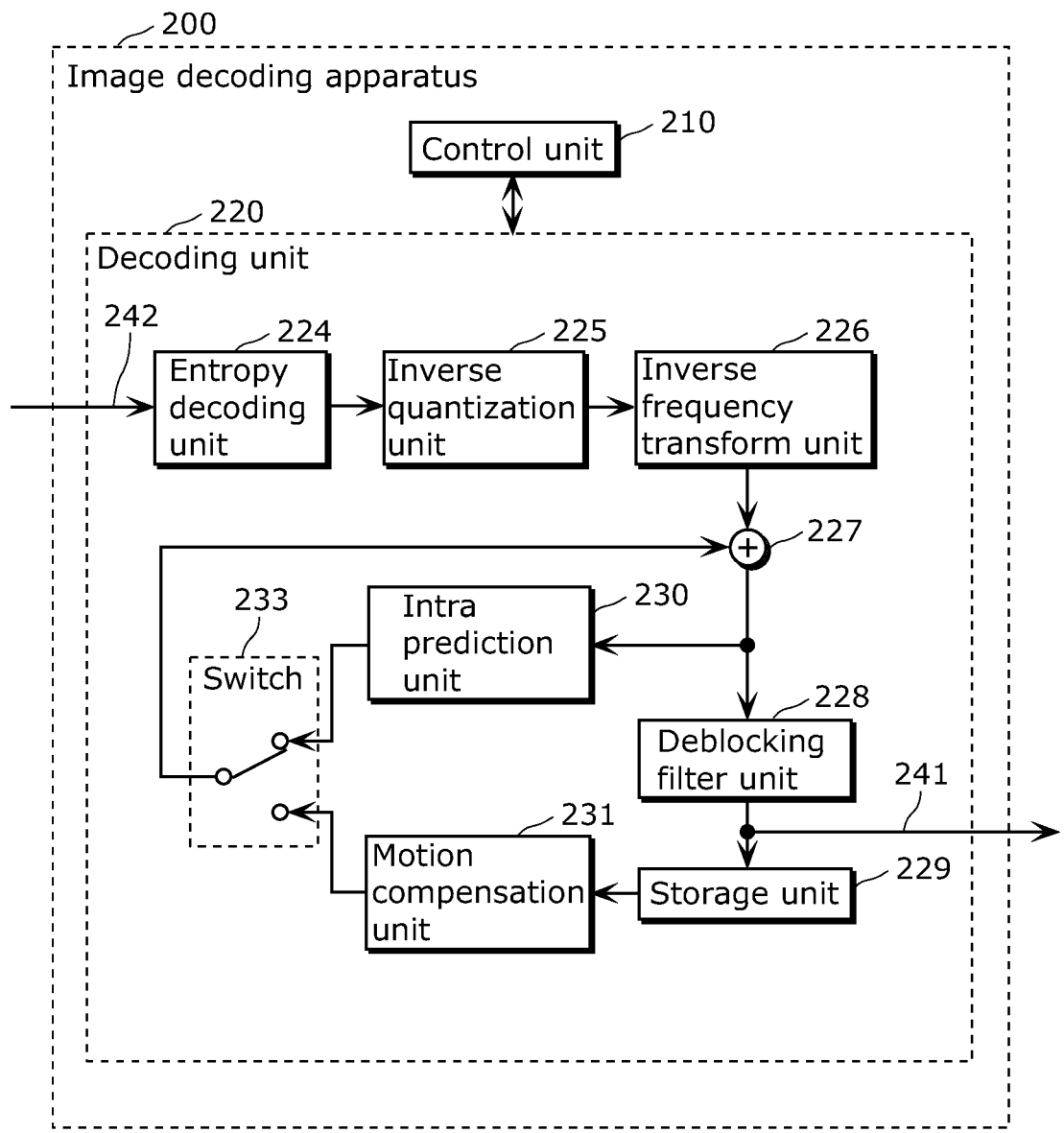
FIG. 89 is a diagram of a first example of a structure of an image decoding apparatus according to Embodiment F1.

FIG. 89 is a diagram of a structure of an image decoding apparatus corresponding to the image coding apparatus 100 shown in FIG. 88. The image decoding apparatus 200 shown in FIG. 89 includes a control unit 210 and a decoding unit 220. The decoding unit 220 includes: an entropy decoding unit 224, an inverse quantization unit 225, an inverse frequency transform unit 226, an addition unit 227, a deblocking filter unit 228, a storage unit 229, an intra prediction unit 230, a motion compensation unit 231, and a switch 233.

As shown in FIG. 89, the decoding unit 220 decodes an image 241 included in a coded stream 242 on a block-by-block basis. At this time, the entropy decoding unit 224 of the decoding unit 220 performs entropy decoding on the coded stream 242 to obtain a prediction type, a motion vector, an intra prediction mode, a quantization parameter, a quantized coefficient block, etc.

The control unit 210 transforms the prediction type, the motion vector, the intra prediction mode, the quantized parameter, etc. to have forms that can be processed by the respective processing units of the decoding unit 220. The control unit 210 controls operations by the decoding unit 220.

The inverse quantization unit 225 of the decoding unit 220 performs inverse quantization on the quantized coefficient block. Then, the inverse frequency transform unit 226 transforms the coefficient block already subjected to the inverse quantization into a pixel block.

The addition unit 227 adds the pixel block of the prediction image to the pixel block generated by the inverse frequency transform unit 226. The deblocking filter unit 228 removes block distortion from the pixel block generated by the addition unit 227. Then, the deblocking filter unit 228 stores a reference image composed of pixel blocks into the storage unit 229. The deblocking filter unit 228 also outputs the image 241 composed of the pixel blocks.

When a current prediction type is an intra prediction, the intra prediction unit 230 performs intra prediction using the pixel block generated by the addition unit 227, according to the intra prediction mode. When a current prediction type is an inter prediction, the motion compensation unit 231 performs inter prediction using the motion vector and the reference image in the storage unit 229. The switch 233 inputs the pixel block of the prediction image obtained through intra prediction or inter prediction to the addition unit 227.

The image decoding apparatus 200 decodes the image 241 included in the coded stream 242 on a block-by-block basis, by performing operations corresponding to the operations performed by the image coding apparatus 100.

Figure 90:
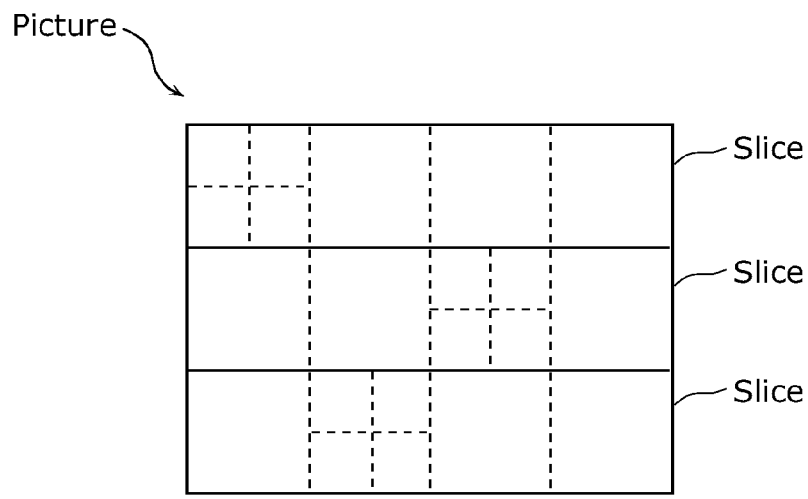
FIG. 90 is an illustration of an example of a structure of a picture according to Embodiment F1.

FIG. 90 is an illustration of an exemplary structure of a picture coded by the image coding apparatus 100 shown in FIG. 88 and to be decoded by the image decoding apparatus 200 shown in FIG. 89. The image is composed of a plurality of pictures. The picture shown in FIG. 90 includes a plurality of slices. Each of the slices includes a plurality of coding units (CU).

The coding unit is a data unit corresponding to a macroblock that is a block of an image. The coding unit is configured to have a square shape. The coding unit corresponds to an area obtainable by dividing a slice using a quadtree.

In addition, the coding units have a hierarchical structure. In other words, one of the coding units may include some of the coding units. Among the coding units, the largest coding unit located at the top of the hierarchy is specifically called as the Largest Coding Unit (LCU).

The image coding unit 100 codes the image composed of the plurality of pictures on a per coding unit basis. The image decoding unit 200 decodes the image composed of the plurality of pictures on the per coding unit basis.

Figure 91:
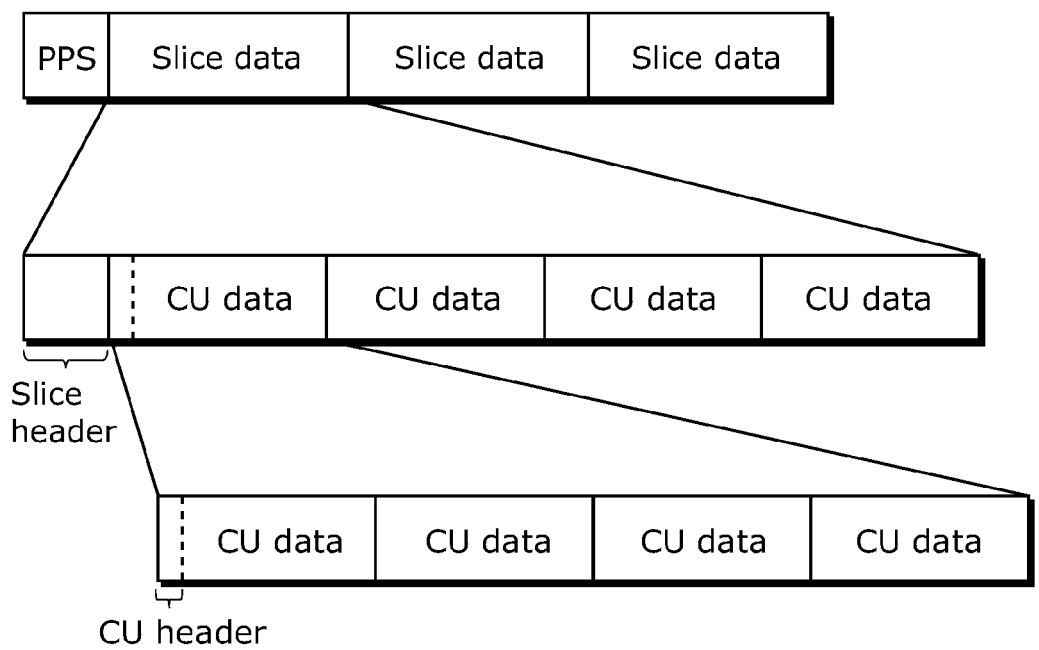
FIG. 91 is an illustration of an example of a structure of a coded stream according to Embodiment F1.

FIG. 91 is an illustration of an exemplary structure of a coded stream corresponding to the picture shown in FIG. 90. The coded stream in FIG. 91 includes a Picture Parameter Set (PPS) and a plurality of slice data items. The slice data includes a slice header, and a plurality of coding unit data (CU data) items. Furthermore, one of the coding unit data items may include some of the coding unit data items. In addition, each of the coding unit data items includes a coding unit header (CU header).

The coded stream in FIG. 91 is a mere example. Coded streams for use in the image coding apparatus 100 and the image decoding apparatus 200 are not limited to the example in FIG. 91. A coded stream may be composed of a plurality of pictures. Such coded stream may include a Sequence Parameter Set (SPS).

Figure 92:
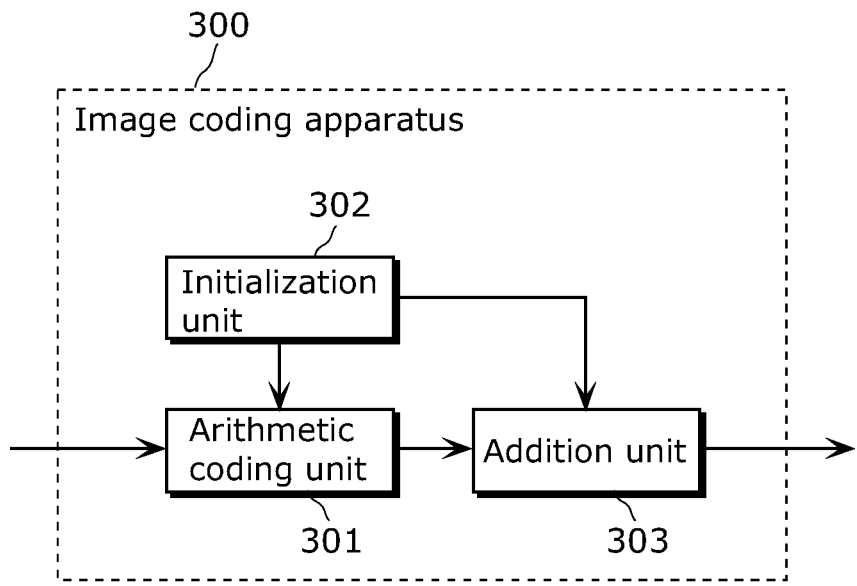
FIG. 92 is a diagram of a second example of a structure of an image coding apparatus according to Embodiment F1.

FIG. 92 is a diagram of a structure of the image coding apparatus including the unique structural elements of the image coding apparatus 100 shown in FIG. 88. The image coding apparatus 300 shown in FIG. 92 codes an image on a block-by-block basis. For example, a block is a coding unit. The image coding apparatus 300 includes: an arithmetic coding unit 301, an initialization unit 302, and an addition unit 303. The arithmetic coding unit 301, the initialization unit 302, and the addition unit 303 may be included in the entropy coding unit 124 of the image coding apparatus 100.

The arithmetic coding unit 301 codes the image on a block-by-block basis using probability information. At this time, the arithmetic coding unit 301 updates the probability information. The probability information shows an occurrence probability of data. The arithmetic coding unit 301 may selectively use a plurality of occurrence probabilities included in the probability information according to the data types of blocks. The arithmetic coding unit 301 generates a coded stream.

The initialization unit 302 initializes probability information using an initial value as necessary. The initial value is a predetermined probability. When the probability information is initialized using the initial value, the addition unit 303 adds the numerical value indicating the initial value to the coded stream.

Figure 93:
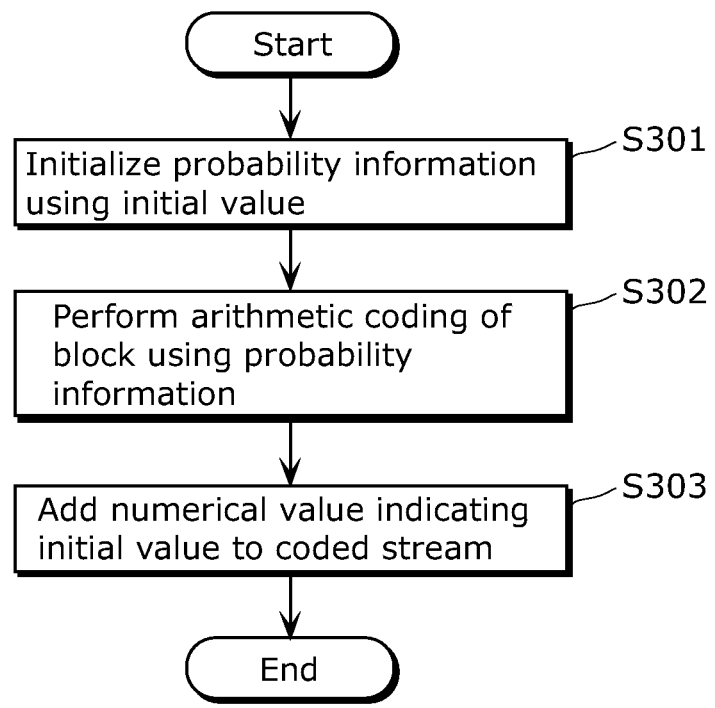
FIG. 93 is a flowchart of operations performed by an image coding apparatus according to Embodiment F1.

FIG. 93 is a flowchart of operations performed by the image coding apparatus 300 shown in FIG. 92. First, the initialization unit 302 initializes the probability information using the initial value as necessary (S301).

For example, the initialization unit 302 initializes the probability information immediately before starting the coding of the image. Alternatively, the initialization unit 302 may initialize probability information before coding the block located at the top of a slice. Alternatively, the initialization unit 302 may initialize probability information at the top of an I-slice, the top of a Group Of Pictures (GOP), or the top or an LCU. Alternatively, the initialization unit 302 may initialize probability information before coding an arbitrary block.

Alternatively, the initialization unit 302 may initialize probability information according to a content, for example, when scenes are switched.

Such initial value is determined according to the image characteristics and the data type. For example, when the image characteristics are pre-set, or detected, an initial value is determined according to the characteristics. Examples of such image characteristics include: a video with large motions, a still image, an animation, a 3D video, the resolution of an image, etc. The initialization unit 302 may determine an initial value for initializing probability information according to any one of these characteristics.

Alternatively, the initialization unit 302 may determine an initial value, based on statistical information of a plurality of coded blocks. At this time, the initialization unit 302 may determine an initial value, based on the statistical information of a plurality of blocks coded before a block coded immediately before a current block.

For example, the initialization unit 302 may determine an initial value from information of a slice before a slice immediately before a current coding target slice in coding order. More specifically, the initialization unit 302 may determine, as the initial value, a value of probability information updated using data of a slice located before the immediately-before slice. In this way, coding of the coding target slice is executed smoothly without any delay.

Alternatively, the initialization unit 302 may determine an initial value from a picture different from the coding target picture and already coded. In this way, the image coding apparatus 300 is capable of coding, in parallel, a plurality of slices included in the coding target picture, using appropriate fixed probability information items.

In addition, data items to be coded are of various data types. Examples of such data types include: a coefficient block (residual coefficient information), a prediction type, a motion vector, an intra prediction mode, and partition information about the division of coding units. The initialization unit 302 may determine an initial value for initializing probability information according to any one of these characteristics.

Next, the arithmetic coding unit 301 performs, using probability information, arithmetic coding on a cording target block so as to generate a coded stream (S302). Then, the arithmetic coding unit 301 updates the probability information according to the data of the coding target block. Next, when the probability information is initialized, the addition unit 303 adds the numerical value indicating the initial value to the coded stream (S303).

The image coding apparatus 300 repeats the aforementioned operations to code images on a block-by-block basis so as to generate the coded stream. Here, the sequence in which the operations are performed is not limited to the aforementioned sequence. The image coding apparatus 300 may execute the operations in another arbitrary sequence. For example, it is also good that the addition unit 303 outputs a numerical value indicating an initial value, and then the arithmetic coding unit 301 outputs the coded blocks. In this way, the coded stream with the numerical value indicating the initial value is output.

With the structure shown in FIG. 92 and the operations shown in FIG. 93, the image coding apparatus 300 initializes probability information using an initial value as necessary. When the probability information is initialized using the initial value, the image coding apparatus 300 adds the numerical value indicating the initial value to the coded stream.

In this way, the probability information at the coding side matches the probability information at the decoding side. In addition, the image coding apparatus 300 is capable of initializing probability information at an arbitrary timing. Furthermore, the image coding apparatus 300 is capable of performing fine control of initial values for use in initialization by transmitting numerical values indicating initial values to the decoding side. This control is finer than the control performed by transmitting identifiers of initial values to the decoding side. Accordingly, the image coding apparatus 300 is capable of controlling probability information more flexibly, and using more appropriate probability information. For this reason, the coding efficiency is increased.

Figure 94:
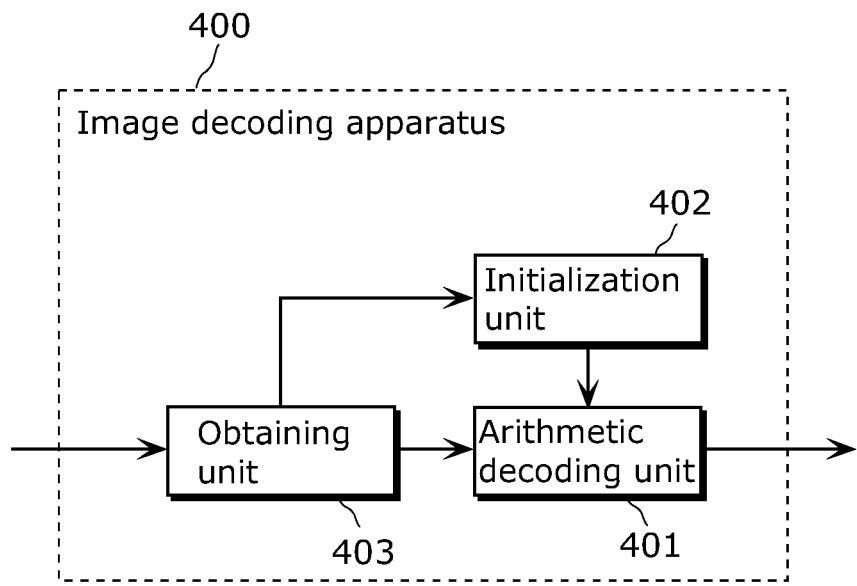
FIG. 94 is a diagram of a second example of a structure of an image decoding apparatus according to Embodiment F1.

FIG. 94 is a diagram of a structure of an image decoding apparatus including the unique structural elements of the image decoding apparatus 200 shown in FIG. 89. The image decoding apparatus 400 shown in FIG. 94 decodes an image included in a coded stream on a block-by-block basis. The image decoding apparatus 400 includes: an arithmetic decoding unit 401, an initialization unit 402, and an obtaining unit 403. The arithmetic decoding unit 401, the initialization unit 402, and the obtaining unit 403 may be included in the entropy decoding unit 224 of the image decoding apparatus 200.

The arithmetic decoding unit 401 decodes the image included in the coded stream on a block-by-block basis, using probability information. At this time, the arithmetic decoding unit 401 updates only the probability information. The probability information shows an occurrence probability of data. The arithmetic coding unit 401 may selectively use a plurality of occurrence probabilities included in the probability information according to the data types of blocks.

The obtaining unit 403 obtains, from the coded stream, numerical values indicating initial values for initializing the probability information that is used by the arithmetic decoding unit 401. The initialization unit 402 initializes probability information using an initial value indicated by a numerical value.

Figure 95:
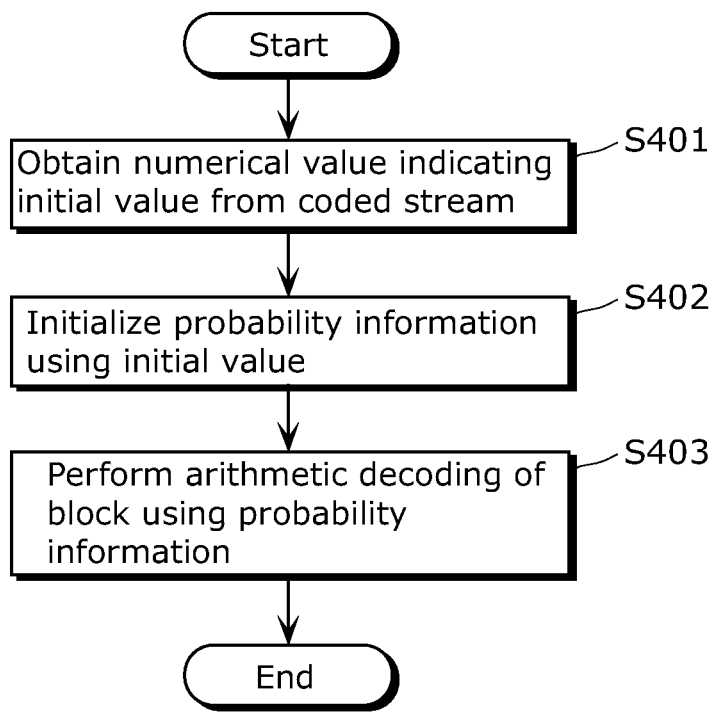
FIG. 95 is a flowchart of operations performed by an image decoding apparatus according to Embodiment F1.

FIG. 95 is a flowchart of operations performed by the image decoding apparatus 400 shown in FIG. 94. First, when a numerical value indicating an initial value is added to a coded stream, the obtaining unit 403 obtains the numerical value from the coded stream (S401). The numerical value indicating the initial value is added when probability information is initialized in the image coding apparatus 300.

Next, when the numerical value indicating the initial value is obtained, the initialization unit 402 initializes the probability information using the initial value indicated by the numerical value (S402). In this way, the probability information is initialized through operations as in operations by the initialization unit 302 of the image coding apparatus 300.

Next, the arithmetic decoding unit 401 performs arithmetic decoding on a decoding target block included in the coded stream, using the probability information (S403). Then, the arithmetic decoding unit 401 updates the probability information according to the data of the decoding target block.

The image decoding apparatus 400 decodes the image included in the coded stream on a block-by-block basis, by repeating the aforementioned operations. Here, the sequence in which the operations are performed is not limited to the aforementioned sequence. The image decoding apparatus 400 may execute the operations in another arbitrary sequence.

When the numerical value indicating the initial value is obtained, with the structure shown in FIG. 94 and the operations shown in FIG. 95, the image decoding apparatus 400 initializes probability information using the initial value indicated by the numerical value. In this way, the probability information at the coding side matches the probability information at the decoding side. Accordingly, the image decoding apparatus 400 is capable of using appropriate probability information.

Figures 96, 97:
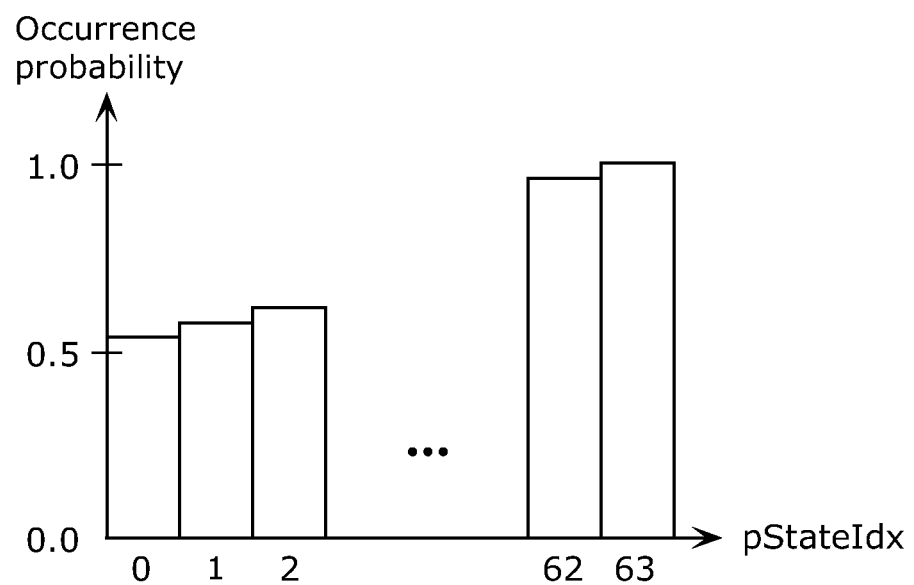
FIG. 96 is a table of probability information according to Embodiment F1.
FIG. 97 is a graph of occurrence probabilities according to Embodiment F1.

FIG. 96 is a table of examples of probability information for use in the image coding apparatus 300 shown in FIG. 92 and the image decoding apparatus 400 shown in FIG. 94. The probability information shown in FIG. 96 is composed of a context index (ctxIdx), an occurrence probability index (pStateIdx), and an MPS value (valMPS).

The context indices are uniquely determined based on conditions such as the slice types that are I-slice, P-slice, and B-slice, and the data types. The occurrence probability index is an index for identifying an occurrence probability corresponding to a context index. An MPS means the symbol having the highest probability (Most Probable Symbol). Each of MPS values is a value of "0" or "1" either of which has the higher occurrence probability.

In other words, the probability that the data corresponding to the context index is an MPS value is identified by a corresponding occurrence probability index.

As for each of I-slices, only intra prediction among inter prediction and intra prediction is used. As for each of P-slices, a single reference picture per block is used for inter prediction. As for each of B-slices, two reference pictures per block are used for inter prediction.

Here, the slice types of I-slice, P-slice, and B-slice are used for identifying context indices. However, it is also possible to use picture types of I-picture, P-picture, and B-picture. The I-picture, P-picture, and B-picture respectively correspond to I-slice, P-slice, and B-slice. The slice types are identified on a per slice basis while the picture types are identified on a per picture basis.

FIG. 97 is a graph showing examples of occurrence probabilities corresponding to the probability information shown in FIG. 96. As shown in FIG. 97, the occurrence probabilities are identified based on the occurrence probability indices. The occurrence probabilities are higher as the occurrence probability indices are larger.

In addition, for example, the initialization unit 302 of the image coding apparatus 300 initializes the current occurrence probability index and a current MPS value of the probability information shown in FIG. 96. The image coding apparatus 300 codes a current image on a block-by-block basis, using the context index, the occurrence probability index, and the MPS value while updating the value of the occurrence probability index and the MPS value in the probability information.

Likewise, for example, the initialization unit 402 of the image decoding apparatus 400 initializes the current occurrence probability index and the current MPS value of the probability information shown in FIG. 96. The arithmetic decoding unit 401 of the image decoding apparatus 400 decodes a current image on a block-by-block basis, using the context index, the occurrence probability index, and the MPS value while updating the values of the occurrence probability index and the MPS value in the probability information shown in FIG. 96.

Figure 98:
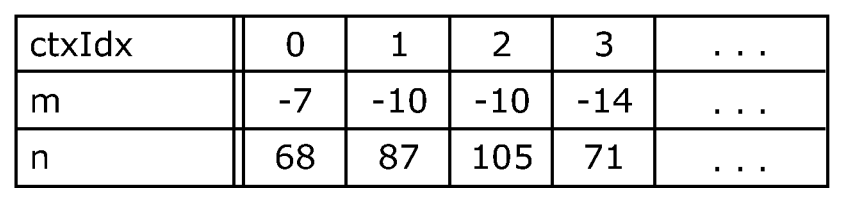

FIG. 98 is a table showing examples of numerical values for initializing the probability information shown in FIG. 96. FIG. 98 shows the numerical values for the initialization as values denoted as m and n. Each of the combinations of m and n is uniquely identified by a corresponding one of the context indices. Each of the values of m and n is a predetermined set of values, and is set for both the arithmetic coding unit 301 of the image coding apparatus 300 and the arithmetic decoding unit 401 of the image decoding apparatus 400. By using any one of the sets of the values, the initial value of probability information is calculated.

FIG. 99 is a diagram showing how to calculate an initial value from numerical values shown in FIG. 98. As shown in FIG. 99, an occurrence probability index and an MPS value are calculated from m, n, and $SliceQP_Y$. More specifically, the occurrence probability index and the MPS value are calculated by multiplying $SliceQP_Y$ by m, and adding n to the multiplication result.

Here, $SliceQP_Y$ shows a quantization parameter determined for each slice. The quantization parameter shows the magnitude of a quantization width in quantization, and is typically determined for each block according to the coding amount. $SliceQP_Y$ is determined for each slice, as a reference quantization parameter determined for each block. Here, each quantization parameter is determined by the control unit 110 in FIG. 88. The quantization parameter is added to the coded stream by the entropy coding unit 124.

The initialization unit 302 of the image coding apparatus 300 and the initialization unit 402 of the image decoding apparatus 400 calculate initial values according to the calculations in FIG. 99 using m, n, and $SliceQP_Y$, and initializes the probability information shown in FIG. 96 using the initial value. Each of the initialization unit 302 of the image coding apparatus 300 and the initialization unit 402 of the image decoding apparatus 400 calculates an initial value at an appropriate time point irrespective of whether or not a current position is at the top of a slice, and initializes the probability information.

In addition, the initialization unit 302 of the image coding apparatus 300 may determine m and n according to the image characteristics and the data types. Furthermore, the addition unit 303 of the image coding apparatus 300 may add the m and n to the coded stream. The obtaining unit 403 of the image decoding apparatus 400 may obtain the m and n from the coded stream. Then, the initialization unit 402 of the image decoding apparatus 400 may initialize the fixed probability information using the m and n. In this way, the probability information at the coding side matches the probability information at the decoding side.

The formats of the probability information shown in FIG. 96 to FIG. 99 are examples. Thus, the formats of probability information for use in the arithmetic coding unit 301 and the arithmetic decoding unit 401 are not limited to these examples. The probability information may directly show the occurrence probability of a data item without using any context index, occurrence probability index, and MPS value.

Figure 100:
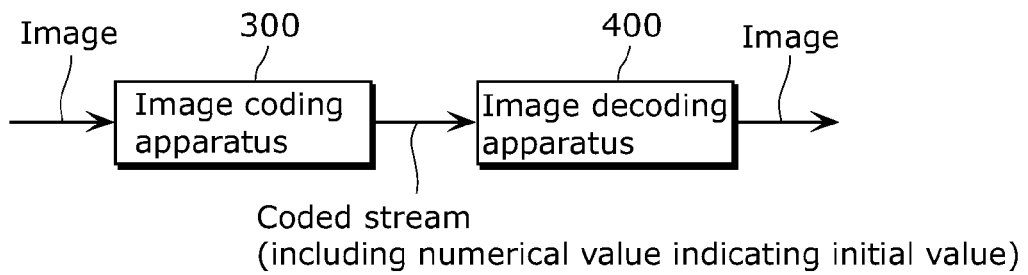
FIG. 100 is a conceptual diagram showing the relationship between an image coding apparatus and an image decoding apparatus according to Embodiment F1.

FIG. 100 is a conceptual diagram showing the relationship between the image coding apparatus 300 shown in FIG. 92 and the image decoding apparatus 400 shown in FIG. 94. The addition unit 303 of the image coding apparatus 300 adds, to the coded stream, the numerical value indicating the initial value used for the initialization of the probability information. The numerical value indicating the initial value is different from an identifier for identifying the type, the segment, or the like. For example, this numerical value may have a relationship as a function having continuity such as a linear function formed in arithmetic calculations with respect to an initial value.

The obtaining unit 403 of the image decoding apparatus 400 obtains the numerical value indicating the initial value from the coded stream. The initialization unit 402 of the image decoding apparatus 400 initializes the probability information using the initial value shown by the numerical value. In this way, the probability information at the coding side matches the probability information at the decoding side.

As shown in FIG. 100, the numerical value indicating the initial value is transmitted to the decoding side. Accordingly, there are few restrictions in the determination of initial values, compared to the case where the identifiers of types, segments, or the like are transmitted. For this reason, the initialization unit 302 of the image coding apparatus 300 is capable of determining appropriate initial values at fine intervals. Accordingly, the coding efficiency is increased.

Figure 101:
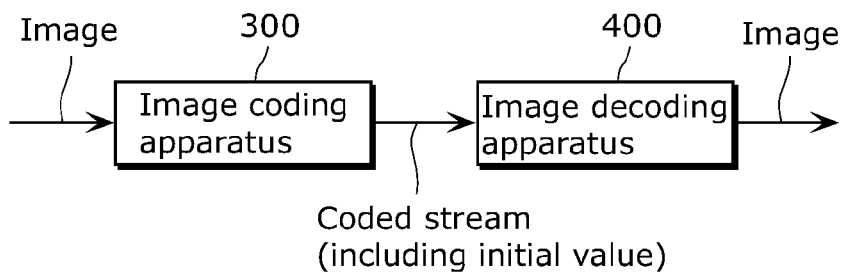
FIG. 101 is a diagram of a first example of a numerical value indicating an initial value according to Embodiment F1.

FIG. 101 is a diagram showing a first example of a numerical value for use in the image coding apparatus 300 shown in FIG. 92 and the image decoding apparatus 400 shown in FIG. 94. In the example of FIG. 101, the addition unit 303 of the image coding apparatus 300 adds, to the coded stream, the numerical value that is an initial value used to initialize the probability information. In other words, the addition unit 303 adds the raw value of the occurrence probability to the coded stream.

The obtaining unit 403 of the image decoding apparatus 400 obtains, as the initial value, the numerical value that is the raw value of the occurrence probability from the coded stream. Then, the initialization unit 402 of the image decoding apparatus 400 initializes the probability information using the initial value obtained from the coded stream. In this way, the probability information at the coding side matches the probability information at the decoding side.

In the example of FIG. 101, the raw initial value is transmitted to the decoding side. Accordingly, fine control of initial values is possible. Furthermore, increases in the calculation amounts are suppressed in the image coding apparatus 300 and the image decoding apparatus 400.

Figure 102:
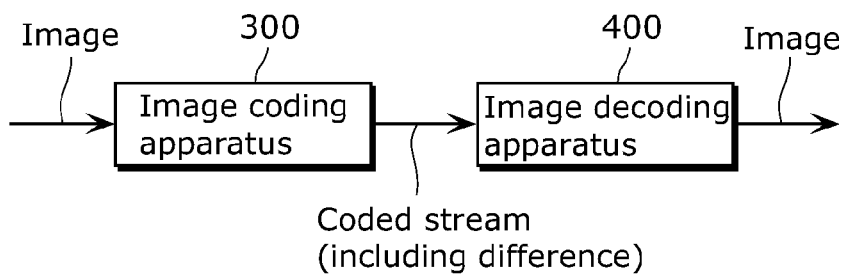
FIG. 102 is a diagram of a second example of a numerical value indicating an initial value according to Embodiment F1.

FIG. 102 is a diagram showing a second example of a numerical value for use in the image coding apparatus 300 shown in FIG. 92 and the image decoding apparatus 400 shown in FIG. 94. In the example of FIG. 102, the addition unit 303 of the image coding apparatus 300 adds a difference as the initial value to the coded stream. This difference is a difference between the initial value used to initialize the probability information and the previous initial value used to initialize the previous probability information.

The obtaining unit 403 of the image decoding apparatus 400 obtains the difference as the numerical value indicating the initial value from the coded stream. The initialization unit 402 of the image decoding apparatus 400 calculates the initial value by adding the difference to the previous initial value, and initializes the probability information using the calculated initial value. In this way, the probability information at the coding side matches the probability information at the decoding side.

In the example of FIG. 102, the difference is transmitted to the decoding side. Accordingly, the information amount for the transmission is reduced. In addition, fine control of initial values is possible. For this reason, the coding efficiency is increased.

Figure 103:
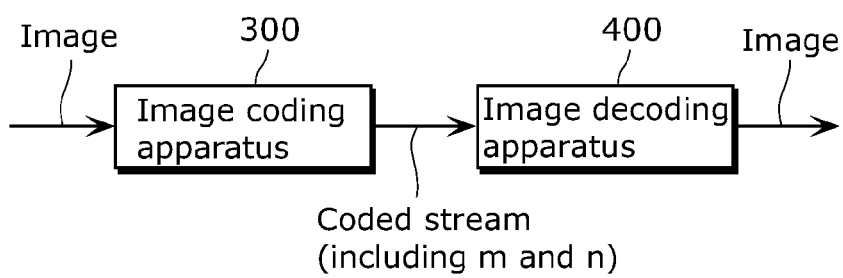
FIG. 103 is a diagram of a third example of a numerical value indicating an initial value according to Embodiment F1.

FIG. 103 is a diagram showing a third example of a numerical value for use in the image coding apparatus 300 shown in FIG. 92 and the image decoding apparatus 400 shown in FIG. 94. In the example of FIG. 103, the addition unit 303 of the image coding apparatus 300 adds, as numerical values indicating initial values, m and n used to initialize the probability information to the coded stream. These m and n are values corresponding to m and n shown in FIG. 98 etc.

In other words, the initialization unit 302 of the image coding apparatus 300 updates m and n for initialization based on the image characteristics and so on. Then, as shown in FIG. 99, the initialization unit 302 calculates initial values using the modified m and n. The initialization unit 302 initializes the probability information using the calculated initial values. In addition, the addition unit 303 adds the modified m and n to the coded stream.

The obtaining unit 403 of the image decoding apparatus 400 obtains the m and n as the numerical values indicating the initial values from the coded stream. Then, the initialization unit 402 of the image decoding apparatus 400 calculates initial values using the m and n, and initializes the probability information using the calculated initial values. In this way, the probability information at the coding side matches the probability information at the decoding side.

In the example of FIG. 103, m and n are transmitted to the decoding side. The initial values are calculated according to the same expressions in both the coding side and the decoding side. Typically, these expressions are the same as in expressions for use in arithmetic coding and arithmetic decoding. Accordingly, the processing is simplified.

The examples of FIG. 101 and FIG. 103 described above may be used in combination. For example, when raw initial values are added, the initial values may be used only in a single slice. When m and n are added, initial values may be calculated using the m and n for each of the succeeding slices.

Alternatively, the differences between m and n used for initialization and previous m and n used for previous initialization may be transmitted as numerical values indicating the initial values. Alternatively, the differences between m and n used for initialization and m and n predetermined in both the coding side and the decoding side may be transmitted as numerical values indicating the initial values.

Figure 104:
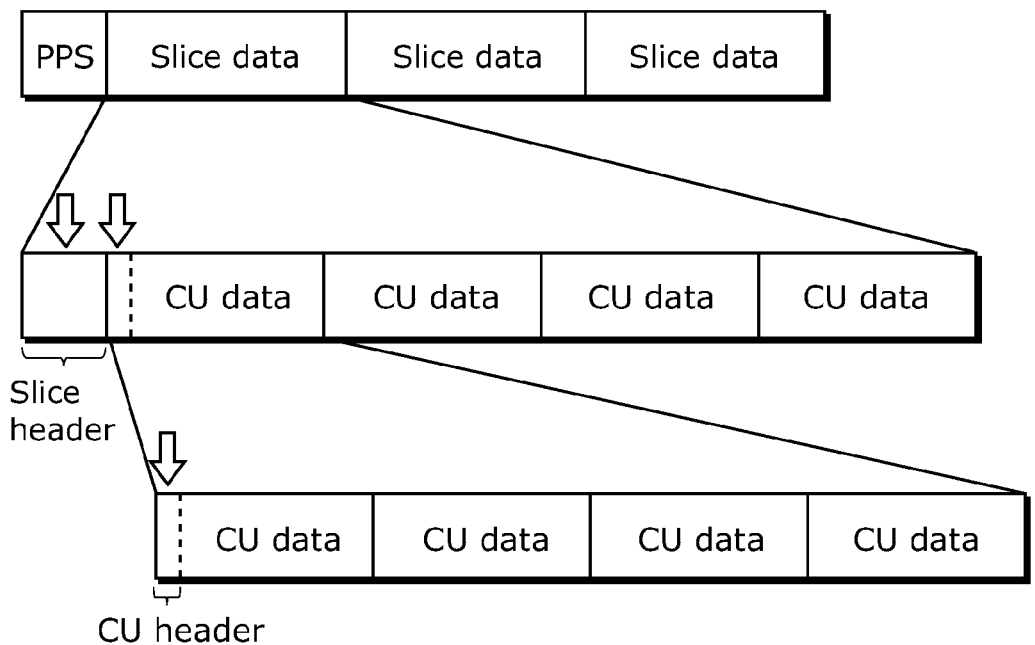
FIG. 104 is an illustration of an example of storage destinations of the numerical values indicating initial values according to Embodiment F1.

FIG. 104 is an illustration of an example of storage destinations of numerical values indicating initial values in the coded stream shown in FIG. 91. The portions shown by arrows in FIG. 104 are the exemplary storage destinations of the numerical values indicating the initial values. For example, the addition unit 303 of the image coding apparatus 300 may store the numerical values indicating the initial values into each slice header. In addition, the addition unit 303 may store the numerical values indicating the initial values in each coding unit header. In addition, the addition unit 303 may store the numerical values indicating the initial values in the header of the maximum coding unit.

The addition unit 303 determines the storage destination(s) according to a time point at which the initialization unit 302 initializes the probability information, and stores the numerical values indicating the initial values at the determined storage destination(s). For example, when the initialization unit 302 initializes the probability information at the top of each slice, the addition unit 303 stores the numerical values indicating the initial values into a corresponding slice header. In addition, for example, when the initialization unit 302 initializes the probability information in the middle of each slice, the addition unit 303 stores the numerical values indicating the initial values into a corresponding coding unit header. In this way, the initialization timing is transmitted.

Here, FIG. 104 shows the examples of the storage destinations, and thus storage destinations are not limited to the examples in FIG. 104. For example, the numerical values indicating the initial values may be stored in a picture parameter set, or in a sequence parameter set.

In addition, the addition unit 303 may add hierarchical depth information for identifying a storage destination in any one of a sequence parameter set, a picture parameter set, or a slice header. As described above, the coding units have a hierarchical structure. The hierarchical depth information shows the depth of a coding unit having a header in which the numerical values indicating the initial values are stored, in the hierarchy composed of the coding units.

In a deep hierarchical layer, a coding unit is comparatively small. When initialization frequently occurs in such a small data unit, the coding efficiency is decreased by the transmission of information for the initialization. To prevent this, the initialization unit 302 performs initialization of probability information only in one or more hierarchical layers shallower than a predetermined hierarchical layer. In this way, the decrease of the coding efficiency is suppressed. In addition, the addition unit 303 adds hierarchical information indicating the predetermined hierarchical layer to the coded stream. In this way, the obtaining unit 403 of the image decoding apparatus 400 is capable of efficiently identifying the coding unit header in which the numerical values indicating the initial values are stored.

The obtaining unit 403 of the image decoding apparatus 400 obtains numerical values from the aforementioned storage destinations. Then, the initialization unit 402 of the image decoding apparatus 400 initializes the probability information in the decoding side according to the storage destinations from which the numerical values are obtained. In this way, the probability information at the decoding side is initialized according to a time point at which the probability information at the coding side is initialized.

Figure 105:
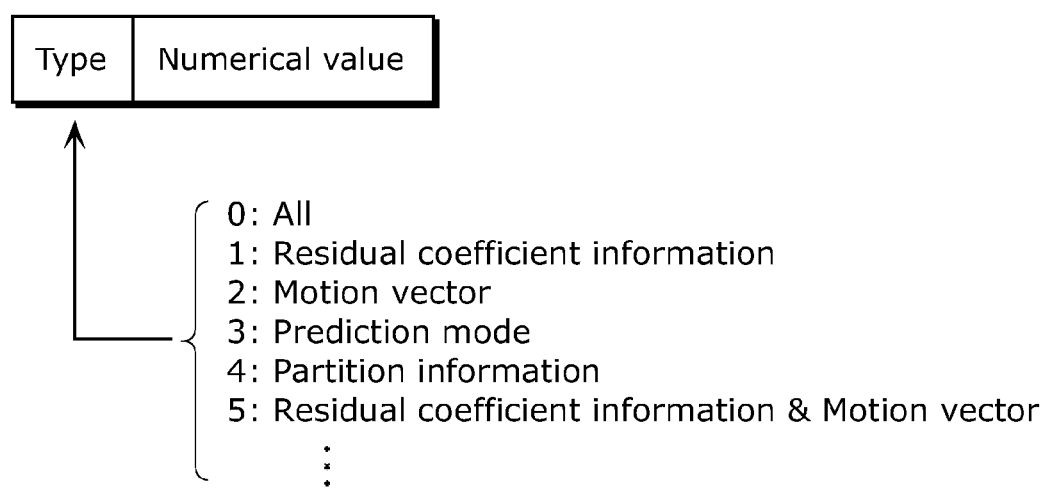
FIG. 105 is an illustration of an example of a storage format of the numerical values indicating initial values according to Embodiment F1.

FIG. 105 is an illustration of an example of a storage format of numerical values that are stored in storage destinations shown in FIG. 104. In the example of FIG. 105, the numerical values are stored together with the identifier of a type (a data type). Examples of the type include, residual coefficient information (a coefficient block), a motion vector, a prediction mode, and partition information. The numerical values show initial values corresponding to the type.

Furthermore, the identifier that is stored in the coded stream may be an identifier showing a plurality of types. In this case, plural numerical values respectively corresponding to plural types may be stored. Alternatively, a single numerical value corresponding to plural types may be stored. For example, "0" in FIG. 105 shows all the types. In this case, the numerical values respectively corresponding to all the types are stored. Alternatively, a single numerical value corresponding to all the types may be stored.

The addition unit 303 of the image coding apparatus 300 adds, to the coded stream, the identifier of at least one of the types and the numerical value(s) indicating the initial value corresponding to the type. The obtaining unit 403 of the image decoding apparatus 400 obtains, from the coded stream, the identifier of at least one of the types and the numerical value(s) indicating the initial value corresponding to the type.

In the example of FIG. 105, the arithmetic coding unit 301 of the image coding apparatus 300 codes an image for each block and for each data type using the probability information corresponding to the plural types, while updating the probability information. In this way, the arithmetic coding unit 301 generates a coded stream. In addition, the initialization unit 302 of the image coding apparatus 300 initializes the probability information using the initial value(s) for the at least one of the plural types. The addition unit 303 of the image coding apparatus 300 adds, to the coded stream, the identifier of the at least one type and the numerical value(s) indicating the initial value corresponding to the type.

In addition, the arithmetic decoding unit 401 of the image decoding apparatus 400 decodes the image for each block and for each type using the probability information corresponding to the plural types, while updating the probability information. The obtaining unit 403 of the image decoding apparatus 400 obtains, from the coded stream, the identifier of at least one of the plural types and the numerical value(s). The initialization unit 402 of the image decoding apparatus 400 initializes the probability information using the initial value(s) for the at least one type shown by the identifier.

In this way, the probability information is initialized according to the type. Accordingly, appropriate probability information is used for each type. In addition, the probability information is initialized at an appropriate time point according to the type.

Figure 106:
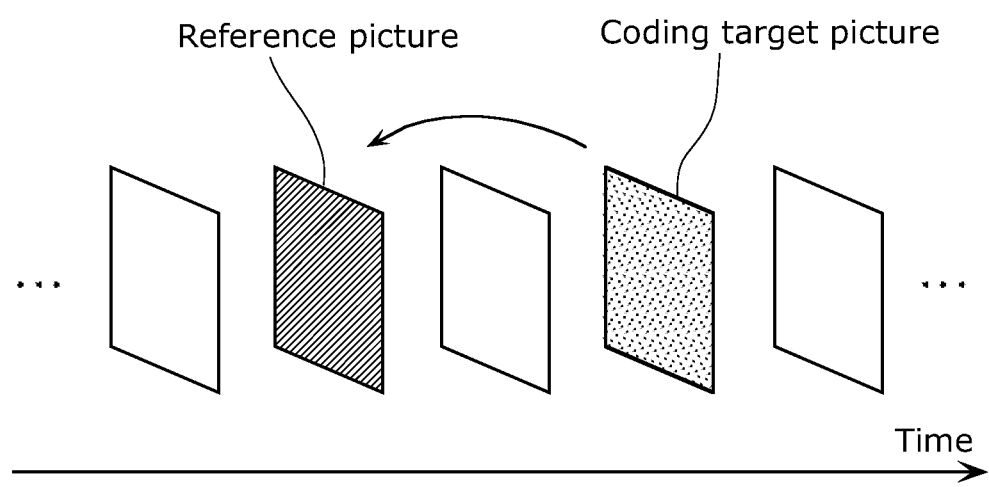
FIG. 106 is a conceptual illustration showing the relationship between a coding target picture and a reference picture according to Embodiment F1.

FIG. 106 is an illustration showing the relationship between a coding target picture that is coded by the image coding apparatus 300 shown in FIG. 92 and a reference picture. The image coding apparatus 300 may code the coding target picture with reference to a plurality of reference pictures according to inter prediction. In this case, the reference picture is determined for each block of the coding target picture. In other words, the image coding apparatus 300 may code the coding target picture with reference to a plurality of reference pictures. Likewise, the image decoding apparatus 400 may decode a decoding target picture with reference to a plurality of reference pictures.

In this case, the initialization unit 302 of the image coding apparatus 300 may calculate an initial value using the distance to the reference picture that is temporally closest from the coding target picture. For example, depending on the data type, there is a possibility that an occurrence probability is higher as the distance between the coding target picture and the reference picture is closer. In the case of such data type, the initialization unit 302 calculates the initial value such that the occurrence probability is higher as the distance between the coding target picture and the reference picture is closer.

More specifically, the initialization unit 302 multiplies the distance between the coding target picture and the reference picture by a magnification corresponding to the correlation between the distance and the occurrence probability. Then, the initialization unit 302 adds a value obtained from the multiplication to a predetermined offset value. According to such calculation, the initialization unit 302 may calculate an initial value.

Then, the addition unit 303 of the image coding apparatus 300 may add numerical values that are used in the calculation to the coded stream. For example, the addition unit 303 may add the magnification and the offset value to the coded stream.

On the other hand, according to the operation performed by the coding side, the obtaining unit 403 of the image decoding apparatus 400 obtains, from the coded stream, the numerical value(s) for calculating the initial value. The initialization unit 402 of the image decoding apparatus 400 calculates the initial value using the distance to the reference picture that is temporally closest from a decoding target picture and the obtained numerical values. The initialization unit 402 initializes the probability information using the calculated initial values.

For example, the obtaining unit 403 may obtain the magnification and the offset value from the coded stream according to the operations by the coding side. The initialization unit 402 may calculate an initial value by multiplying the distance by a magnification and adding an offset value to the multiplication result. The initialization unit 402 may initialize the probability information using the calculated initial value.

The above-described operations are examples using the distance between the coding target picture and the reference picture. Thus, such a distance does not need to be always used in the calculations of initial values.

In addition, a resolution of an image may be used to calculate an initial value instead of such a distance or in combination with the distance. In this case, the addition unit 303 of the image coding apparatus 300 adds, to a coded stream, numerical values for calculating an initial value using the resolution of the image. Then, the obtaining unit 403 of the image decoding apparatus 400 obtains, from the coded stream, the numerical values for calculating the initial value using the resolution of the image.

As described above, the image coding apparatus 300 according to this embodiment initializes probability information as necessary. When the probability information is initialized using the initial value, the image coding apparatus 300 adds the numerical value indicating the initial value to the coded stream.

In this way, the probability information at the coding side matches the probability information at the decoding side. In addition, the image coding apparatus 300 is capable of initializing probability information at an arbitrary timing. Furthermore, the image coding apparatus 300 is capable of performing fine control of initial values for use in initialization by transmitting numerical values indicating initial values to the decoding side. This control is finer than the control performed by transmitting identifiers of initial values to the decoding side. Accordingly, the image coding apparatus 300 is capable of controlling probability information more flexibly, and using more appropriate probability information. For this reason, the coding efficiency is increased.

In addition, when a numerical value indicating an initial value is obtained, the image decoding apparatus 400 initializes the probability information using the initial value indicated by the numerical value. In this way, the probability information at the coding side matches the probability information at the decoding side. Accordingly, the image decoding apparatus 400 is capable of using appropriate probability information.

The image coding apparatus and image decoding apparatus according to the present invention have been described above, but the present invention is not limited to these embodiments. Those skilled in the art will readily appreciate that many modifications are possible in the exemplary embodiments and other embodiments are possible by arbitrarily combining the structural elements of the embodiments. Accordingly, all of such modifications and other embodiments are intended to be included within the scope of the present invention.

For example, some of the processes performed by a particular one of the processing units may be executed by another processing unit or another one of the processing units. Alternatively, the sequence in which the processes are executed may be modified, or some of the processes may be executed in parallel. Alternatively, an exclusive or shared storage unit for storing various kinds of information may be added to the configuration of the image coding and/or decoding apparatus.

Furthermore, the present invention can be implemented not only as an image coding apparatus and an image decoding apparatus, but also an image coding method and an image decoding method which have the steps corresponding to the processing units of the image coding apparatus and the image decoding apparatus. For example, these steps are executed by one or more computers. Furthermore, the present invention can be implemented as one or more programs for causing the one or more computers to execute the steps of the methods. Furthermore, the present invention can be implemented as a non-transitory computer-readable recording medium such as a CD-ROM on which the programs are recorded.

The structural elements of the image coding apparatus and the image decoding apparatus may be implemented as one or more Large Scale Integrated circuits. Each of these structural elements may be made on a one chip, or some or all of these structural elements may be integrated into a single chip. For example, the structural elements other than the storage unit may be integrated into a single chip. The name used here is an LSI, but it may also be referred to as an IC, a system LSI, a super LSI, or an ultra LSI, depending on the degree of integration.

Moreover, ways to achieve such integration are not limited to the LSI, and special circuit or general purpose processor and so forth can also achieve the integration. A Field Programmable Gate Array (FPGA) that can be programmed or a reconfigurable processor that allows re-configuration of the connection or configuration of LSI can be used for the same purpose.

Furthermore, when a circuit integration technology for replacing LSIs with new circuits appears in the future with advancement in semiconductor technology and derivative other technologies, the circuit integration technology may be naturally used to integrate functional the structural elements of the image coding apparatus and the image decoding apparatus.

As described above, an image coding method according to an aspect of the present invention is an image coding method of coding an image on a block-by-block basis, including: performing arithmetic coding on the image on a block-by-block basis, using probability information indicating occurrence probabilities of data while updating the probability information, so as to generate a coded stream; initializing the probability information using an initial value; and adding, to the coded stream, a numerical value that indicates the initial value and is different from an identifier.

In addition, for example, in the adding, the initial value is added as the numerical value to the coded stream.

In addition, for example, in the adding, a difference between the initial value and a previous initial value is added as the numerical value to the coded stream, the initial value being used to initialize the probability information and the previous initial value being used to initialize previous probability information.

In addition, for example, in the adding, at least one of a multiplication coefficient and an addition coefficient is added as the fixed value information to the coded stream, the multiplication coefficient and the addition coefficient being for calculating the fixed value by performing calculations including a multiplication and an addition based on a quantization parameter that is determined for each of slices included in the image.

In addition, for example, in the initializing, the initial value is calculated from the numerical value and a distance to a reference picture that is temporally closest from a coding target picture of the image, and the probability information is initialized using the calculated initial value, and in the adding, the numerical value for calculating the initial value using the distance is added to the coded stream.

In addition, for example, in the initializing, the initial value is calculated from the numerical value and a resolution of the image, and the probability information is initialized using the calculated initial value, and in the adding, the numerical value for calculating the initial value using the resolution is added to the coded stream.

In addition, for example, in the adding, the numerical value is added to one of a header of a slice included in the image and a header of a coding unit that is a block included in the image.

In addition, for example, in the generating, the coded stream is generated by performing arithmetic coding on the image for each of blocks according to a data type of the block using the probability information corresponding to the data types while updating the probability information, in the initializing, the probability information is initialized, using the initial value, for at least one of the data types, and in the adding, an identifier indicating the at least one data type and the numerical value are added to the coded stream.

In addition, an image decoding method according to an aspect of the present invention is an image decoding method of decoding an image included in a coded stream on a block-by-block basis, including: performing arithmetic decoding on the image included in the coded stream on a block-by-block basis, using probability information indicating occurrence probabilities of data while updating the probability information; obtaining, from the coded stream, a numerical value that indicates the initial value for initializing the probability information and is different from an identifier; and initializing the probability information using the initial value indicated by the numerical value.

In addition, for example, in the obtaining, the initial value is obtained as the numerical value from the coded stream.

In addition, for example, in the obtaining, a difference between the initial value and a previous initial value is obtained as the numerical value from the coded stream, the initial value being used to initialize the probability information and the previous initial value being used to initialize previous probability information.

In addition, for example, in the obtaining, at least one of a multiplication coefficient and an addition coefficient is obtained as the numerical value from the coded stream, the multiplication coefficient and the addition coefficient being for calculating the initial value by performing calculations including a multiplication and an addition based on a quantization parameter that is determined for each of slices included in the image.

In addition, for example, in the obtaining, the numerical value for calculating the initial value is obtained from the coded stream, using a distance to a reference picture that is temporally closest from a decoding target picture of the image, and in the initializing, the initial value is calculated from the numerical value and the distance, and the probability information is initialized using the calculated initial value.

In addition, for example, in the obtaining, the numerical value for calculating the initial value using a resolution of the image is obtained from the coded stream, and in the initializing, the initial value is calculated from the numerical value and the resolution, and the probability information is initialized using the calculated initial value.

In addition, for example, in the obtaining, the numerical value is obtained from one of a header of a slice included in the image and a header of a coding unit that is a block included in the image.

In addition, for example, in the performing arithmetic decoding, arithmetic decoding is performed on the image for each of blocks according to a data type of the block using the probability information corresponding to the data types while updating the probability information, in the obtaining, an identifier indicating the at least one of the data types and the numerical value are obtained from the coded stream, and in the initializing, the probability information is initialized, using the initial value, for the at least one data type indicated by the identifier obtained in the obtaining.

In addition, an image coding apparatus according to an aspect of the present invention is an image coding apparatus which codes an image on a block-by-block basis, including: an arithmetic coding unit configured to perform arithmetic coding on the image on a block-by-block basis, using probability information indicating occurrence probabilities of data while updating the probability information, so as to generate a coded stream; an initialization unit configured to initialize the probability information using an initial value; and an addition unit configured to add, to the coded stream, a numerical value that indicates the initial value and is different from an identifier.

In addition, an image decoding apparatus according to an aspect of the present invention is an image decoding apparatus which decodes an image included in a coded stream on a block-by-block basis, including: an arithmetic decoding unit configured to perform arithmetic decoding on the image included in the coded stream on a block-by-block basis, using probability information indicating occurrence probabilities of data while updating the probability information; an obtaining unit configured to obtain, from the coded stream, a numerical value that indicates the initial value for initializing the probability information and is different from an identifier; and an initialization unit configured to initialize the probability information using the initial value indicated by the numerical value.

Embodiment G1

The processing described in each of embodiments can be simply implemented in an independent computer system, by recording, in a recording medium, a program for implementing the configurations of the moving picture coding method (image coding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture coding method (image coding method) and the moving picture decoding method (image decoding method) described in each of embodiments and systems using thereof will be described. The system has a feature of having an image coding and decoding apparatus that includes an image coding apparatus using the image coding method and an image decoding apparatus using the image decoding method. Other configurations in the system can be changed as appropriate depending on the cases.

Figure 107:
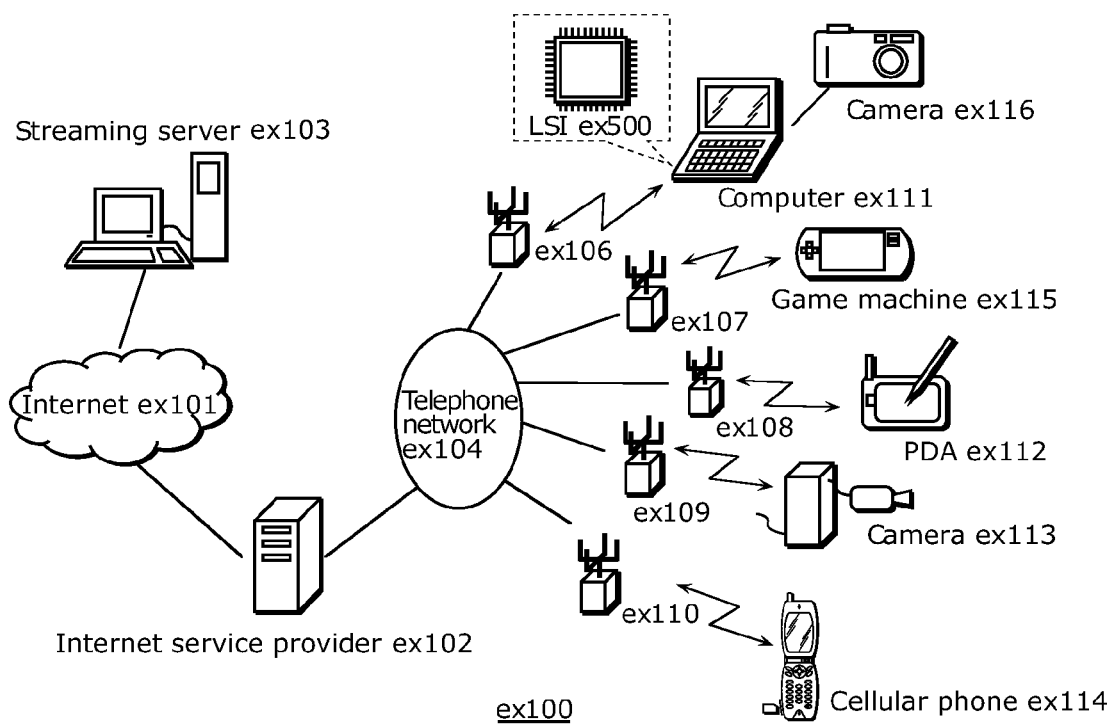
FIG. 107 shows an overall configuration of a content providing system for implementing content distribution services.

FIG. 107 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 107, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of embodiments (i.e., the camera functions as the image coding apparatus according to an aspect of the present invention), and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (i.e., functions as the image decoding apparatus according to an aspect of the present invention).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the video data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 108:
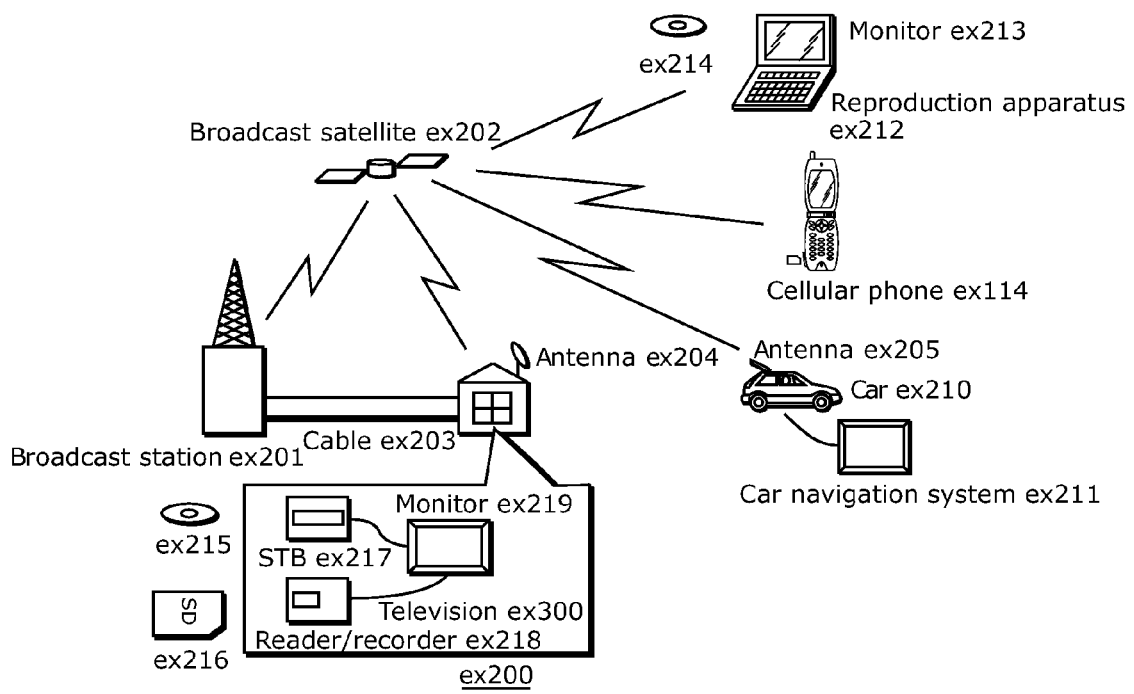
FIG. 108 shows an overall configuration of a digital broadcasting system.

Aside from the example of the content providing system ex100, at least one of the moving picture coding apparatus (image coding apparatus) and the moving picture decoding apparatus (image decoding apparatus) described in each of embodiments may be implemented in a digital broadcasting system ex200 illustrated in FIG. 108. More specifically, a broadcast station ex201 communicates or transmits, via radio waves to a broadcast satellite ex202, multiplexed data obtained by multiplexing audio data and others onto video data. The video data is data coded by the moving picture coding method described in each of embodiments (i.e., data coded by the image coding apparatus according to an aspect of the present invention). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an aspect of the present invention).

Furthermore, a reader/recorder ex218 (i) reads and decodes the multiplexed data recorded on a recording medium ex215, such as a DVD and a BD, or (i) codes video signals in the recording medium ex215, and in some cases, writes data obtained by multiplexing an audio signal on the coded data. The reader/recorder ex218 can include the moving picture decoding apparatus or the moving picture coding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 109:
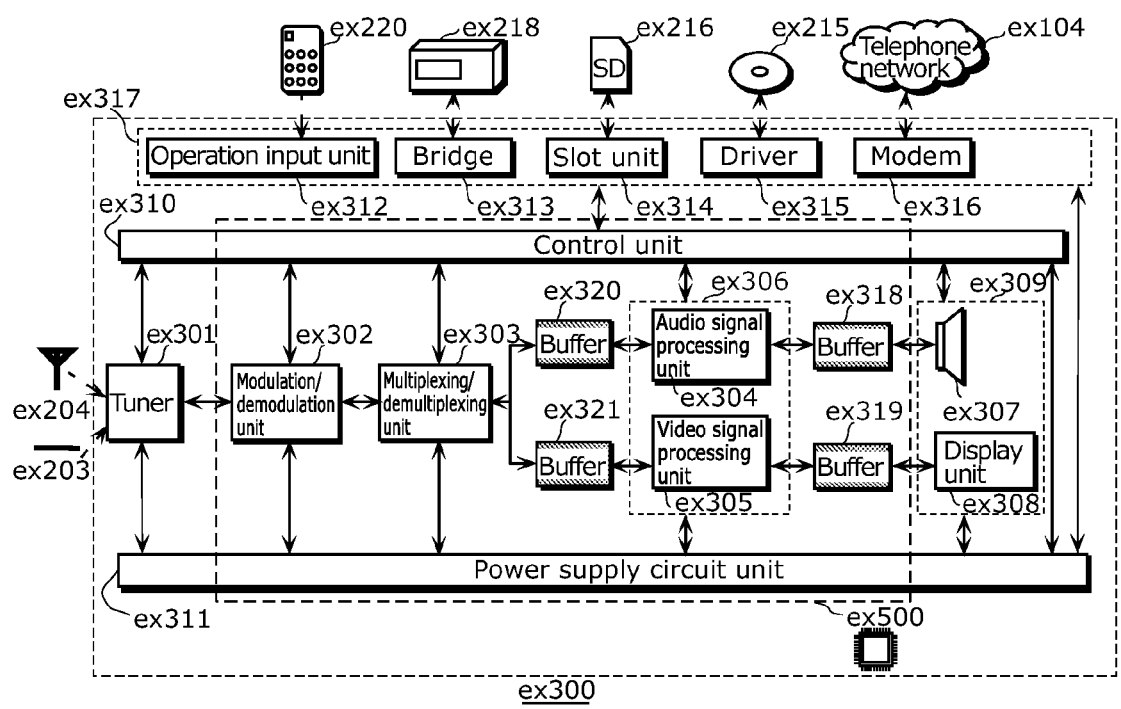
FIG. 109 shows a block diagram illustrating an example of a configuration of a television.

FIG. 109 illustrates the television (receiver) ex300 that uses the moving picture coding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively (which function as the image coding apparatus and the image decoding apparatus according to the aspects of the present invention); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 110:
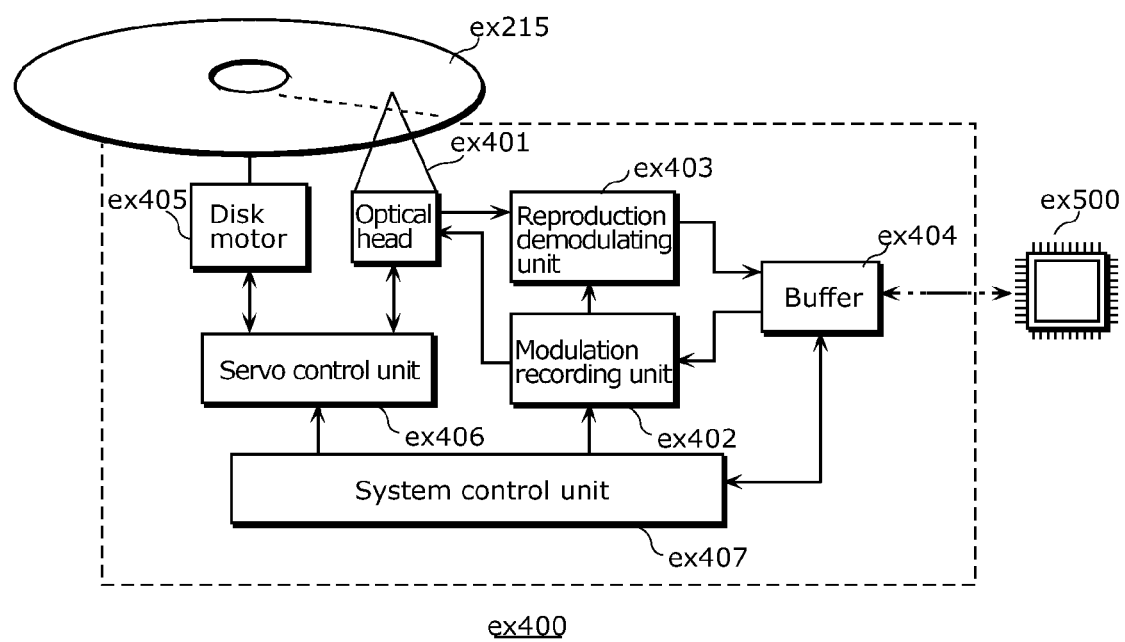
FIG. 110 shows a block diagram illustrating an example of a configuration of an information reproducing/recording unit that reads and writes information from and on a recording medium that is an optical disk.

As an example, FIG. 110 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 111:
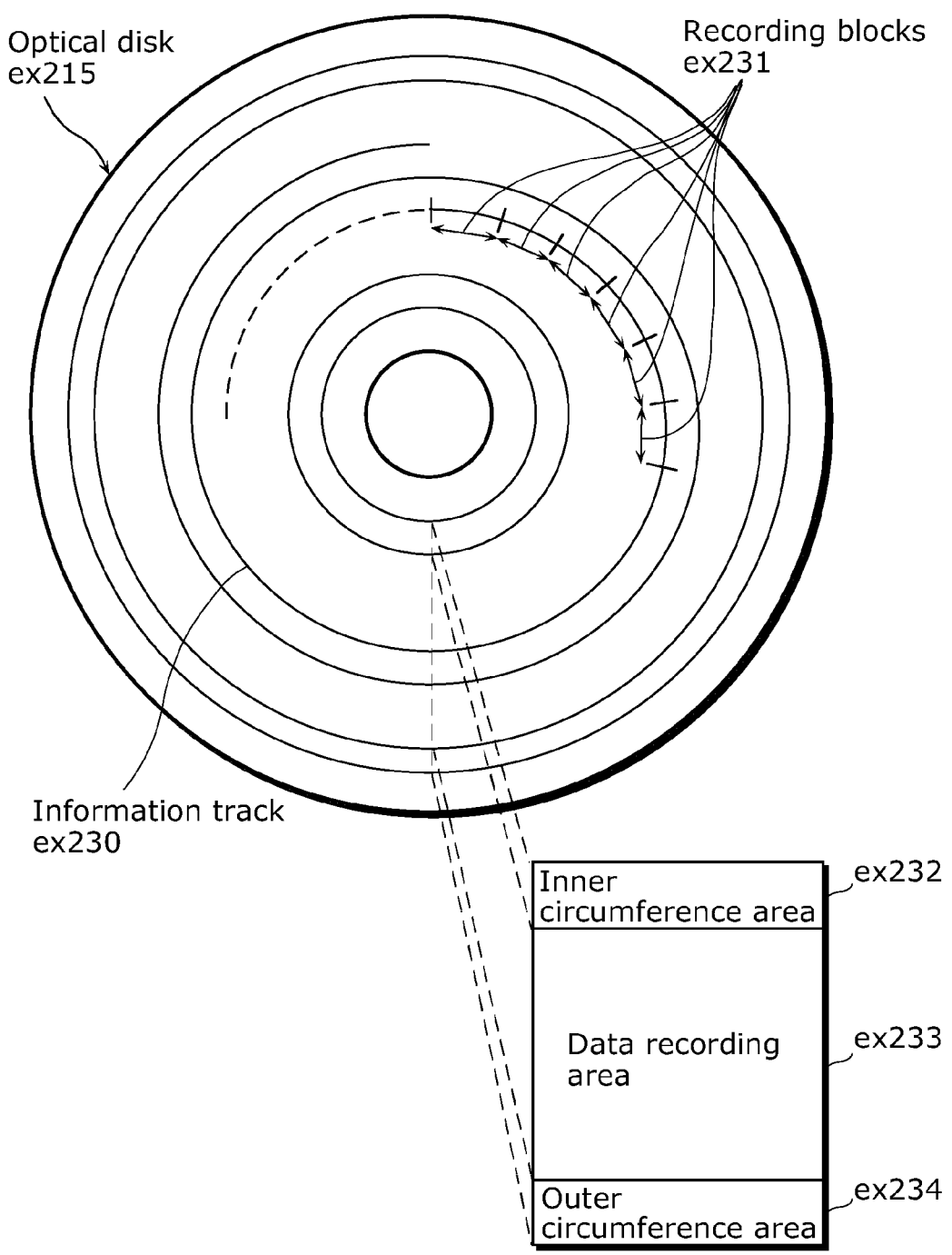
FIG. 111 shows an example of a configuration of a recording medium that is an optical disk.

FIG. 111 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 109. The same will be true for the configuration of the computer ex111, the cellular phone ex114, and others.

Figure 112A:
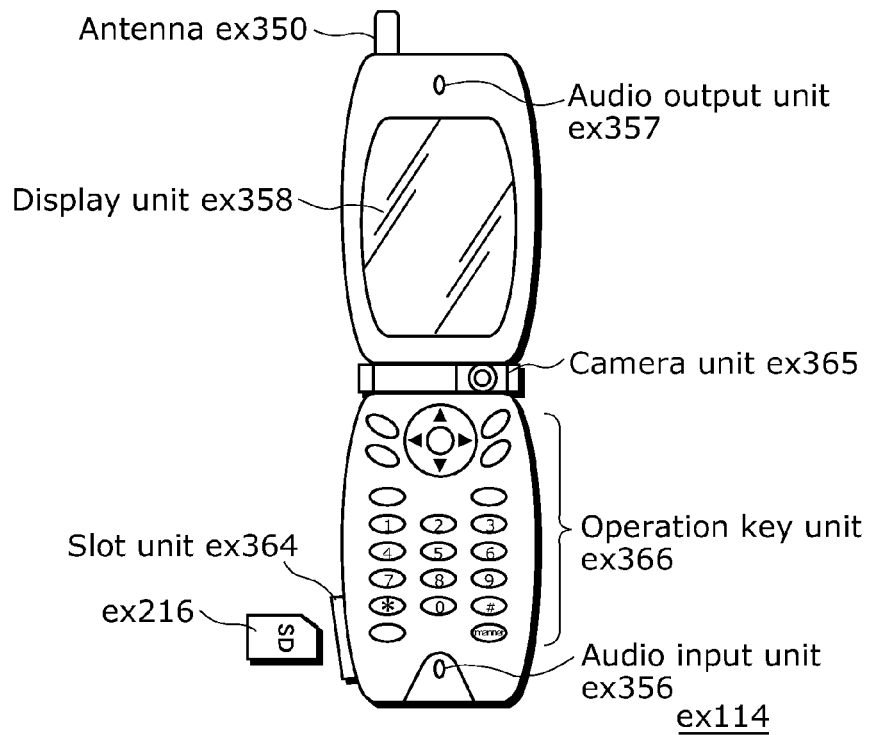
FIG. 112A shows an example of a cellular phone.

FIG. 112A illustrates the cellular phone ex114 that uses the moving picture coding method and the moving picture decoding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Figure 112B:
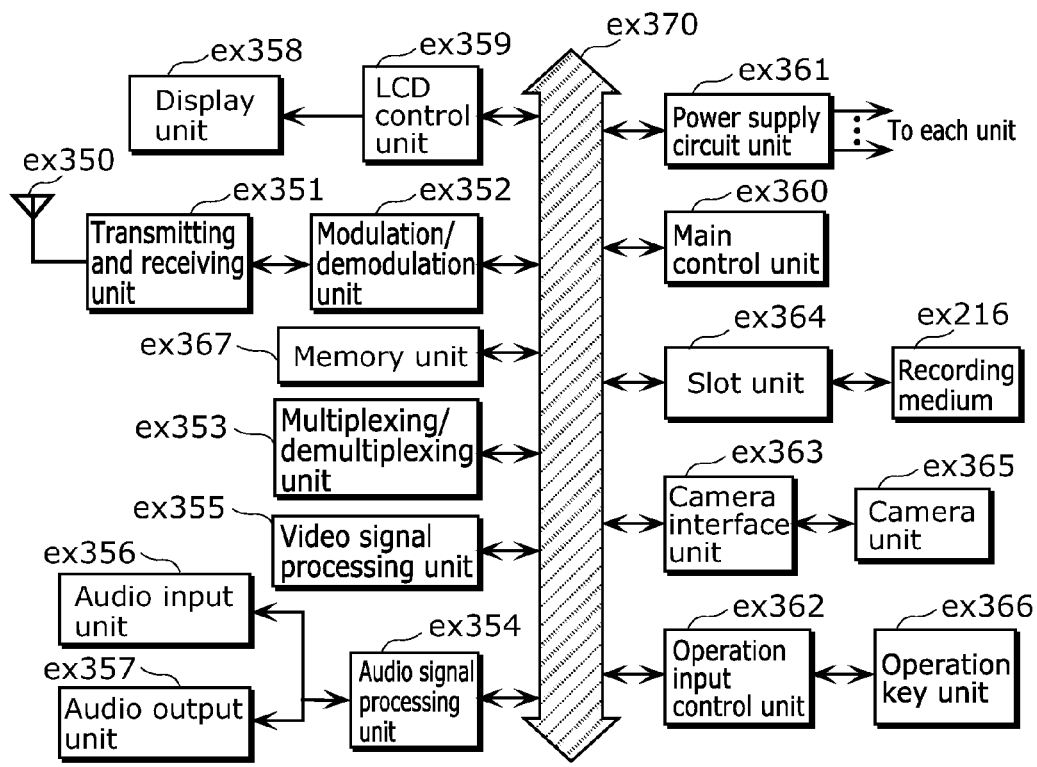
FIG. 112B is a block diagram showing an example of a configuration of a cellular phone.

Next, an example of a configuration of the cellular phone ex114 will be described with reference to FIG. 112B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in each of embodiments (i.e., functions as the image coding apparatus according to the aspect of the present invention), and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the moving picture coding method shown in each of embodiments (i.e., functions as the image decoding apparatus according to the aspect of the present invention), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of embodiments can be used in any of the devices and systems described. Thus, the advantages described in each of embodiments can be obtained.

Furthermore, the present invention is not limited to embodiments, and various modifications and revisions are possible without departing from the scope of the present invention.

Embodiment G2

Video data can be generated by switching, as necessary, between (i) the moving picture coding method or the moving picture coding apparatus shown in each of embodiments and (ii) a moving picture coding method or a moving picture coding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conform cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of embodiments will be hereinafter described. The multiplexed data is a digital stream in the MPEG-2 Transport Stream format.

FIG. 113 illustrates a structure of the multiplexed data. As illustrated in FIG. 113, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of embodiments, or in a moving picture coding method or by a moving picture coding apparatus in conformity with a conventional standard, such as MPEG-2, MPEG-4 AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 114:
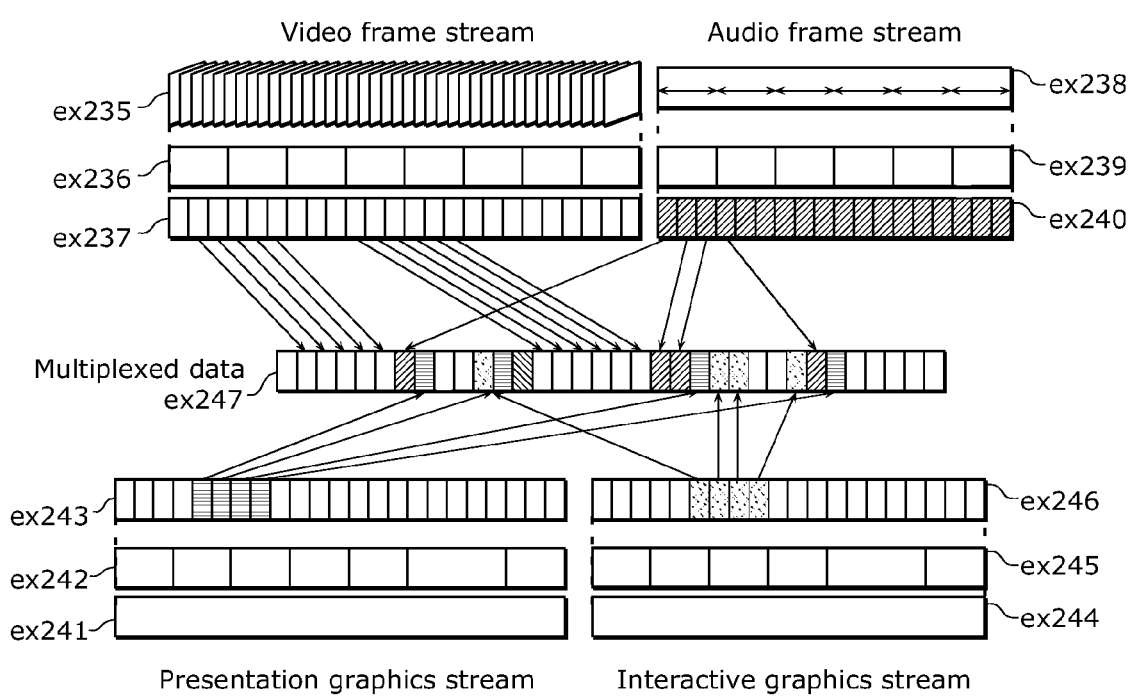
FIG. 114 schematically shows how each stream is multiplexed in multiplexed data.

FIG. 114 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 115:
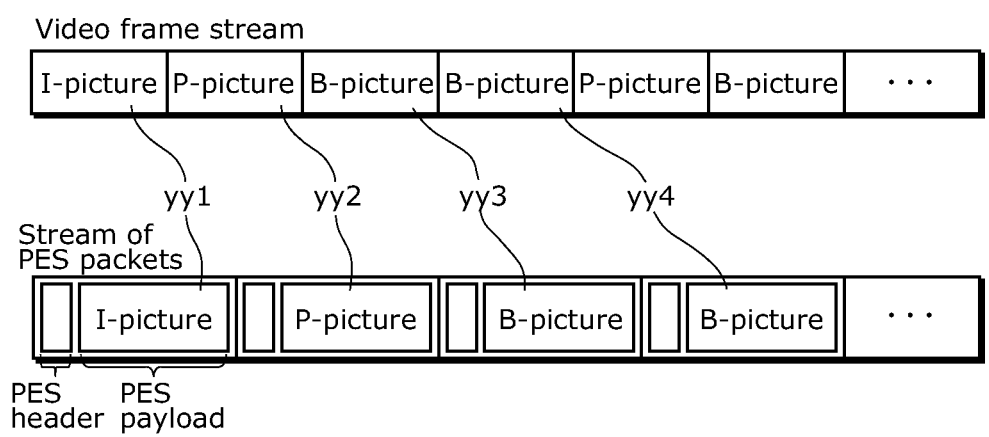
FIG. 115 shows how a video stream is stored in a stream of PES packets in more detail.

FIG. 115 illustrates how a video stream is stored in a stream of PES packets in more detail. The first bar in FIG. 115 shows a video frame stream in a video stream. The second bar shows the stream of PES packets. As indicated by arrows denoted as yy1, yy2, yy3, and yy4 in FIG. 115, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

FIG. 116 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 116. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 117:
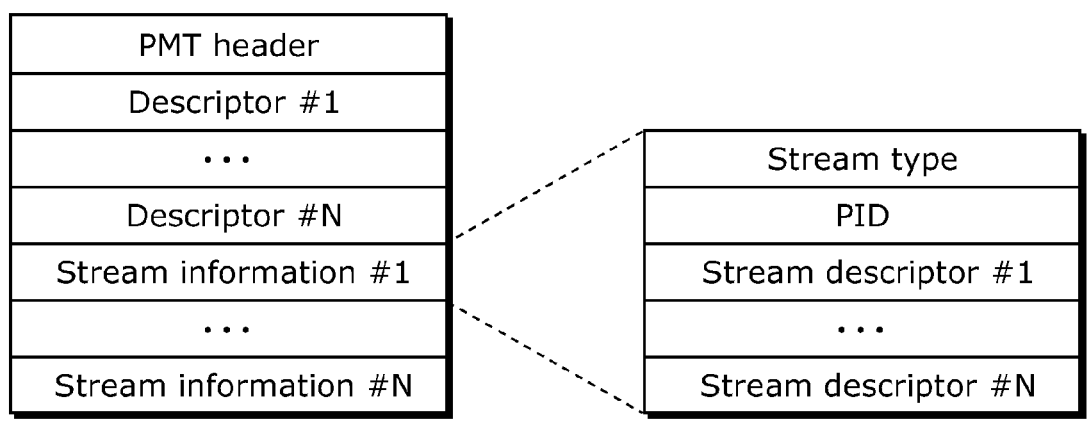
FIG. 117 shows a data structure of a PMT.

FIG. 117 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 118:
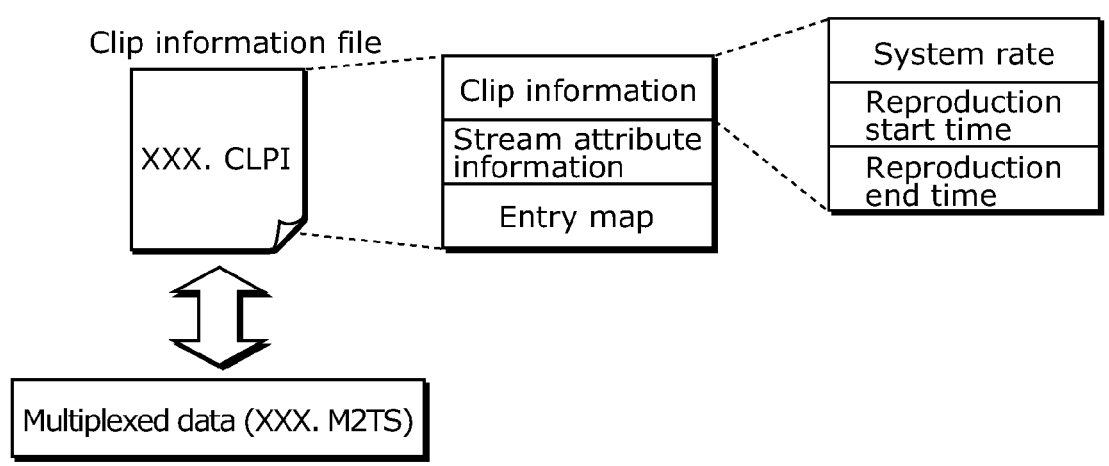

Each of the multiplexed data information files is management information of the multiplexed data as shown in FIG. 118. The multiplexed data information files are in one to one correspondence with the multiplexed data, and each of the files includes multiplexed data information, stream attribute information, and an entry map.

As illustrated in FIG. 118, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 119:
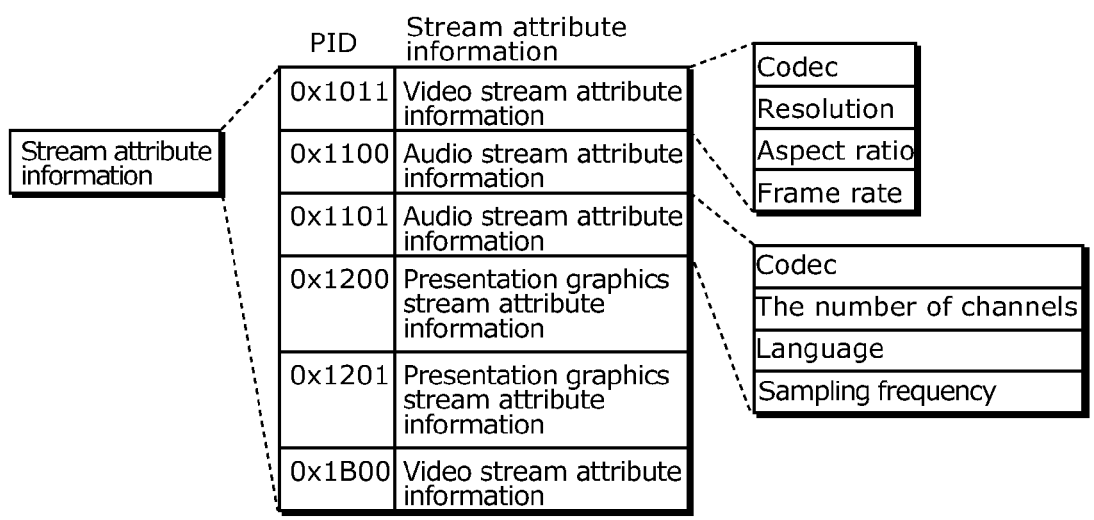

As shown in FIG. 119, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of embodiments includes a step or a unit for allocating unique information indicating video data generated by the moving picture coding method or the moving picture coding apparatus in each of embodiments, to the stream type included in the PMT or the video stream attribute information. With the configuration, the video data generated by the moving picture coding method or the moving picture coding apparatus described in each of embodiments can be distinguished from video data that conforms to another standard.

Figure 120:
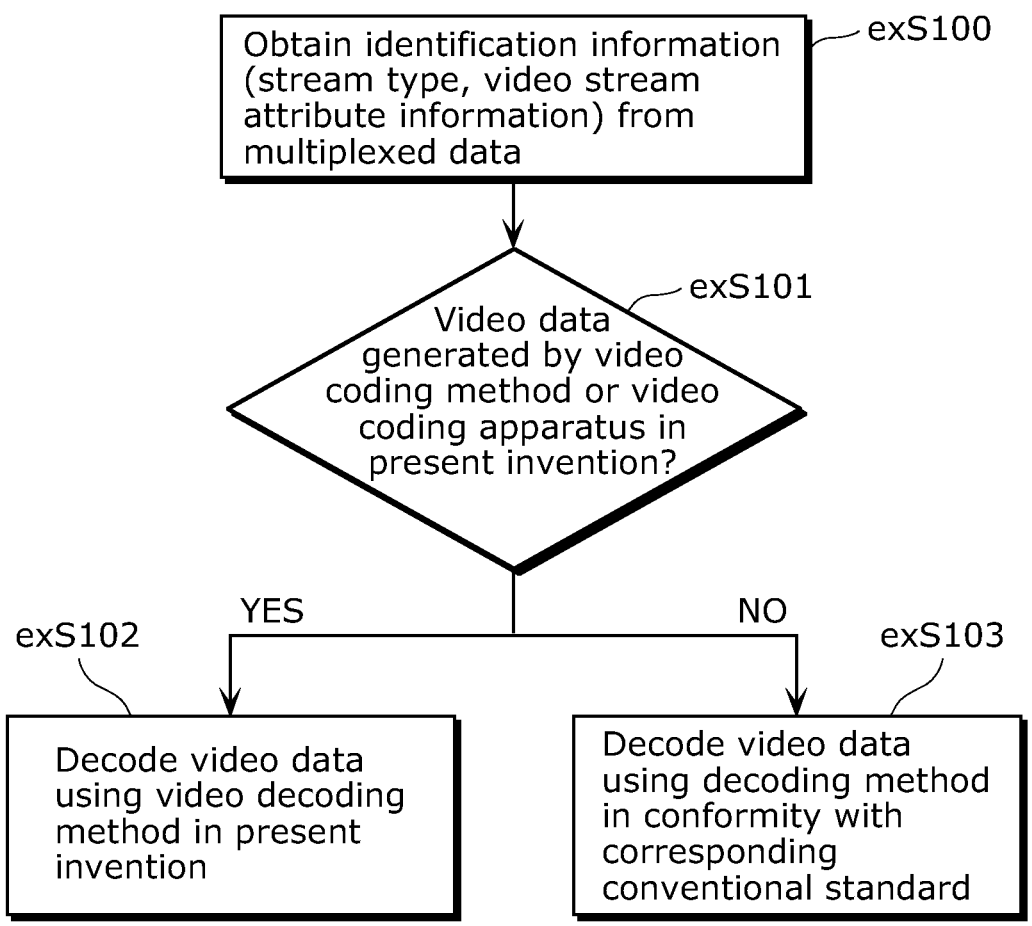

Furthermore, FIG. 120 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture coding method or the moving picture coding apparatus in each of embodiments. When it is determined that the stream type or the video stream attribute information indicates that the multiplexed data is generated by the moving picture coding method or the moving picture coding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture coding method or apparatus, or the moving picture decoding method or apparatus in the present embodiment can be used in the devices and systems described above.

Embodiment G3

Figure 121:
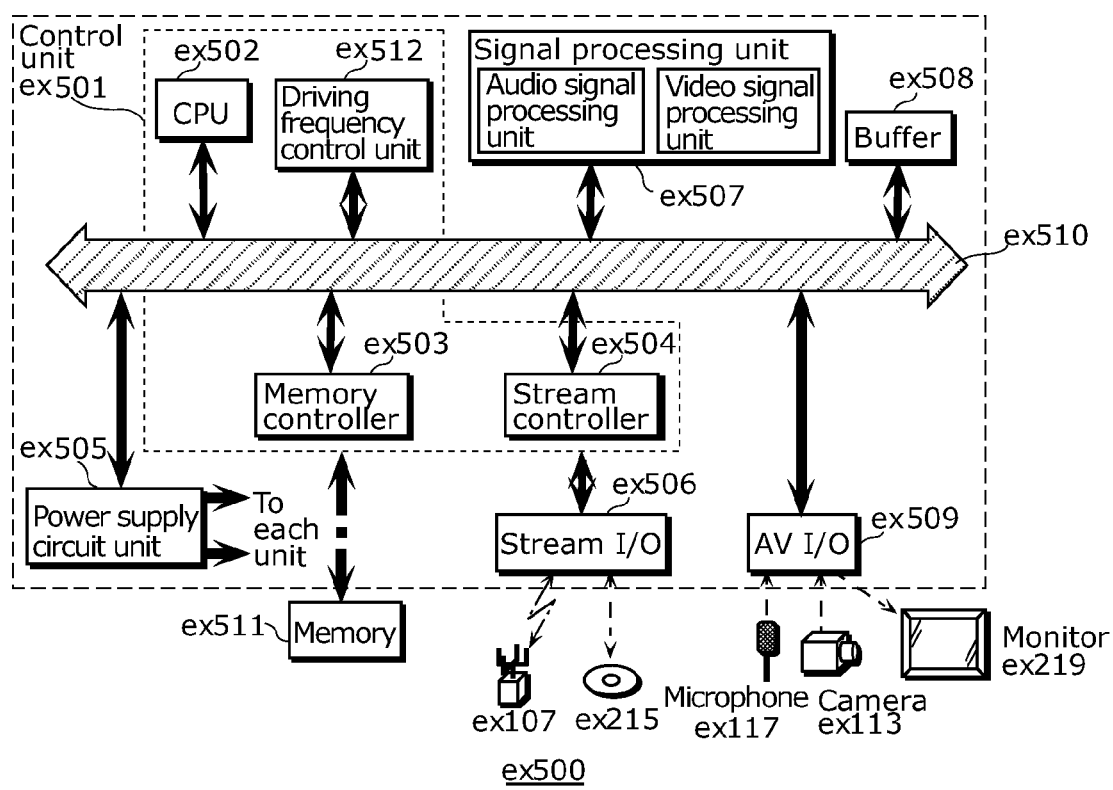

Each of the moving picture coding method, the moving picture coding apparatus, the moving picture decoding method, and the moving picture decoding apparatus in each of embodiments is typically achieved in the form of an integrated circuit or a Large Scale Integrated (LSI) circuit. As an example of the LSI, FIG. 121 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of embodiments. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present invention is applied to biotechnology.

Embodiment G4

When video data generated in the moving picture coding method or by the moving picture coding apparatus described in each of embodiments is decoded, compared to when video data that conforms to a conventional standard, such as MPEG-2, MPEG-4 AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 122:
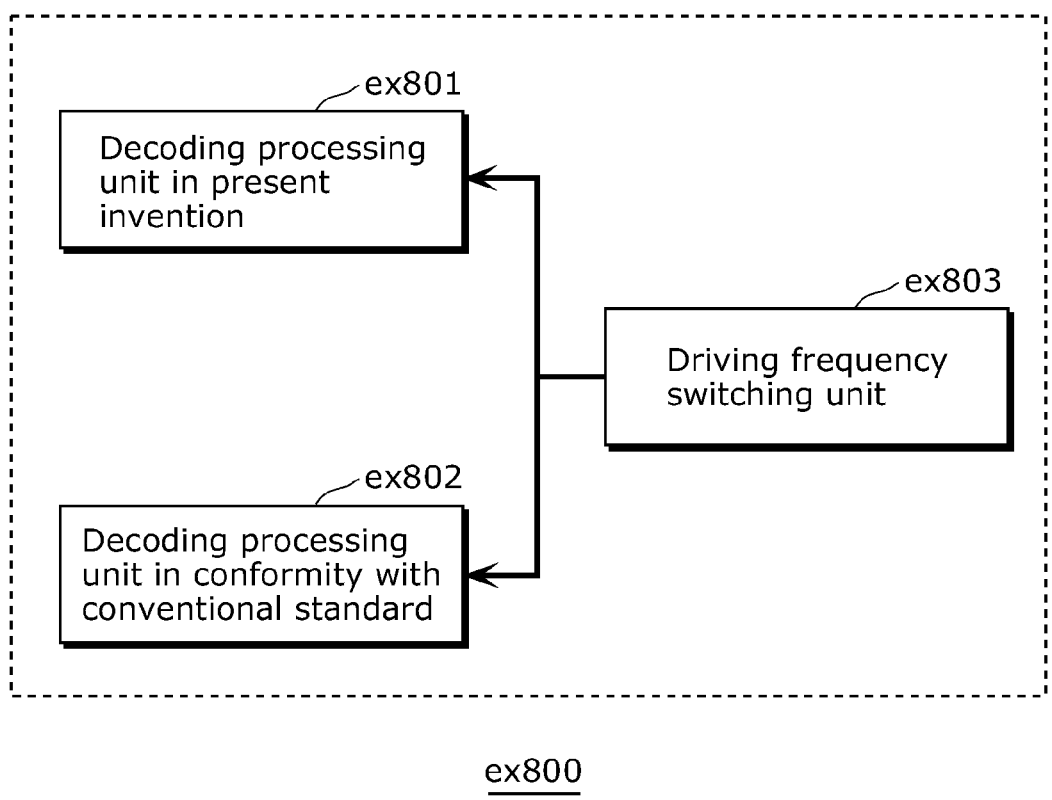

In order to solve the problem, the moving picture decoding apparatus, such as the television ex300 and the LSI ex500 is configured to determine to which standard the video data conforms, and switch between the driving frequencies according to the determined standard. FIG. 122 illustrates a configuration ex800 in the present embodiment. A driving frequency switching unit ex803 sets a driving frequency to a higher driving frequency when video data is generated by the moving picture coding method or the moving picture coding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 121. Here, each of the decoding processing unit ex801 that executes the moving picture decoding method described in each of embodiments and the decoding processing unit ex802 that conforms to the conventional standard corresponds to the signal processing unit ex507 in FIG. 121. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment G2 is probably used for identifying the video data. The identification information is not limited to the one described in Embodiment G2 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 124. The driving frequency can be selected by storing the look-up table in the buffer ex508 and in an internal memory of an LSI, and with reference to the look-up table by the CPU ex502.

Figure 123:
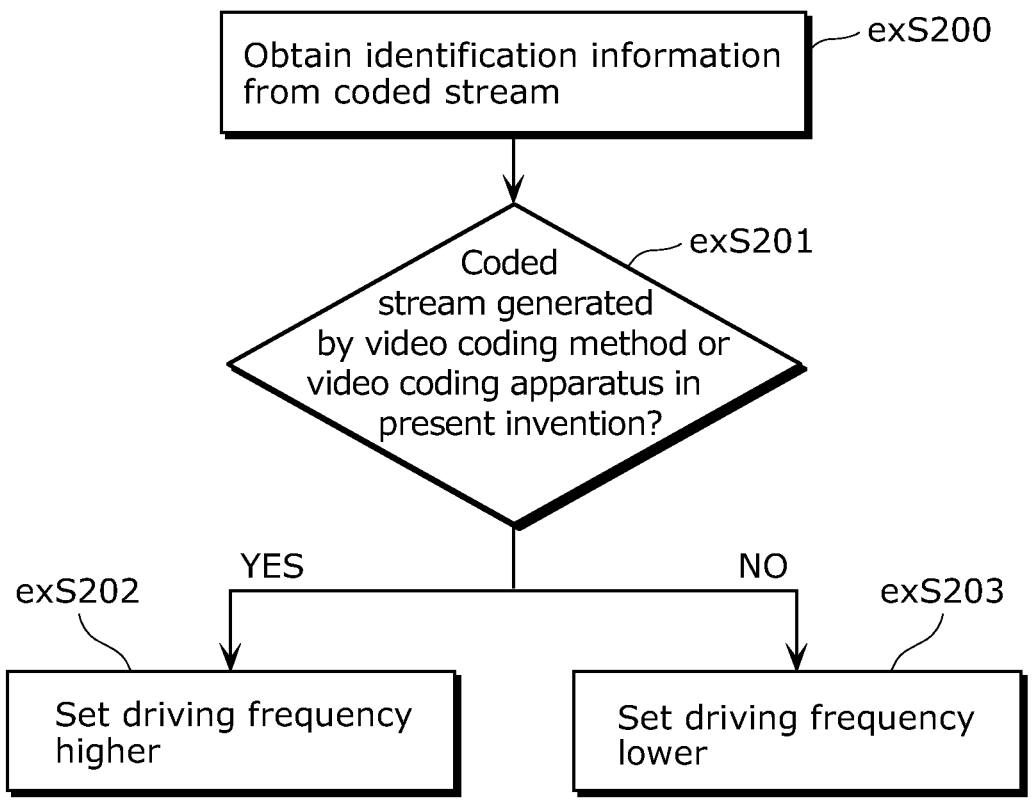

FIG. 123 illustrates steps for executing a method in the present embodiment. First, in Step exS200, the signal processing unit ex507 obtains identification information from the multiplexed data. Next, in Step exS201, the CPU ex502 determines whether or not the video data is generated by the coding method and the coding apparatus described in each of embodiments, based on the identification information. When the video data is generated by the moving picture coding method and the moving picture coding apparatus described in each of embodiments, in Step exS202, the CPU ex502 transmits a signal for setting the driving frequency to a higher driving frequency to the driving frequency control unit ex512.

Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture coding method and the moving picture coding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture coding method and the moving picture coding apparatus described in each of embodiments, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. Even when the identification information indicates that the video data is generated by the moving picture coding method and the moving picture coding apparatus described in each of embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment G5

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

Figure 125A:
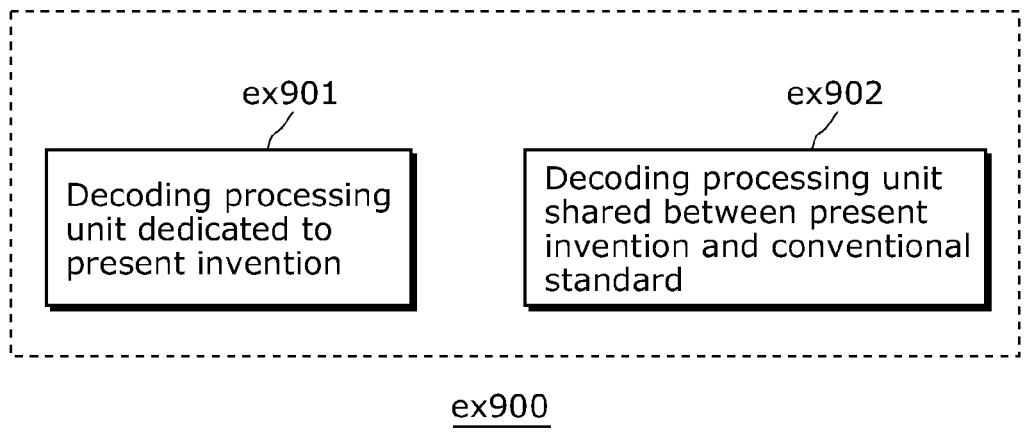

In order to solve the problem, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 125A shows an example of the configuration. For example, the moving picture decoding method described in each of embodiments and the moving picture decoding method that conforms to MPEG-4 AVC have, partly in common, the details of processing, such as entropy coding, inverse quantization, deblocking filtering, and motion compensated prediction. The details of processing to be shared probably include use of a decoding processing unit ex902 that conforms to MPEG-4 AVC. In contrast, a dedicated decoding processing unit ex901 is probably used for other processing unique to an aspect of the present invention. Since the aspect of the present invention is characterized by entropy decoding in particular, for example, the dedicated decoding processing unit ex901 is used for entropy decoding. Otherwise, the decoding processing unit is probably shared for one of the inverse quantization, deblocking filtering, and motion compensation, or all of the processing. The decoding processing unit for implementing the moving picture decoding method described in each of embodiments may be shared for the processing to be shared, and a dedicated decoding processing unit may be used for processing unique to that of MPEG-4 AVC.

Figure 125B:
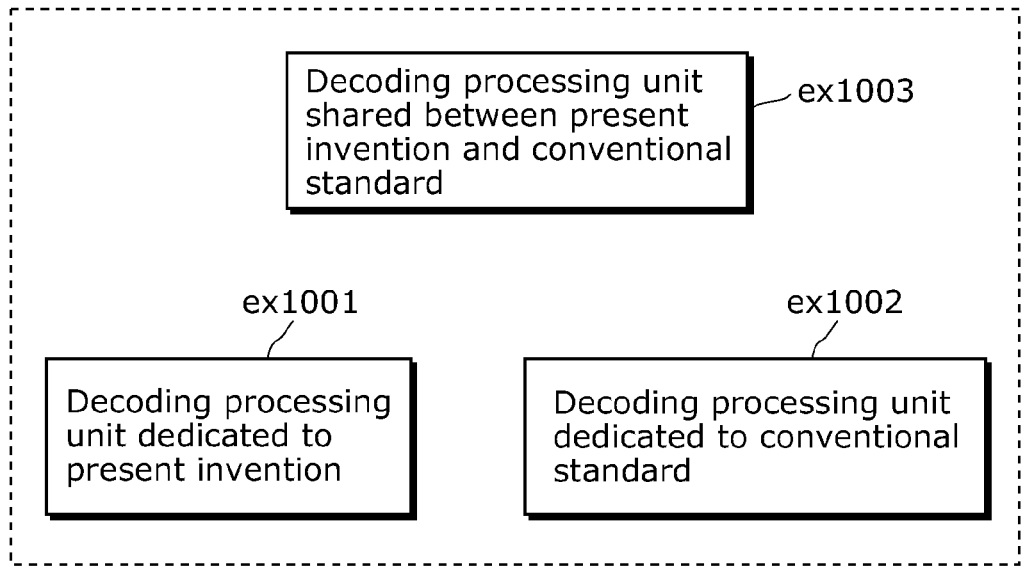

Furthermore, ex1000 in FIG. 125B shows another example in that processing is partly shared. This example uses a configuration including a dedicated decoding processing unit ex1001 that supports the processing unique to an aspect of the present invention, a dedicated decoding processing unit ex1002 that supports the processing unique to another conventional standard, and a decoding processing unit ex1003 that supports processing to be shared between the moving picture decoding method according to the aspect of the present invention and the conventional moving picture decoding method. Here, the dedicated decoding processing units ex1001 and ex1002 are not necessarily specialized for the processing according to the aspect of the present invention and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present invention and the moving picture decoding method in conformity with the conventional standard.

Although only some exemplary embodiments of the present invention have been described in detail above, those skilled in the art will readily appreciate that many modifications are possible in the exemplary embodiments without materially departing from the novel teachings and advantages of the present invention. Accordingly, all such modifications are intended to be included within the scope of the present invention.

INDUSTRIAL APPLICABILITY

The image coding method and image decoding method according to the present invention are applicable to various applications such as information display apparatuses and image capturing apparatuses which support high resolution. Examples of such apparatuses include television sets, digital video recorders, car navigation systems, mobile phones, digital cameras, and digital video cameras.

The invention claimed is:

1. An image decoding method of decoding coded image data, the image decoding method comprising
selecting, based on a type of a decoding target signal, an arithmetic decoding method that is used to decode the decoding target signal, from among a plurality of arithmetic decoding methods that include:
a first arithmetic decoding method which is performed based on a symbol occurrence probability obtained according to a context, and which involves update of the symbol occurrence probability according to a decoding symbol; and
a second arithmetic decoding method which is performed based on a symbol occurrence probability obtained according to a context, and which maintains the symbol occurrence probability that is other than 50%.

2. The image decoding method according to claim 1,
wherein the symbol occurrence probability in the second arithmetic decoding method is defined by performing a shift operation based on a parameter showing an internal state of arithmetic decoding.

3. The image decoding method according to claim 1,
wherein the second arithmetic decoding method includes normalizing an arithmetic decoding process, and
the normalizing is performed using a table that defines the number of processing loops.

4. The image decoding method according to claim 1,
wherein, in the second arithmetic decoding method, a fixed probability value is defined for each of parameters.

* * * * *